US012348555B2

(12) United States Patent
Murphy et al.

(10) Patent No.: US 12,348,555 B2
(45) Date of Patent: Jul. 1, 2025

(54) THREAT MITIGATION SYSTEM AND METHOD

(71) Applicant: ReliaQuest Holdings, LLC, Tampa, FL (US)

(72) Inventors: Brian P. Murphy, Tampa, FL (US); Joe Partlow, Tampa, FL (US); Colin O'Connor, Tampa, FL (US); Jason Pfeiffer, Tampa, FL (US); Brian Philip Murphy, St. Petersburg, FL (US); Jonathan R. Echavarria, Tampa, FL (US)

(73) Assignee: RELIAQUEST HOLDINGS, LLC, Tampa, FL (US)

( * ) Notice: Subject to any disclaimer, the term of this patent is extended or adjusted under 35 U.S.C. 154(b) by 0 days.

(21) Appl. No.: 18/585,125

(22) Filed: Feb. 23, 2024

(65) Prior Publication Data

US 2024/0291851 A1 Aug. 29, 2024

Related U.S. Application Data

(60) Provisional application No. 63/486,617, filed on Feb. 23, 2023.

(51) Int. Cl.
*H04L 9/40* (2022.01)
*G06F 16/34* (2019.01)
(Continued)

(52) U.S. Cl.
CPC ........ *H04L 63/1441* (2013.01); *G06F 16/345* (2019.01); *G06F 21/552* (2013.01);
(Continued)

(58) Field of Classification Search
CPC ........................ H04L 63/1441; H04L 63/1416
See application file for complete search history.

(56) References Cited

U.S. PATENT DOCUMENTS 7,159,237 B2 1/2007 Schneier et al.
8,745,703 B2 6/2014 Lambert et al.
(Continued)

OTHER PUBLICATIONS

Chu et al., "Analysis of network security and privacy security based on AI in IOT environment", Sep. 2021, IEEE 4th International Conference on Information Systems and Computer Aided Education, pp. 390-393 (Year: 2021).*
(Continued)

*Primary Examiner* — Kenneth W Chang
(74) *Attorney, Agent, or Firm* — Brian J. Colandreo; Jeffrey T. Placker; Holland & Knight LLP

(57) ABSTRACT

A computer-implemented method, computer program product and computing system for establishing connectivity with a plurality of security-relevant subsystems within a computing platform; receiving an initial notification of a security event from one of the security-relevant subsystems, wherein the initial notification includes a computer-readable language portion that defines one or more specifics of the security event; processing the initial notification using a generative AI model and a formatting script to produce a summarized human-readable report for the initial notification, wherein the summarized human-readable report defines one or more recommended actions; and automatically executing some or all of the recommended actions to address the security event.

24 Claims, 44 Drawing Sheets

(51) Int. Cl.

| | |
|---|---|
| ***G06F 21/55*** | (2013.01) |
| ***G06F 21/56*** | (2013.01) |
| ***G06F 40/103*** | (2020.01) |
| ***G06F 40/154*** | (2020.01) |
| ***G06F 40/56*** | (2020.01) |
| ***G06N 3/0475*** | (2023.01) |
| ***H04L 41/16*** | (2022.01) |

(52) U.S. Cl.

CPC .......... *G06F 21/554* (2013.01); *G06F 21/566* (2013.01); *G06F 40/103* (2020.01); *G06F 40/154* (2020.01); *G06F 40/56* (2020.01); *G06N 3/0475* (2023.01); *H04L 41/16* (2013.01); *H04L 63/1416* (2013.01); *H04L 63/1425* (2013.01); *G06F 2221/034* (2013.01)

(56) References Cited

U.S. PATENT DOCUMENTS 9,292,496 B1* 3/2016 Carbonell ............... G06F 40/30
9,436,820 B1 9/2016 Gleichauf et al.
9,641,544 B1 5/2017 Treat et al.
10,397,255 B1 8/2019 Bhalotra et al.
10,681,060 B2 6/2020 Scheidler et al.
10,778,714 B2 9/2020 Shi
11,023,576 B2 6/2021 Griffin et al.
11,119,630 B1 9/2021 Marchetti et al.
11,336,689 B1 5/2022 Miramirkhani et al.
11,363,036 B2 6/2022 Levin et al.
11,388,040 B2 7/2022 Mdini et al.
11,416,504 B2 8/2022 Pelloin
11,558,408 B2 1/2023 Eisenkot et al.
11,743,287 B2 8/2023 Nagarajegowda et al.
11,750,634 B1 9/2023 Chowdhary et al.
11,886,585 B1 1/2024 Davis
11,916,767 B1 2/2024 Wu et al.
12,081,568 B2 9/2024 Koide et al.
12,184,697 B2 12/2024 Crabtree et al.
2003/0051026 A1 3/2003 Carter et al.
2005/0254654 A1 11/2005 Rockwell et al.
2006/0236395 A1 10/2006 Barker et al.
2009/0172773 A1 7/2009 Moore
2012/0158615 A1* 6/2012 Spring .................... G06F 40/20
706/11
2014/0249760 A1 9/2014 Proud et al.
2015/0067835 A1 3/2015 Chari et al.
2017/0006058 A1 1/2017 Murphy et al.
2017/0006061 A1 1/2017 Murphy et al.
2017/0054745 A1 2/2017 Zhang et al.
2017/0286455 A1 10/2017 Li et al.
2018/0020021 A1 1/2018 Gilmore et al.
2018/0285479 A1* 10/2018 Mackay ........... G06F 16/90335
2018/0288070 A1 10/2018 Price et al.
2018/0307833 A1 10/2018 Noeth et al.
2019/0124109 A1 4/2019 Foster et al.
2019/0164224 A1 5/2019 Hunter et al.
2019/0205395 A1 7/2019 Bonin et al.
2019/0208363 A1 7/2019 Shapiro et al.
2019/0228297 A1* 7/2019 Shen ........................ G06N 3/08
2019/0258716 A1* 8/2019 Becker .................. G06F 16/904
2019/0260764 A1 8/2019 Humphrey et al.
2019/0260769 A1 8/2019 Sharon et al.
2019/0260779 A1* 8/2019 Bazalgette .............. H04L 51/42
2019/0312889 A1 10/2019 Philip et al.
2019/0377876 A1 12/2019 Murphy et al.
2019/0379705 A1 12/2019 Murphy et al.
2019/0394226 A1 12/2019 Murphy et al.
2020/0023846 A1 1/2020 Husain et al.
2020/0067985 A1 2/2020 Bhargava et al.
2020/0125725 A1 4/2020 Petersen et al.
2020/0134103 A1 4/2020 Mankovskii
2020/0285977 A1 9/2020 Brebner
2020/0329054 A1 10/2020 Bjarnason et al.
2020/0344249 A1 10/2020 Mohan et al.
2020/0358792 A1 11/2020 Bazalgette et al.
2020/0396231 A1 12/2020 Krebs et al.
2020/0410320 A1 12/2020 Almazn et al.
2021/0014256 A1 1/2021 Malhotra
2021/0026954 A1 1/2021 Murphy et al.
2021/0029159 A1 1/2021 Murphy et al.
2021/0035116 A1 2/2021 Berrington et al.
2021/0037043 A1 2/2021 Lee et al.
2021/0042662 A1* 2/2021 Pu ......................... G06Q 50/01
2021/0073389 A1 3/2021 Murphy et al.
2021/0073390 A1 3/2021 Murphy et al.
2021/0075818 A1 3/2021 Murphy et al.
2021/0075819 A1 3/2021 Murphy et al.
2021/0075820 A1 3/2021 Murphy et al.
2021/0133670 A1 5/2021 Cella et al.
2021/0150411 A1 5/2021 Coenders et al.
2021/0160258 A1* 5/2021 Murphy .............. H04L 63/1416
2021/0160274 A1 5/2021 Murphy et al.
2021/0168161 A1 6/2021 Dunn et al.
2021/0168175 A1 6/2021 Crabtree et al.
2021/0194924 A1 6/2021 Heinemeyer et al.
2021/0273954 A1 9/2021 Linton et al.
2021/0273960 A1 9/2021 Humphrey et al.
2021/0287800 A1* 9/2021 Ghosh .................... G16H 10/60
2021/0319090 A1 10/2021 Demir et al.
2021/0359980 A1 11/2021 Crabtree et al.
2021/0366586 A1 11/2021 Ryan et al.
2022/0036153 A1 2/2022 O'Malia et al.
2022/0058273 A1 2/2022 Rathore et al.
2022/0148397 A1 5/2022 Schoeman
2022/0156380 A1 5/2022 Pradzynski et al.
2022/0187847 A1 6/2022 Cella et al.
2022/0237368 A1 7/2022 Tran
2022/0245641 A1 8/2022 Wintle et al.
2022/0261478 A1 8/2022 Yankovskiy et al.
2022/0329630 A1 10/2022 Li
2022/0382611 A1 12/2022 Kapish et al.
2022/0400131 A1 12/2022 Shao et al.
2023/0009704 A1 1/2023 Boyle et al.
2023/0095415 A1 3/2023 Boyer et al.
2023/0124288 A1 4/2023 Meier-Hellstern et al.
2023/0132501 A1 5/2023 Phillippe et al.
2023/0164158 A1* 5/2023 Fellows .............. H04L 63/1425
726/23
2023/0164567 A1 5/2023 Fellows et al.
2023/0171266 A1* 6/2023 Brunner .............. H04L 63/1441
726/23
2023/0179628 A1 6/2023 Porras et al.
2023/0229937 A1 7/2023 Takata et al.
2023/0245234 A1 8/2023 Sumant
2023/0252147 A1 8/2023 Gervais et al.
2023/0259860 A1 8/2023 Sarkar
2023/0283629 A1 9/2023 Boyer et al.
2023/0308474 A1 9/2023 Thompson
2023/0315722 A1 10/2023 Saxe et al.
2023/0319071 A1 10/2023 Durbin et al.
2023/0368321 A1 11/2023 Bringsjord et al.
2023/0396641 A1 12/2023 Hebbagodi et al.
2023/0403296 A1 12/2023 Pickman et al.
2023/0403587 A1 12/2023 Lee et al.
2024/0045990 A1* 2/2024 Boyer ................... G06F 40/279
2024/0046318 A1 2/2024 Muriqi
2024/0061937 A1 2/2024 Camp et al.
2024/0070270 A1 2/2024 Mace et al.
2024/0112791 A1 4/2024 Simmons et al.
2024/0152624 A1 5/2024 Helyar et al.
2024/0168864 A1 5/2024 Hamlin et al.
2024/0171451 A1 5/2024 Soni et al.
2024/0256582 A1 8/2024 Jain et al.
2024/0273227 A1 8/2024 Thompson

OTHER PUBLICATIONS

International Search Report and Written Opinion issued in related Application Serial No. PCT/US2024/017020 on Jun. 21, 2024.

International Search Report and Written Opinion issued in related Application Serial No. PCT/US2024/017024 on Jun. 21, 2024.

(56) References Cited

OTHER PUBLICATIONS

International Search Report and Written Opinion issued in related Application Serial No. PCT/US2024/017029 on Jun. 21, 2024.
International Search Report and Written Opinion issued in related Application Serial No. PCT/US2024/017032 on Jun. 21, 2024.
International Search Report and Written Opinion issued in related Application Serial No. PCT/US2024/017037 on Jun. 21, 2024.
International Search Report and Written Opinion issued in related Application Serial No. PCT/US2024/017041 on Jun. 26, 2024.
International Search Report and Written Opinion issued in related Application Serial No. PCT/US2024/017044 on Jun. 26, 2024.
International Search Report and Written Opinion issued in related Application Serial No. PCT/US2024/017056 on Jun. 26, 2024.
International Search Report and Written Opinion issued in related Application Serial No. PCT/US2024/017063 on Jul. 24, 2024.
International Search Report and Written Opinion issued in related Application Serial No. PCT/US2024/017066 on Jun. 4, 2024.
International Search Report and Written Opinion issued in related Application Serial No. PCT/US2024/017070 on Jun. 26, 2024.
Non Final Office Action issued in related U.S. Appl. No. 18/584,994 on May 31, 2024.
Non Final Office Action issued in related U.S. Appl. No. 18/584,989 on Jun. 7, 2024.
Non Final Office Action issued in related U.S. Appl. No. 18/585,000 on May 22, 2024.
Non Final Office Action issued in related U.S. Appl. No. 18/585,128 on Jun. 5, 2024.
Non Final Office Action issued in related U.S. Appl. No. 18/585,186 on Jun. 6, 2024.
Non Final Office Action issued in related U.S. Appl. No. 18/585,428 on Jun. 17, 2024.
Non Final Office Action issued in related U.S. Appl. No. 18/585,510 on May 30, 2024.
Non-Final Office Action issued in related U.S. Appl. No. 18/584,996 on Jun. 13, 2024.
Non-Final Office Action issued in related U.S. Appl. No. 18/585,120 on May 21, 2024.
Non-Final Office Action issued in the related U.S. Appl. No. 18/585,687 mailed on May 2, 2024.
Final Office Action issued in related U.S. Appl. No. 18/584,994 on Sep. 11, 2024.
Final Office Action issued in related U.S. Appl. No. 18/585,128 on Sep. 24, 2024.
Final Office Action issued in related U.S. Appl. No. 18/585,186 on Sep. 28, 2024.
Final Office Action issued in related U.S. Appl. No. 18/585,510 on Oct. 22, 2024.
Final Office Action issued in related U.S. Appl. No. 18/585,687 on Oct. 31, 2024.
Final Office Action issued in related U.S. Appl. No. 18/585,000 on Dec. 30, 2024.
Final Office Action issued in related U.S. Appl. No. 18/585,428 on Dec. 13, 2024.
Final Office Action issued in related U.S. Appl. No. 18/584,989 on Nov. 27, 2024.
Final Office Action issued in related U.S. Appl. No. 18/585,120 on Nov. 15, 2024.
Final Office Action issued in related U.S. Appl. No. 18/584,996 on Jan. 29, 2025.
Non-Final Office Action issued in related U.S. Appl. No. 18/584,994 on Mar. 3, 2025.
Non-Final Office Action issued in related U.S. Appl. No. 18/585,128 on Jan. 15, 2025.
Non-Final Office Action issued in related U.S. Appl. No. 18/585,510 on Feb. 21, 2025.
Notice of Allowance issued in related U.S. Appl. No. 18/584,989 on Feb. 24, 2025.
Notice of Allowance issued in related U.S. Appl. No. 18/584,989 on Mar. 19, 2025.
Notice of Allowance issued in related U.S. Appl. No. 18/585,120 on Feb. 18, 2025.
Notice of Allowance issued in related U.S. Appl. No. 18/585,120 on Mar. 3, 2025.
Notice of Allowance issued in related U.S. Appl. No. 18/585,186 on Feb. 12, 2025.
Notice of Allowance issued in related U.S. Appl. No. 18/585,186 on Jan. 16, 2025.
Notice of Allowance issued in related U.S. Appl. No. 18/585,687 on Mar. 20, 2025.
Notice of Allowance issued in related U.S. Appl. No. 18/585,186 on Apr. 14, 2025.
Notice of Allowance issued in related U.S. Appl. No. 18/585,428 on Apr. 16, 2025.
Non Final Office Action issued in related U.S. Appl. No. 18/584,996 on May 21, 2025.
Notice of Allowance issued in related U.S. Appl. No. 18/585,000 on Apr. 21, 2025.
Notice of Allowance issued in related U.S. Appl. No. 18/585,120 on May 19, 2025.
Notice of Allowance issued in related U.S. Appl. No. 18/585,128 on May 8, 2025.
Notice of Allowance issued in related U.S. Appl. No. 18/585,186 on Apr. 24, 2025.

* cited by examiner

350

10

352

352

1258

10

10

2900

THREAT MITIGATION SYSTEM AND METHOD

RELATED APPLICATION(S)

This application claims the benefit of U.S. Provisional Patent Application No. 63/486,617, filed on 23 Feb. 2023, the entire contents of which are herein incorporated by reference.

TECHNICAL FIELD

This disclosure relates to threat mitigation systems and, more particularly, to threat mitigation systems that utilize a universal query language.

BACKGROUND

In the computer world, there is a constant battle occurring between bad actors that want to attack computing platforms and good actors who try to prevent the same. Unfortunately, the complexity of such computer attacks in constantly increasing, so technology needs to be employed that understands the complexity of these attacks and is capable of addressing the same.

Threat mitigation systems may utilize and/or communicate with a plurality of security-relevant subsystems, wherein these security-relevant subsystems may gather information concerning such computer attacks. Unfortunately and in order to obtain such gathered information from these security-relevant subsystems, the user of the threat mitigation system would often be required to formulate a unique query for each security-relevant subsystem.

SUMMARY OF DISCLOSURE

Auto-Execution of Recommended Actions

In one implementation, a computer-implemented method is executed on a computing device and includes: establishing connectivity with a plurality of security-relevant subsystems within a computing platform; receiving an initial notification of a security event from one of the security-relevant subsystems, wherein the initial notification includes a computer-readable language portion that defines one or more specifics of the security event; processing the initial notification using a generative AI model and a formatting script to produce a summarized human-readable report for the initial notification, wherein the summarized human-readable report defines one or more recommended actions; and automatically executing some or all of the recommended actions to address the security event.

One or more of the following features may be included. Receiving an initial notification of a security event from one of the security-relevant subsystems may include: receiving the initial notification of the security event from an agent executed on one of the security-relevant subsystems. Processing the initial notification using a generative AI model and a formatting script to produce a summarized human-readable report for the initial notification may include: processing the initial notification using the generative AI model, the formatting script and/or one or more tools to produce the summarized human-readable report for the initial notification. The one or more tools may include one or more of: a decoding tool to decode an encoded initial notification; a decompression tool to decompress a compressed initial notification; and an identification tool to identify an owner of a domain associated with the initial notification. Processing the initial notification using a generative AI model and a formatting script to produce a summarized human-readable report for the initial notification may include: processing the initial notification using a large language model. Processing the initial notification using a generative AI model and a formatting script to produce a summarized human-readable report for the initial notification may include: utilizing prompt engineering to produce the summarized human-readable report for the initial notification. Processing the initial notification using a generative AI model and a formatting script to produce a summarized human-readable report for the initial notification may include: utilizing several loops and/or nested loops to produce the summarized human-readable report for the initial notification. Automatically executing some or all of the recommended actions may include: automatically performing one or more remedial operations concerning the security event.

In another implementation, a computer program product resides on a computer readable medium and has a plurality of instructions stored on it. When executed by a processor, the instructions cause the processor to perform operations including establishing connectivity with a plurality of security-relevant subsystems within a computing platform; receiving an initial notification of a security event from one of the security-relevant subsystems, wherein the initial notification includes a computer-readable language portion that defines one or more specifics of the security event; processing the initial notification using a generative AI model and a formatting script to produce a summarized human-readable report for the initial notification, wherein the summarized human-readable report defines one or more recommended actions; and automatically executing some or all of the recommended actions to address the security event.

One or more of the following features may be included. Receiving an initial notification of a security event from one of the security-relevant subsystems may include: receiving the initial notification of the security event from an agent executed on one of the security-relevant subsystems. Processing the initial notification using a generative AI model and a formatting script to produce a summarized human-readable report for the initial notification may include: processing the initial notification using the generative AI model, the formatting script and/or one or more tools to produce the summarized human-readable report for the initial notification. The one or more tools may include one or more of: a decoding tool to decode an encoded initial notification; a decompression tool to decompress a compressed initial notification; and an identification tool to identify an owner of a domain associated with the initial notification. Processing the initial notification using a generative AI model and a formatting script to produce a summarized human-readable report for the initial notification may include: processing the initial notification using a large language model. Processing the initial notification using a generative AI model and a formatting script to produce a summarized human-readable report for the initial notification may include: utilizing prompt engineering to produce the summarized human-readable report for the initial notification. Processing the initial notification using a generative AI model and a formatting script to produce a summarized human-readable report for the initial notification may include: utilizing several loops and/or nested loops to produce the summarized human-readable report for the initial notification. Automatically executing some or all of the recommended actions may include: automatically performing one or more remedial operations concerning the security event.

In another implementation, a computing system includes a processor and a memory system configured to perform operations including establishing connectivity with a plurality of security-relevant subsystems within a computing platform; receiving an initial notification of a security event from one of the security-relevant subsystems, wherein the initial notification includes a computer-readable language portion that defines one or more specifics of the security event; processing the initial notification using a generative AI model and a formatting script to produce a summarized human-readable report for the initial notification, wherein the summarized human-readable report defines one or more recommended actions; and automatically executing some or all of the recommended actions to address the security event.

One or more of the following features may be included. Receiving an initial notification of a security event from one of the security-relevant subsystems may include: receiving the initial notification of the security event from an agent executed on one of the security-relevant subsystems. Processing the initial notification using a generative AI model and a formatting script to produce a summarized human-readable report for the initial notification may include: processing the initial notification using the generative AI model, the formatting script and/or one or more tools to produce the summarized human-readable report for the initial notification. The one or more tools may include one or more of: a decoding tool to decode an encoded initial notification; a decompression tool to decompress a compressed initial notification; and an identification tool to identify an owner of a domain associated with the initial notification. Processing the initial notification using a generative AI model and a formatting script to produce a summarized human-readable report for the initial notification may include: processing the initial notification using a large language model. Processing the initial notification using a generative AI model and a formatting script to produce a summarized human-readable report for the initial notification may include: utilizing prompt engineering to produce the summarized human-readable report for the initial notification. Processing the initial notification using a generative AI model and a formatting script to produce a summarized human-readable report for the initial notification may include: utilizing several loops and/or nested loops to produce the summarized human-readable report for the initial notification. Automatically executing some or all of the recommended actions may include: automatically performing one or more remedial operations concerning the security event.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

System Overview

Figure 1:
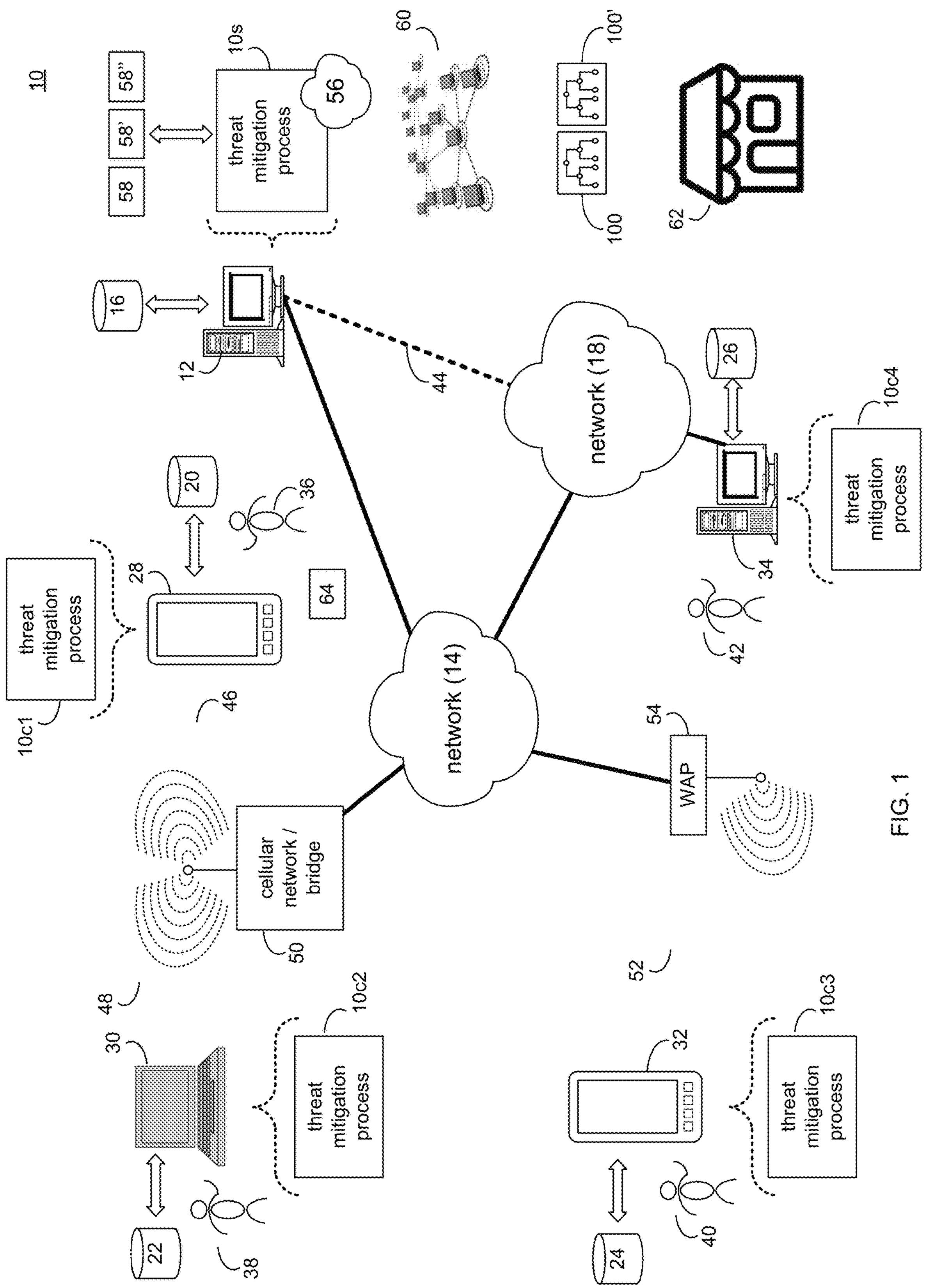
FIG. 1 is a diagrammatic view of a distributed computing network including a computing device that executes a threat mitigation process according to an embodiment of the present disclosure.

Referring to FIG. 1, there is shown threat mitigation process 10. Threat mitigation process 10 may be implemented as a server-side process, a client-side process, or a hybrid server-side/client-side process. For example, threat mitigation process 10 may be implemented as a purely server-side process via threat mitigation process 10*s*. Alternatively, threat mitigation process 10 may be implemented as a purely client-side process via one or more of threat mitigation process 10*c*1, threat mitigation process 10*c*2, threat mitigation process 10*c*3, and threat mitigation process 10*c*4. Alternatively still, threat mitigation process 10 may be implemented as a hybrid server-side/client-side process via threat mitigation process 10*s* in combination with one or more of threat mitigation process 10*c*1, threat mitigation process 10*c*2, threat mitigation process 10*c*3, and threat mitigation process 10*c*4. Accordingly, threat mitigation process 10 as used in this disclosure may include any combination of threat mitigation process 10*s*, threat mitigation process 10*c*1, threat mitigation process 10*c*2, threat mitigation process, and threat mitigation process 10*c*4.

Threat mitigation process 10*s* may be a server application and may reside on and may be executed by computing device 12, which may be connected to network 14 (e.g., the Internet or a local area network). Examples of computing device 12 may include, but are not limited to: a personal computer, a laptop computer, a personal digital assistant, a data-enabled cellular telephone, a notebook computer, a television with one or more processors embedded therein or coupled thereto, a cable/satellite receiver with one or more processors embedded therein or coupled thereto, a server computer, a series of server computers, a mini computer, a mainframe computer, or a cloud-based computing network.

The instruction sets and subroutines of threat mitigation process 10*s*, which may be stored on storage device 16 coupled to computing device 12, may be executed by one or more processors (not shown) and one or more memory architectures (not shown) included within computing device 12. Examples of storage device 16 may include but are not limited to: a hard disk drive; a RAID device; a random-access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Examples of threat mitigation processes 10*c*1, 10*c*2, 10*c*3, 10*c*4 may include but are not limited to a client application, a web browser, a game console user interface, or a specialized application (e.g., an application running on e.g., the Android™ platform or the iOS™ platform). The instruction sets and subroutines of threat mitigation processes 10*c*1, 10*c*2, 10*c*3, 10*c*4, which may be stored on storage devices 20, 22, 24, 26 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Examples of storage device 16 may include but are not limited to: a hard disk drive; a RAID device; a random-access memory (RAM); a read-only memory (ROM); and all forms of flash memory storage devices.

Examples of client electronic devices 28, 30, 32, 34 may include, but are not limited to, data-enabled, cellular telephone 28, laptop computer 30, personal digital assistant 32, personal computer 34, a notebook computer (not shown), a server computer (not shown), a gaming console (not shown), a smart television (not shown), and a dedicated network device (not shown). Client electronic devices 28, 30, 32, 34 may each execute an operating system, examples of which may include but are not limited to Microsoft Windows™, Android™, WebOS™, iOS™, Redhat Linux™, or a custom operating system.

Users 36, 38, 40, 42 may access threat mitigation process 10 directly through network 14 or through secondary network 18. Further, threat mitigation process 10 may be connected to network 14 through secondary network 18, as illustrated with link line 44.

The various client electronic devices (e.g., client electronic devices 28, 30, 32, 34) may be directly or indirectly coupled to network 14 (or network 18). For example, data-enabled, cellular telephone 28 and laptop computer 30 are shown wirelessly coupled to network 14 via wireless communication channels 46, 48 (respectively) established between data-enabled, cellular telephone 28, laptop computer 30 (respectively) and cellular network/bridge 50, which is shown directly coupled to network 14. Further, personal digital assistant 32 is shown wirelessly coupled to network 14 via wireless communication channel 52 established between personal digital assistant 32 and wireless access point (i.e., WAP) 54, which is shown directly coupled to network 14. Additionally, personal computer 34 is shown directly coupled to network 18 via a hardwired network connection. WAP 54 may be, for example, an IEEE 802.11a, 802.11b, 802.11g, 802.11n, Wi-Fi, and/or Bluetooth device that is capable of establishing wireless communication channel 52 between personal digital assistant 32 and WAP 54. As is known in the art, IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

Artificial Intelligence/Machines Learning Overview:

Assume for illustrative purposes that threat mitigation process 10 includes AI/ML process 56 (e.g., an artificial intelligence/machine learning process) that is configured to process information (e.g., information 58). As will be discussed below in greater detail, examples of information 58 may include but are not limited to platform information (e.g., structured or unstructured content) being scanned to detect security events (e.g., access auditing; anomalies; authentication; denial of services; exploitation; malware; phishing; spamming; reconnaissance; and/or web attack) within a monitored computing platform (e.g., computing platform 60).

As is known in the art, structured content may be content that is separated into independent portions (e.g., fields, columns, features) and, therefore, may have a pre-defined data model and/or is organized in a pre-defined manner. For example, if the structured content concerns an employee list: a first field, column or feature may define the first name of the employee; a second field, column or feature may define the last name of the employee; a third field, column or feature may define the home address of the employee; and a fourth field, column or feature may define the hire date of the employee.

Further and as is known in the art, unstructured content may be content that is not separated into independent portions (e.g., fields, columns, features) and, therefore, may not have a pre-defined data model and/or is not organized in a pre-defined manner. For example, if the unstructured content concerns the same employee list: the first name of the employee, the last name of the employee, the home address of the employee, and the hire date of the employee may all be combined into one field, column or feature.

For the following illustrative example, assume that information 58 is unstructured content, an example of which may include but is not limited to unstructured user feedback received by a company (e.g., text-based feedback such as text-messages, social media posts, and email messages; and transcribed voice-based feedback such as transcribed voice mail, and transcribed voice messages).

When processing information 58, AI/ML process 56 may use probabilistic modeling to accomplish such processing, wherein examples of such probabilistic modeling may include but are not limited to discriminative modeling, generative modeling, or combinations thereof.

As is known in the art, probabilistic modeling may be used within modern artificial intelligence systems (e.g., AI/ML process 56), in that these probabilistic models may provide artificial intelligence systems with the tools required to autonomously analyze vast quantities of data (e.g., information 58).

Examples of the tasks for which probabilistic modeling may be utilized may include but are not limited to:

- predicting media (music, movies, books) that a user may like or enjoy based upon media that the user has liked or enjoyed in the past;
- transcribing words spoken by a user into editable text;
- grouping genes into gene clusters;
- identifying recurring patterns within vast data sets;
- filtering email that is believed to be spam from a user's inbox;
- generating clean (i.e., non-noisy) data from a noisy data set;
- analyzing (voice-based or text-based) customer feedback; and
- diagnosing various medical conditions and diseases.

For each of the above-described applications of probabilistic modeling, an initial probabilistic model may be defined, wherein this initial probabilistic model may be subsequently (e.g., iteratively or continuously) modified and revised, thus allowing the probabilistic models and the artificial intelligence systems (e.g., AI/ML process 56) to "learn" so that future probabilistic models may be more precise and may explain more complex data sets.

Accordingly, AI/ML process 56 may define an initial probabilistic model for accomplishing a defined task (e.g., the analyzing of information 58). For the illustrative example, assume that this defined task is analyzing customer feedback (e.g., information 58) that is received from customers of e.g., store 62 via an automated feedback phone line. For this example, assume that information 58 is initially voice-based content that is processed via e.g., a speech-to-text process that results in unstructured text-based customer feedback (e.g., information 58).

With respect to AI/ML process 56, a probabilistic model may be utilized to go from initial observations about information 58 (e.g., as represented by the initial branches of a probabilistic model) to conclusions about information 58 (e.g., as represented by the leaves of a probabilistic model).

As used in this disclosure, the term "branch" may refer to the existence (or non-existence) of a component (e.g., a sub-model) of (or included within) a model. Examples of such a branch may include but are not limited to: an execution branch of a probabilistic program or other generative model, a part (or parts) of a probabilistic graphical model, and/or a component neural network that may (or may not) have been previously trained.

While the following discussion provides a detailed example of a probabilistic model, this is for illustrative purposes only and is not intended to be a limitation of this disclosure, as other configurations are possible and are considered to be within the scope of this disclosure. For example, the following discussion may concern any type of model (e.g., be it probabilistic or other) and, therefore, the below-described probabilistic model is merely intended to be one illustrative example of a type of model and is not intended to limit this disclosure to probabilistic models.

Additionally, while the following discussion concerns word-based routing of messages through a probabilistic model, this is for illustrative purposes only and is not intended to be a limitation of this disclosure, as other configurations are possible and are considered to be within the scope of this disclosure. Examples of other types of information that may be used to route messages through a probabilistic model may include: the order of the words within a message; and the punctuation interspersed throughout the message.

Figure 2:
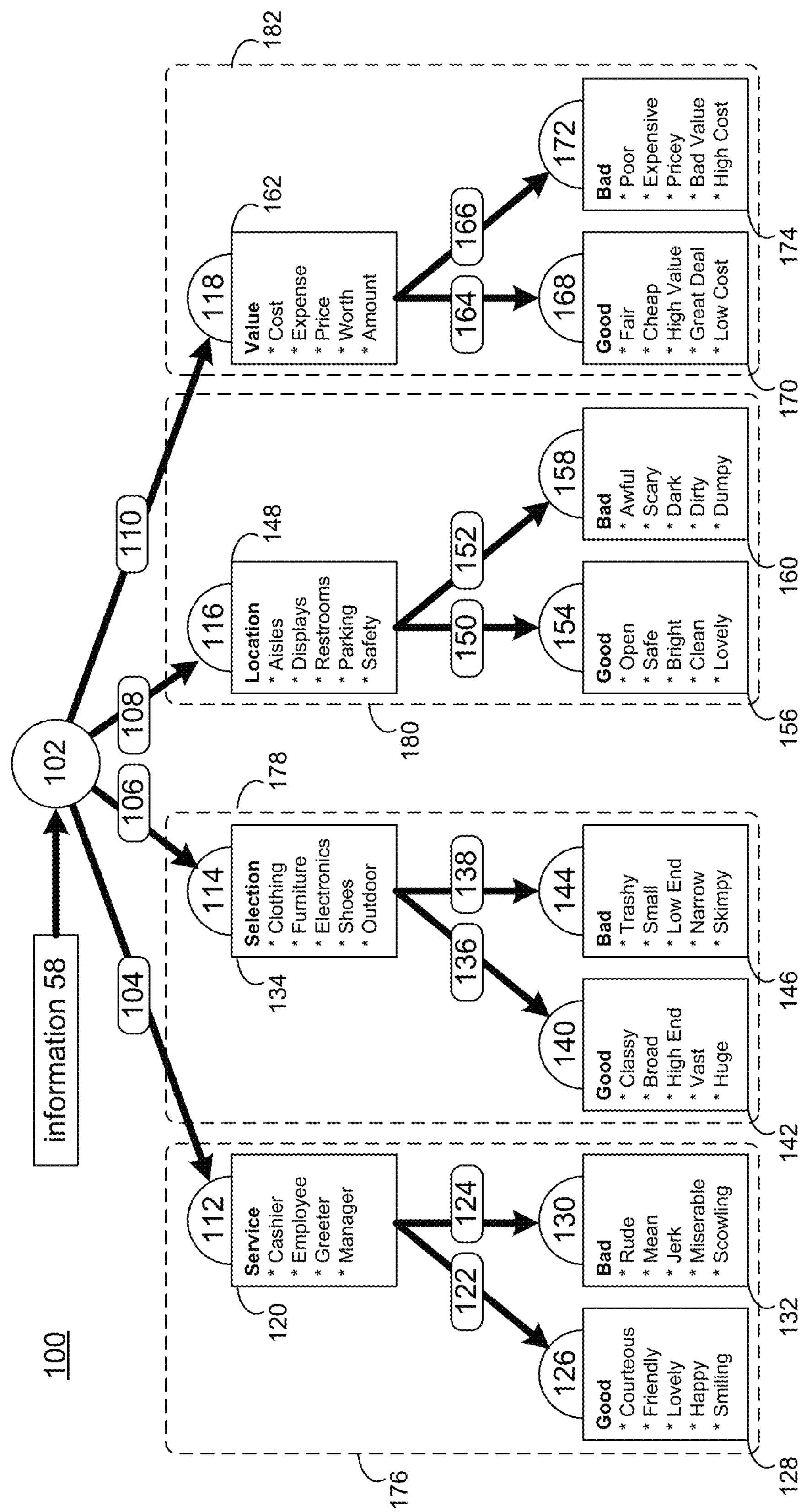
FIG. 2 is a diagrammatic view of an exemplary probabilistic model rendered by a probabilistic process of the threat mitigation process of FIG. 1 according to an embodiment of the present disclosure.

For example and referring also to FIG. 2, there is shown one simplified example of a probabilistic model (e.g., probabilistic model 100) that may be utilized to analyze information 58 (e.g., unstructured text-based customer feedback) concerning store 62. The manner in which probabilistic model 100 may be automatically-generated by AI/ML process 56 will be discussed below in detail. In this particular example, probabilistic model 100 may receive information 58 (e.g., unstructured text-based customer feedback) at branching node 102 for processing. Assume that probabilistic model 100 includes four branches off of branching node 102, namely: service branch 104; selection branch 106; location branch 108; and value branch 110 that respectively lead to service node 112, selection node 114, location node 116, and value node 118.

As stated above, service branch 104 may lead to service node 112, which may be configured to process the portion of information 58 (e.g., unstructured text-based customer feedback) that concerns (in whole or in part) feedback concerning the customer service of store 62. For example, service node 112 may define service word list 120 that may include e.g., the word service, as well as synonyms of (and words related to) the word service (e.g., cashier, employee, greeter and manager). Accordingly and in the event that a portion of information 58 (e.g., a text-based customer feedback message) includes the word cashier, employee, greeter and/or manager, that portion of information 58 may be considered to be text-based customer feedback concerning the service received at store 62 and (therefore) may be routed to service node 112 of probabilistic model 100 for further processing. Assume for this illustrative example that probabilistic model 100 includes two branches off of service node 112, namely: good service branch 122 and bad service branch 124.

Good service branch 122 may lead to good service node 126, which may be configured to process the portion of information 58 (e.g., unstructured text-based customer feedback) that concerns (in whole or in part) good feedback concerning the customer service of store 62. For example, good service node 126 may define good service word list 128 that may include e.g., the word good, as well as synonyms of (and words related to) the word good (e.g., courteous, friendly, lovely, happy, and smiling). Accordingly and in the event that a portion of information 58 (e.g., a text-based customer feedback message) that was routed to service node 112 includes the word good, courteous, friendly, lovely, happy, and/or smiling, that portion of information 58 may be considered to be text-based customer feedback indicative of good service received at store 62 (and, therefore, may be routed to good service node 126).

Bad service branch 124 may lead to bad service node 130, which may be configured to process the portion of information 58 (e.g., unstructured text-based customer feedback) that concerns (in whole or in part) bad feedback concerning the customer service of store 62. For example, bad service node 130 may define bad service word list 132 that may include e.g., the word bad, as well as synonyms of (and words related to) the word bad (e.g., rude, mean, jerk, miserable, and scowling). Accordingly and in the event that a portion of information 58 (e.g., a text-based customer feedback message) that was routed to service node 112 includes the word bad, rude, mean, jerk, miserable, and/or scowling, that portion of information 58 may be considered to be text-based customer feedback indicative of bad service received at store 62 (and, therefore, may be routed to bad service node 130).

As stated above, selection branch 106 may lead to selection node 114, which may be configured to process the portion of information 58 (e.g., unstructured text-based customer feedback) that concerns (in whole or in part) feedback concerning the selection available at store 62. For example, selection node 114 may define selection word list 134 that may include e.g., words indicative of the selection available at store 62. Accordingly and in the event that a portion of information 58 (e.g., a text-based customer feedback message) includes any of the words defined within selection word list 134, that portion of information 58 may be considered to be text-based customer feedback concerning the selection available at store 62 and (therefore) may be routed to selection node 114 of probabilistic model 100 for further processing. Assume for this illustrative example that probabilistic model 100 includes two branches off of selection node 114, namely: good selection branch 136 and bad selection branch 138.

Good selection branch 136 may lead to good selection node 140, which may be configured to process the portion of information 58 (e.g., unstructured text-based customer feedback) that concerns (in whole or in part) good feedback concerning the selection available at store 62. For example, good selection node 140 may define good selection word list 142 that may include words indicative of a good selection at store 62. Accordingly and in the event that a portion of information 58 (e.g., a text-based customer feedback message) that was routed to selection node 114 includes any of the words defined within good selection word list 142, that portion of information 58 may be considered to be text-based customer feedback indicative of a good selection available at store 62 (and, therefore, may be routed to good selection node 140).

Bad selection branch 138 may lead to bad selection node 144, which may be configured to process the portion of information 58 (e.g., unstructured text-based customer feedback) that concerns (in whole or in part) bad feedback concerning the selection available at store 62. For example, bad selection node 144 may define bad selection word list 146 that may include words indicative of a bad selection at store 62. Accordingly and in the event that a portion of information 58 (e.g., a text-based customer feedback message) that was routed to selection node 114 includes any of the words defined within bad selection word list 146, that portion of information 58 may be considered to be text-based customer feedback indicative of a bad selection being available at store 62 (and, therefore, may be routed to bad selection node 144).

As stated above, location branch 108 may lead to location node 116, which may be configured to process the portion of information 58 (e.g., unstructured text-based customer feedback) that concerns (in whole or in part) feedback concerning the location of store 62. For example, location node 116 may define location word list 148 that may include e.g., words indicative of the location of store 62. Accordingly and in the event that a portion of information 58 (e.g., a text-based customer feedback message) includes any of the words defined within location word list 148, that portion of information 58 may be considered to be text-based customer feedback concerning the location of store 62 and (therefore) may be routed to location node 116 of probabilistic model 100 for further processing. Assume for this illustrative example that probabilistic model 100 includes two branches off of location node 116, namely: good location branch 150 and bad location branch 152.

Good location branch 150 may lead to good location node 154, which may be configured to process the portion of information 58 (e.g., unstructured text-based customer feedback) that concerns (in whole or in part) good feedback concerning the location of store 62. For example, good location node 154 may define good location word list 156 that may include words indicative of store 62 being in a good location. Accordingly and in the event that a portion of information 58 (e.g., a text-based customer feedback message) that was routed to location node 116 includes any of the words defined within good location word list 156, that portion of information 58 may be considered to be text-based customer feedback indicative of store 62 being in a good location (and, therefore, may be routed to good location node 154).

Bad location branch 152 may lead to bad location node 158, which may be configured to process the portion of information 58 (e.g., unstructured text-based customer feedback) that concerns (in whole or in part) bad feedback concerning the location of store 62. For example, bad location node 158 may define bad location word list 160 that may include words indicative of store 62 being in a bad location. Accordingly and in the event that a portion of information 58 (e.g., a text-based customer feedback message) that was routed to location node 116 includes any of the words defined within bad location word list 160, that portion of information 58 may be considered to be text-based customer feedback indicative of store 62 being in a bad location (and, therefore, may be routed to bad location node 158).

As stated above, value branch 110 may lead to value node 118, which may be configured to process the portion of information 58 (e.g., unstructured text-based customer feedback) that concerns (in whole or in part) feedback concerning the value received at store 62. For example, value node 118 may define value word list 162 that may include e.g., words indicative of the value received at store 62. Accordingly and in the event that a portion of information 58 (e.g., a text-based customer feedback message) includes any of the words defined within value word list 162, that portion of information 58 may be considered to be text-based customer feedback concerning the value received at store 62 and (therefore) may be routed to value node 118 of probabilistic model 100 for further processing. Assume for this illustrative example that probabilistic model 100 includes two branches off of value node 118, namely: good value branch 164 and bad value branch 166.

Good value branch 164 may lead to good value node 168, which may be configured to process the portion of information 58 (e.g., unstructured text-based customer feedback) that concerns (in whole or in part) good value being received at store 62. For example, good value node 168 may define good value word list 170 that may include words indicative of receiving good value at store 62. Accordingly and in the event that a portion of information 58 (e.g., a text-based customer feedback message) that was routed to value node 118 includes any of the words defined within good value word list 170, that portion of information 58 may be considered to be text-based customer feedback indicative of good value being received at store 62 (and, therefore, may be routed to good value node 168).

Bad value branch 166 may lead to bad value node 172, which may be configured to process the portion of information 58 (e.g., unstructured text-based customer feedback) that concerns (in whole or in part) bad value being received at store 62. For example, bad value node 172 may define bad value word list 174 that may include words indicative of receiving bad value at store 62. Accordingly and in the event that a portion of information 58 (e.g., a text-based customer feedback message) that was routed to value node 118 includes any of the words defined within bad value word list 174, that portion of information 58 may be considered to be text-based customer feedback indicative of bad value being received at store 62 (and, therefore, may be routed to bad value node 172).

Once it is established that good or bad customer feedback was received concerning store 62 (i.e., with respect to the service, the selection, the location or the value), representatives and/or agents of store 62 may address the provider of such good or bad feedback via e.g., social media postings, text-messages and/or personal contact.

Assume for illustrative purposes that user 36 uses data-enabled, cellular telephone 28 to provide feedback 64 (e.g., a portion of information 58) to an automated feedback phone line concerning store 62. Upon receiving feedback 64 for analysis, AI/ML process 56 may identify any pertinent content that is included within feedback 64.

For illustrative purposes, assume that user 36 was not happy with their experience at store 62 and that feedback 64 provided by user 36 was "my cashier was rude and the weather was rainy". Accordingly and for this example, AI/ML process 56 may identify the pertinent content (included within feedback 64) as the phrase "my cashier was rude" and may ignore/remove the irrelevant content "the weather was rainy". As (in this example) feedback 64 includes the word "cashier", AI/ML process 56 may route feedback 64 to service node 112 via service branch 104. Further, as feedback 64 also includes the word "rude", AI/ML process 56 may route feedback 64 to bad service node 130 via bad service branch 124 and may consider feedback 64 to be text-based customer feedback indicative of bad service being received at store 62.

For further illustrative purposes, assume that user 36 was happy with their experience at store 62 and that feedback 64 provided by user 36 was "the clothing I purchased was classy but my cab got stuck in traffic". Accordingly and for this example, AI/ML process 56 may identify the pertinent content (included within feedback 64) as the phrase "the clothing I purchased was classy" and may ignore/remove the irrelevant content "my cab got stuck in traffic". As (in this example) feedback 64 includes the word "clothing", AI/ML process 56 may route feedback 64 to selection node 114 via selection branch 106. Further, as feedback 64 also includes the word "classy", AI/ML process 56 may route feedback 64 to good selection node 140 via good selection branch 136 and may consider feedback 64 to be text-based customer feedback indicative of a good selection being available at store 62.

Model Generation Overview:

While the following discussion concerns the automated generation of a probabilistic model, this is for illustrative purposes only and is not intended to be a limitation of this disclosure, as other configurations are possible and are considered to be within the scope of this disclosure. For example, the following discussion of automated generation may be utilized on any type of model. For example, the following discussion may be applicable to any other form of probabilistic model or any form of generic model (such as Dempster Shaffer theory or fuzzy logic).

As discussed above, probabilistic model 100 may be utilized to categorize information 58, thus allowing the various messages included within information 58 to be routed to (in this simplified example) one of eight nodes (e.g., good service node 126, bad service node 130, good selection node 140, bad selection node 144, good location node 154, bad location node 158, good value node 168, and bad value node 172). For the following example, assume that store 62 is a long-standing and well-established shopping establishment. Further, assume that information 58 is a very large quantity of voice mail messages (>10,000 messages) that were left by customers of store 62 on a voice-based customer feedback line. Additionally, assume that this very large quantity of voice mail messages (>10,000) have been transcribed into a very large quantity of text-based messages (>10,000).

AI/ML process 56 may be configured to automatically define probabilistic model 100 based upon information 58. Accordingly, AI/ML process 56 may receive content (e.g., a very large quantity of text-based messages) and may be configured to define one or more probabilistic model variables for probabilistic model 100. For example, AI/ML process 56 may be configured to allow a user to specify such probabilistic model variables. Another example of such variables may include but is not limited to values and/or ranges of values for a data flow variable. For the following discussion and for this disclosure, examples of a "variable" may include but are not limited to variables, parameters, ranges, branches and nodes.

Specifically and for this example, assume that AI/ML process 56 defines the initial number of branches (i.e., the number of branches off of branching node 102) within probabilistic model 100 as four (i.e., service branch 104, selection branch 106, location branch 108 and value branch 110). The defining of the initial number of branches (i.e., the number of branches off of branching node 102) within probabilistic model 100 as four may be effectuated in various ways (e.g., manually or algorithmically). Further and when defining probabilistic model 100 based, at least in part, upon information 58 and the one or more model variables (i.e., defining the number of branches off of branching node 102 as four), AI/ML process 56 may process information 58 to identify the pertinent content included within information 58. As discussed above, AI/ML process 56 may identify the pertinent content (included within information 58) and may ignore/remove the irrelevant content.

This type of processing of information 58 may continue for all of the very large quantity of text-based messages (>10,000) included within information 58. And using the probabilistic modeling technique described above, AI/ML process 56 may define a first version of the probabilistic model (e.g., probabilistic model 100) based, at least in part, upon pertinent content found within information 58. Accordingly, a first text-based message included within information 58 may be processed to extract pertinent information from that first message, wherein this pertinent information may be grouped in a manner to correspond (at least temporarily) with the requirement that four branches originate from branching node 102 (as defined above).

As AI/ML process 56 continues to process information 58 to identify pertinent content included within information 58, AI/ML process 56 may identify patterns within these text-based message included within information 58. For example, the messages may all concern one or more of the service, the selection, the location and/or the value of store 62. Further and e.g., using the probabilistic modeling technique described above, AI/ML process 56 may process information 58 to e.g.: a) sort text-based messages concerning the service into positive or negative service messages; b) sort text-based messages concerning the selection into positive or negative selection messages; c) sort text-based messages concerning the location into positive or negative location messages; and/or d) sort text-based messages concerning the value into positive or negative service messages. For example, AI/ML process 56 may define various lists (e.g., lists 128, 132, 142, 146, 156, 160, 170, 174) by starting with a root word (e.g., good or bad) and may then determine synonyms for these words and use those words and synonyms to populate lists 128, 132, 142, 146, 156, 160, 170, 174.

Continuing with the above-stated example, once information 58 (or a portion thereof) is processed by AI/ML process 56, AI/ML process 56 may define a first version of the probabilistic model (e.g., probabilistic model 100) based, at least in part, upon pertinent content found within information 58. AI/ML process 56 may compare the first version of the probabilistic model (e.g., probabilistic model 100) to information 58 to determine if the first version of the probabilistic model (e.g., probabilistic model 100) is a good explanation of the content.

When determining if the first version of the probabilistic model (e.g., probabilistic model 100) is a good explanation of the content, AI/ML process 56 may use an ML algorithm to fit the first version of the probabilistic model (e.g., probabilistic model 100) to the content, wherein examples of such an ML algorithm may include but are not limited to one or more of: an inferencing algorithm, a learning algorithm, an optimization algorithm, and a statistical algorithm.

For example and as is known in the art, probabilistic model 100 may be used to generate messages (in addition to analyzing them). For example and when defining a first version of the probabilistic model (e.g., probabilistic model 100) based, at least in part, upon pertinent content found within information 58, AI/ML process 56 may define a weight for each branch within probabilistic model 100 based upon information 58. For example, threat mitigation process 10 may equally weight each of branches 104, 106, 108, 110 at 25%. Alternatively, if e.g., a larger percentage of information 58 concerned the service received at store 62, threat mitigation process 10 may equally weight each of branches 106, 108, 110 at 20%, while more heavily weighting branch 104 at 40%.

Accordingly and when AI/ML process 56 compares the first version of the probabilistic model (e.g., probabilistic model 100) to information 58 to determine if the first version of the probabilistic model (e.g., probabilistic model 100) is a good explanation of the content, AI/ML process 56 may generate a very large quantity of messages e.g., by auto-generating messages using the above-described probabilities, the above-described nodes & node types, and the words defined in the above-described lists (e.g., lists 128, 132, 142, 146, 156, 160, 170, 174), thus resulting in generated information 58'. Generated information 58' may then be compared to information 58 to determine if the first version of the probabilistic model (e.g., probabilistic model 100) is a good explanation of the content. For example, if generated information 58' exceeds a threshold level of similarity to information 58, the first version of the probabilistic model (e.g., probabilistic model 100) may be deemed a good explanation of the content. Conversely, if generated information 58' does not exceed a threshold level of similarity to information 58, the first version of the probabilistic model (e.g., probabilistic model 100) may be deemed not a good explanation of the content.

If the first version of the probabilistic model (e.g., probabilistic model 100) is not a good explanation of the content, AI/ML process 56 may define a revised version of the probabilistic model (e.g., revised probabilistic model 100'). When defining revised probabilistic model 100', AI/ML process 56 may e.g., adjust weighting, adjust probabilities, adjust node counts, adjust node types, and/or adjust branch counts to define the revised version of the probabilistic model (e.g., revised probabilistic model 100'). Once defined, the above-described process of auto-generating messages (this time using revised probabilistic model 100') may be repeated and this newly-generated content (e.g., generated information 58") may be compared to information 58 to determine if e.g., revised probabilistic model 100' is a good explanation of the content. If revised probabilistic model 100' is not a good explanation of the content, the above-described process may be repeated until a proper probabilistic model is defined.

The Threat Mitigation Process

As discussed above, threat mitigation process 10 may include AI/ML process 56 (e.g., an artificial intelligence/machine learning process) that may be configured to process information (e.g., information 58), wherein examples of information 58 may include but are not limited to platform information (e.g., structured or unstructured content) that may be scanned to detect security events (e.g., access auditing; anomalies; authentication; denial of services; exploitation; malware; phishing; spamming; reconnaissance; and/or web attack) within a monitored computing platform (e.g., computing platform 60).

Figure 3:
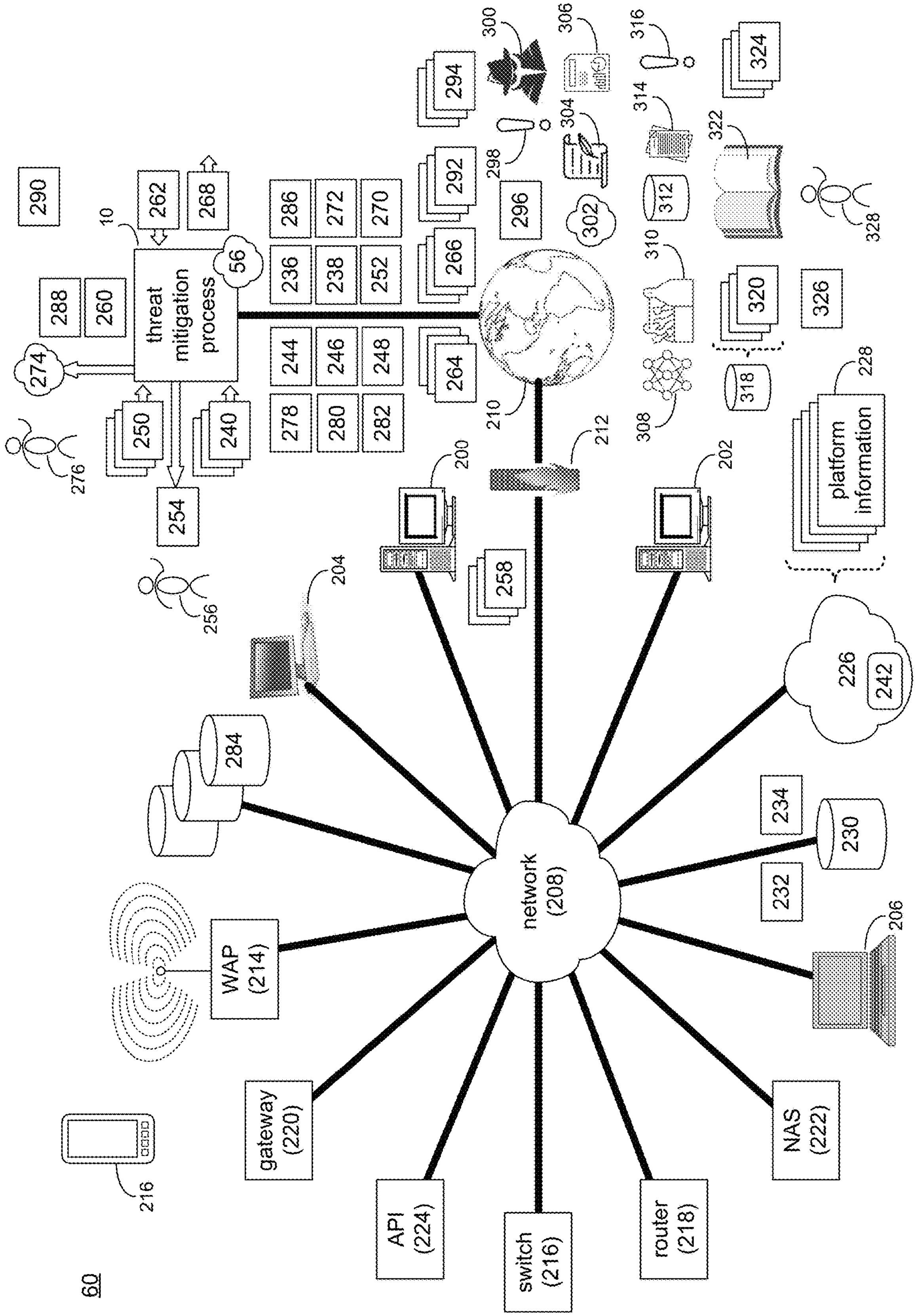
FIG. 3 is a diagrammatic view of the computing platform of FIG. 1 according to an embodiment of the present disclosure.

Referring also to FIG. 3, the monitored computing platform (e.g., computing platform 60) utilized by business today may be a highly complex, multi-location computing system/network that may span multiple buildings/locations/countries. For this illustrative example, the monitored computing platform (e.g., computing platform 60) is shown to include many discrete computing devices, examples of which may include but are not limited to: server computers (e.g., server computers 200, 202), desktop computers (e.g., desktop computer 204), and laptop computers (e.g., laptop computer 206), all of which may be coupled together via a network (e.g., network 208), such as an Ethernet network. Computing platform 60 may be coupled to an external network (e.g., Internet 210) through WAF (i.e., Web Application Firewall) 212. A wireless access point (e.g., WAP 214) may be configured to allow wireless devices (e.g., smartphone 216) to access computing platform 60. Computing platform 60 may include various connectivity devices that enable the coupling of devices within computing platform 60, examples of which may include but are not limited to: switch 216, router 218 and gateway 220. Computing platform 60 may also include various storage devices (e.g., NAS 222), as well as functionality (e.g., API Gateway 224) that allows software applications to gain access to one or more resources within computing platform 60.

In addition to the devices and functionality discussed above, other technology (e.g., security-relevant subsystems 226) may be deployed within computing platform 60 to monitor the operation of (and the activity within) computing platform 60. Examples of security-relevant subsystems 226 may include but are not limited to: CDN (i.e., Content Delivery Network) systems; DAM (i.e., Database Activity Monitoring) systems; UBA (i.e., User Behavior Analytics) systems; MDM (i.e., Mobile Device Management) systems; IAM (i.e., Identity and Access Management) systems; DNS (i.e., Domain Name Server) systems, antivirus systems, operating systems, data lakes; data logs; security-relevant software applications; security-relevant hardware systems; and resources external to the computing platform.

Each of security-relevant subsystems 226 may monitor and log their activity with respect to computing platform 60, resulting in the generation of platform information 228. For example, platform information 228 associated with a client-defined MDM (i.e., Mobile Device Management) system may monitor and log the mobile devices that were allowed access to computing platform 60.

Further, SEIM (i.e., Security Information and Event Management) system 230 may be deployed within computing platform 60. As is known in the art, SIEM system 230 is an approach to security management that combines SIM (security information management) functionality and SEM (security event management) functionality into one security management system. The underlying principles of a SIEM system is to aggregate relevant data from multiple sources, identify deviations from the norm and take appropriate action. For example, when a security event is detected, SIEM system 230 might log additional information, generate an alert and instruct other security controls to mitigate the security event. Accordingly, SIEM system 230 may be configured to monitor and log the activity of security-relevant subsystems 226 (e.g., CDN (i.e., Content Delivery Network) systems; DAM (i.e., Database Activity Monitoring) systems; UBA (i.e., User Behavior Analytics) systems; MDM (i.e., Mobile Device Management) systems; IAM (i.e., Identity and Access Management) systems; DNS (i.e., Domain Name Server) systems, antivirus systems, operating systems, data lakes; data logs; security-relevant software applications; security-relevant hardware systems; and resources external to the computing platform).

Computing Platform Analysis & Reporting

As will be discussed below in greater detail, threat mitigation process 10 may be configured to e.g., analyze computing platform 60 and provide reports to third-parties concerning the same. Further and since security-relevant subsystems 226 may monitor and log activity with respect to computing platform 60 and computing platform 60 may include a wide range of computing devices (e.g., server computers 200, 202, desktop computer 204, laptop computer 206, network 208, web application firewall 212, wireless access point 214, switch 216, router 218, gateway 220, NAS 222, and API Gateway 224), threat mitigation process 10 may provide holistic monitoring of the entirety of computing platform 60 (e.g., both central devices and end point devices), generally referred to as XDR (extended detection and response) functionality. As defined by analyst firm Gartner, Extended Detection and Response (XDR) is "a SaaS-based, vendor-specific, security threat detection and incident response tool that natively integrates multiple security products into a cohesive security operations system that unifies all licensed components."

Figure 4:
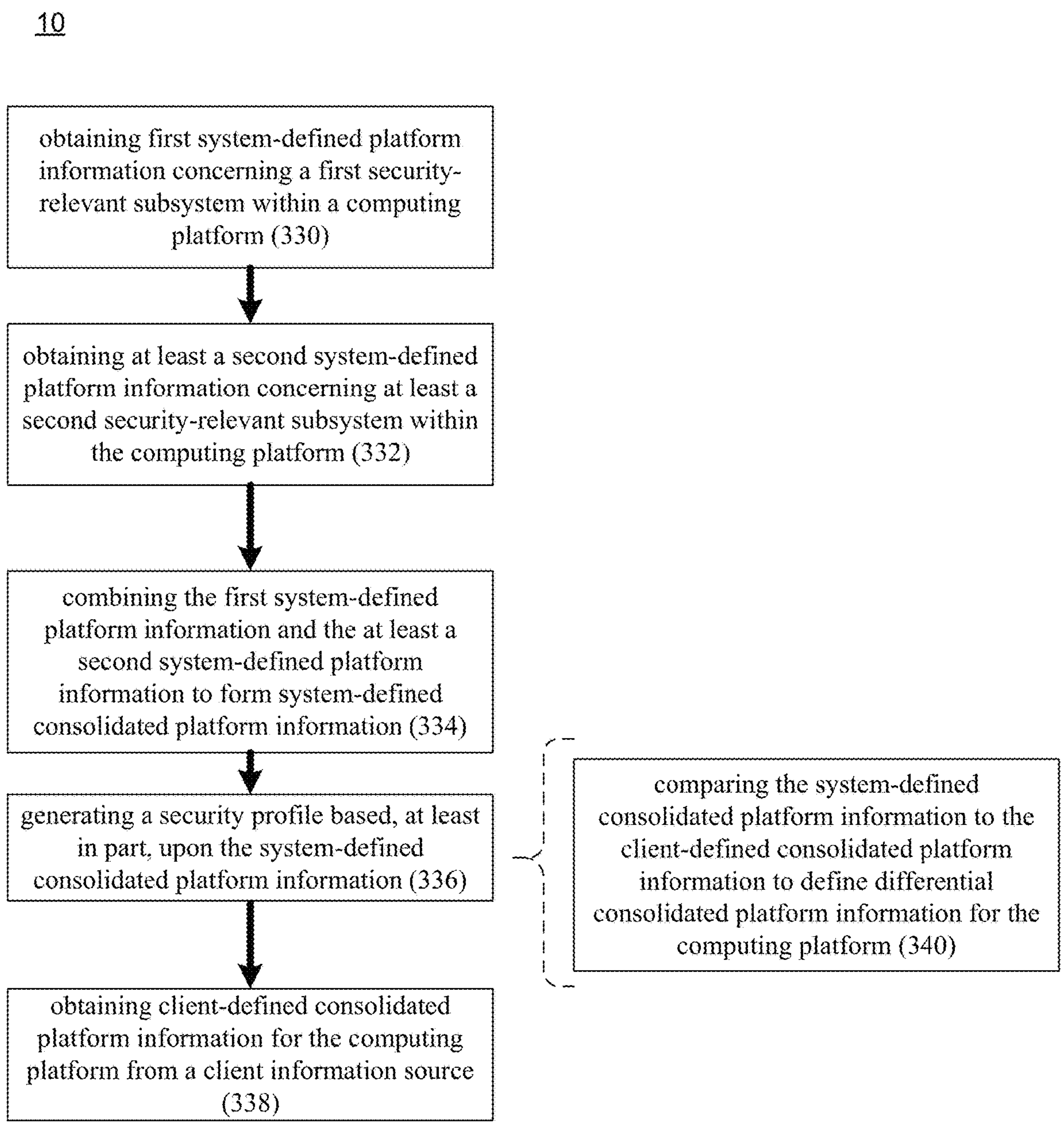
FIG. 4 is a flowchart of an implementation of the threat mitigation process of FIG. 1 according to an embodiment of the present disclosure.
Figure 5:
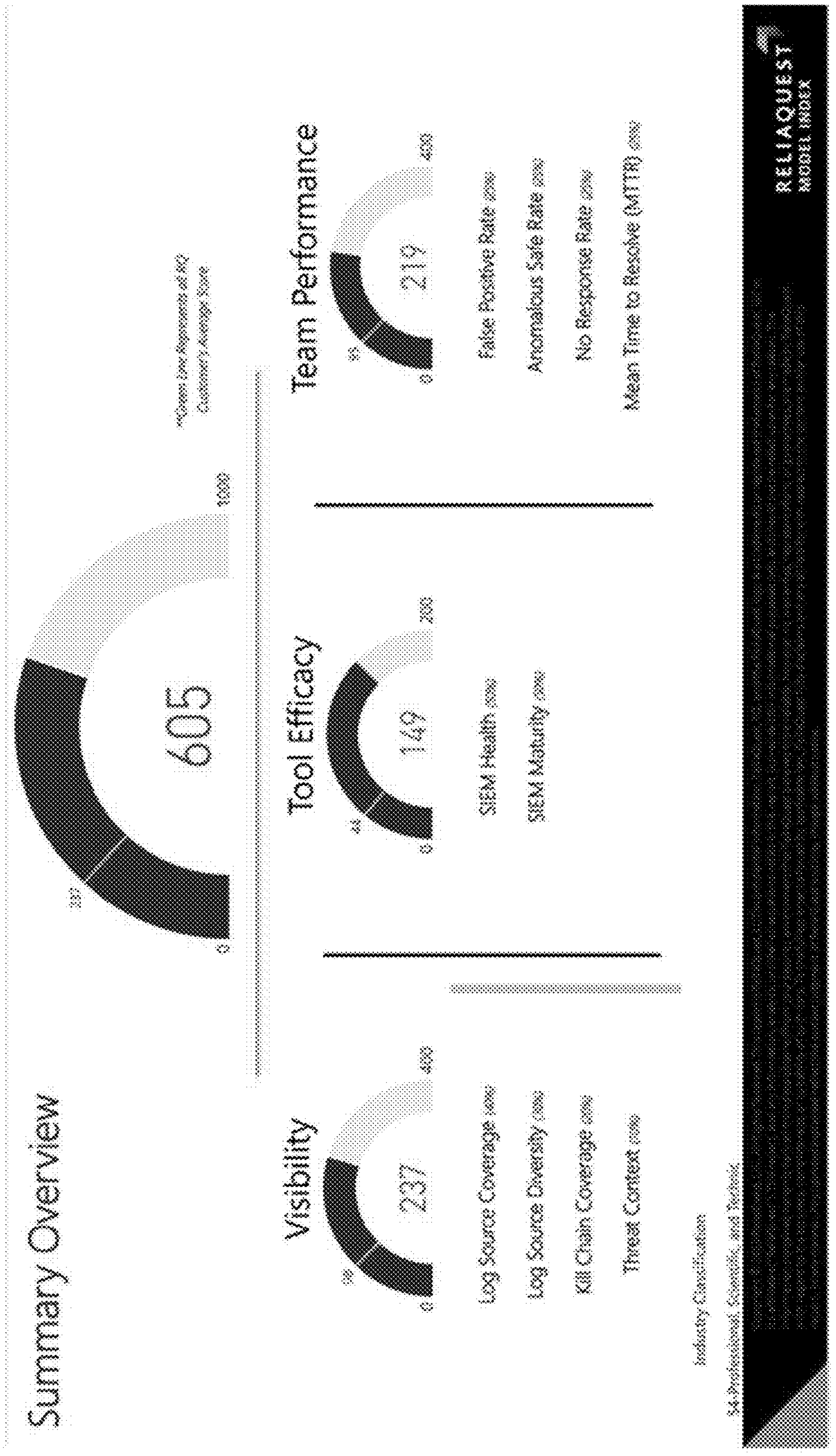
FIGS. 5-6 are diagrammatic views of screens rendered by the threat mitigation process of FIG. 1 according to an embodiment of the present disclosure.
Figure 6:
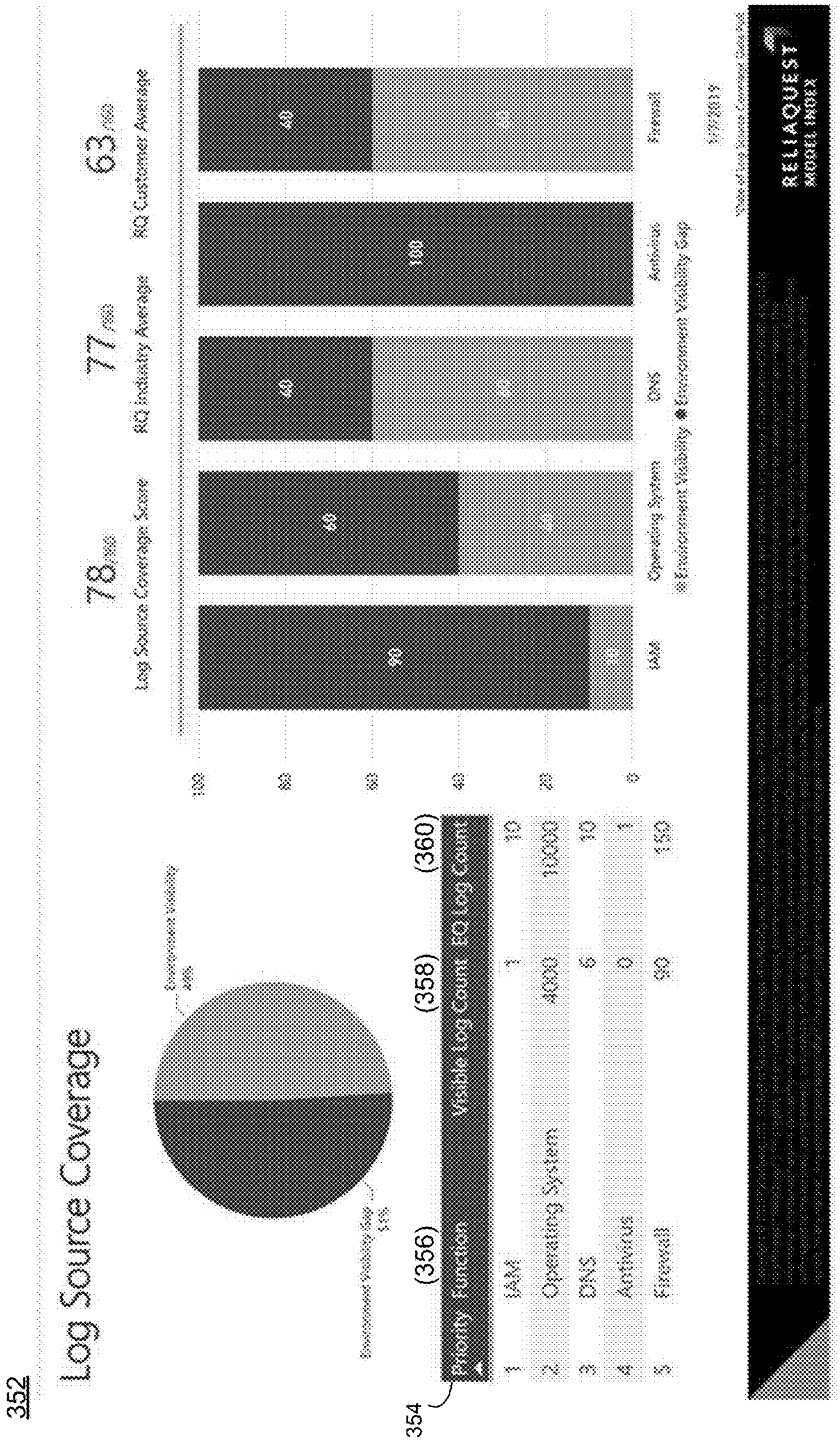

Referring also to FIGS. 4-6, threat mitigation process 10 may be configured to obtain and combine information from multiple security-relevant subsystem to generate a security profile for computing platform 60. For example, threat mitigation process 10 may obtain 330 first system-defined platform information (e.g., system-defined platform information 232) concerning a first security-relevant subsystem (e.g., the number of operating systems deployed) within computing platform 60 and may obtain 332 at least a second system-defined platform information (e.g., system-defined platform information 234) concerning at least a second security-relevant subsystem (e.g., the number of antivirus systems deployed) within computing platform 60.

The first system-defined platform information (e.g., system-defined platform information 232) and the at least a second system-defined platform information (e.g., system-defined platform information 234) may be obtained from one or more log files defined for computing platform 60.

Specifically, system-defined platform information 232 and/or system-defined platform information 234 may be obtained from SIEM system 230, wherein (and as discussed above) SIEM system 230 may be configured to monitor and log the activity of security-relevant subsystems 226 (e.g., CDN (i.e., Content Delivery Network) systems; DAM (i.e., Database Activity Monitoring) systems; UBA (i.e., User Behavior Analytics) systems; MDM (i.e., Mobile Device Management) systems; IAM (i.e., Identity and Access Management) systems; DNS (i.e., Domain Name Server) systems, antivirus systems, operating systems, data lakes; data logs; security-relevant software applications; security-relevant hardware systems; and resources external to the computing platform).

Alternatively, the first system-defined platform information (e.g., system-defined platform information 232) and the at least a second system-defined platform information (e.g., system-defined platform information 234) may be obtained from the first security-relevant subsystem (e.g., the operating systems themselves) and the at least a second security-relevant subsystem (e.g., the antivirus systems themselves). Specifically, system-defined platform information 232 and/or system-defined platform information 234 may be obtained directly from the security-relevant subsystems (e.g., the operating systems and/or the antivirus systems), which (as discussed above) may be configured to self-document their activity.

Threat mitigation process 10 may combine 334 the first system-defined platform information (e.g., system-defined platform information 232) and the at least a second system-defined platform information (e.g., system-defined platform information 234) to form system-defined consolidated platform information 236. Accordingly and in this example, system-defined consolidated platform information 236 may independently define the security-relevant subsystems (e.g., security-relevant subsystems 226) present on computing platform 60.

Threat mitigation process 10 may generate 336 a security profile (e.g., security profile 350) based, at least in part, upon system-defined consolidated platform information 236. Through the use of security profile (e.g., security profile 350), the user/owner/operator of computing platform 60 may be able to see that e.g., they have a security score of 605 out of a possible score of 1,000, wherein the average customer has a security score of 237. While security profile 350 in shown in the example to include several indicators that may enable a user to compare (in this example) computing platform 60 to other computing platforms, this is for illustrative purposes only and is not intended to be a limitation of this disclosure, as it is understood that other configurations are possible and are considered to be within the scope of this disclosure.

Naturally, the format, appearance and content of security profile 350 may be varied greatly depending upon the design criteria and anticipated performance/use of threat mitigation process 10. Accordingly, the appearance, format, completeness and content of security profile 350 is for illustrative purposes only and is not intended to be a limitation of this disclosure, as other configurations are possible and are considered to be within the scope of this disclosure. For example, content may be added to security profile 350, removed from security profile 350, and/or reformatted within security profile 350.

Additionally, threat mitigation process 10 may obtain 338 client-defined consolidated platform information 238 for computing platform 60 from a client information source, examples of which may include but are not limited to one or more client-completed questionnaires (e.g., questionnaires 240) and/or one or more client-deployed platform monitors (e.g., client-deployed platform monitor 242, which may be configured to effectuate SIEM functionality). Accordingly and in this example, client-defined consolidated platform information 238 may define the security-relevant subsystems (e.g., security-relevant subsystems 226) that the client believes are present on computing platform 60.

When generating 336 a security profile (e.g., security profile 350) based, at least in part, upon system-defined consolidated platform information 236, threat mitigation process 10 may compare 340 the system-defined consolidated platform information (e.g., system-defined consolidated platform information 236) to the client-defined consolidated platform information (e.g., client-defined consolidated platform information 238) to define differential consolidated platform information 352 for computing platform 60.

Differential consolidated platform information 352 may include comparison table 354 that e.g., compares computing platform 60 to other computing platforms. For example and in this particular implementation of differential consolidated platform information 352, comparison table 354 is shown to include three columns, namely: security-relevant subsystem column 356 (that identifies the security-relevant subsystems in question); system-defined consolidated platform information column 358 (that is based upon system-defined consolidated platform information 236 and independently defines what security-relevant subsystems are present on computing platform 60); and client-defined consolidated platform column 360 (that is based upon client-defined platform information 238 and defines what security-relevant subsystems the client believes are present on computing platform 60). As shown within comparison table 354, there are considerable differences between that is actually present on computing platform 60 and what is believed to be present on computing platform 60 (e.g., 1 IAM system vs. 10 IAM systems; 4,000 operating systems vs. 10,000 operating systems, 6 DNS systems vs. 10 DNS systems; 0 antivirus systems vs. 1 antivirus system, and 90 firewalls vs. 150 firewalls).

Naturally, the format, appearance and content of differential consolidated platform information 352 may be varied greatly depending upon the design criteria and anticipated performance/use of threat mitigation process 10. Accordingly, the appearance, format, completeness and content of differential consolidated platform information 352 is for illustrative purposes only and is not intended to be a limitation of this disclosure, as other configurations are possible and are considered to be within the scope of this disclosure. For example, content may be added to differential consolidated platform information 352, removed from differential consolidated platform information 352, and/or reformatted within differential consolidated platform information 352.

Figure 7:
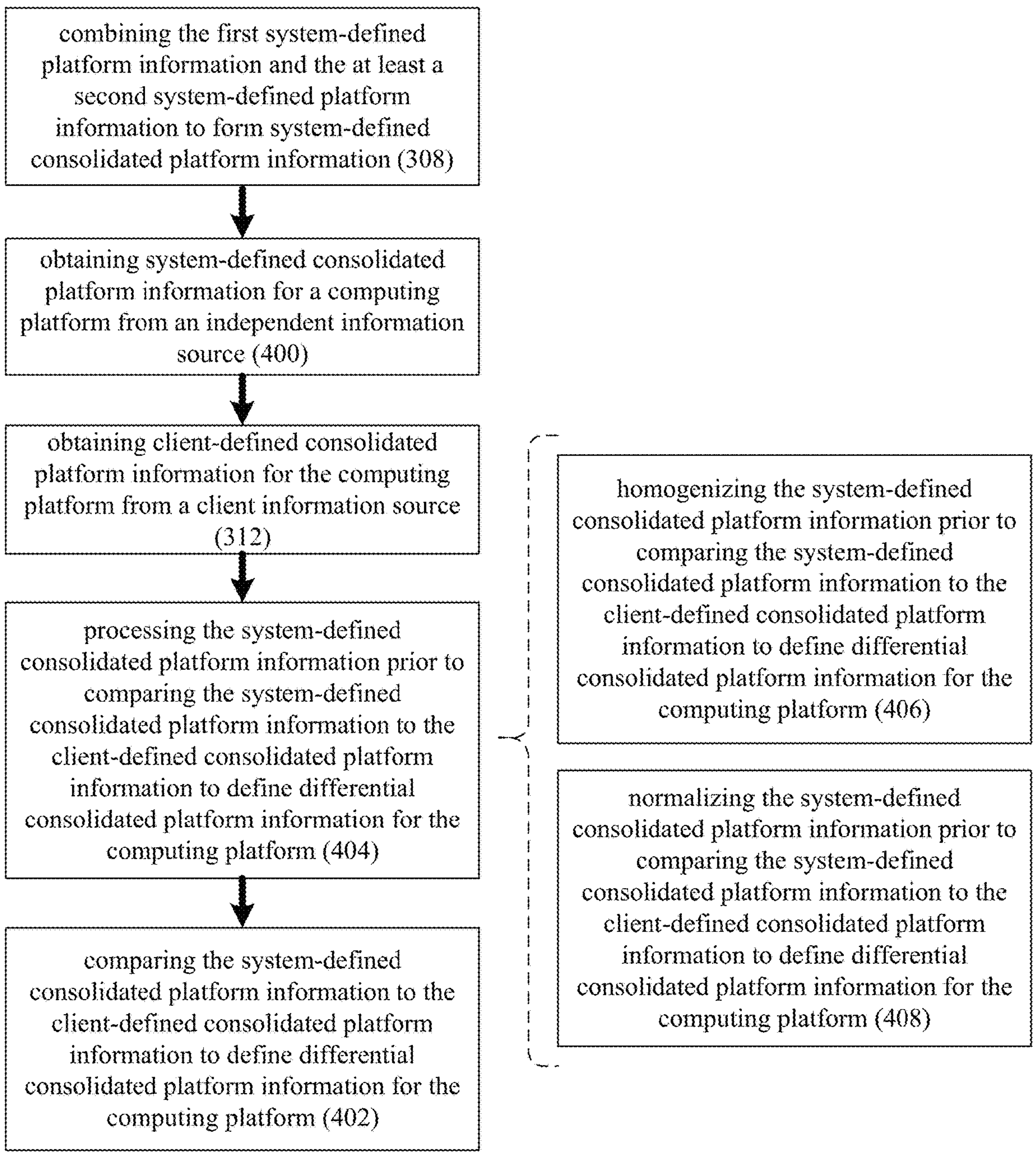
FIGS. 7-9 are flowcharts of other implementations of the threat mitigation process of FIG. 1 according to an embodiment of the present disclosure.

Referring also to FIG. 7, threat mitigation process 10 may be configured to compare what security relevant subsystems are actually included within computing platform 60 versus what security relevant subsystems were believed to be included within computing platform 60. As discussed above, threat mitigation process 10 may combine 334 the first system-defined platform information (e.g., system-defined platform information 232) and the at least a second system-defined platform information (e.g., system-defined platform information 234) to form system-defined consolidated platform information 236.

Threat mitigation process 10 may obtain 400 system-defined consolidated platform information 236 for computing platform 60 from an independent information source, examples of which may include but are not limited to: one or more log files defined for computing platform 60 (e.g., such as those maintained by SIEM system 230); and two or more security-relevant subsystems (e.g., directly from the operating system security-relevant subsystem and the antivirus security-relevant subsystem) deployed within computing platform 60.

Further and as discussed above, threat mitigation process 10 may obtain 338 client-defined consolidated platform information 238 for computing platform 60 from a client information source, examples of which may include but are not limited to one or more client-completed questionnaires (e.g., questionnaires 240) and/or one or more client-deployed platform monitors (e.g., client-deployed platform monitor 242, which may be configured to effectuate SIEM functionality).

Additionally and as discussed above, threat mitigation process 10 may compare 402 system-defined consolidated platform information 236 to client-defined consolidated platform information 238 to define differential consolidated platform information 352 for computing platform 60, wherein differential consolidated platform information 352 may include comparison table 354 that e.g., compares computing platform 60 to other computing platforms.

Threat mitigation process 10 may process 404 system-defined consolidated platform information 236 prior to comparing 402 system-defined consolidated platform information 236 to client-defined consolidated platform information 238 to define differential consolidated platform information 352 for computing platform 60. Specifically, threat mitigation process 10 may process 404 system-defined consolidated platform information 236 so that it is comparable to client-defined consolidated platform information 238.

For example and when processing 404 system-defined consolidated platform information 236, threat mitigation process 10 may homogenize 406 system-defined consolidated platform information 236 prior to comparing 402 system-defined consolidated platform information 236 to client-defined consolidated platform information 238 to define differential consolidated platform information 352 for computing platform 60. Such homogenization 406 may result in system-defined consolidated platform information 236 and client-defined consolidated platform information 238 being comparable to each other (e.g., to accommodate for differing data nomenclatures/headers).

Further and when processing 404 system-defined consolidated platform information 236, threat mitigation process 10 may normalize 408 system-defined consolidated platform information 236 prior to comparing 402 system-defined consolidated platform information 236 to client-defined consolidated platform information 238 to define differential consolidated platform information 352 for computing platform 60 (e.g., to accommodate for data differing scales/ranges).

Figure 8:
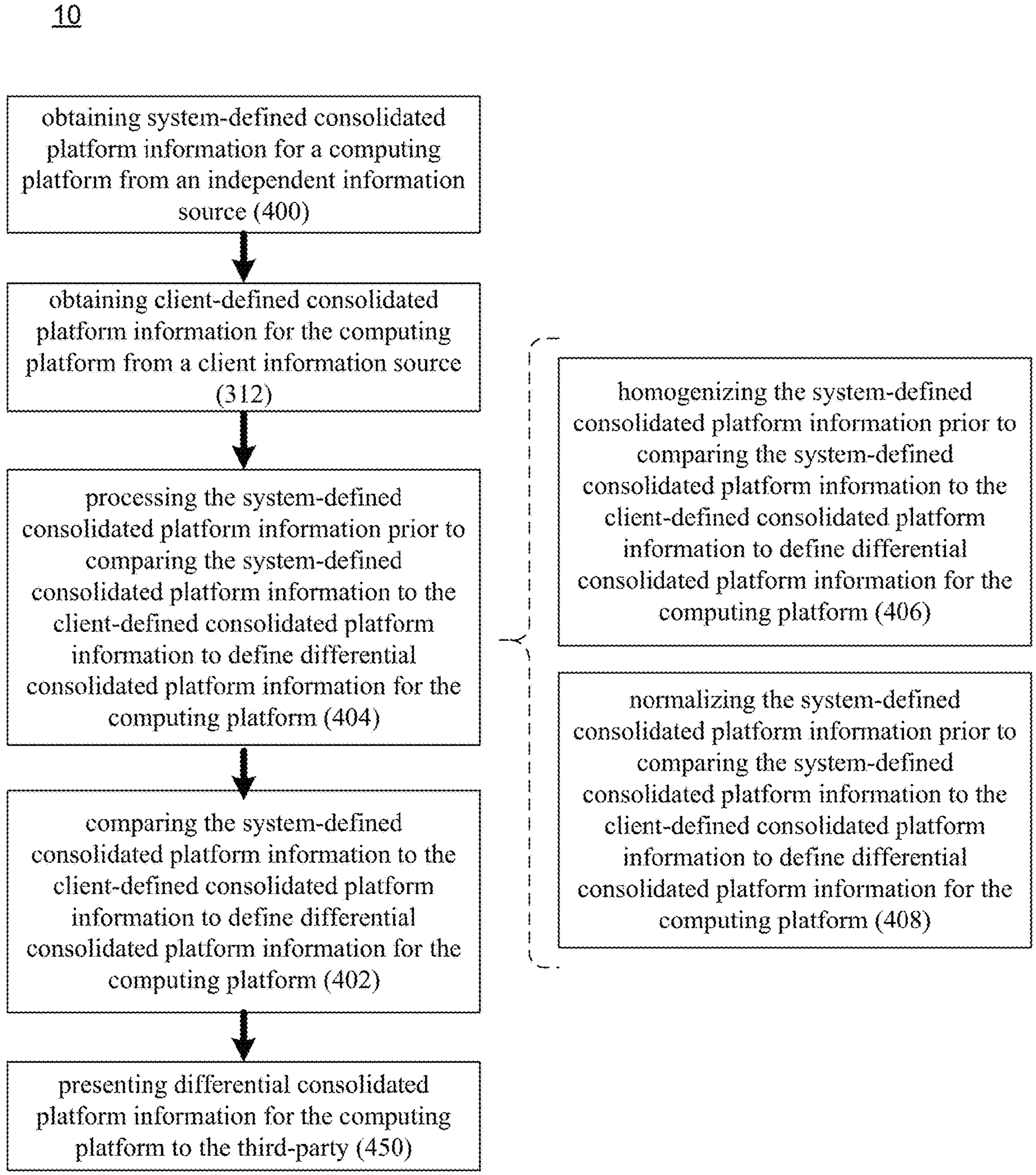

Referring also to FIG. 8, threat mitigation process 10 may be configured to compare what security relevant subsystems are actually included within computing platform 60 versus what security relevant subsystems were believed to be included within computing platform 60.

As discussed above, threat mitigation process 10 may obtain 400 system-defined consolidated platform information 236 for computing platform 60 from an independent information source, examples of which may include but are not limited to: one or more log files defined for computing platform 60 (e.g., such as those maintained by SIEM system 230); and two or more security-relevant subsystems (e.g., directly from the operating system security-relevant subsystem and the antivirus security-relevant subsystem) deployed within computing platform 60.

Further and as discussed above, threat mitigation process 10 may obtain 338 client-defined consolidated platform information 238 for computing platform 60 from a client information source, examples of which may include but are not limited to one or more client-completed questionnaires (e.g., questionnaires 240) and/or one or more client-deployed platform monitors (e.g., client-deployed platform monitor 242, which may be configured to effectuate SIEM functionality).

Threat mitigation process 10 may present 450 differential consolidated platform information 352 for computing platform 60 to a third-party, examples of which may include but are not limited to the user/owner/operator of computing platform 60.

Additionally and as discussed above, threat mitigation process 10 may compare 402 system-defined consolidated platform information 236 to client-defined consolidated platform information 238 to define differential consolidated platform information 352 for computing platform 60, wherein differential consolidated platform information 352 may include comparison table 354 that e.g., compares computing platform 60 to other computing platforms, wherein (and as discussed above) threat mitigation process 10 may process 404 (e.g., via homogenizing 406 and/or normalizing 408) system-defined consolidated platform information 236 prior to comparing 402 system-defined consolidated platform information 236 to client-defined consolidated platform information 236 to define differential consolidated platform information 352 for computing platform 60.

Computing Platform Analysis & Recommendation

As will be discussed below in greater detail, threat mitigation process 10 may be configured to e.g., analyze & display the vulnerabilities of computing platform 60.

Figure 9:
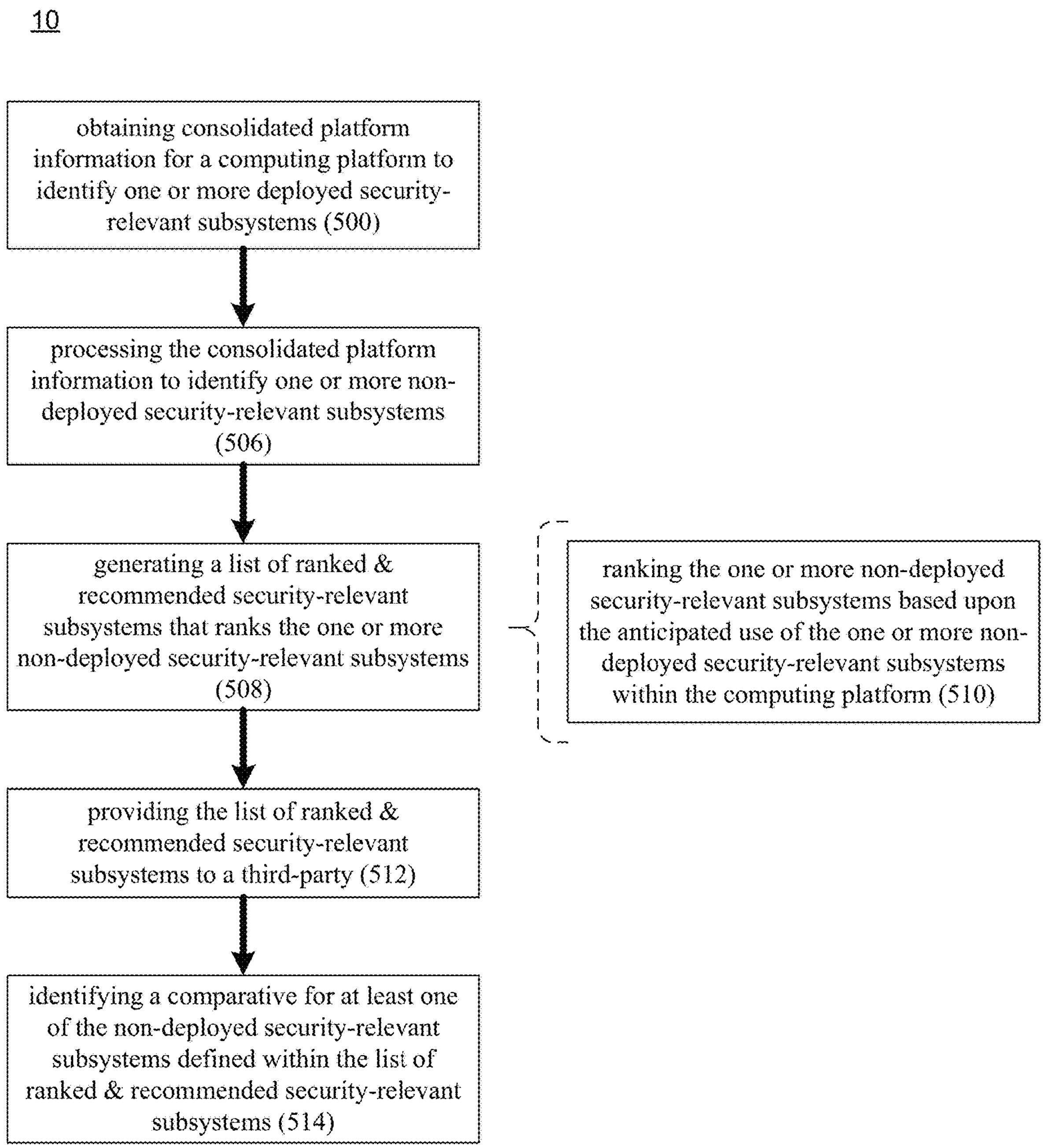

Referring also to FIG. 9, threat mitigation process 10 may be configured to make recommendations concerning security relevant subsystems that are missing from computing platform 60. As discussed above, threat mitigation process 10 may obtain 500 consolidated platform information for computing platform 60 to identify one or more deployed security-relevant subsystems 226 (e.g., CDN (i.e., Content Delivery Network) systems; DAM (i.e., Database Activity Monitoring) systems; UBA (i.e., User Behavior Analytics) systems; MDM (i.e., Mobile Device Management) systems; IAM (i.e., Identity and Access Management) systems; DNS (i.e., Domain Name Server) systems, antivirus systems, operating systems, data lakes; data logs; security-relevant software applications; security-relevant hardware systems; and resources external to the computing platform). This consolidated platform information may be obtained from an independent information source (e.g., such as SIEM system 230 that may provide system-defined consolidated platform information 236) and/or may be obtained from a client information source (e.g., such as questionnaires 240 that may provide client-defined consolidated platform information 238).

Figure 10:
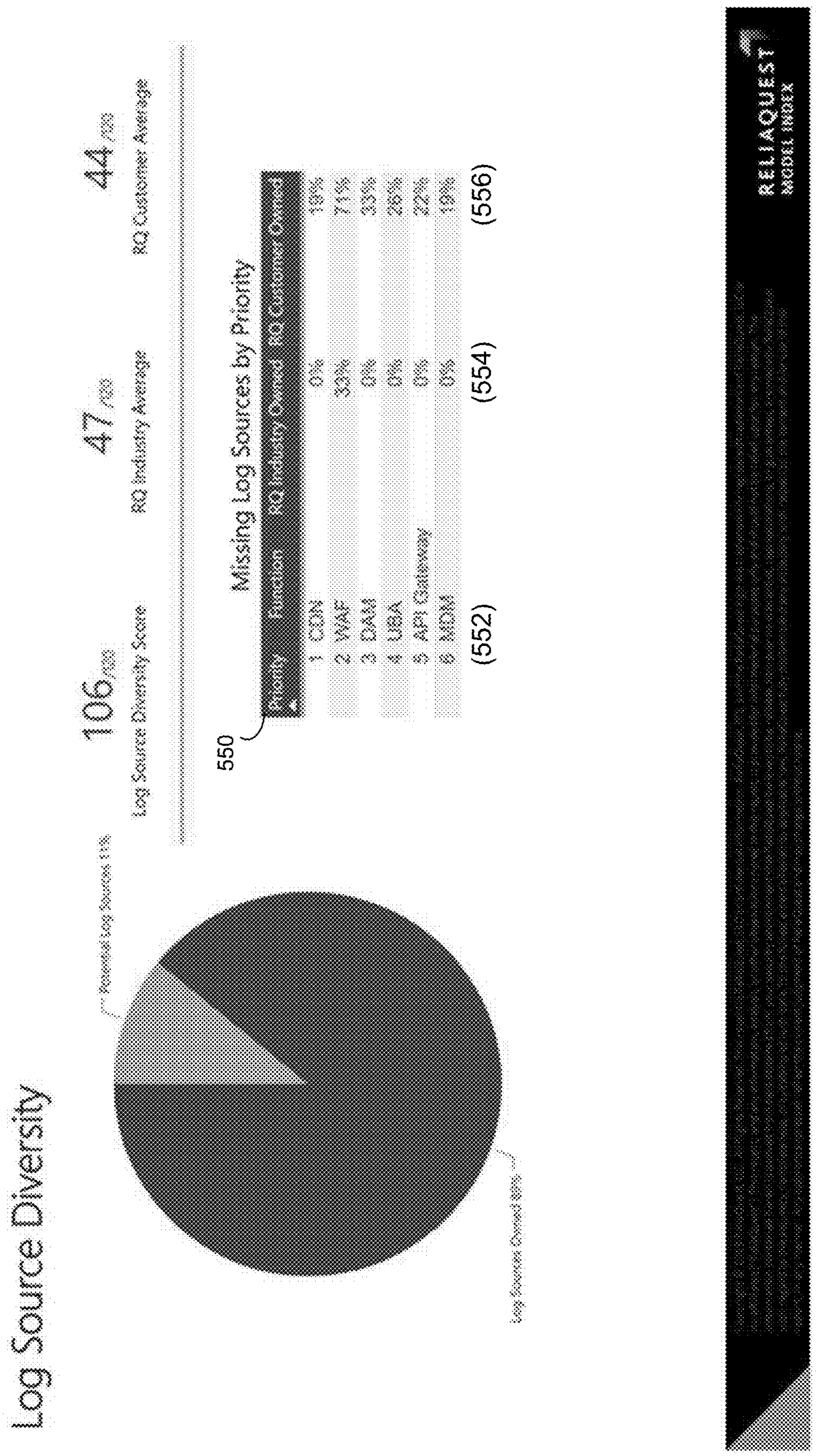
FIG. 10 is a diagrammatic view of a screen rendered by the threat mitigation process of FIG. 1 according to an embodiment of the present disclosure.

Referring also to FIG. 10, threat mitigation process 10 may process 506 the consolidated platform information (e.g., system-defined consolidated platform information 236 and/or client-defined consolidated platform information 238) to identify one or more non-deployed security-relevant subsystems (within computing platform 60) and may then generate 508 a list of ranked & recommended security-relevant subsystems (e.g., non-deployed security-relevant subsystem list 550) that ranks the one or more non-deployed security-relevant subsystems.

For this particular illustrative example, non-deployed security-relevant subsystem list 550 is shown to include column 552 that identifies six non-deployed security-relevant subsystems, namely: a CDN subsystem, a WAF subsystem, a DAM subsystem; a UBA subsystem; an API subsystem, and an MDM subsystem.

When generating 508 a list of ranked & recommended security-relevant subsystems (e.g., non-deployed security-relevant subsystem list 550) that ranks the one or more non-deployed security-relevant subsystems, threat mitigation process 10 may rank 510 the one or more non-deployed security-relevant subsystems (e.g., a CDN subsystem, a WAF subsystem, a DAM subsystem; a UBA subsystem; a API subsystem, and an MDM subsystem) based upon the anticipated use of the one or more non-deployed security-relevant subsystems within computing platform 60. This ranking 510 of the non-deployed security-relevant subsystems (e.g., a CDN subsystem, a WAF subsystem, a DAM subsystem; a UBA subsystem; a API subsystem, and an MDM subsystem) may be agnostic in nature and may be based on the functionality/effectiveness of the non-deployed security-relevant subsystems and the anticipated manner in which their implementation may impact the functionality/security of computing platform 60.

Threat mitigation process 10 may provide 512 the list of ranked & recommended security-relevant subsystems (e.g., non-deployed security-relevant subsystem list 550) to a third-party, examples of which may include but are not limited to a user/owner/operator of computing platform 60.

Additionally, threat mitigation process 10 may identify 514 a comparative for at least one of the non-deployed security-relevant subsystems (e.g., a CDN subsystem, a WAF subsystem, a DAM subsystem; a UBA subsystem; an API subsystem, and an MDM subsystem) defined within the list of ranked & recommended security-relevant subsystems (e.g., non-deployed security-relevant subsystem list 550). This comparative may include vendor customers in a specific industry comparative and/or vendor customers in any industry comparative.

For example and in addition to column 552, non-deployed security-relevant subsystem list 550 may include columns 554, 556 for defining the comparatives for the six non-deployed security-relevant subsystems, namely: a CDN subsystem, a WAF subsystem, a DAM subsystem; a UBA subsystem; an API subsystem, and an MDM subsystem. Specifically, column 554 is shown to define comparatives concerning vendor customers that own the non-deployed security-relevant subsystems in a specific industry (i.e., the same industry as the user/owner/operator of computing platform 60). Additionally, column 556 is shown to define comparatives concerning vendor customers that own the non-deployed security-relevant subsystems in any industry (i.e., not necessarily the same industry as the user/owner/operator of computing platform 60). For example and concerning the comparatives of the WAF subsystem: 33% of the vendor customers in the same industry as the user/owner/operator of computing platform 60 deploy a WAF subsystem; while 71% of the vendor customers in any industry deploy a WAF subsystem.

Naturally, the format, appearance and content of non-deployed security-relevant subsystem list 550 may be varied greatly depending upon the design criteria and anticipated performance/use of threat mitigation process 10. Accordingly, the appearance, format, completeness and content of non-deployed security-relevant subsystem list 550 is for illustrative purposes only and is not intended to be a limitation of this disclosure, as other configurations are possible and are considered to be within the scope of this disclosure. For example, content may be added to non-deployed security-relevant subsystem list 550, removed from non-deployed security-relevant subsystem list 550, and/or reformatted within non-deployed security-relevant subsystem list 550.

Figure 11:
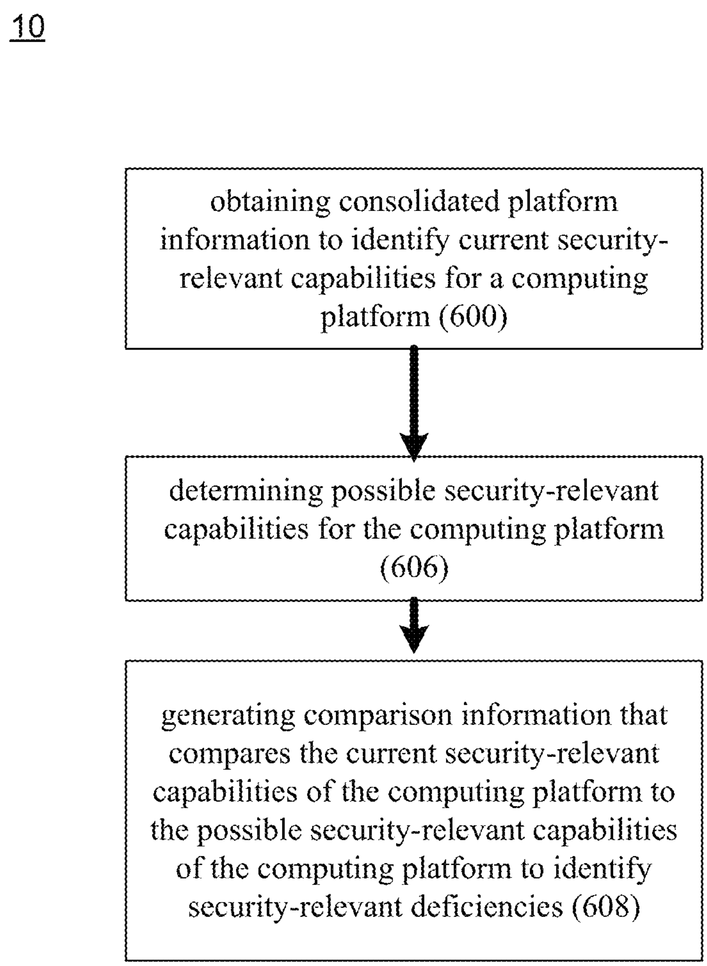
FIG. 11 is a flowchart of another implementation of the threat mitigation process of FIG. 1 according to an embodiment of the present disclosure.

Referring also to FIG. 11, threat mitigation process 10 may be configured to compare the current capabilities to the possible capabilities of computing platform 60. As discussed above, threat mitigation process 10 may obtain 600 consolidated platform information to identify current security-relevant capabilities for computing platform 60. This consolidated platform information may be obtained from an independent information source (e.g., such as SIEM system 230 that may provide system-defined consolidated platform information 236) and/or may be obtained from a client information source (e.g., such as questionnaires 240 that may provide client-defined consolidated platform information 238. Threat mitigation process 10 may then determine 606 possible security-relevant capabilities for computing platform 60 (i.e., the difference between the current security-relevant capabilities of computing platform 60 and the possible security-relevant capabilities of computing platform 60. For example, the possible security-relevant capabilities may concern the possible security-relevant capabilities of computing platform 60 using the currently-deployed security-relevant subsystems. Additionally/alternatively, the possible security-relevant capabilities may concern the possible security-relevant capabilities of computing platform 60 using one or more supplemental security-relevant subsystems.

Figure 12:
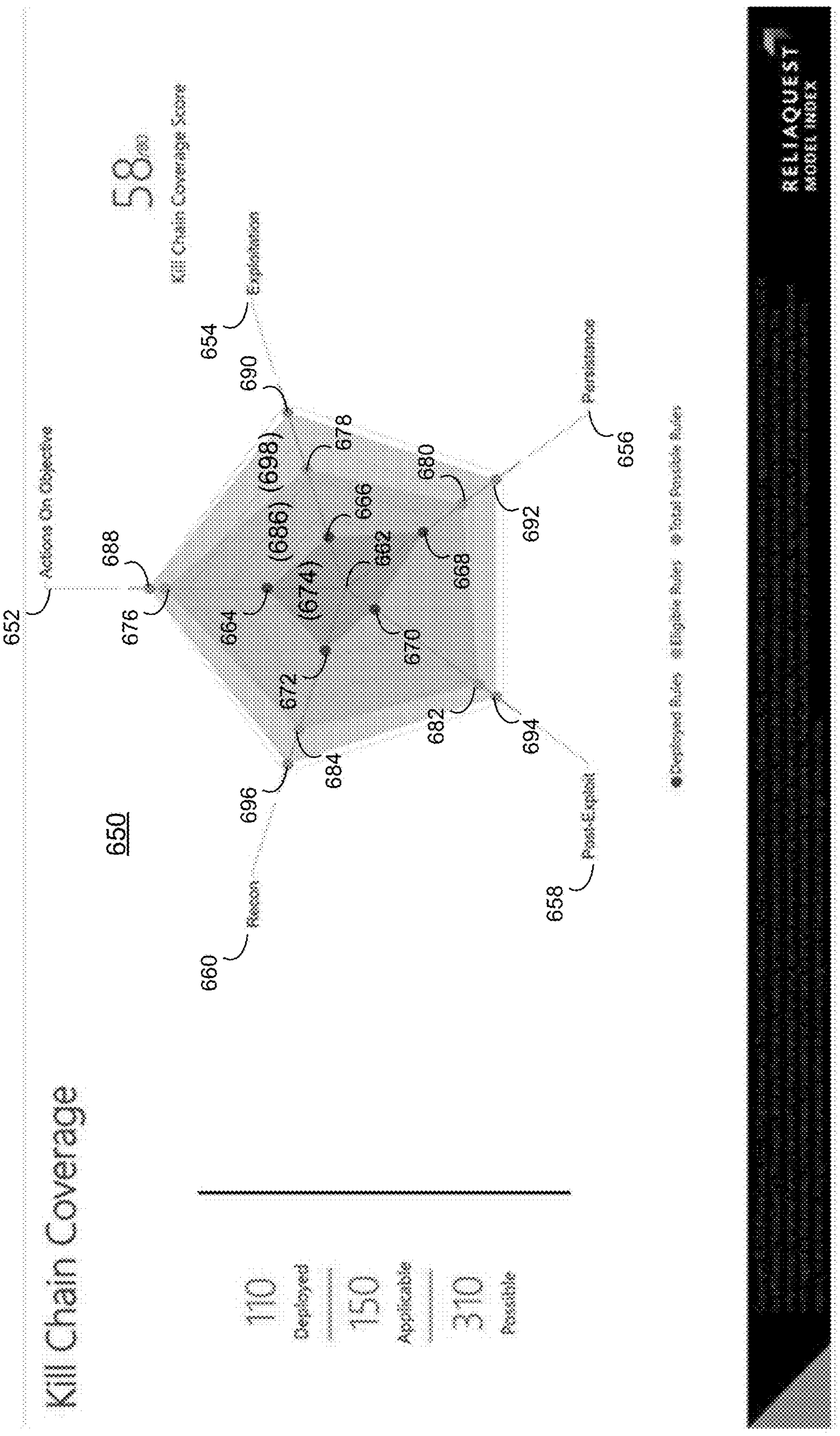
FIG. 12 is a diagrammatic view of a screen rendered by the threat mitigation process of FIG. 1 according to an embodiment of the present disclosure.

Referring also to FIG. 12 and as will be explained below, threat mitigation process 10 may generate 608 comparison information 650 that compares the current security-relevant capabilities of computing platform 60 to the possible security-relevant capabilities of computing platform 60 to identify security-relevant deficiencies. Comparison information 650 may include graphical comparison information, such as multi-axial graphical comparison information that simultaneously illustrates a plurality of security-relevant deficiencies.

For example, comparison information 650 may define (in this particular illustrative example) graphical comparison information that include five axes (e.g. axes 652, 654, 656, 658, 660) that correspond to five particular types of computer threats. Comparison information 650 includes origin 662, the point at which computing platform 60 has no protection with respect to any of the five types of computer threats that correspond to axes 652, 654, 656, 658, 660. Accordingly, as the capabilities of computing platform 60 are increased to counter a particular type of computer threat, the data point along the corresponding axis is proportionately displaced from origin 652.

As discussed above, threat mitigation process 10 may obtain 600 consolidated platform information to identify current security-relevant capabilities for computing platform 60. Concerning such current security-relevant capabilities for computing platform 60, these current security-relevant capabilities are defined by data points 664, 666, 668, 670, 672, the combination of which define bounded area 674. Bounded area 674 (in this example) defines the current security-relevant capabilities of computing platform 60.

Further and as discussed above, threat mitigation process 10 may determine 606 possible security-relevant capabilities for computing platform 60 (i.e., the difference between the current security-relevant capabilities of computing platform 60 and the possible security-relevant capabilities of computing platform 60.

As discussed above, the possible security-relevant capabilities may concern the possible security-relevant capabilities of computing platform 60 using the currently-deployed security-relevant subsystems. For example, assume that the currently-deployed security relevant subsystems are not currently being utilized to their full potential. Accordingly, certain currently-deployed security relevant subsystems may have certain features that are available but are not utilized and/or disabled. Further, certain currently-deployed security relevant subsystems may have expanded features available if additional licensing fees are paid. Therefore and concerning such possible security-relevant capabilities of computing platform 60 using the currently-deployed security-relevant subsystems, data points 676, 678, 680, 682, 684 may define bounded area 686 (which represents the full capabilities of the currently-deployed security-relevant subsystems within computing platform 60).

Further and as discussed above, the possible security-relevant capabilities may concern the possible security-relevant capabilities of computing platform 60 using one or more supplemental security-relevant subsystems. For example, assume that supplemental security-relevant subsystems are available for the deployment within computing platform 60. Therefore and concerning such possible security-relevant capabilities of computing platform 60 using such supplemental security-relevant subsystems, data points 688, 690, 692, 694, 696 may define bounded area 698 (which represents the total capabilities of computing platform 60 when utilizing the full capabilities of the currently-deployed security-relevant subsystems and any supplemental security-relevant subsystems).

Naturally, the format, appearance and content of comparison information 650 may be varied greatly depending upon the design criteria and anticipated performance/use of threat mitigation process 10. Accordingly, the appearance, format, completeness and content of comparison information 650 is for illustrative purposes only and is not intended to be a limitation of this disclosure, as other configurations are possible and are considered to be within the scope of this disclosure. For example, content may be added to comparison information 650, removed from comparison information 650, and/or reformatted within comparison information 650.

Figure 13:
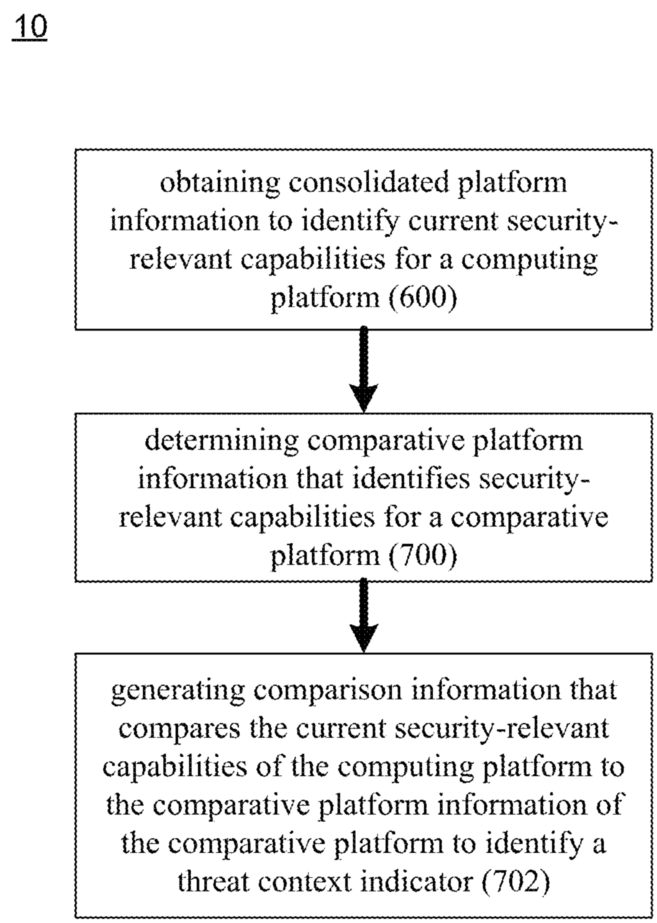
FIG. 13 is a flowchart of another implementation of the threat mitigation process of FIG. 1 according to an embodiment of the present disclosure.

Referring also to FIG. 13, threat mitigation process 10 may be configured to generate a threat context score for computing platform 60. As discussed above, threat mitigation process 10 may obtain 600 consolidated platform information to identify current security-relevant capabilities for computing platform 60. This consolidated platform information may be obtained from an independent information source (e.g., such as SIEM system 230 that may provide system-defined consolidated platform information 236) and/or may be obtained from a client information source (e.g., such as questionnaires 240 that may provide client-defined consolidated platform information 238. As will be discussed below in greater detail, threat mitigation process 10 may determine 700 comparative platform information that identifies security-relevant capabilities for a comparative platform, wherein this comparative platform information may concern vendor customers in a specific industry (i.e., the same industry as the user/owner/operator of computing platform 60) and/or vendor customers in any industry (i.e., not necessarily the same industry as the user/owner/operator of computing platform 60).

Figure 14:
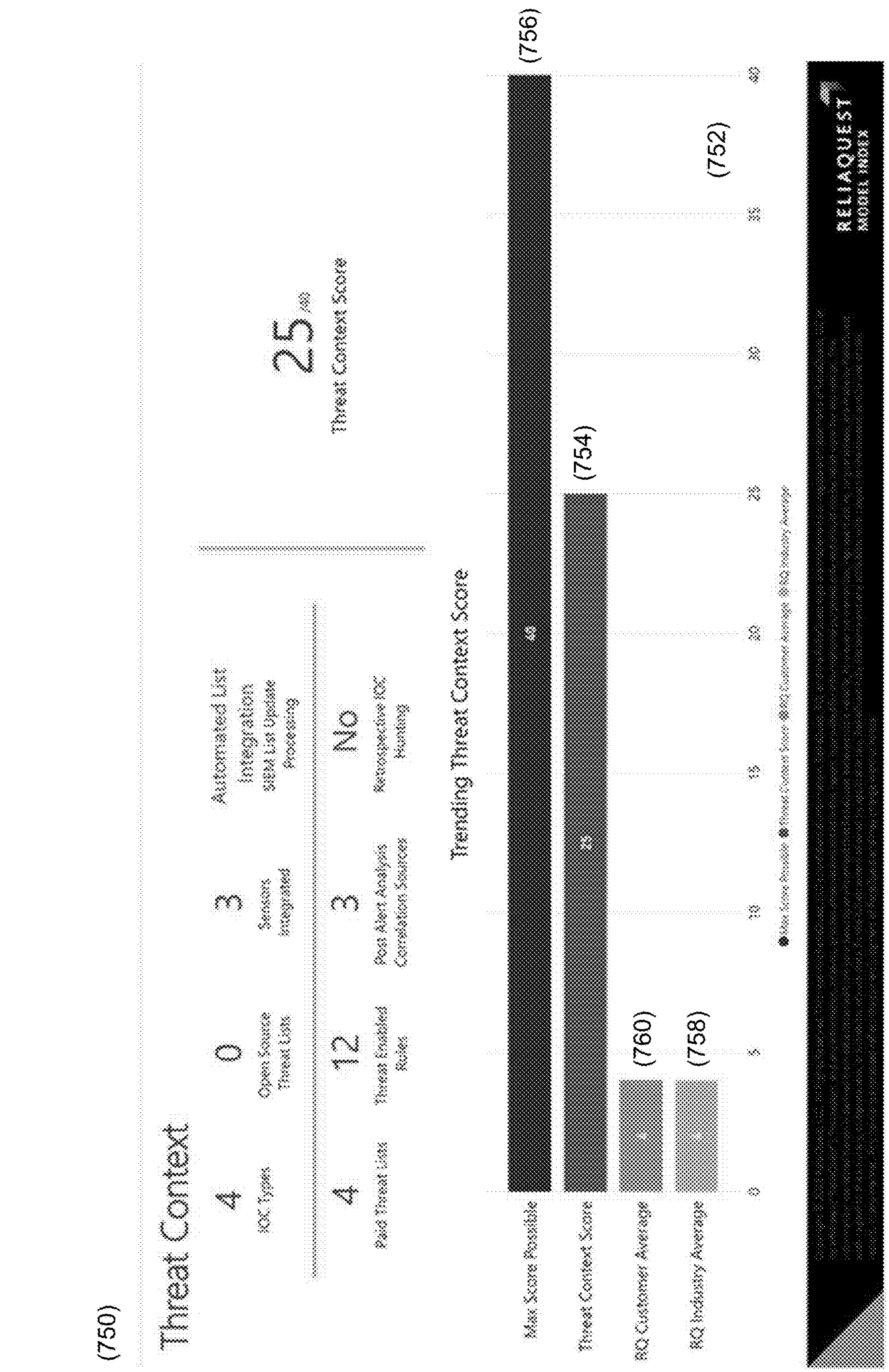
FIG. 14 is a diagrammatic view of a screen rendered by the threat mitigation process of FIG. 1 according to an embodiment of the present disclosure.

Referring also to FIG. 14 and as will be discussed below, threat mitigation process 10 may generate 702 comparison information 750 that compares the current security-relevant capabilities of computing platform 60 to the comparative platform information determined 700 for the comparative platform to identify a threat context indicator for computing platform 60, wherein comparison information 750 may include graphical comparison information 752.

Graphical comparison information 752 (which in this particular example is a bar chart) may identify one or more of: a current threat context score 754 for a client (e.g., the user/owner/operator of computing platform 60); a maximum possible threat context score 756 for the client (e.g., the user/owner/operator of computing platform 60); a threat context score 758 for one or more vendor customers in a specific industry (i.e., the same industry as the user/owner/operator of computing platform 60); and a threat context score 760 for one or more vendor customers in any industry (i.e., not necessarily the same industry as the user/owner/operator of computing platform 60).

Naturally, the format, appearance and content of comparison information 750 may be varied greatly depending upon the design criteria and anticipated performance/use of threat mitigation process 10. Accordingly, the appearance, format, completeness and content of comparison information 750 is for illustrative purposes only and is not intended to be a limitation of this disclosure, as other configurations are possible and are considered to be within the scope of this disclosure. For example, content may be added to comparison information 750, removed from comparison information 750, and/or reformatted within comparison information 750.

Computing Platform Monitoring & Mitigation

As will be discussed below in greater detail, threat mitigation process 10 may be configured to e.g., monitor the operation and performance of computing platform 60.

Figure 15:
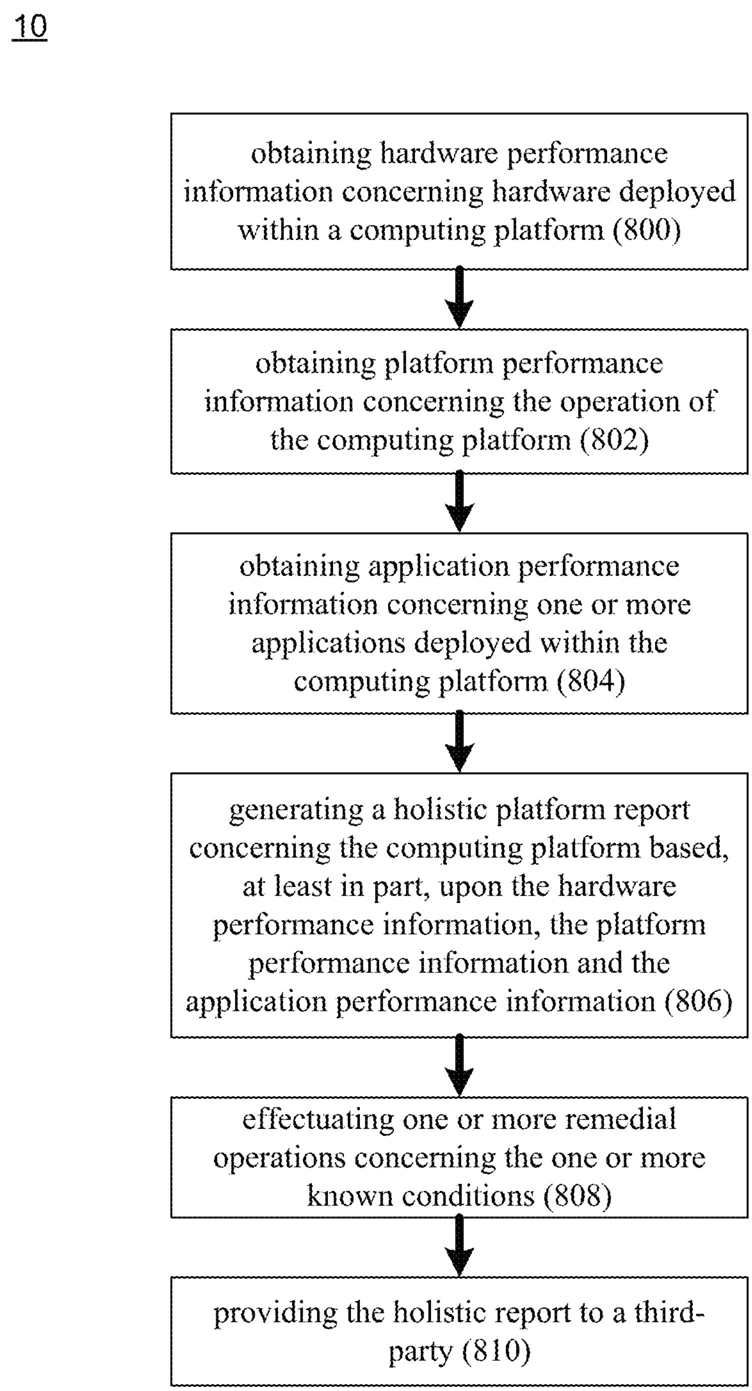
FIG. 15 is a flowchart of another implementation of the threat mitigation process of FIG. 1 according to an embodiment of the present disclosure.

Referring also to FIG. 15, threat mitigation process 10 may be configured to monitor the health of computing platform 60 and provide feedback to a third-party concerning the same. Threat mitigation process 10 may obtain 800 hardware performance information 244 concerning hardware (e.g., server computers, desktop computers, laptop computers, switches, firewalls, routers, gateways, WAPs, and NASs), deployed within computing platform 60. Hardware performance information 244 may concern the operation and/or functionality of one or more hardware systems (e.g., server computers, desktop computers, laptop computers, switches, firewalls, routers, gateways, WAPs, and NASs) deployed within computing platform 60.

Threat mitigation process 10 may obtain 802 platform performance information 246 concerning the operation of computing platform 60. Platform performance information 246 may concern the operation and/or functionality of computing platform 60.

When obtaining 802 platform performance information concerning the operation of computing platform 60, threat mitigation process 10 may (as discussed above): obtain 400 system-defined consolidated platform information 236 for computing platform 60 from an independent information source (e.g., SIEM system 230); obtain 338 client-defined consolidated platform information 238 for computing platform 60 from a client information (e.g., questionnaires 240); and present 450 differential consolidated platform information 352 for computing platform 60 to a third-party, examples of which may include but are not limited to the user/owner/operator of computing platform 60.

When obtaining 802 platform performance information concerning the operation of computing platform 60, threat mitigation process 10 may (as discussed above): obtain 500 consolidated platform information for computing platform 60 to identify one or more deployed security-relevant subsystems 226 (e.g., CDN (i.e., Content Delivery Network) systems; DAM (i.e., Database Activity Monitoring) systems; UBA (i.e., User Behavior Analytics) systems; MDM (i.e., Mobile Device Management) systems; IAM (i.e., Identity and Access Management) systems; DNS (i.e., Domain Name Server) systems, antivirus systems, operating systems, data lakes; data logs; security-relevant software applications; security-relevant hardware systems; and resources external to the computing platform); process 506 the consolidated platform information (e.g., system-defined consolidated platform information 236 and/or client-defined consolidated platform information 238) to identify one or more non-deployed security-relevant subsystems (within computing platform 60); generate 508 a list of ranked & recommended security-relevant subsystems (e.g., non-deployed security-relevant subsystem list 550) that ranks the one or more non-deployed security-relevant subsystems; and provide 514 the list of ranked & recommended security-relevant subsystems (e.g., non-deployed security-relevant subsystem list 550) to a third-party, examples of which may include but are not limited to a user/owner/operator of computing platform 60.

When obtaining 802 platform performance information concerning the operation of computing platform 60, threat mitigation process 10 may (as discussed above): obtain 600 consolidated platform information to identify current security-relevant capabilities for the computing platform; determine 606 possible security-relevant capabilities for computing platform 60; and generate 608 comparison information 650 that compares the current security-relevant capabilities of computing platform 60 to the possible security-relevant capabilities of computing platform 60 to identify security-relevant deficiencies.

When obtaining 802 platform performance information concerning the operation of computing platform 60, threat mitigation process 10 may (as discussed above): obtain 600 consolidated platform information to identify current security-relevant capabilities for computing platform 60; determine 700 comparative platform information that identifies security-relevant capabilities for a comparative platform; and generate 702 comparison information 750 that compares the current security-relevant capabilities of computing platform 60 to the comparative platform information determined 700 for the comparative platform to identify a threat context indicator for computing platform 60.

Threat mitigation process 10 may obtain 804 application performance information 248 concerning one or more applications (e.g., operating systems, user applications, security application, and utility application) deployed within computing platform 60. Application performance information 248 may concern the operation and/or functionality of one or more software applications (e.g., operating systems, user applications, security application, and utility application) deployed within computing platform 60.

Figure 16:
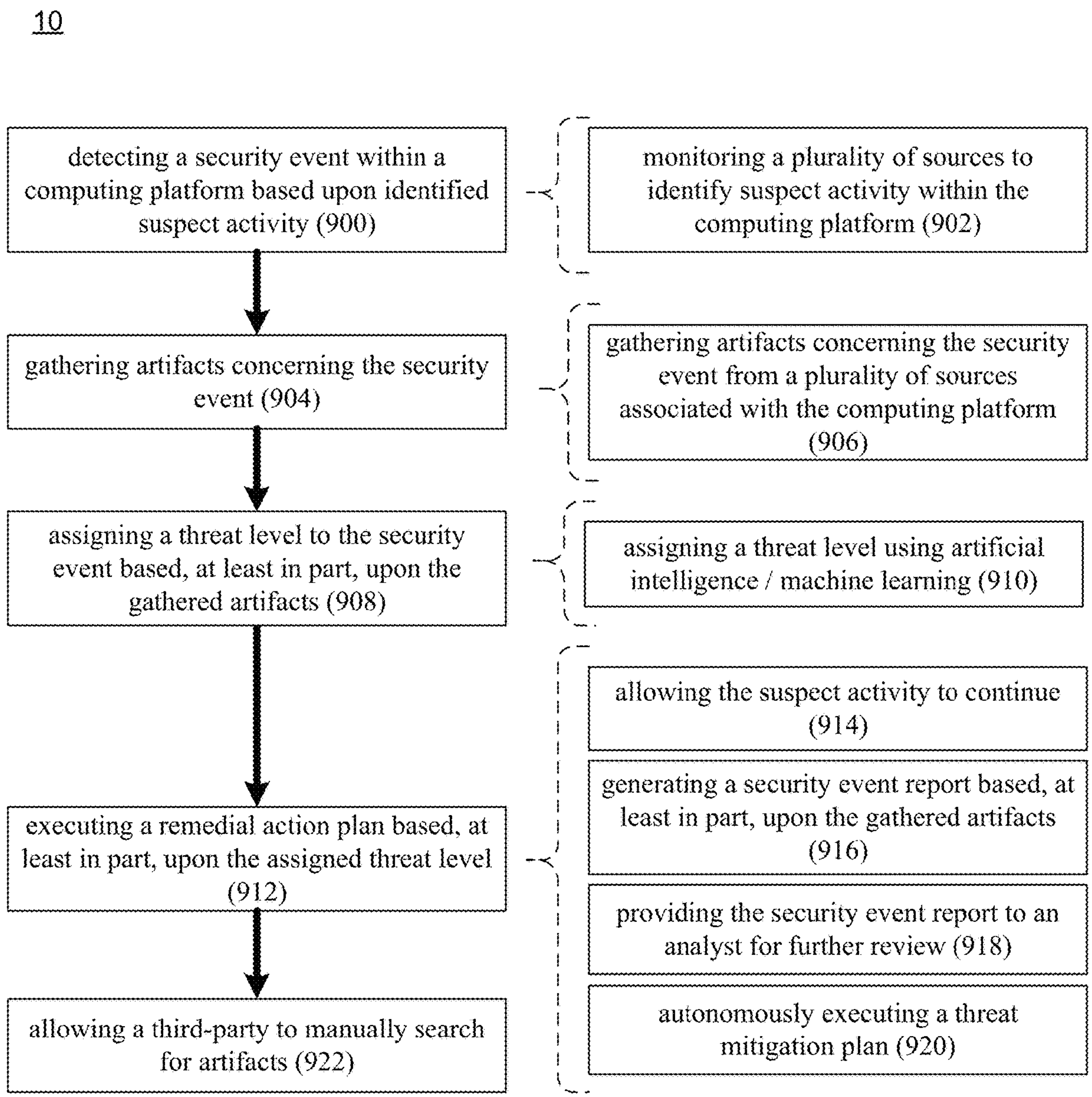
FIG. 16 is a diagrammatic view of screens rendered by the threat mitigation process of FIG. 1 according to an embodiment of the present disclosure.

Referring also to FIG. 16, threat mitigation process 10 may generate 806 holistic platform report (e.g., holistic platform reports 850, 852) concerning computing platform 60 based, at least in part, upon hardware performance information 244, platform performance information 246 and application performance information 248. Threat mitigation process 10 may be configured to receive e.g., hardware performance information 244, platform performance information 246 and application performance information 248 at regular intervals (e.g., continuously, every minute, every ten minutes, etc.).

As illustrated, holistic platform reports 850, 852 may include various pieces of content such as e.g., thought clouds that identity topics/issues with respect to computing platform 60, system logs that memorialize identified issues within computing platform 60, data sources providing information to computing system 60, and so on. The holistic platform report (e.g., holistic platform reports 850, 852) may identify one or more known conditions concerning the computing platform; and threat mitigation process 10 may effectuate 808 one or more remedial operations concerning the one or more known conditions.

For example, assume that the holistic platform report (e.g., holistic platform reports 850, 852) identifies that computing platform 60 is under a DoS (i.e., Denial of Services) attack. In computing, a denial-of-service attack (DOS attack) is a cyber-attack in which the perpetrator seeks to make a machine or network resource unavailable to its intended users by temporarily or indefinitely disrupting services of a host connected to the Internet. Denial of service is typically accomplished by flooding the targeted machine or resource with superfluous requests in an attempt to overload systems and prevent some or all legitimate requests from being fulfilled.

In response to detecting such a DOS attack, threat mitigation process 10 may effectuate 808 one or more remedial operations. For example and with respect to such a DOS attack, threat mitigation process 10 may effectuate 808 e.g., a remedial operation that instructs WAF (i.e., Web Application Firewall) 212 to deny all incoming traffic from the identified attacker based upon e.g., protocols, ports or the originating IP addresses.

Threat mitigation process 10 may also provide 810 the holistic report (e.g., holistic platform reports 850, 852) to a third-party, examples of which may include but are not limited to a user/owner/operator of computing platform 60.

Naturally, the format, appearance and content of the holistic platform report (e.g., holistic platform reports 850, 852) may be varied greatly depending upon the design criteria and anticipated performance/use of threat mitigation process 10. Accordingly, the appearance, format, completeness and content of the holistic platform report (e.g., holistic platform reports 850, 852) is for illustrative purposes only and is not intended to be a limitation of this disclosure, as other configurations are possible and are considered to be within the scope of this disclosure. For example, content may be added to the holistic platform report (e.g., holistic platform reports 850, 852), removed from the holistic platform report (e.g., holistic platform reports 850, 852), and/or reformatted within the holistic platform report (e.g., holistic platform reports 850, 852).

Figure 17:
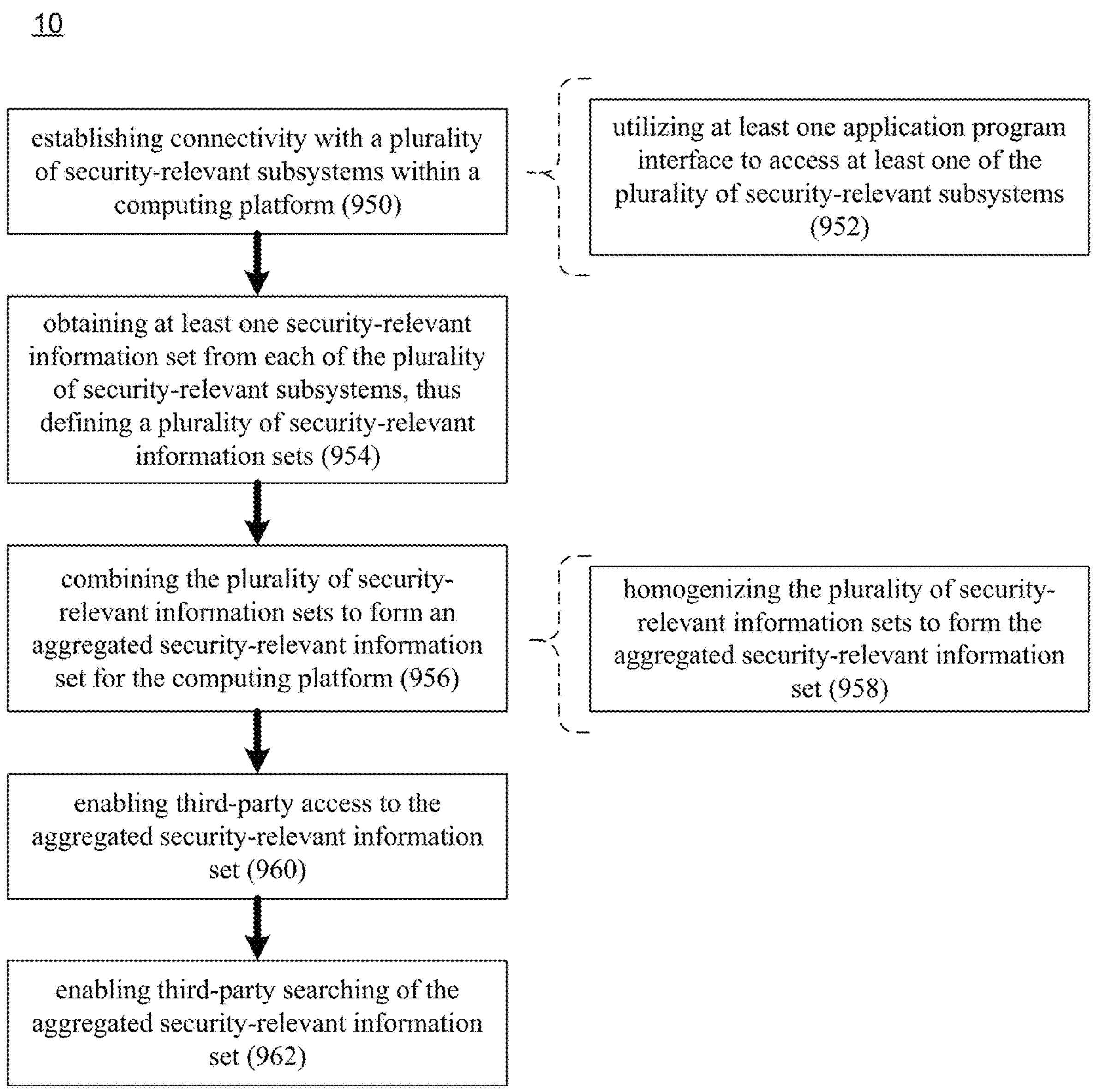
FIGS. 17-23 are flowcharts of other implementations of the threat mitigation process of FIG. 1 according to an embodiment of the present disclosure.

Referring also to FIG. 17, threat mitigation process 10 may be configured to monitor computing platform 60 for the occurrence of a security event and (in the event of such an occurrence) gather artifacts concerning the same. For example, threat mitigation process 10 may detect 900 a security event within computing platform 60 based upon identified suspect activity. Examples of such security events may include but are not limited to: DDoS events, DoS events, phishing events, spamming events, malware events, web attacks, and exploitation events.

When detecting 900 a security event (e.g., DDOS events, DoS events, phishing events, spamming events, malware events, web attacks, and exploitation events) within computing platform 60 based upon identified suspect activity, threat mitigation process 10 may monitor 902 a plurality of sources to identify suspect activity within computing platform 60.

For example, assume that threat mitigation process 10 detects 900 a security event within computing platform 60. Specifically, assume that threat mitigation process 10 is monitoring 902 a plurality of sources (e.g., the various log files maintained by SIEM system 230). And by monitoring 902 such sources, assume that threat mitigation process 10 detects 900 the receipt of inbound content (via an API) from a device having an IP address located in Uzbekistan; the subsequent opening of a port within WAF (i.e., Web Application Firewall) 212; and the streaming of content from a computing device within computing platform 60 through that recently-opened port in WAF (i.e., Web Application Firewall) 212 and to a device having an IP address located in Moldova.

Upon detecting 900 such a security event within computing platform 60, threat mitigation process 10 may gather 904 artifacts (e.g., artifacts 250) concerning the above-described security event. When gathering 904 artifacts (e.g., artifacts 250) concerning the above-described security event, threat mitigation process 10 may gather 906 artifacts concerning the security event from a plurality of sources associated with the computing platform, wherein examples of such plurality of sources may include but are not limited to the various log files maintained by SIEM system 230, and the various log files directly maintained by the security-relevant subsystems.

Once the appropriate artifacts (e.g., artifacts 250) are gathered 904, threat mitigation process 10 may assign 908 a threat level to the above-described security event based, at least in part, upon the artifacts (e.g., artifacts 250) gathered 904.

When assigning 908 a threat level to the above-described security event, threat mitigation process 10 may assign 910 a threat level using artificial intelligence/machine learning. As discussed above and with respect to artificial intelligence/machine learning being utilized to process data sets, an initial probabilistic model may be defined, wherein this initial probabilistic model may be subsequently (e.g., iteratively or continuously) modified and revised, thus allowing the probabilistic models and the artificial intelligence systems (e.g., AI/ML process 56) to "learn" so that future probabilistic models may be more precise and may explain more complex data sets. As further discussed above, AI/ML process 56 may define an initial probabilistic model for accomplishing a defined task (e.g., the analyzing of information 58), wherein the probabilistic model may be utilized to go from initial observations about information 58 (e.g., as represented by the initial branches of a probabilistic model) to conclusions about information 58 (e.g., as represented by the leaves of a probabilistic model). Accordingly and through the use of AI/ML process 56, massive data sets concerning security events may be processed so that a probabilistic model may be defined (and subsequently revised) to assign 910 a threat level to the above-described security event.

Once assigned 910 a threat level, threat mitigation process 10 may execute 912 a remedial action plan (e . . . , remedial action plan 252) based, at least in part, upon the assigned threat level.

For example and when executing 912 a remedial action plan, threat mitigation process 10 may allow 914 the above-described suspect activity to continue when e.g., threat mitigation process 10 assigns 908 a "low" threat level to the above-described security event (e.g., assuming that it is determined that the user of the local computing device is streaming video of his daughter's graduation to his parents in Moldova).

Further and when executing 912 a remedial action plan, threat mitigation process 10 may generate 916 a security event report (e.g., security event report 254) based, at least in part, upon the artifacts (e.g., artifacts 250) gathered 904; and provide 918 the security event report (e.g., security event report 254) to an analyst (e.g., analyst 256) for further review when e.g., threat mitigation process 10 assigns 908 a "moderate" threat level to the above-described security event (e.g., assuming that it is determined that while the streaming of the content is concerning, the content is low value and the recipient is not a known bad actor).

Further and when executing 912 a remedial action plan, threat mitigation process 10 may autonomously execute 920 a threat mitigation plan (shutting down the stream and closing the port) when e.g., threat mitigation process 10 assigns 908 a "severe" threat level to the above-described security event (e.g., assuming that it is determined that the streaming of the content is very concerning, as the content is high value and the recipient is a known bad actor).

Additionally, threat mitigation process 10 may allow 922 a third-party (e.g., the user/owner/operator of computing platform 60) to manually search for artifacts within computing platform 60. For example, the third-party (e.g., the user/owner/operator of computing platform 60) may be able to search the various information resources include within computing platform 60, examples of which may include but are not limited to the various log files maintained by SIEM system 230, and the various log files directly maintained by the security-relevant subsystems within computing platform 60.

Computing Platform Aggregation & Searching

As will be discussed below in greater detail, threat mitigation process 10 may be configured to e.g., aggregate data sets and allow for unified search of those data sets.

Figure 18:
Figure 18:

Referring also to FIG. 18, threat mitigation process 10 may be configured to consolidate multiple separate and discrete data sets to form a single, aggregated data set. For example, threat mitigation process 10 may establish 950 connectivity with a plurality of security-relevant subsystems (e.g., security-relevant subsystems 226) within computing platform 60. As discussed above, examples of security-relevant subsystems 226 may include but are not limited to: CDN (i.e., Content Delivery Network) systems; DAM (i.e., Database Activity Monitoring) systems; UBA (i.e., User Behavior Analytics) systems; MDM (i.e., Mobile Device Management) systems; IAM (i.e., Identity and Access Management) systems; DNS (i.e., Domain Name Server) systems, Antivirus systems, operating systems, data lakes; data logs; security-relevant software applications; security-relevant hardware systems; and resources external to the computing platform.

When establishing 950 connectivity with a plurality of security-relevant subsystems, threat mitigation process 10 may utilize 952 at least one application program interface (e.g., API Gateway 224) to access at least one of the plurality of security-relevant subsystems. For example, a 1st API gateway may be utilized to access CDN (i.e., Content Delivery Network) system; a 2nd API gateway may be utilized to access DAM (i.e., Database Activity Monitoring) system; a 3rd API gateway may be utilized to access UBA (i.e., User Behavior Analytics) system; a 4th API gateway may be utilized to access MDM (i.e., Mobile Device Management) system; a 5th API gateway may be utilized to access IAM (i.e., Identity and Access Management) system; and a 6th API gateway may be utilized to access DNS (i.e., Domain Name Server) system.

Threat mitigation process 10 may obtain 954 at least one security-relevant information set (e.g., a log file) from each of the plurality of security-relevant subsystems (e.g., CDN system; DAM system; UBA system; MDM system; IAM system; and DNS system), thus defining plurality of security-relevant information sets 258. As would be expected, plurality of security-relevant information sets 258 may utilize a plurality of different formats and/or a plurality of different nomenclatures. Accordingly, threat mitigation process 10 may combine 956 plurality of security-relevant information sets 258 to form an aggregated security-relevant information set 260 for computing platform 60.

When combining 956 plurality of security-relevant information sets 258 to form aggregated security-relevant information set 260, threat mitigation process 10 may homogenize 958 plurality of security-relevant information sets 258 to form aggregated security-relevant information set 260. For example, threat mitigation process 10 may process one or more of security-relevant information sets 258 so that they all have a common format, a common nomenclature, and/or a common structure.

Once threat mitigation process 10 combines 956 plurality of security-relevant information sets 258 to form an aggregated security-relevant information set 260 for computing platform 60, threat mitigation process 10 may enable 960 a third-party (e.g., the user/owner/operator of computing platform 60) to access aggregated security-relevant information set 260 and/or enable 962 a third-party (e.g., the user/owner/operator of computing platform 60) to search aggregated security-relevant information set 260.

Figure 19:
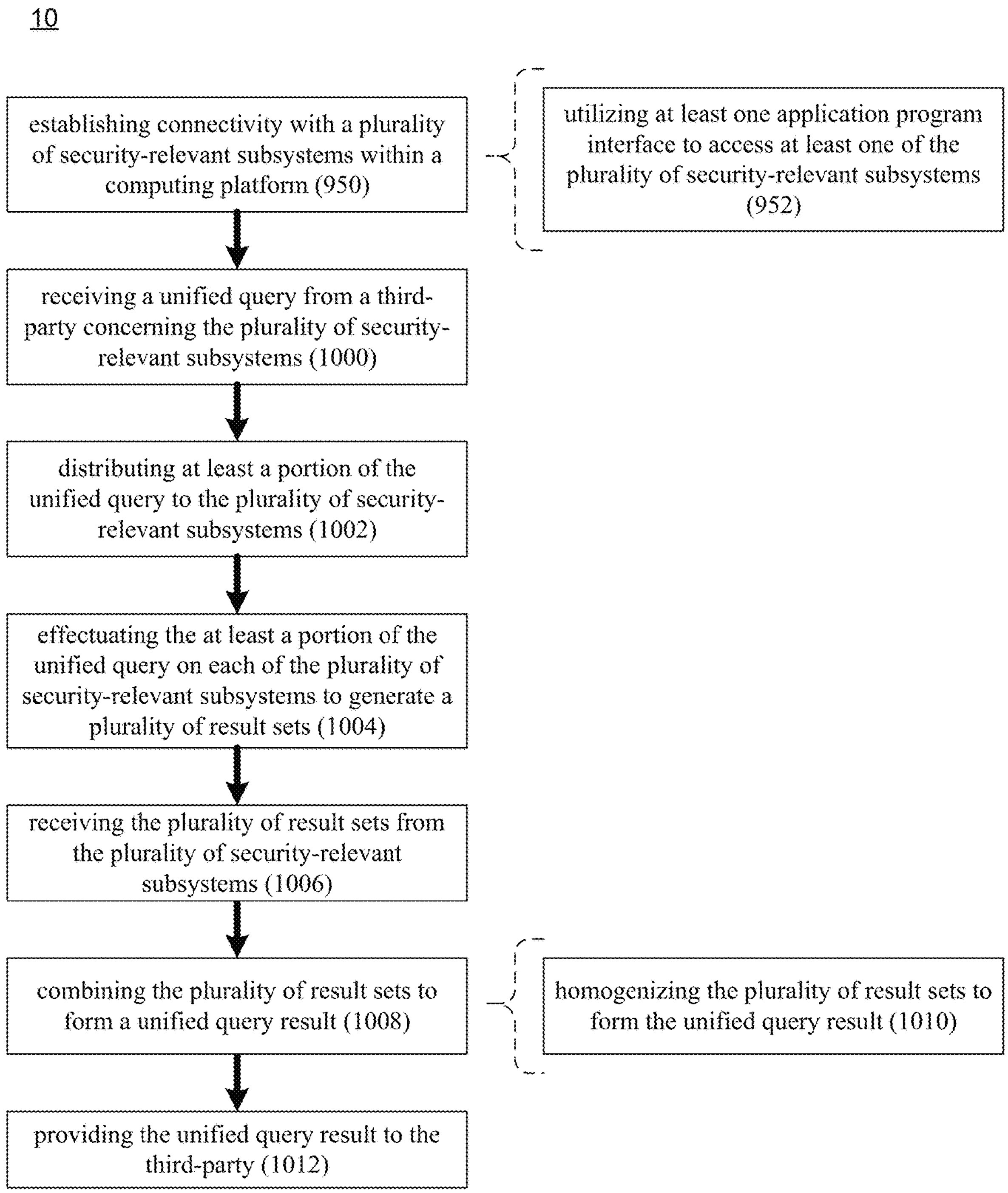

Referring also to FIG. 19, threat mitigation process 10 may be configured to enable the searching of multiple separate and discrete data sets using a single search operation. For example and as discussed above, threat mitigation process 10 may establish 950 connectivity with a plurality of security-relevant subsystems (e . . . , security-relevant subsystems 226) within computing platform 60. As discussed above, examples of security-relevant subsystems 226 may include but are not limited to: CDN (i.e., Content Delivery Network) systems; DAM (i.e., Database Activity Monitoring) systems; UBA (i.e., User Behavior Analytics) systems; MDM (i.e., Mobile Device Management) systems; IAM (i.e., Identity and Access Management) systems; DNS (i.e., Domain Name Server) systems, Antivirus systems, operating systems, data lakes; data logs; security-relevant software applications; security-relevant hardware systems; and resources external to the computing platform.

When establishing 950 connectivity with a plurality of security-relevant subsystems, threat mitigation process 10 may utilize 952 at least one application program interface (e.g., API Gateway 224) to access at least one of the plurality of security-relevant subsystems. For example, a 1st API gateway may be utilized to access CDN (i.e., Content Delivery Network) system; a 2nd API gateway may be utilized to access DAM (i.e., Database Activity Monitoring) system; a 3rd API gateway may be utilized to access UBA (i.e., User Behavior Analytics) system; a 4th API gateway may be utilized to access MDM (i.e., Mobile Device Management) system; a 5th API gateway may be utilized to access IAM (i.e., Identity and Access Management) system; and a 6th API gateway may be utilized to access DNS (i.e., Domain Name Server) system.

Threat mitigation process 10 may receive 1000 unified query 262 from a third-party (e.g., the user/owner/operator of computing platform 60) concerning the plurality of security-relevant subsystems. As discussed above, examples of security-relevant subsystems 226 may include but are not limited to: CDN (i.e., Content Delivery Network) systems; DAM (i.e., Database Activity Monitoring) systems; UBA (i.e., User Behavior Analytics) systems; MDM (i.e., Mobile Device Management) systems; IAM (i.e., Identity and Access Management) systems; DNS (i.e., Domain Name Server) systems, Antivirus systems, operating systems, data lakes; data logs; security-relevant software applications; security-relevant hardware systems; and resources external to the computing platform.

Threat mitigation process 10 may distribute 1002 at least a portion of unified query 262 to the plurality of security-relevant subsystems, resulting in the distribution of plurality of queries 264 to the plurality of security-relevant subsystems. For example, assume that a third-party (e.g., the user/owner/operator of computing platform 60) wishes to execute a search concerning the activity of a specific employee. Accordingly, the third-party (e.g., the user/owner/operator of computing platform 60) may formulate the appropriate unified query (e.g., unified query 262) that defines the employee name, the computing device(s) of the employee, and the date range of interest. Unified query 262 may then be parsed to form plurality of queries 264, wherein a specific query (within plurality of queries 264) may be defined for each of the plurality of security-relevant subsystems and provided to the appropriate security-relevant subsystems. For example, a 1st query may be included within plurality of queries 264 and provided to CDN (i.e., Content Delivery Network) system; a 2nd query may be included within plurality of queries 264 and provided to DAM (i.e., Database Activity Monitoring) system; a 3rd query may be included within plurality of queries 264 and provided to UBA (i.e., User Behavior Analytics) system; a 4th query may be included within plurality of queries 264 and provided to MDM (i.e., Mobile Device Management) system; a 5th query may be included within plurality of queries 264 and provided to IAM (i.e., Identity and Access Management) system; and a 6th query may be included within plurality of queries 264 and provided to DNS (i.e., Domain Name Server) system.

Threat mitigation process 10 may effectuate 1004 at least a portion of unified query 262 on each of the plurality of security-relevant subsystems to generate plurality of result sets 266. For example, the 1st query may be executed on CDN (i.e., Content Delivery Network) system to produce a 1st result set; the 2nd query may be executed on DAM (i.e., Database Activity Monitoring) system to produce a 2nd result set; the 3rd query may be executed on UBA (i.e., User Behavior Analytics) system to produce a 3rd result set; the 4th query may be executed on MDM (i.e., Mobile Device Management) system to produce a 4th result set; the 5th query may be executed on IAM (i.e., Identity and Access Management) system to produce a 5th result set; and the 6th query may executed on DNS (i.e., Domain Name Server) system to produce a 6th result set.

Threat mitigation process 10 may receive 1006 plurality of result sets 266 from the plurality of security-relevant subsystems. Threat mitigation process 10 may then combine 1008 plurality of result sets 266 to form unified query result 268. When combining 1008 plurality of result sets 266 to form unified query result 268, threat mitigation process 10 may homogenize 1010 plurality of result sets 266 to form unified query result 268. For example, threat mitigation process 10 may process one or more discrete result sets included within plurality of result sets 266 so that the discrete result sets within plurality of result sets 266 all have a common format, a common nomenclature, and/or a common structure. Threat mitigation process 10 may then provide 1012 unified query result 268 to the third-party (e.g., the user/owner/operator of computing platform 60).

Figure 20:
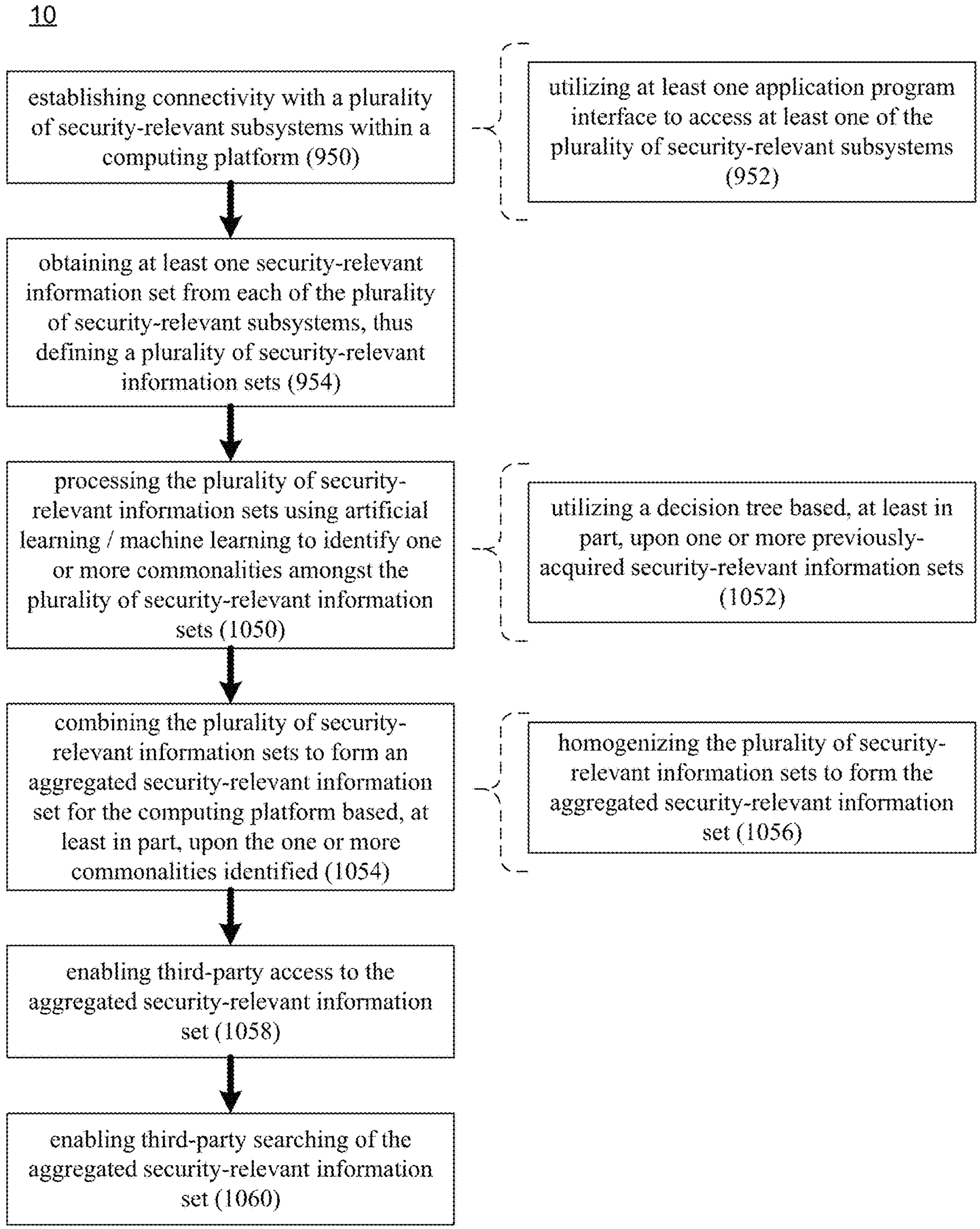

Referring also to FIG. 20, threat mitigation process 10 may be configured to utilize artificial intelligence/machine learning to automatically consolidate multiple separate and discrete data sets to form a single, aggregated data set. For example and as discussed above, threat mitigation process 10 may establish 950 connectivity with a plurality of security-relevant subsystems (e.g., security-relevant subsystems 226) within computing platform 60. As discussed above, examples of security-relevant subsystems 226 may include but are not limited to: CDN (i.e., Content Delivery Network) systems; DAM (i.e., Database Activity Monitoring) systems; UBA (i.e., User Behavior Analytics) systems; MDM (i.e., Mobile Device Management) systems; IAM (i.e., Identity and Access Management) systems; DNS (i.e., Domain Name Server) systems, Antivirus systems, operating systems, data lakes; data logs; security-relevant software applications; security-relevant hardware systems; and resources external to the computing platform.

As discussed above and when establishing 950 connectivity with a plurality of security-relevant subsystems, threat mitigation process 10 may utilize 952 at least one application program interface (e.g., API Gateway 224) to access at least one of the plurality of security-relevant subsystems. For example, a 1st API gateway may be utilized to access CDN (i.e., Content Delivery Network) system; a 2nd API gateway may be utilized to access DAM (i.e., Database Activity Monitoring) system; a 3rd API gateway may be utilized to access UBA (i.e., User Behavior Analytics) system; a 4th API gateway may be utilized to access MDM (i.e., Mobile Device Management) system; a 5th API gateway may be utilized to access IAM (i.e., Identity and Access Management) system; and a 6th API gateway may be utilized to access DNS (i.e., Domain Name Server) system.

As discussed above, threat mitigation process 10 may obtain 954 at least one security-relevant information set (e.g., a log file) from each of the plurality of security-relevant subsystems (e.g., CDN system; DAM system; UBA system; MDM system; IAM system; and DNS system), thus defining plurality of security-relevant information sets 258. As would be expected, plurality of security-relevant information sets 258 may utilize a plurality of different formats and/or a plurality of different nomenclatures.

Threat mitigation process 10 may process 1050 plurality of security-relevant information sets 258 using artificial learning/machine learning to identify one or more commonalities amongst plurality of security-relevant information sets 258. As discussed above and with respect to artificial intelligence/machine learning being utilized to process data sets, an initial probabilistic model may be defined, wherein this initial probabilistic model may be subsequently (e.g., iteratively or continuously) modified and revised, thus allowing the probabilistic models and the artificial intelligence systems (e.g., AI/ML process 56) to "learn" so that future probabilistic models may be more precise and may explain more complex data sets. As further discussed above, AI/ML process 56 may define an initial probabilistic model for accomplishing a defined task (e.g., the analyzing of information 58), wherein the probabilistic model may be utilized to go from initial observations about information 58 (e.g., as represented by the initial branches of a probabilistic model) to conclusions about information 58 (e.g., as represented by the leaves of a probabilistic model). Accordingly and through the use of AI/ML process 56, plurality of security-relevant information sets 258 may be processed so that a probabilistic model may be defined (and subsequently revised) to identify one or more commonalities (e.g., common headers, common nomenclatures, common data ranges, common data types, common formats, etc.) amongst plurality of security-relevant information sets 258. When processing 1050 plurality of security-relevant information sets 258 using artificial learning/machine learning to identify one or more commonalities amongst plurality of security-relevant information sets 258, threat mitigation process 10 may utilize 1052 a decision tree (e.g., probabilistic model 100) based, at least in part, upon one or more previously-acquired security-relevant information sets.

Threat mitigation process 10 may combine 1054 plurality of security-relevant information sets 258 to form aggregated security-relevant information set 260 for computing platform 60 based, at least in part, upon the one or more commonalities identified.

When combining 1054 plurality of security-relevant information sets 258 to form aggregated security-relevant information set 260 for computing platform 60 based, at least in part, upon the one or more commonalities identified, threat mitigation process 10 may homogenize 1056 plurality of security-relevant information sets 258 to form aggregated security-relevant information set 260. For example, threat mitigation process 10 may process one or more of security-relevant information sets 258 so that they all have a common format, a common nomenclature, and/or a common structure.

Once threat mitigation process 10 combines 1054 plurality of security-relevant information sets 258 to form an aggregated security-relevant information set 260 for computing platform 60, threat mitigation process 10 may enable 1058 a third-party (e.g., the user/owner/operator of computing platform 60) to access aggregated security-relevant information set 260 and/or enable 1060 a third-party (e.g., the user/owner/operator of computing platform 60) to search aggregated security-relevant information set 260.

Threat Event Information Updating

As will be discussed below in greater detail, threat mitigation process 10 may be configured to be updated concerning threat event information.

Figure 21:
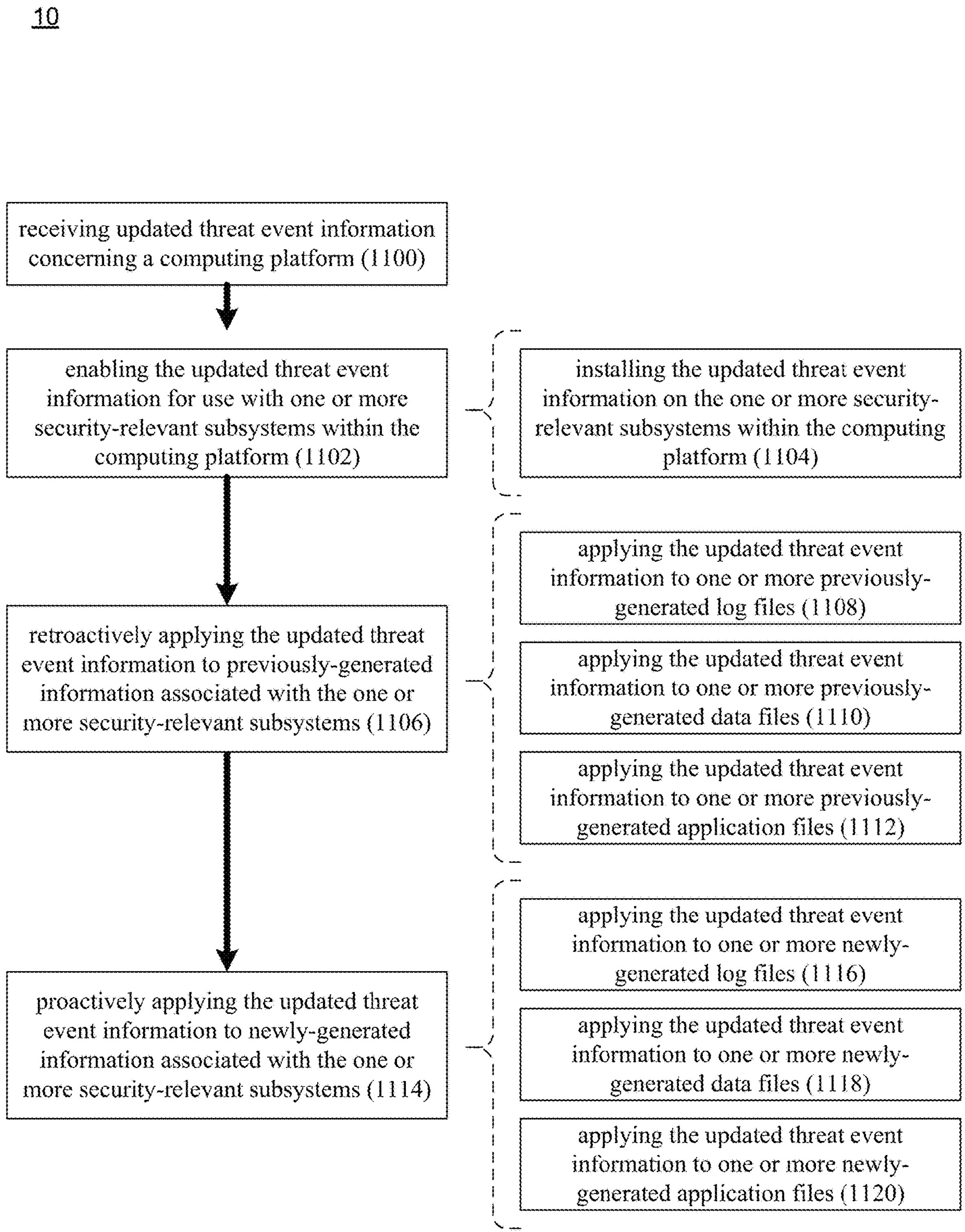

Referring also to FIG. 21, threat mitigation process 10 may be configured to receive updated threat event information for security-relevant subsystems 226. For example, threat mitigation process 10 may receive 1100 updated threat event information 270 concerning computing platform 60, wherein updated threat event information 270 may define one or more of: updated threat listings; updated threat definitions; updated threat methodologies; updated threat sources; and updated threat strategies. Threat mitigation process 10 may enable 1102 updated threat event information 270 for use with one or more security-relevant subsystems 226 within computing platform 60. As discussed above, examples of security-relevant subsystems 226 may include but are not limited to: CDN (i.e., Content Delivery Network) systems; DAM (i.e., Database Activity Monitoring) systems; UBA (i.e., User Behavior Analytics) systems; MDM (i.e., Mobile Device Management) systems; IAM (i.e., Identity and Access Management) systems; DNS (i.e., Domain Name Server) systems, Antivirus systems, operating systems, data lakes; data logs; security-relevant software applications; security-relevant hardware systems; and resources external to the computing platform.

When enabling 1102 updated threat event information 270 for use with one or more security-relevant subsystems 226 within computing platform 60, threat mitigation process 10 may install 1104 updated threat event information 270 on one or more security-relevant subsystems 226 within computing platform 60.

Threat mitigation process 10 may retroactively apply 1106 updated threat event information 270 to previously-generated information associated with one or more security-relevant subsystems 226.

When retroactively apply 1106 updated threat event information 270 to previously-generated information associated with one or more security-relevant subsystems 226, threat mitigation process 10 may: apply 1108 updated threat event information 270 to one or more previously-generated log files (not shown) associated with one or more security-relevant subsystems 226; apply 1110 updated threat event information 270 to one or more previously-generated data files (not shown) associated with one or more security-relevant subsystems 226; and apply 1112 updated threat event information 270 to one or more previously-generated application files (not shown) associated with one or more security-relevant subsystems 226.

Additionally/alternatively, threat mitigation process 10 may proactively apply 1114 updated threat event information 270 to newly-generated information associated with one or more security-relevant subsystems 226.

When proactively applying 1114 updated threat event information 270 to newly-generated information associated with one or more security-relevant subsystems 226, threat mitigation process 10 may: apply 1116 updated threat event information 270 to one or more newly-generated log files (not shown) associated with one or more security-relevant subsystems 226; apply 1118 updated threat event information 270 to one or more newly-generated data files (not shown) associated with one or more security-relevant subsystems 226; and apply 1120 updated threat event information 270 to one or more newly-generated application files (not shown) associated with one or more security-relevant subsystems 226.

Figure 22:
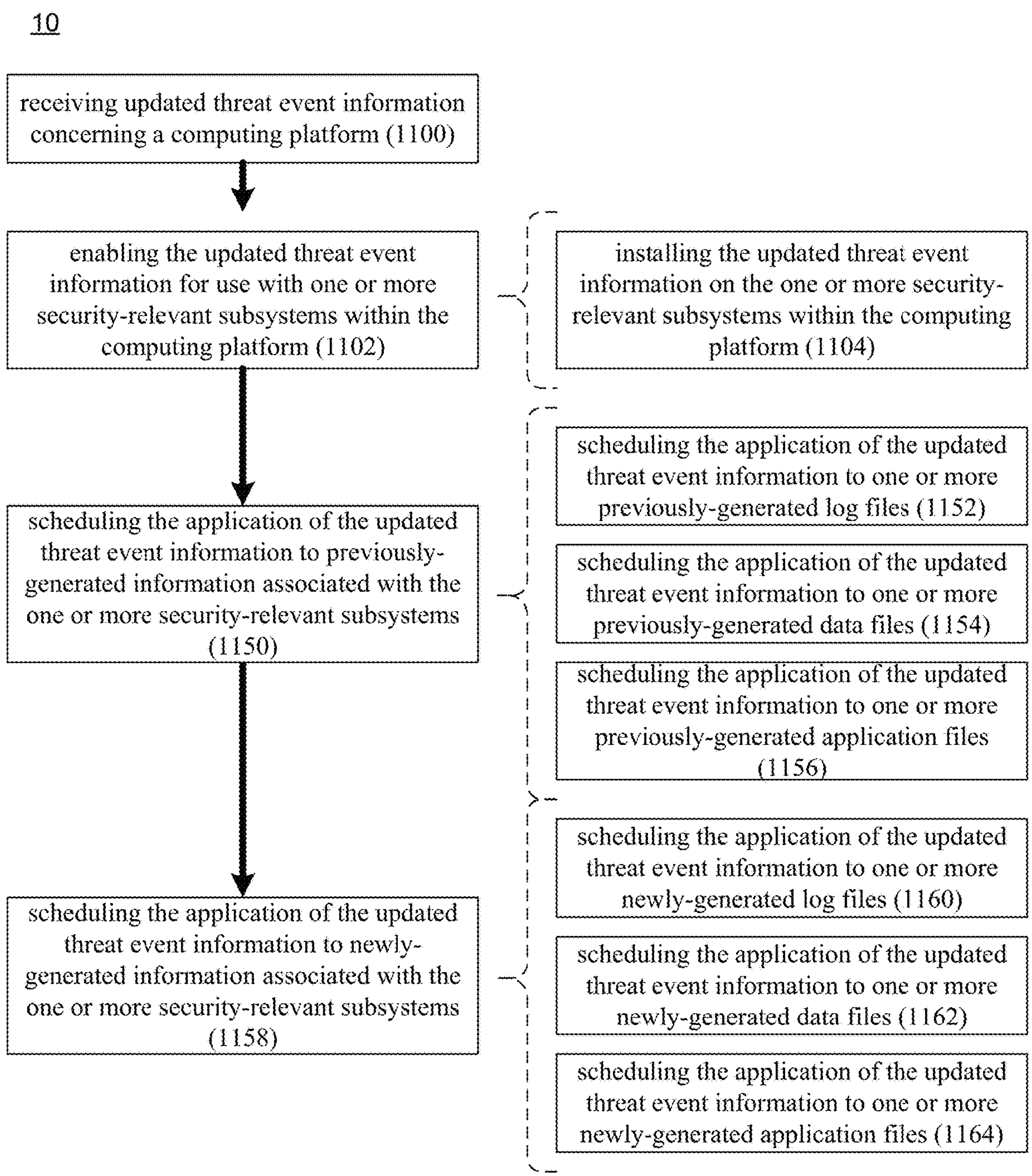

Referring also to FIG. 22, threat mitigation process 10 may be configured to receive updated threat event information 270 for security-relevant subsystems 226. For example and as discussed above, threat mitigation process 10 may receive 1100 updated threat event information 270 concerning computing platform 60, wherein updated threat event information 270 may define one or more of: updated threat listings; updated threat definitions; updated threat methodologies; updated threat sources; and updated threat strategies. Further and as discussed above, threat mitigation process 10 may enable 1102 updated threat event information 270 for use with one or more security-relevant subsystems 226 within computing platform 60. As discussed above, examples of security-relevant subsystems 226 may include but are not limited to: CDN (i.e., Content Delivery Network) systems; DAM (i.e., Database Activity Monitoring) systems; UBA (i.e., User Behavior Analytics) systems; MDM (i.e., Mobile Device Management) systems; IAM (i.e., Identity and Access Management) systems; DNS (i.e., Domain Name Server) systems, Antivirus systems, operating systems, data lakes; data logs; security-relevant software applications; security-relevant hardware systems; and resources external to the computing platform.

As discussed above and when enabling 1102 updated threat event information 270 for use with one or more security-relevant subsystems 226 within computing platform 60, threat mitigation process 10 may install 1104 updated threat event information 270 on one or more security-relevant subsystems 226 within computing platform 60.

Sometimes, it may not be convenient and/or efficient to immediately apply updated threat event information 270 to security-relevant subsystems 226. Accordingly, threat mitigation process 10 may schedule 1150 the application of updated threat event information 270 to previously-generated information associated with one or more security-relevant subsystems 226.

When scheduling 1150 the application of updated threat event information 270 to previously-generated information associated with one or more security-relevant subsystems 226, threat mitigation process 10 may: schedule 1152 the application of updated threat event information 270 to one or more previously-generated log files (not shown) associated with one or more security-relevant subsystems 226; schedule 1154 the application of updated threat event information 270 to one or more previously-generated data files (not shown) associated with one or more security-relevant subsystems 226; and schedule 1156 the application of updated threat event information 270 to one or more previously-generated application files (not shown) associated with one or more security-relevant subsystems 226.

Additionally/alternatively, threat mitigation process 10 may schedule 1158 the application of the updated threat event information to newly-generated information associated with the one or more security-relevant subsystems.

When scheduling 1158 the application of updated threat event information 270 to newly-generated information associated with one or more security-relevant subsystems 226, threat mitigation process 10 may: schedule 1160 the application of updated threat event information 270 to one or more newly-generated log files (not shown) associated with one or more security-relevant subsystems 226; schedule 1162 the application of updated threat event information 270 to one or more newly-generated data files (not shown) associated with one or more security-relevant subsystems 226; and schedule 1164 the application of updated threat event information 270 to one or more newly-generated application files (not shown) associated with one or more security-relevant subsystems 226.

Figure 23:
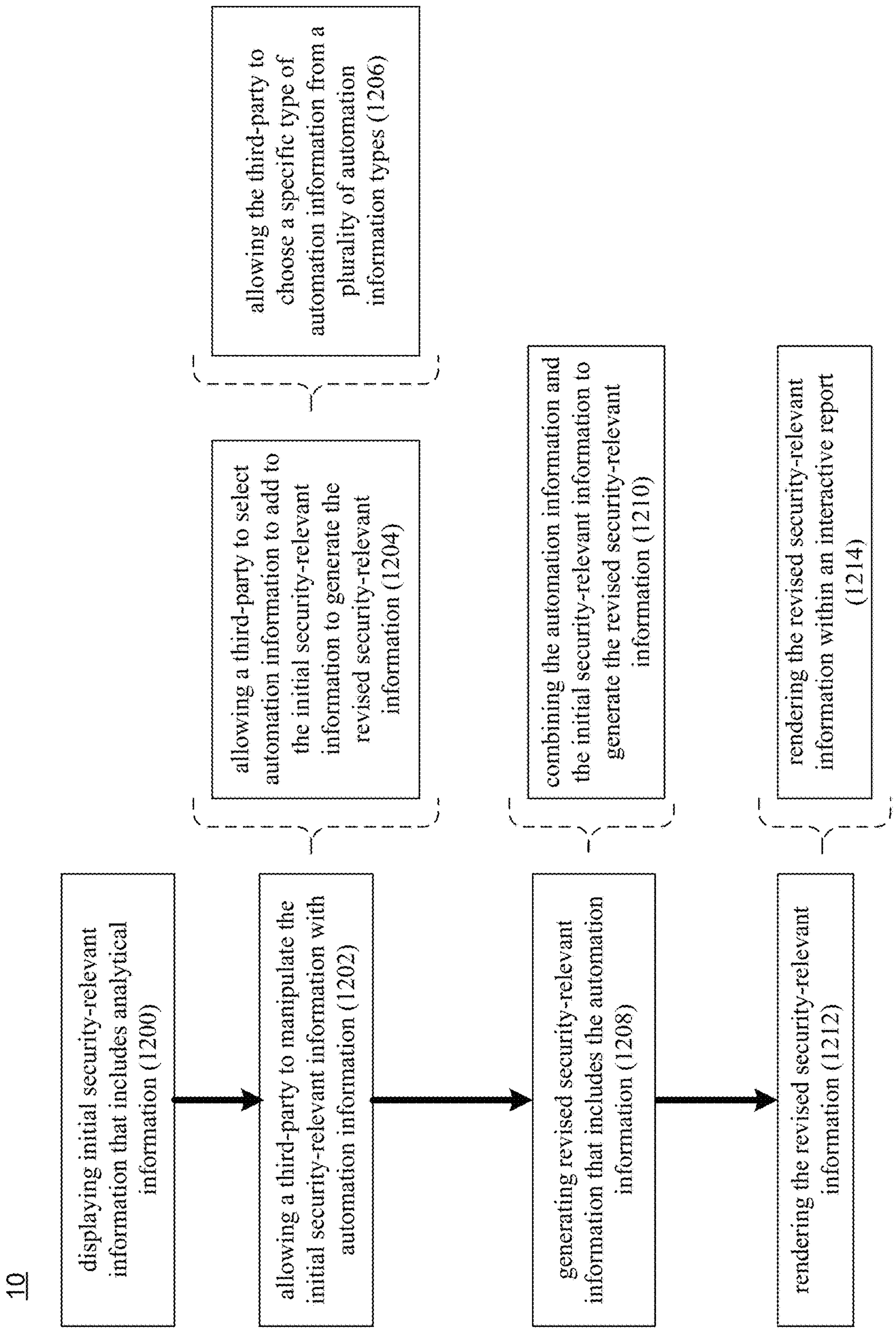
Figure 24:
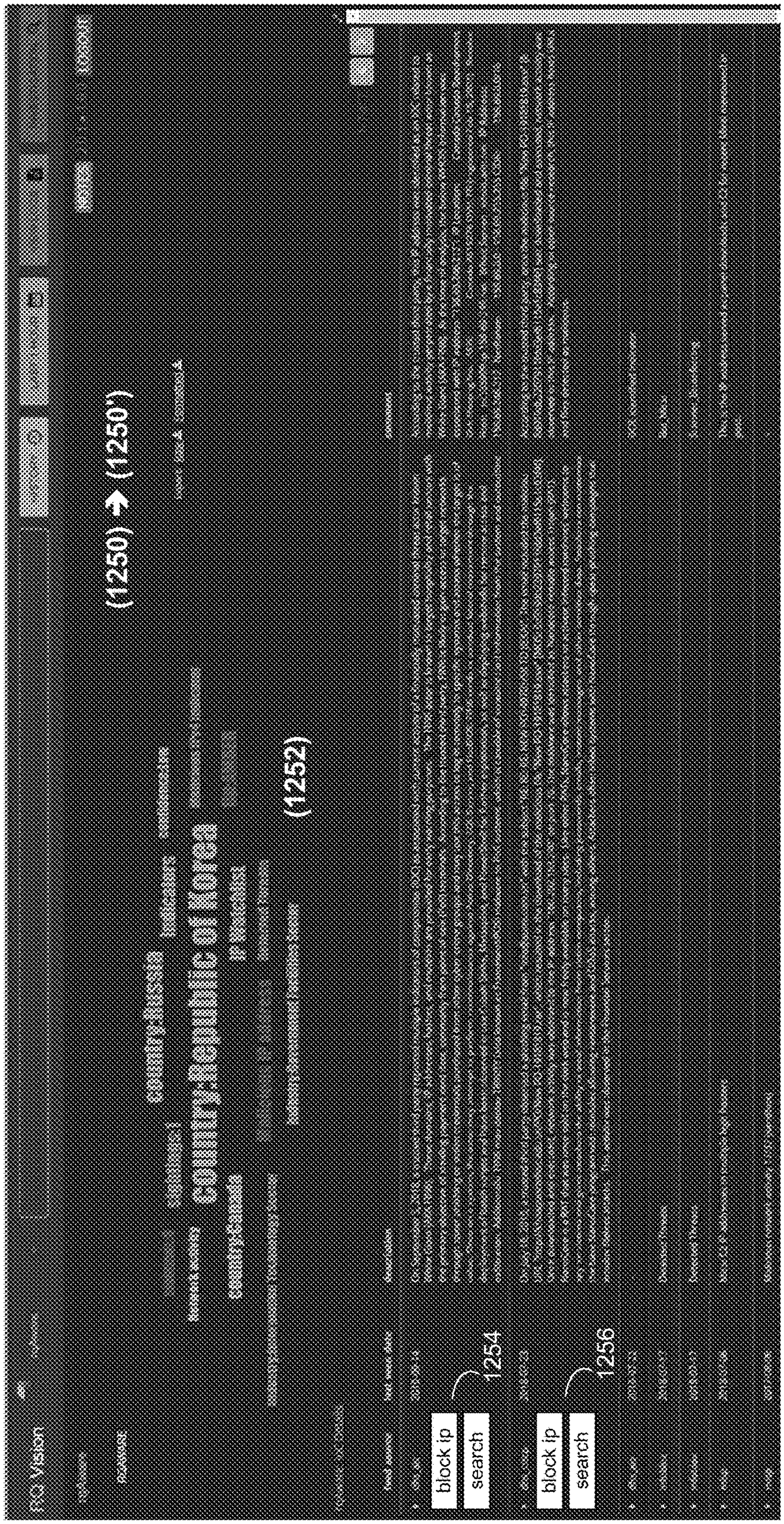
FIG. 24 is a diagrammatic view of a screen rendered by the threat mitigation process of FIG. 1 according to an embodiment of the present disclosure.

Referring also to FIGS. 23-24, threat mitigation process 10 may be configured to initially display analytical data, which may then be manipulated/updated to include automation data. For example, threat mitigation process 10 may display 1200 initial security-relevant information 1250 that includes analytical information (e.g., thought cloud 1252). Examples of such analytical information may include but is not limited to one or more of: investigative information; and hunting information.

Investigative Information (a portion of analytical information): Unified searching and/or automated searching, such as e.g., a security event occurring and searches being performed to gather artifacts concerning that security event.

Hunt Information (a portion of analytical information): Targeted searching/investigations, such as the monitoring and cataloging of the videos that an employee has watched or downloaded over the past 30 days.

Threat mitigation process 10 may allow 1202 a third-party (e.g., the user/owner/operator of computing platform 60) to manipulate initial security-relevant information 1250 with automation information.

Automate Information (a portion of automation): The execution of a single (and possibly simple) action one time, such as the blocking an IP address from accessing computing platform 60 whenever such an attempt is made.

Orchestrate Information (a portion of automation): The execution of a more complex batch (or series) of tasks, such as sensing an unauthorized download via an API and a) shutting down the API, adding the requesting IP address to a blacklist, and closing any ports opened for the requestor.

When allowing 1202 a third-party (e.g., the user/owner/operator of computing platform 60) to manipulate initial security-relevant information 1250 with automation information, threat mitigation process 10 may allow 1204 a third-party (e.g., the user/owner/operator of computing platform 60) to select the automation information to add to initial security-relevant information 1250 to generate revised security-relevant information 1250'. For example and when allowing 1204 a third-party (e.g., the user/owner/operator of computing platform 60) to select the automation information to add to initial security-relevant information 1250 to generate revised security-relevant information 1250', threat mitigation process 10 may allow 1206 the third-party (e.g., the user/owner/operator of computing platform 60) to choose a specific type of automation information from a plurality of automation information types.

For example, the third-party (e.g., the user/owner/operator of computing platform 60) may choose to add/initiate the automation information to generate revised security-relevant information 1250'. Accordingly, threat mitigation process 10 may render selectable options (e.g., selectable buttons 1254, 1256) that the third-party (e.g., the user/owner/operator of computing platform 60) may select to manipulate initial security-relevant information 1250 with automation information to generate revised security-relevant information

1250'. For this particular example, the third-party (e.g., the user/owner/operator of computing platform 60) may choose two different options to manipulate initial security-relevant information 1250, namely: "block ip" or "search", both of which will result in threat mitigation process 10 generating 1208 revised security-relevant information 1250' (that includes the above-described automation information).

When generating 1208 revised security-relevant information 1250' (that includes the above-described automation information), threat mitigation process 10 may combine 1210 the automation information (that results from selecting "block IP" or "search") and initial security-relevant information 1250 to generate and render 1212 revised security-relevant information 1250'.

When rendering 1212 revised security-relevant information 1250', threat mitigation process 10 may render 1214 revised security-relevant information 1250' within interactive report 1258.

Training Routine Generation and Execution

As will be discussed below in greater detail, threat mitigation process 10 may be configured to allow for the manual or automatic generation of training routines, as well as the execution of the same.

Figure 25:
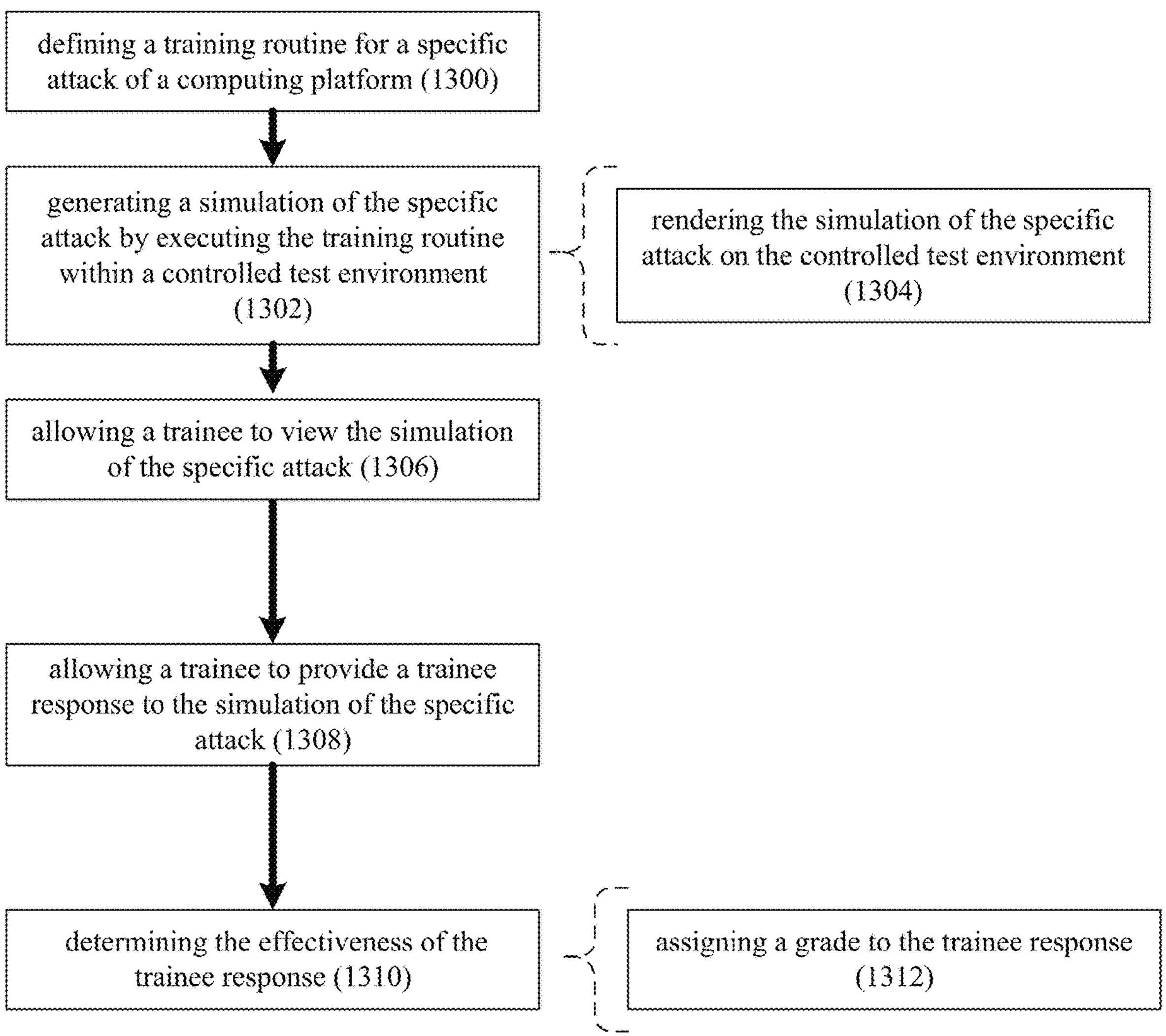
FIGS. 25-31 are flowcharts of other implementations of the threat mitigation process of FIG. 1 according to an embodiment of the present disclosure.

Referring also to FIG. 25, threat mitigation process 10 may be configured to allow for the manual generation of testing routine 272. For example, threat mitigation process 10 may define 1300 training routine 272 for a specific attack (e.g., a Denial of Services attack) of computing platform 60. Specifically, threat mitigation process 10 may generate 1302 a simulation of the specific attack (e.g., a Denial of Services attack) by executing training routine 272 within a controlled test environment, an example of which may include but is not limited to virtual machine 274 executed on a computing device (e.g., computing device 12).

When generating 1302 a simulation of the specific attack (e.g., a Denial of Services attack) by executing training routine 272 within the controlled test environment (e.g., virtual machine 274), threat mitigation process 10 may render 1304 the simulation of the specific attack (e.g., a Denial of Services attack) on the controlled test environment (e.g., virtual machine 274).

Threat mitigation process 10 may allow 1306 a trainee (e.g., trainee 276) to view the simulation of the specific attack (e.g., a Denial of Services attack) and may allow 1308 the trainee (e.g., trainee 276) to provide a trainee response (e.g., trainee response 278) to the simulation of the specific attack (e.g., a Denial of Services attack). For example, threat mitigation process 10 may execute training routine 272, which trainee 276 may "watch" and provide trainee response 278.

Threat mitigation process 10 may then determine 1310 the effectiveness of trainee response 278, wherein determining 1310 the effectiveness of the trainee response may include threat mitigation process 10 assigning 1312 a grade (e.g., a letter grade or a number grade) to trainee response 278.

Figure 26:
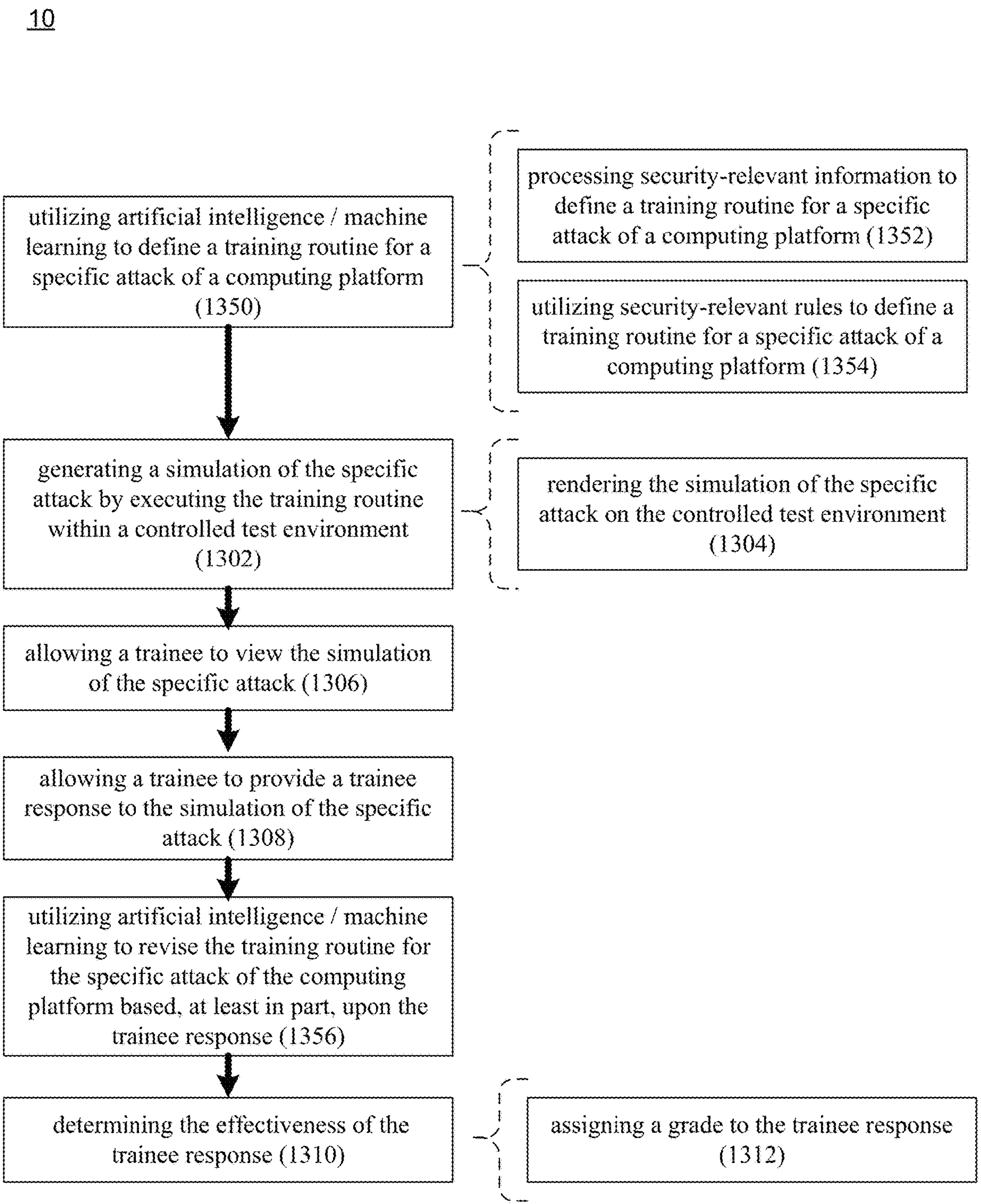

Referring also to FIG. 26, threat mitigation process 10 may be configured to allow for the automatic generation of testing routine 272. For example, threat mitigation process 10 may utilize 1350 artificial intelligence/machine learning to define training routine 272 for a specific attack (e.g., a Denial of Services attack) of computing platform 60.

As discussed above and with respect to artificial intelligence/machine learning being utilized to process data sets, an initial probabilistic model may be defined, wherein this initial probabilistic model may be subsequently (e.g., iteratively or continuously) modified and revised, thus allowing the probabilistic models and the artificial intelligence systems (e.g., AI/ML process 56) to "learn" so that future probabilistic models may be more precise and may explain more complex data sets. As further discussed above, AI/ML process 56 may define an initial probabilistic model for accomplishing a defined task (e.g., the analyzing of information 58), wherein the probabilistic model may be utilized to go from initial observations about information 58 (e.g., as represented by the initial branches of a probabilistic model) to conclusions about information 58 (e.g., as represented by the leaves of a probabilistic model). Accordingly and through the use of AI/ML process 56, information may be processed so that a probabilistic model may be defined (and subsequently revised) to define training routine 272 for a specific attack (e.g., a Denial of Services attack) of computing platform 60.

When using 1350 artificial intelligence/machine learning to define training routine 272 for a specific attack (e.g., a Denial of Services attack) of computing platform 60, threat mitigation process 10 may process 1352 security-relevant information to define training routine 272 for specific attack (e.g., a Denial of Services attack) of computing platform 60. Further and when using 1350 artificial intelligence/machine learning to define training routine 272 for a specific attack (e.g., a Denial of Services attack) of computing platform 60, threat mitigation process 10 may utilize 1354 security-relevant rules to define training routine 272 for a specific attack (e.g., a Denial of Services attack) of computing platform 60. Accordingly, security-relevant information that e.g., defines the symptoms of e.g., a Denial of Services attack and security-relevant rules that define the behavior of e.g., a Denial of Services attack may be utilized by threat mitigation process 10 when defining training routine 272.

As discussed above, threat mitigation process 10 may generate 1302 a simulation of the specific attack (e.g., a Denial of Services attack) by executing training routine 272 within a controlled test environment, an example of which may include but is not limited to virtual machine 274 executed on a computing device (e.g., computing device 12.

Further and as discussed above, when generating 1302 a simulation of the specific attack (e.g., a Denial of Services attack) by executing training routine 272 within the controlled test environment (e.g., virtual machine 274), threat mitigation process 10 may render 1304 the simulation of the specific attack (e.g., a Denial of Services attack) on the controlled test environment (e.g., virtual machine 274).

Threat mitigation process 10 may allow 1306 a trainee (e.g., trainee 276) to view the simulation of the specific attack (e.g., a Denial of Services attack) and may allow 1308 the trainee (e.g., trainee 276) to provide a trainee response (e.g., trainee response 278) to the simulation of the specific attack (e.g., a Denial of Services attack). For example, threat mitigation process 10 may execute training routine 272, which trainee 276 may "watch" and provide trainee response 278.

Threat mitigation process 10 may utilize 1356 artificial intelligence/machine learning to revise training routine 272 for the specific attack (e.g., a Denial of Services attack) of computing platform 60 based, at least in part, upon trainee response 278.

As discussed above, threat mitigation process 10 may then determine 1310 the effectiveness of trainee response 278, wherein determining 1310 the effectiveness of the trainee response may include threat mitigation process 10 assigning 1312 a grade (e.g., a letter grade or a number grade) to trainee response 278.

Figure 27:
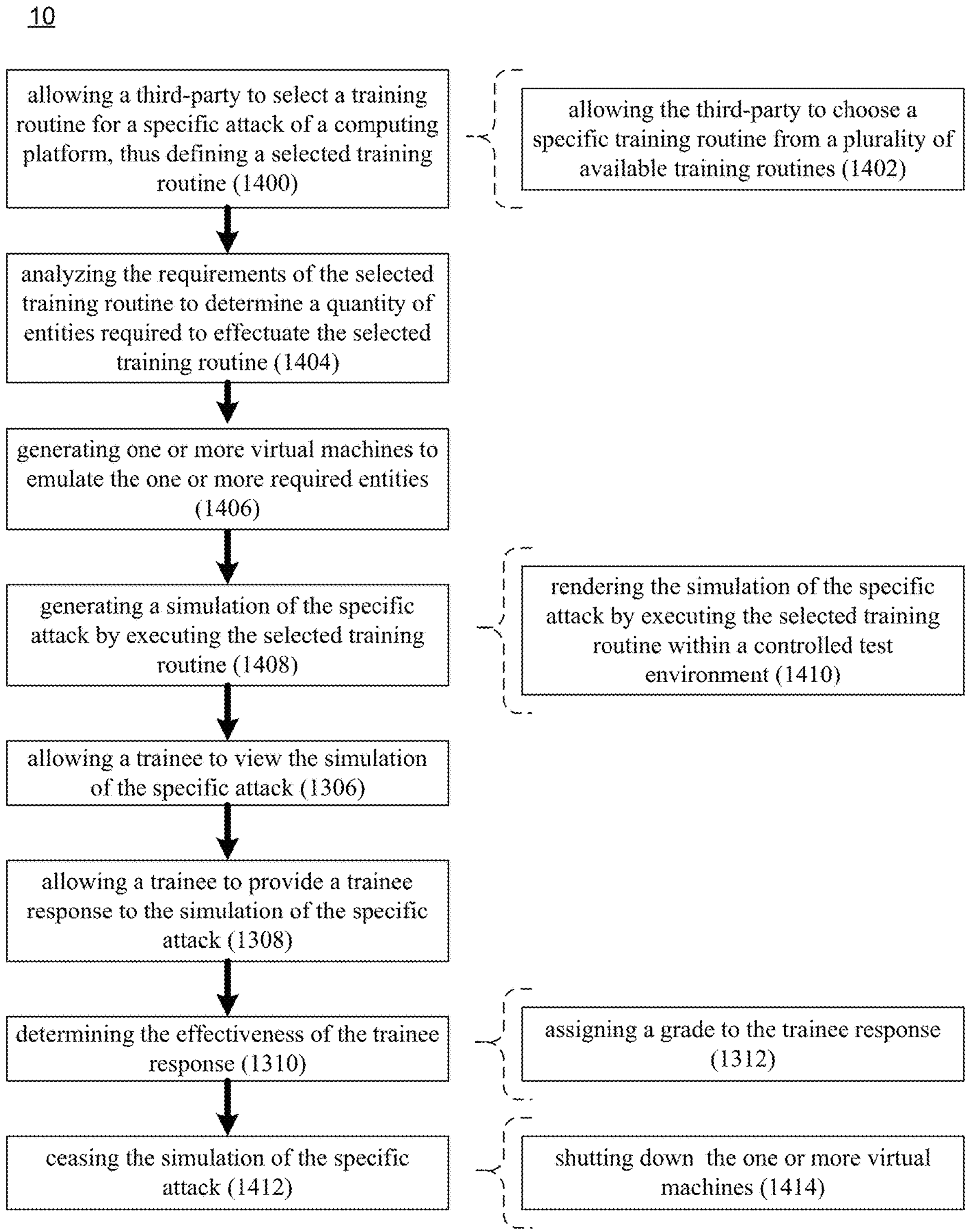

Referring also to FIG. 27, threat mitigation process 10 may be configured to allow a trainee to choose their training routine. For example mitigation process 10 may allow 1400 a third-party (e.g., the user/owner/operator of computing platform 60) to select a training routine for a specific attack (e.g., a Denial of Services attack) of computing platform 60, thus defining a selected training routine. When allowing 1400 a third-party (e.g., the user/owner/operator of computing platform 60) to select a training routine for a specific attack (e.g., a Denial of Services attack) of computing platform 60, threat mitigation process 10 may allow 1402 the third-party (e.g., the user/owner/operator of computing platform 60) to choose a specific training routine from a plurality of available training routines. For example, the third-party (e.g., the user/owner/operator of computing platform 60) may be able to select a specific type of attack (e.g., DDOS events, DoS events, phishing events, spamming events, malware events, web attacks, and exploitation events) and/or select a specific training routine (that may or may not disclose the specific type of attack).

Once selected, threat mitigation process 10 may analyze 1404 the requirements of the selected training routine (e.g., training routine 272) to determine a quantity of entities required to effectuate the selected training routine (e.g., training routine 272), thus defining one or more required entities. For example, assume that training routine 272 has three required entities (e.g., an attacked device and two attacking devices). According, threat mitigation process 10 may generate 1406 one or more virtual machines (e.g., such as virtual machine 274) to emulate the one or more required entities. In this particular example, threat mitigation process 10 may generate 1406 three virtual machines, a first VM for the attacked device, a second VM for the first attacking device and a third VM for the second attacking device. As is known in the art, a virtual machine (VM) is a virtual emulation of a physical computing system. Virtual machines may be based on computer architectures and may provide the functionality of a physical computer, wherein their implementations may involve specialized hardware, software, or a combination thereof.

Threat mitigation process 10 may generate 1408 a simulation of the specific attack (e.g., a Denial of Services attack) by executing the selected training routine (e.g., training routine 272). When generating 1408 the simulation of the specific attack (e.g., a Denial of Services attack) by executing the selected training routine (e.g., training routine 272), threat mitigation process 10 may render 1410 the simulation of the specific attack (e.g., a Denial of Services attack) by executing the selected training routine (e.g., training routine 272) within a controlled test environment (e.g., such as virtual machine 274).

As discussed above, threat mitigation process 10 may allow 1306 a trainee (e.g., trainee 276) to view the simulation of the specific attack (e.g., a Denial of Services attack) and may allow 1308 the trainee (e.g., trainee 276) to provide a trainee response (e.g., trainee response 278) to the simulation of the specific attack (e.g., a Denial of Services attack). For example, threat mitigation process 10 may execute training routine 272, which trainee 276 may "watch" and provide trainee response 278.

Further and as discussed above, threat mitigation process 10 may then determine 1310 the effectiveness of trainee response 278, wherein determining 1310 the effectiveness of the trainee response may include threat mitigation process 10 assigning 1312 a grade (e.g., a letter grade or a number grade) to trainee response 278.

When training is complete, threat mitigation process 10 may cease 1412 the simulation of the specific attack (e.g., a Denial of Services attack), wherein ceasing 1412 the simulation of the specific attack (e.g., a Denial of Services attack) may include threat mitigation process 10 shutting down 1414 the one or more virtual machines (e.g., the first VM for the attacked device, the second VM for the first attacking device and the third VM for the second attacking device).

Information Routing

As will be discussed below in greater detail, threat mitigation process 10 may be configured to route information based upon whether the information is more threat-pertinent or less threat-pertinent.

Figure 28:
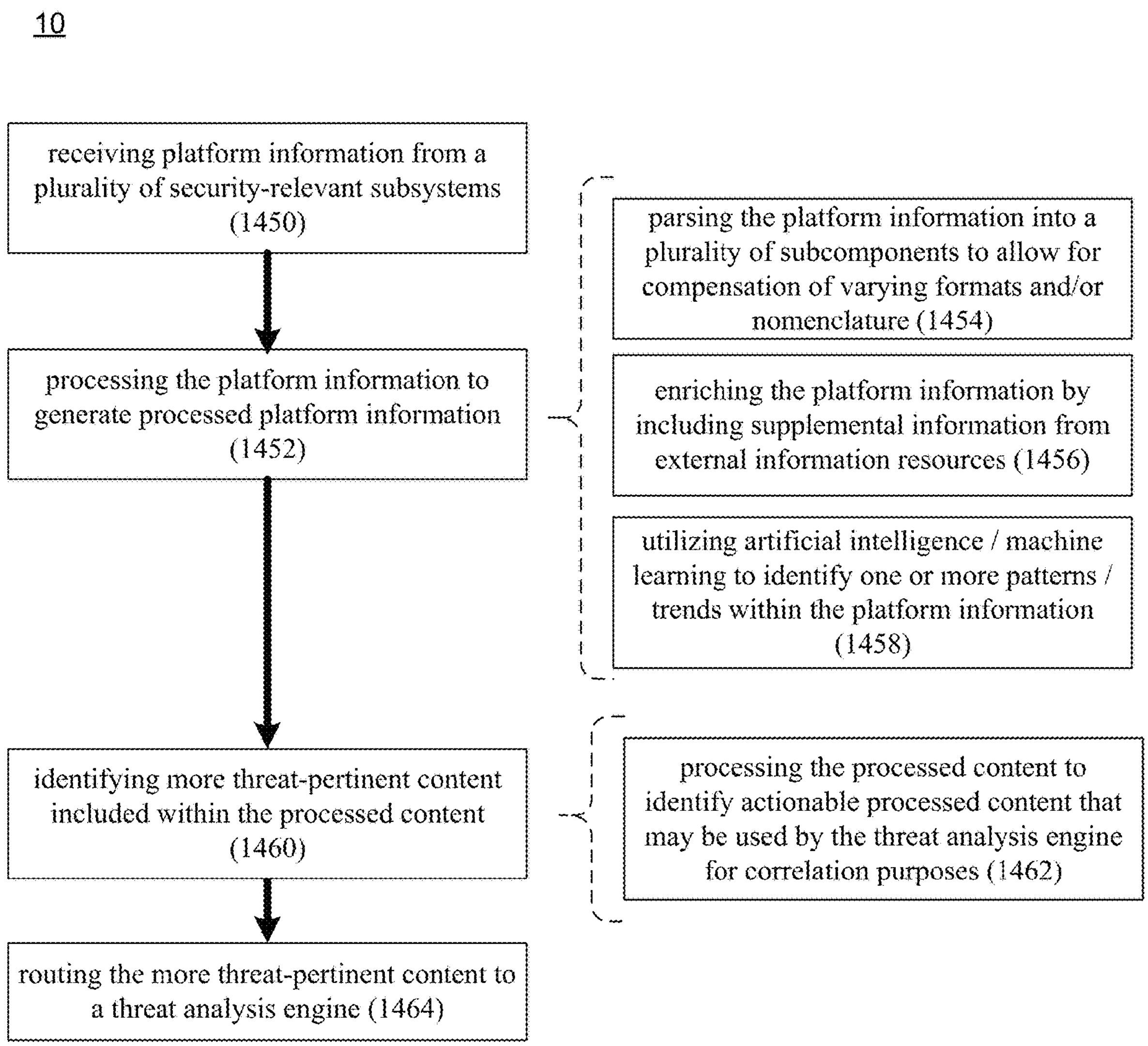

Referring also to FIG. 28, threat mitigation process 10 may be configured to route more threat-pertinent content in a specific manner. For example, threat mitigation process 10 may receive 1450 platform information (e.g., log files) from a plurality of security-relevant subsystems (e.g., security-relevant subsystems 226). As discussed above, examples of security-relevant subsystems 226 may include but are not limited to: CDN (i.e., Content Delivery Network) systems; DAM (i.e., Database Activity Monitoring) systems; UBA (i.e., User Behavior Analytics) systems; MDM (i.e., Mobile Device Management) systems; IAM (i.e., Identity and Access Management) systems; DNS (i.e., Domain Name Server) systems, Antivirus systems, operating systems, data lakes; data logs; security-relevant software applications; security-relevant hardware systems; and resources external to the computing platform.

Threat mitigation process 10 may process 1452 this platform information (e.g., log files) to generate processed platform information. And when processing 1452 this platform information (e.g., log files) to generate processed platform information, threat mitigation process 10 may: parse 1454 the platform information (e.g., log files) into a plurality of subcomponents (e.g., columns, rows, etc.) to allow for compensation of varying formats and/or nomenclature; enrich 1456 the platform information (e.g., log files) by including supplemental information from external information resources; and/or utilize 1458 artificial intelligence/machine learning (in the manner described above) to identify one or more patterns/trends within the platform information (e.g., log files).

Threat mitigation process 10 may identify 1460 more threat-pertinent content 280 included within the processed content, wherein identifying 1460 more threat-pertinent content 280 included within the processed content may include processing 1462 the processed content to identify actionable processed content that may be used by a threat analysis engine (e.g., SIEM system 230) for correlation purposes. Threat mitigation process 10 may route 1464 more threat-pertinent content 280 to this threat analysis engine (e.g., SIEM system 230).

Figure 29:
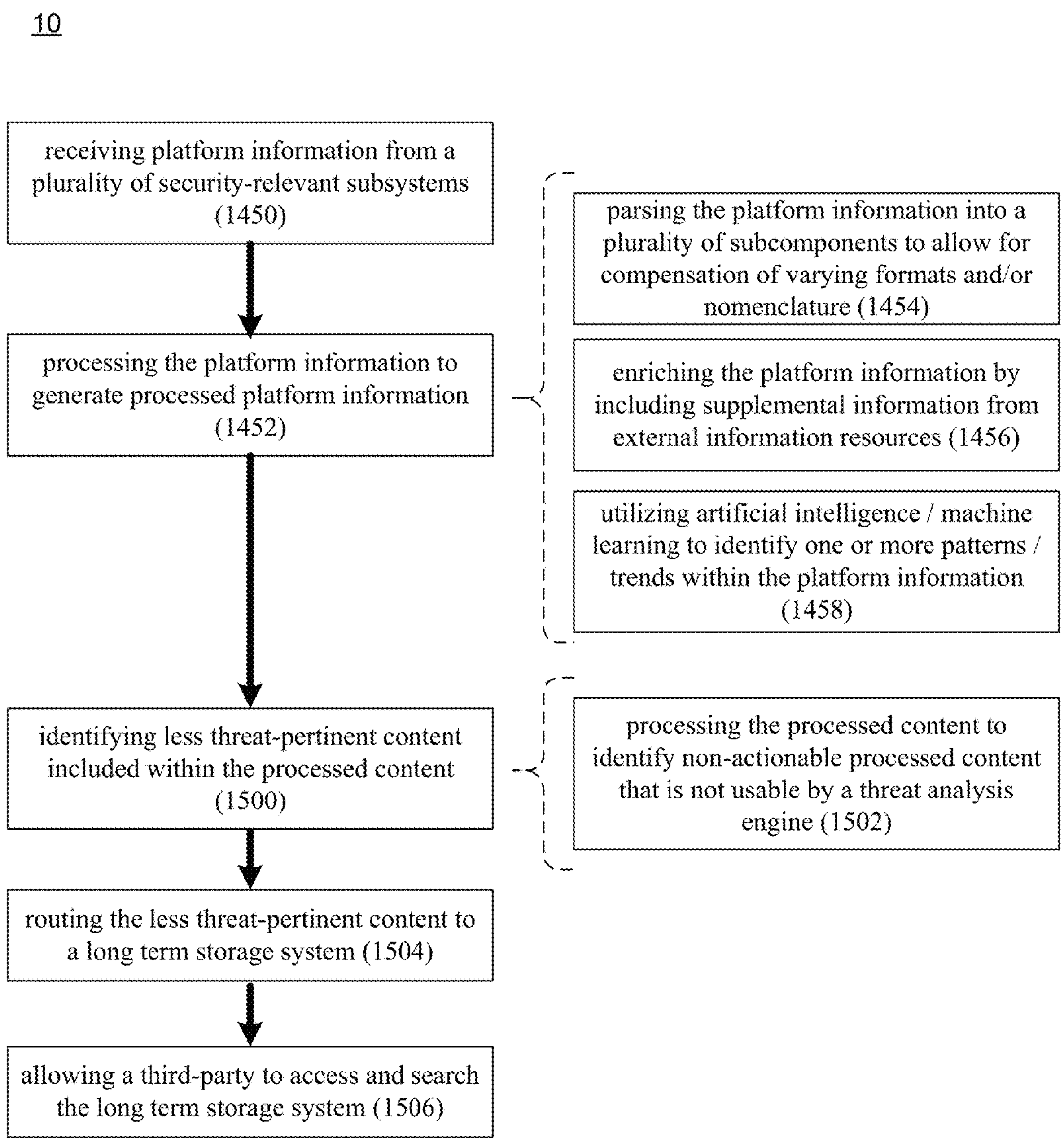

Referring also to FIG. 29, threat mitigation process 10 may be configured to route less threat-pertinent content in a specific manner. For example and as discussed above, threat mitigation process 10 may receive 1450 platform information (e.g., log files) from a plurality of security-relevant subsystems (e.g., security-relevant subsystems 226). As discussed above, examples of security-relevant subsystems 226 may include but are not limited to: CDN (i.e., Content Delivery Network) systems; DAM (i.e., Database Activity Monitoring) systems; UBA (i.e., User Behavior Analytics) systems; MDM (i.e., Mobile Device Management) systems; IAM (i.e., Identity and Access Management) systems; DNS (i.e., Domain Name Server) systems, Antivirus systems, operating systems, data lakes; data logs; security-relevant software applications; security-relevant hardware systems; and resources external to the computing platform Further and as discussed above, threat mitigation process 10 may process 1452 this platform information (e.g., log files) to generate processed platform information. And when processing 1452 this platform information (e.g., log files) to generate processed platform information, threat mitigation process 10 may: parse 1454 the platform information (e.g., log files) into a plurality of subcomponents (e.g., columns, rows, etc.) to allow for compensation of varying formats and/or nomenclature; enrich 1456 the platform information (e.g., log files) by including supplemental information from external information resources; and/or utilize 1458 artificial intelligence/machine learning (in the manner described above) to identify one or more patterns/trends within the platform information (e.g., log files).

Threat mitigation process 10 may identify 1500 less threat-pertinent content 282 included within the processed content, wherein identifying 1500 less threat-pertinent content 282 included within the processed content may include processing 1502 the processed content to identify non-actionable processed content that is not usable by a threat analysis engine (e.g., SIEM system 230) for correlation purposes. Threat mitigation process 10 may route 1504 less threat-pertinent content 282 to a long-term storage system (e.g., long term storage system 284). Further, threat mitigation process 10 may be configured to allow 1506 a third-party (e.g., the user/owner/operator of computing platform 60) to access and search long term storage system 284.

Automated Analysis

As will be discussed below in greater detail, threat mitigation process 10 may be configured to automatically analyze a detected security event.

Figure 30:
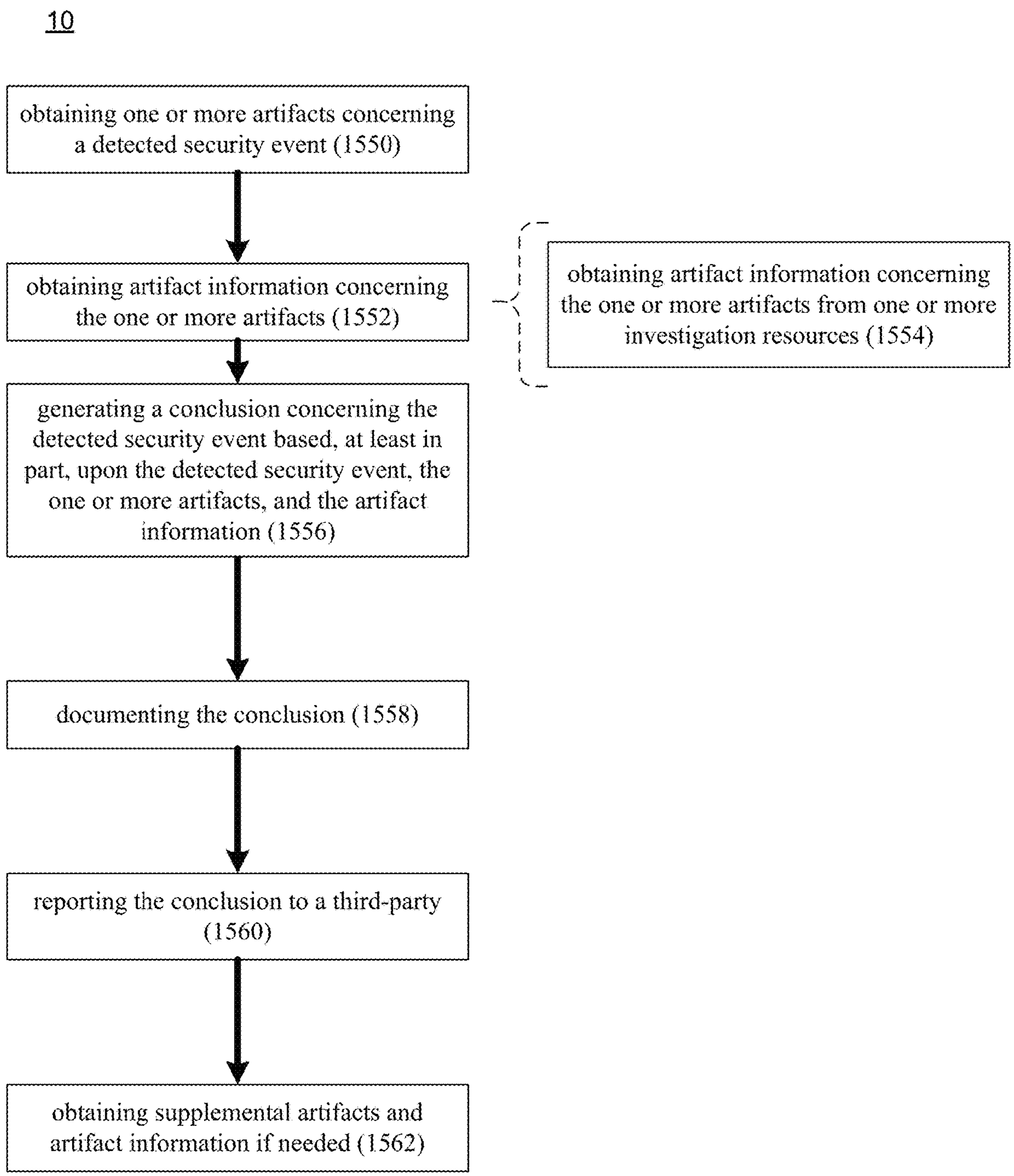

Referring also to FIG. 30, threat mitigation process 10 may be configured to automatically classify and investigate a detected security event. As discussed above and in response to a security event being detected, threat mitigation process 10 may obtain 1550 one or more artifacts (e.g., artifacts 250) concerning the detected security event. Examples of such a detected security event may include but are not limited to one or more of: access auditing; anomalies; authentication; denial of services; exploitation; malware; phishing; spamming; reconnaissance; and web attack. These artifacts (e.g., artifacts 250) may be obtained 1550 from a plurality of sources associated with the computing platform, wherein examples of such plurality of sources may include but are not limited to the various log files maintained by SIEM system 230, and the various log files directly maintained by the security-relevant subsystems Threat mitigation process 10 may obtain 1552 artifact information (e.g., artifact information 286) concerning the one or more artifacts (e.g., artifacts 250), wherein artifact information 286 may be obtained from information resources include within (or external to) computing platform 60.

For example and when obtaining 1552 artifact information 286 concerning the one or more artifacts (e.g., artifacts 250), threat mitigation process 10 may obtain 1554 artifact information 286 concerning the one or more artifacts (e.g., artifacts 250) from one or more investigation resources (such as third-party resources that may e.g., provide information on known bad actors).

Once the investigation is complete, threat mitigation process 10 may generate 1556 a conclusion (e.g., conclusion 288) concerning the detected security event (e.g., a Denial of Services attack) based, at least in part, upon the detected security event (e.g., a Denial of Services attack), the one or more artifacts (e.g., artifacts 250), and artifact information 286. Threat mitigation process 10 may document 1558 the conclusion (e.g., conclusion 288), report 1560 the conclusion (e.g., conclusion 288) to a third-party (e.g., the user/owner/operator of computing platform 60). Further, threat mitigation process 10 may obtain 1562 supplemental artifacts and artifact information (if needed to further the investigation).

While the system is described above as being computer-implemented, this is for illustrative purposes only and is not intended to be a limitation of this disclosure, as other configurations are possible and are considered to be within the scope of this disclosure. For example, some or all of the above-described system may be implemented by a human being.

Unified Searching

As discussed above, threat mitigation process 10 may be configured to e.g., analyze a monitored computing platform (e.g., computing platform 60) and provide information to third-parties concerning the same. Further and as discussed above, such a monitored computing platform (e.g., computing platform 60) may be a highly complex, multi-location computing system/network that may span multiple buildings/locations/countries.

For this illustrative example, the monitored computing platform (e.g., computing platform 60) is shown to include many discrete computing devices, examples of which may include but are not limited to: server computers (e.g., server computers 200, 202), desktop computers (e.g., desktop computer 204), and laptop computers (e.g., laptop computer 206), all of which may be coupled together via a network (e.g., network 208), such as an Ethernet network. Computing platform 60 may be coupled to an external network (e.g., Internet 210) through WAF (i.e., Web Application Firewall) 212. A wireless access point (e.g., WAP 214) may be configured to allow wireless devices (e.g., smartphone 216) to access computing platform 60. Computing platform 60 may include various connectivity devices that enable the coupling of devices within computing platform 60, examples of which may include but are not limited to: switch 216, router 218 and gateway 220. Computing platform 60 may also include various storage devices (e.g., NAS 222), as well as functionality (e.g., API Gateway 224) that allows software applications to gain access to one or more resources within computing platform 60.

In addition to the devices and functionality discussed above, other technology (e.g., security-relevant subsystems 226) may be deployed within computing platform 60 to monitor the operation of (and the activity within) computing platform 60. Examples of security-relevant subsystems 226 may include but are not limited to: CDN (i.e., Content Delivery Network) systems; DAM (i.e., Database Activity Monitoring) systems; UBA (i.e., User Behavior Analytics) systems; MDM (i.e., Mobile Device Management) systems; IAM (i.e., Identity and Access Management) systems; DNS (i.e., Domain Name Server) systems, antivirus systems, operating systems, data lakes; data logs; security-relevant software applications; security-relevant hardware systems; and resources external to the computing platform. Each of security-relevant subsystems 226 may monitor and log their activity with respect to computing platform 60, resulting in the generation of platform information 228. For example, platform information 228 associated with a client-defined MDM (i.e., Mobile Device Management) system may monitor and log the mobile devices that were allowed access to computing platform 60.

Further, SEIM (i.e., Security Information and Event Management) system 230 may be deployed within computing platform 60. As is known in the art, SIEM system 230 is an approach to security management that combines SIM (security information management) functionality and SEM (security event management) functionality into one security management system. The underlying principles of a SIEM system is to aggregate relevant data from multiple sources, identify deviations from the norm and take appropriate action. For example, when a security event is detected, SIEM system 230 might log additional information, generate an alert and instruct other security controls to mitigate the security event. Accordingly, SIEM system 230 may be configured to monitor and log the activity of security-relevant subsystems 226 (e.g., CDN (i.e., Content Delivery Network) systems; DAM (i.e., Database Activity Monitoring) systems; UBA (i.e., User Behavior Analytics) systems; MDM (i.e., Mobile Device Management) systems; IAM (i.e., Identity and Access Management) systems; DNS (i.e., Domain Name Server) systems, antivirus systems, operating systems, data lakes; data logs; security-relevant software applications; security-relevant hardware systems; and resources external to the computing platform).

Figure 31:
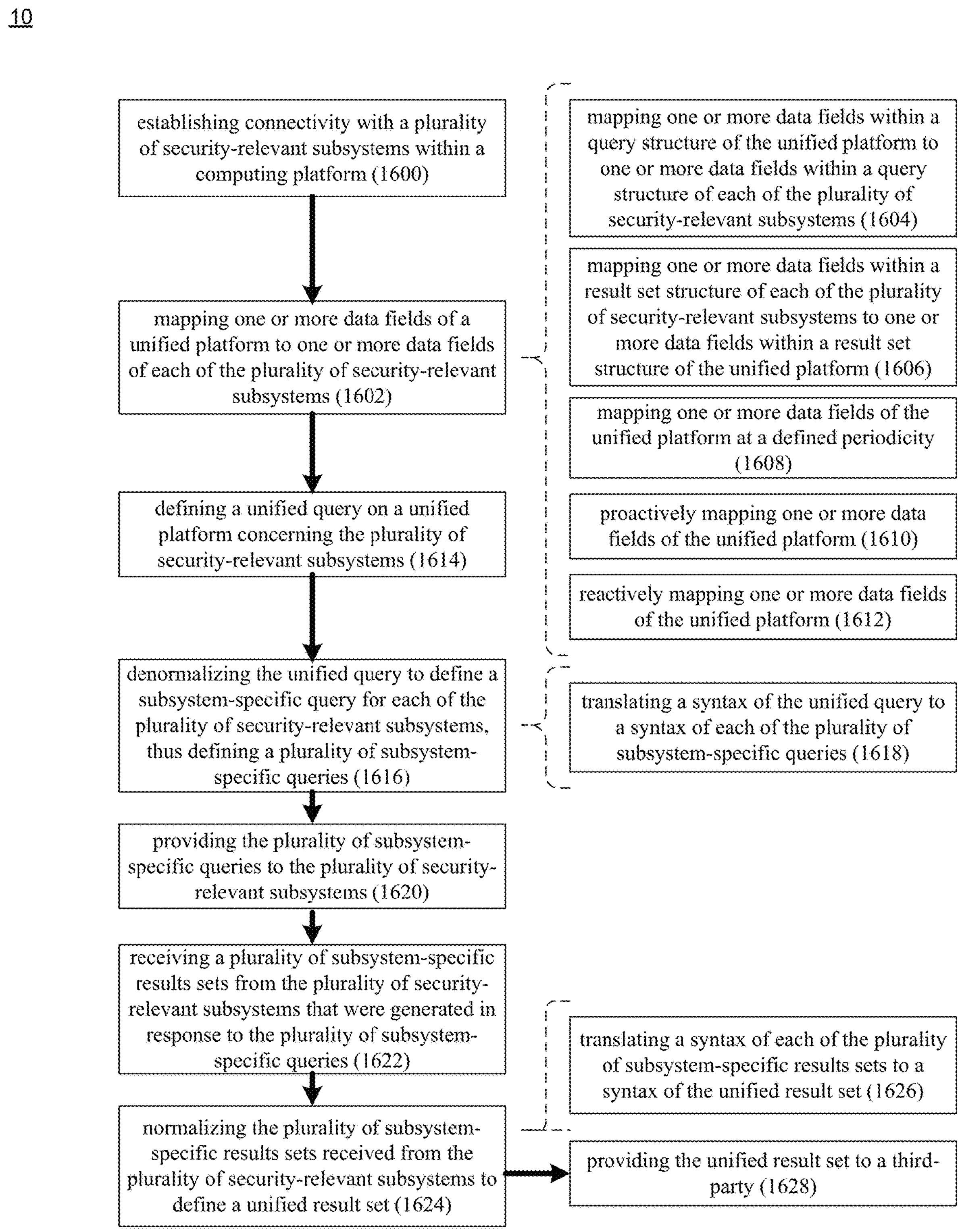
Figure 32:
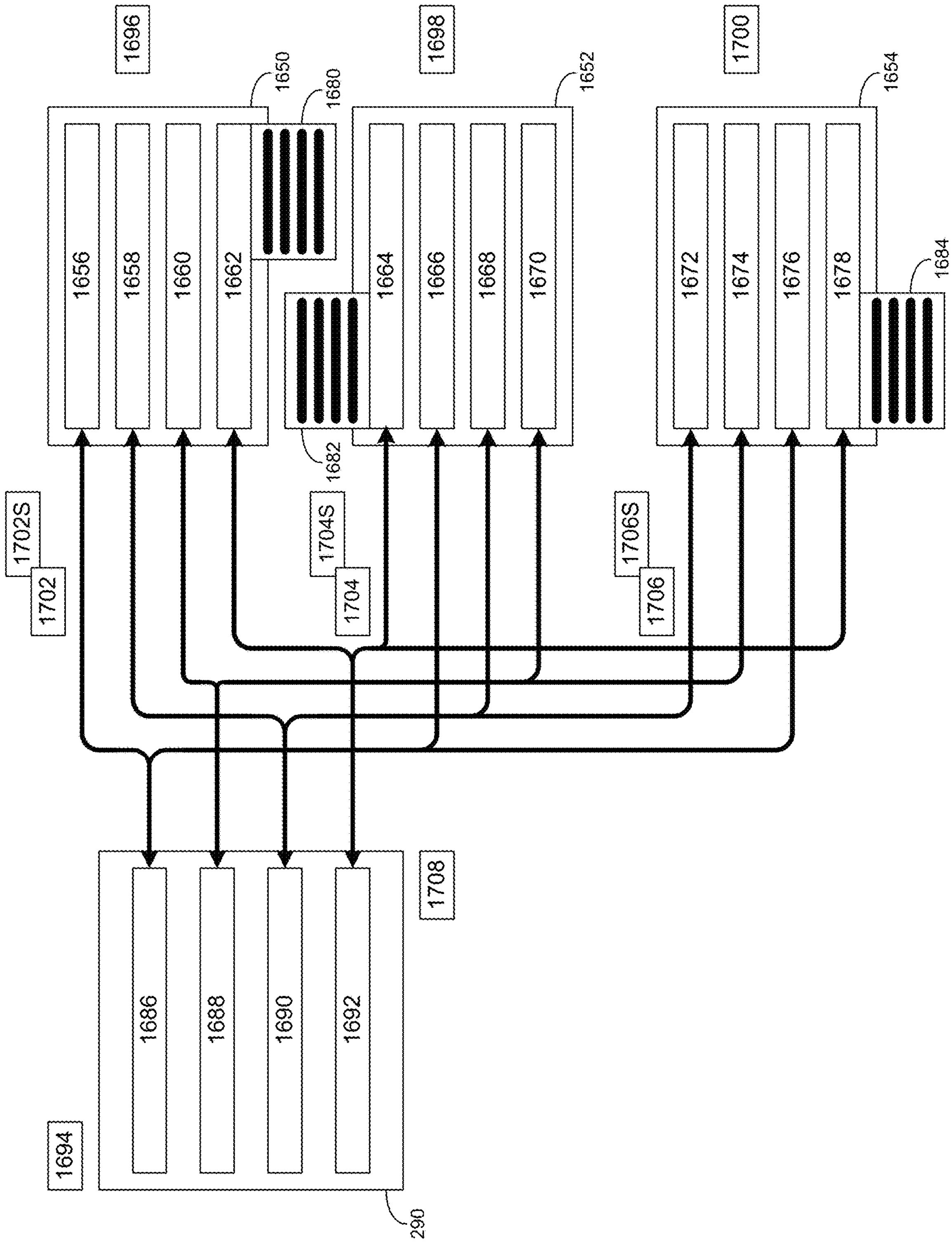
FIG. 32 is a diagrammatic view of data field mapping according to an embodiment of the present disclosure.

Referring also to FIGS. 31-32, threat mitigation process 10 may be configured to enable the querying of multiple separate and discrete subsystems (e.g., security-relevant subsystems 226) using a single query operation. For example, threat mitigation process 10 may establish 1600 connectivity with a plurality of security-relevant subsystems (e.g., security-relevant subsystems 226) within computing platform 60.

As discussed above, examples of security-relevant subsystems 226 may include but are not limited to: CDN (i.e., Content Delivery Network) systems; DAM (i.e., Database Activity Monitoring) systems; UBA (i.e., User Behavior Analytics) systems; MDM (i.e., Mobile Device Management) systems; IAM (i.e., Identity and Access Management) systems; DNS (i.e., Domain Name Server) systems, Antivirus systems, operating systems, data lakes; data logs; security-relevant software applications; security-relevant hardware systems; and resources external to the computing platform.

When establishing 1600 connectivity with a plurality of security-relevant subsystems (e.g., security-relevant subsystems 226), threat mitigation process 10 may utilize at least one application program interface (e.g., API Gateway 224) to access at least one of the plurality of security-relevant subsystems. For example, a 1st API gateway may be utilized to access CDN (i.e., Content Delivery Network) system; a 2nd API gateway may be utilized to access DAM (i.e., Database Activity Monitoring) system; a 3rd API gateway may be utilized to access UBA (i.e., User Behavior Analytics) system; a 4th API gateway may be utilized to access MDM (i.e., Mobile Device Management) system; a 5th API gateway may be utilized to access IAM (i.e., Identity and Access Management) system; and a 6th API gateway may be utilized to access DNS (i.e., Domain Name Server) system.

In order to enable the querying of multiple separate and discrete subsystems (e.g., security-relevant subsystems 226) using a single query operation, threat mitigation process 10 may map 1602 one or more data fields of unified platform 290 (e.g., a platform effectuated by threat mitigation process 10) to one or more data fields of each of the plurality of security-relevant subsystems (e.g., security-relevant subsystems 226).

For example, unified platform 290 may be a platform that enables a third-party (e.g., the user/owner/operator of computing platform 60) to query multiple security-relevant subsystems (within security-relevant subsystems 226), such as security-relevant subsystem 1650, security-relevant subsystem 1652 and security-relevant subsystem 1654. As discussed above, examples of such security-relevant subsystem (e.g., security-relevant subsystem 1650, security-relevant subsystem 1652 and security-relevant subsystem 1654) may include but are not limited to: CDN (i.e., Content Delivery Network) systems; DAM (i.e., Database Activity Monitoring) systems; UBA (i.e., User Behavior Analytics) systems; MDM (i.e., Mobile Device Management) systems; IAM (i.e., Identity and Access Management) systems; DNS (i.e., Domain Name Server) systems, antivirus systems, operating systems, data lakes; data logs; security-relevant software applications; security-relevant hardware systems; and resources external to the computing platform.

Each of these security-relevant subsystem (e.g., security-relevant subsystem 1650, security-relevant subsystem 1652 and security-relevant subsystem 1654) may include a plurality of data fields that enable the third-party (e.g., the user/owner/operator of computing platform 60) to search for and obtain information from these security-relevant subsystems (e.g., security-relevant subsystem 1650, security-relevant subsystem 1652 and security-relevant subsystem 1654). For example: security-relevant subsystem 1650 is shown to include data fields 1656, 1658, 1660, 1662; security-relevant subsystem 1652 is shown to include data fields 1664, 1666, 1668, 1670; and security-relevant subsystem 1654 is shown to include data fields 1672, 1674, 1676, 1678.

These data fields (e.g., data fields 1656, 1658, 1660, 1662, 1664, 1666, 1668, 1670, 1672, 1674, 1676, 1678) may be populatable by the third-party (e.g., the user/owner/operator of computing platform 60) to enable such searching. For example, the third-party (e.g., the user/owner/operator of computing platform 60) may populate these data fields by typing information into some of these data fields (e.g., data fields 1656, 1658, 1660, 1666, 1668, 1670, 1672, 1674, 1676). Additionally/alternatively, the third-party (e.g., the user/owner/operator of computing platform 60) may populate these data fields via a drop-down menu available within some of these data fields (e.g., data fields 1662, 1664, 1678). For example, data field 1662 is shown to be populatable via drop down menu 1680, data field 1664 is shown to be populatable via drop down menu 1682, and data field 1678 is shown to be populatable via drop down menu 1684.

Through the use of such data fields, the third-party (e.g., the user/owner/operator of computing platform 60) may populate one of more of these data fields to define a query that may be effectuated on the information contained/available within these security-relevant subsystems (e.g., security-relevant subsystem 1650, security-relevant subsystem 1652 and security-relevant subsystem 1654) so that the pertinent information may be obtained.

Naturally, the subject matter of these individual data fields may vary depending upon the type of information available via these security-relevant subsystems (e.g., security-relevant subsystem 1650, security-relevant subsystem 1652 and security-relevant subsystem 1654). As (in this example) these are security-relevant subsystems, the information available from these security-relevant subsystems concerns the security of computing platform 60 and/or any security events (e.g., access auditing; anomalies; authentication; denial of services; exploitation; malware; phishing; spamming; reconnaissance; and/or web attack) occurring therein. For example, some of these data fields may concern e.g., user names, user IDs, device locations, device types, device IP addresses, source IP addresses, destination IP addresses, port addresses, deployed operating systems, utilized bandwidth, etc.

As discussed above, in order to enable the querying of multiple separate and discrete subsystems (e.g., security-relevant subsystem 1650, security-relevant subsystem 1652 and security-relevant subsystem 1654) using a single query operation, threat mitigation process 10 may map 1602 one or more data fields of unified platform 290 (e.g., a platform effectuated by threat mitigation process 10) to one or more data fields of each of the plurality of security-relevant subsystems (e.g., security-relevant subsystem 1650, security-relevant subsystem 1652 and security-relevant subsystem 1654).

In this particular example, unified platform 290 (e.g., a platform effectuated by threat mitigation process 10) is shown to include four data fields (e.g., data fields 1686, 1688, 1690, 1692), wherein:

- data field 1686 within unified platform 290 concerns a user ID (and is entitled USER_ID);
- data field 1688 within unified platform 290 concerns a device IP address (and is entitled DEVICE_IP);
- data field 1690 within unified platform 290 concerns a destination IP address (and is entitled DESTINATION_IP); and
- data field 1692 within unified platform 290 concerns a query result set (and is entitled QUERY_RESULT).

When mapping 1602 data fields within unified platform 290 (e.g., a platform effectuated by threat mitigation process 10) to data fields within each of the plurality of security-relevant subsystems (e.g., security-relevant subsystem 1650, security-relevant subsystem 1652 and security-relevant subsystem 1654), threat mitigation process 10 may only map 1602 data fields that are related with respect to subject matter.

As discussed above, data field 1686 within unified platform 290 (e.g., a platform effectuated by threat mitigation process 10) concerns a user ID (and is entitled USER_ID). For this example, assume that:

- data field 1656 within security-relevant subsystem 1650 also concerns a user ID and is entitled USER;
- data field 1666 within security-relevant subsystem 1652 also concerns a user ID and is entitled ID; and
- data field 1676 within security-relevant subsystem 1654 also concerns a user ID and is entitled USR_ID.

Accordingly, threat mitigation process 10 may map 1602 data field 1686 of unified platform 290 (e.g., a platform effectuated by threat mitigation process 10) to:

- data field 1656 of security-relevant subsystem 1650;
- data field 1666 of security-relevant subsystem 1652; and
- data field 1676 of security-relevant subsystem 1654.

As discussed above, data field 1688 within unified platform 290 (e.g., a platform effectuated by threat mitigation process 10) concerns a device IP address (and is entitled DEVICE_IP). For this example, assume that:

- data field 1660 within security-relevant subsystem 1650 also concerns a device IP address and is entitled DEV_IP;
- data field 1670 within security-relevant subsystem 1652 also concerns a device IP address and is entitled IP_DEVICE; and
- data field 1674 within security-relevant subsystem 1654 also concerns a device IP address and is entitled IP DEV.

Accordingly, threat mitigation process 10 may map 1602 data field 1688 of unified platform 290 (e.g., a platform effectuated by threat mitigation process 10) to:

- data field 1660 of security-relevant subsystem 1650;
- data field 1670 of security-relevant subsystem 1652; and
- data field 1674 of security-relevant subsystem 1654.

As discussed above, data field 1690 within unified platform 290 (e.g., a platform effectuated by threat mitigation process 10) concerns a destination IP address (and is entitled DESTINATION_IP). For this example, assume that:

- data field 1658 within security-relevant subsystem 1650 also concerns a destination IP address and is entitled DEST_IP;
- data field 1668 within security-relevant subsystem 1652 also concerns a destination IP address and is entitled IP DEST; and
- data field 1672 within security-relevant subsystem 1654 also concerns a destination IP address and is entitled IP DES.

Accordingly, threat mitigation process 10 may map 1602 data field 1690 of unified platform 290 (e.g., a platform effectuated by threat mitigation process 10) to:

- data field 1658 of security-relevant subsystem 1650;
- data field 1668 of security-relevant subsystem 1652; and
- data field 1672 of security-relevant subsystem 1654.

As discussed above, data field 1692 within unified platform 290 (e.g., a platform effectuated by threat mitigation process 10) concerns a query result (and is entitled QUERY_RESULT). For this example, assume that:

- data field 1662 within security-relevant subsystem 1650 also concerns a query result and is entitled RESULT;
- data field 1664 within security-relevant subsystem 1652 also concerns a query result and is entitled Q_RESULT; and
- data field 1678 within security-relevant subsystem 1654 also concerns a query result and is entitled RESULT_Q.

Accordingly, threat mitigation process 10 may map 1602 data field 1692 of unified platform 290 (e.g., a platform effectuated by threat mitigation process 10) to:

- data field 1662 of security-relevant subsystem 1650;
- data field 1664 of security-relevant subsystem 1652; and
- data field 1678 of security-relevant subsystem 1654.

Through the use of threat mitigation process 10, a query (e.g., query 1694) may be defined within one or more of data fields 1686, 1688, 1690 of unified platform 290 (e.g., a platform effectuated by threat mitigation process 10), wherein this query (e.g., query 1694) may be provided (via the above-described mappings) to the appropriate data fields within the security-relevant subsystems (e.g., security-relevant subsystem 1650, security-relevant subsystem 1652 and security-relevant subsystem 1654).

Accordingly and when mapping 1602 one or more data fields of the unified platform (e.g., unified platform 290) to one or more data fields of each of the plurality of security-relevant subsystems (e.g., security-relevant subsystem 1650, security-relevant subsystem 1652 and security-relevant subsystem 1654), threat mitigation process 10 may map 1604 one or more data fields within a query structure of the unified platform (e.g., unified platform 290) to one or more data fields within a query structure of each of the plurality of security-relevant subsystems (e.g., security-relevant subsystem 1650, security-relevant subsystem 1652 and security-relevant subsystem 1654).

Therefore, if a query (e.g., query 1694) was defined on unified platform 290 (e.g., a platform effectuated by threat mitigation process 10) that specified a user ID within data field 1686, a device IP address within data field 1688, and a destination IP address within data field 1690; by mapping 1604 one or more data fields of the unified platform (e.g., unified platform 290) to one or more data fields of each of the plurality of security-relevant subsystems (e.g., security-relevant subsystem 1650, security-relevant subsystem 1652 and security-relevant subsystem 1654), this structured query (e.g., query 1694) may be provided to the plurality of security-relevant subsystems (e.g., security-relevant subsystem 1650, security-relevant subsystem 1652 and security-relevant subsystem 1654) in a fashion that enables the plurality of security-relevant subsystems (e.g., security-relevant subsystem 1650, security-relevant subsystem 1652 and security-relevant subsystem 1654) to effectuate the structured query (e.g., query 1694).

Upon effectuating such a structured query (e.g., query 1694), the plurality of security-relevant subsystems (e.g., security-relevant subsystem 1650, security-relevant subsystem 1652 and security-relevant subsystem 1654) may each generate a subsystem-specific result set. For example, security-relevant subsystem 1650 may generate subsystem-specific result set 1696, security-relevant subsystem 1652 may generate subsystem-specific result set 1698, and security-relevant subsystem 1654 may generate subsystem-specific result set 1700.

Through the use of threat mitigation process 10, subsystem-specific result sets (e.g., subsystem-specific result sets 1696, 1698, 1700) may be defined within one or more of data fields (e.g., data fields 1662, 1664, 1678) of the plurality of security-relevant subsystems (e.g., security-relevant subsystem 1650, security-relevant subsystem 1652 and security-relevant subsystem 1654), wherein these subsystem-specific result sets (e.g., subsystem-specific result sets 1696, 1698, 1700) may be provided (via the above-described mappings) to the appropriate data fields within the unified platform (e.g., unified platform 290).

Accordingly and when mapping 1602 one or more data fields of the unified platform (e.g., unified platform 290) to one or more data fields of each of the plurality of security-relevant subsystems (e.g., security-relevant subsystem 1650, security-relevant subsystem 1652 and security-relevant subsystem 1654), threat mitigation process 10 may map 1606 one or more data fields within a result set structure of each of the plurality of security-relevant subsystems (e.g., security-relevant subsystem 1650, security-relevant subsystem 1652 and security-relevant subsystem 1654) to one or more data fields within a result set structure of the unified platform (e.g., unified platform 290).

Therefore, by mapping 1606 one or more data fields within a result set structure of each of the plurality of security-relevant subsystems (e.g., security-relevant subsystem 1650, security-relevant subsystem 1652 and security-relevant subsystem 1654) to one or more data fields within a result set structure of the unified platform (e.g., unified platform 290), these subsystem-specific result sets (e.g., subsystem-specific result sets 1696, 1698, 1700) may be provided to the unified platform (e.g., unified platform 290) in a fashion that enables the unified platform (e.g., unified platform 290) to properly process these subsystem-specific result sets (e.g., subsystem-specific result sets 1696, 1698, 1700).

It is foreseeable that over time, the data fields within the plurality of security-relevant subsystems (e.g., security-relevant subsystem 1650, security-relevant subsystem 1652 and security-relevant subsystem 1654) may change. For example, additional data fields may be added to and/or certain data fields may be deleted from the plurality of security-relevant subsystems. Accordingly and in order to ensure that the above-described mapping remain current and accurate, such mappings may be periodically refreshed.

Accordingly and when mapping 1602 one or more data fields of the unified platform (e.g., unified platform 290) to one or more data fields of each of the plurality of security-relevant subsystems (e.g., security-relevant subsystem 1650, security-relevant subsystem 1652 and security-relevant subsystem 1654), threat mitigation process 10 may map 1608 one or more data fields of the unified platform (e.g., unified platform 290) to one or more data fields of each of the plurality of security-relevant subsystems (e.g., security-relevant subsystem 1650, security-relevant subsystem 1652 and security-relevant subsystem 1654) at a defined periodicity.

Therefore, at a certain frequency (e.g., every few minutes, every few hours, every few days, every few weeks or every few months), the above-describe mapping process may be reperformed to ensure that the above-described mappings are up to date.

Further and when mapping 1602 one or more data fields of the unified platform (e.g., unified platform 290) to one or more data fields of each of the plurality of security-relevant subsystems (e.g., security-relevant subsystem 1650, security-relevant subsystem 1652 and security-relevant subsystem 1654), threat mitigation process 10 may proactively map 1610 one or more data fields of the unified platform (e.g., unified platform 290) to one or more data fields of each of the plurality of security-relevant subsystems (e.g., security-relevant subsystem 1650, security-relevant subsystem 1652 and security-relevant subsystem 1654).

For example, the above-described mapping process may be proactively done, wherein threat mitigation process 10 actively monitors the security-relevant subsystems within computing platform 60 so that the data fields within these security-relevant subsystems may be proactively mapped 1610 prior to a third-party (e.g., the user/owner/operator of computing platform 60) defining a query within unified platform 290.

Additionally and when mapping 1602 one or more data fields of the unified platform (e.g., unified platform 290) to one or more data fields of each of the plurality of security-relevant subsystems (e.g., security-relevant subsystem 1650, security-relevant subsystem 1652 and security-relevant subsystem 1654), threat mitigation process 10 may reactively map 1612 one or more data fields of the unified platform (e.g., unified platform 290) to one or more data fields of each of the plurality of security-relevant subsystems (e.g., security-relevant subsystem 1650, security-relevant subsystem 1652 and security-relevant subsystem 1654).

For example, the above-described mapping process may be reactively performed, wherein threat mitigation process 10 may not actively monitor the security-relevant subsystems within computing platform 60 and the data fields within these security-relevant subsystems may be reactively mapped 1612 after a third-party (e.g., the user/owner/operator of computing platform 60) defines a query within unified platform 290.

As discussed above, threat mitigation process 10 may allow a third-party (e.g., the user/owner/operator of computing platform 60) to define 1614 a unified query (e.g., query 1694) on a unified platform (e.g., unified platform 290) concerning security-relevant subsystems 226 (e.g., security-relevant subsystem 1650, security-relevant subsystem 1652 and security-relevant subsystem 1654).

As discussed above, examples of security-relevant subsystems 226 may include but are not limited to: CDN (i.e., Content Delivery Network) systems; DAM (i.e., Database Activity Monitoring) systems; UBA (i.e., User Behavior Analytics) systems; MDM (i.e., Mobile Device Management) systems; IAM (i.e., Identity and Access Management) systems; DNS (i.e., Domain Name Server) systems, Antivirus systems, operating systems, data lakes; data logs;

security-relevant software applications; security-relevant hardware systems; and resources external to the computing platform.

Threat mitigation process 10 may denormalize 1616 the unified query (e.g., query 1694) to define a subsystem-specific query for each of the plurality of security-relevant subsystems (e.g., security-relevant subsystem 1650, security-relevant subsystem 1652 and security-relevant subsystem 1654), thus defining a plurality of subsystem-specific queries (e.g., subsystem-specific queries 1702, 1704, 1706).

As discussed above, unified platform 290 (e.g., a platform effectuated by threat mitigation process 10) is shown to include four data fields (e.g., data fields 1686, 1688, 1690, 1692), wherein a third-party (e.g., the user/owner/operator of computing platform 60) may utilize these data fields to define the unified query (e.g., query 1694). As this unified query (e.g., query 1694) may be used as the basis to search for pertinent information on (in this example) three entirely separate and discrete subsystems (e.g., security-relevant subsystem 1650, security-relevant subsystem 1652 and security-relevant subsystem 1654), it is foreseeable that these subsystems (e.g., security-relevant subsystem 1650, security-relevant subsystem 1652 and security-relevant subsystem 1654) may require queries to be structured differently.

Accordingly and when denormalizing 1616 the unified query (e.g., query 1694) to define a subsystem-specific query for each of the plurality of security-relevant subsystems (e.g., security-relevant subsystem 1650, security-relevant subsystem 1652 and security-relevant subsystem 1654), thus defining a plurality of subsystem-specific queries (e.g., subsystem-specific queries 1702, 1704, 1706), threat mitigation process 10 may translate 1618 a syntax of the unified query (e.g., query 1694) to a syntax of each of the plurality of subsystem-specific queries (e.g., subsystem-specific queries 1702, 1704, 1706). For example:

- security-relevant subsystem 1650 may only be capable of processing queries having a first structure and/or utilizing a first nomenclature;
- security-relevant subsystem 1652 may only be capable of processing queries having a second structure and/or utilizing a second nomenclature; and
- security-relevant subsystem 1654 may only be capable of processing queries having a third structure and/or utilizing a third nomenclature.

Accordingly and when denormalizing 1616 the unified query (e.g., query 1694) to define a plurality of subsystem-specific queries (e.g., subsystem-specific queries 1702, 1704, 1706), threat mitigation process 10 may translate 1618 the syntax of the unified query (e.g., query 1694) so that:

- subsystem-specific query 1702 has a first structure and/or utilizes a first nomenclature;
- subsystem-specific query 1704 has a second structure and/or utilizes a second nomenclature;
- subsystem-specific query 1706 has a third structure and/or utilizes a third nomenclature.

Threat mitigation process 10 may provide 1620 the plurality of subsystem-specific queries (e.g., subsystem-specific queries 1702, 1704, 1706) to the plurality of security-relevant subsystems (e.g., security-relevant subsystem 1650, security-relevant subsystem 1652 and security-relevant subsystem 1654).

The plurality of subsystem-specific queries (e.g., subsystem-specific queries 1702, 1704, 1706) may be effectuated on the appropriate security-relevant subsystem. For example, subsystem-specific query 1702 may be effectuated on security-relevant subsystem 1650, subsystem-specific query 1704 may be effectuated on security-relevant subsystem 1652, and subsystem-specific query 1706 may be effectuated on security-relevant subsystem 1654; resulting in the generation of subsystem-specific result sets. For example, security-relevant subsystem 1650 may generate subsystem-specific result set 1696, security-relevant subsystem 1652 may generate subsystem-specific result set 1698, and security-relevant subsystem 1654 may generate subsystem-specific result set 1700.

Threat mitigation process 10 may receive 1622 a plurality of subsystem-specific results sets (e.g., subsystem-specific result sets 1696, 1698, 1700) from the plurality of security-relevant subsystems (e.g., security-relevant subsystem 1650, security-relevant subsystem 1652 and security-relevant subsystem 1654, respectively) that were generated in response to the plurality of subsystem-specific queries (e.g., subsystem-specific queries 1702, 1704, 1706).

Threat mitigation process 10 may normalize 1624 the plurality of subsystem-specific results sets (e.g., subsystem-specific result sets 1696, 1698, 1700) received from the plurality of security-relevant subsystems (e.g., security-relevant subsystem 1650, security-relevant subsystem 1652 and security-relevant subsystem 1654, respectively) to define a unified result set (e.g., unified result set 1708). For example, threat mitigation process 10 may process the plurality of subsystem-specific results sets (e.g., subsystem-specific result sets 1696, 1698, 1700) so that the subsystem-specific results sets all have a common format, a common nomenclature, and/or a common structure.

Accordingly and when normalizing 1624 the plurality of subsystem-specific results sets (e.g., subsystem-specific result sets 1696, 1698, 1700) received from the plurality of security-relevant subsystems (e.g., security-relevant subsystem 1650, security-relevant subsystem 1652 and security-relevant subsystem 1654, respectively) to define a unified result set (e.g., unified result set 1708), threat mitigation process 10 may translate 1626 a syntax of each of the plurality of subsystem-specific results sets (e.g., subsystem-specific result sets 1696, 1698, 1700) to a syntax of the unified result set (e.g., unified result set 1708).

As discussed above:

- security-relevant subsystem 1650 may only be capable of processing queries having a first structure and/or utilizing a first nomenclature;
- security-relevant subsystem 1652 may only be capable of processing queries having a second structure and/or utilizing a second nomenclature; and
- security-relevant subsystem 1654 may only be capable of processing queries having a third structure and/or utilizing a third nomenclature.

Accordingly and when producing a result set:

- security-relevant subsystem 1650 may only be capable producing a result set (e.g., subsystem-specific result set 1696) having a first structure and/or utilizing a first nomenclature;
- security-relevant subsystem 1652 may only be capable producing a result set (e.g., subsystem-specific result set 1698) having a second structure and/or utilizing a second nomenclature; and
- security-relevant subsystem 1654 may only be capable producing a result set (e.g., subsystem-specific result set 1700) having a third structure and/or utilizing a third nomenclature.

Accordingly and when normalizing 1624 the plurality of subsystem-specific results sets (e.g., subsystem-specific result sets 1696, 1698, 1700) received from the plurality of security-relevant subsystems (e.g., security-relevant subsystem 1650, security-relevant subsystem 1652 and security-relevant subsystem 1654, respectively) to define a unified result set (e.g., unified result set 1708), threat mitigation process 10 may translate 1626 the syntax of:

- subsystem-specific result set 1696 from a first structure/first nomenclature to a unified syntax of the unified result set (e.g., unified result set 1708);
- subsystem-specific result set 1698 from a second structure/second nomenclature to the unified syntax of the unified result set (e.g., unified result set 1708);
- subsystem-specific result set 1700 from a third structure/third nomenclature to a unified syntax of the unified result set (e.g., unified result set 1708).

Once normalized 1624, 1626, threat mitigation process 10 may combine the subsystem-specific results sets (e.g., subsystem-specific result sets 1696, 1698, 1700) to form the unified result set (e.g., unified result set 1708), wherein threat mitigation process 10 may then provide 1628 the unified result set (e.g., unified result set 1708) to a third-party (e.g., the user/owner/operator of computing platform 60).

Threat Hunting

Figure 33:
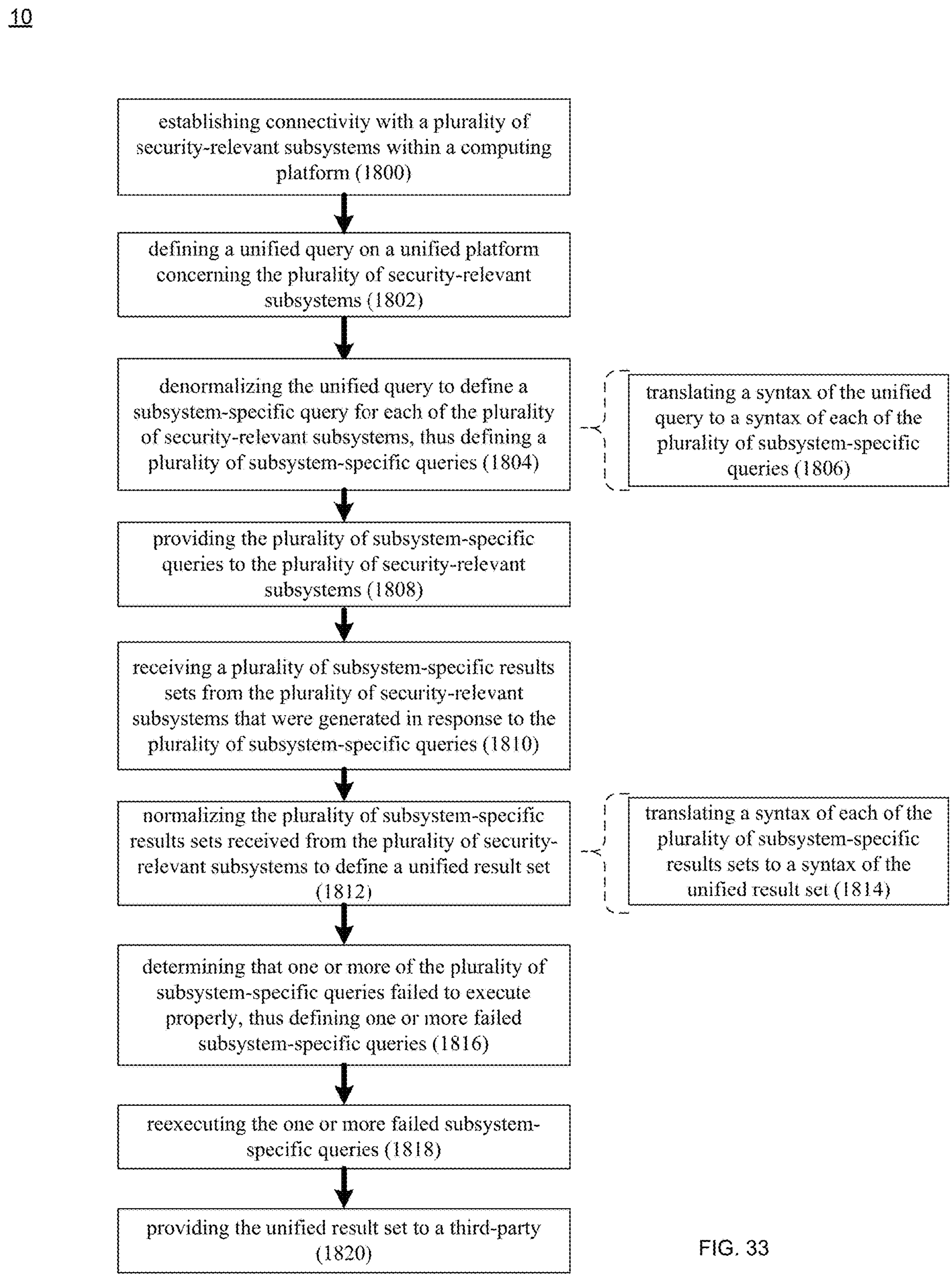
FIG. 33 is a flowchart of another implementation of the threat mitigation process of FIG. 1 according to an embodiment of the present disclosure.

Referring also to FIG. 33, threat mitigation process 10 may establish 1800 connectivity with a plurality of security-relevant subsystems (e.g., security-relevant subsystems 226) within computing platform 60, wherein examples of security-relevant subsystems 226 may include but are not limited to: CDN (i.e., Content Delivery Network) systems; DAM (i.e., Database Activity Monitoring) systems; UBA (i.e., User Behavior Analytics) systems; MDM (i.e., Mobile Device Management) systems; IAM (i.e., Identity and Access Management) systems; DNS (i.e., Domain Name Server) systems, Antivirus systems, operating systems, data lakes; data logs; security-relevant software applications; security-relevant hardware systems; and resources external to the computing platform.

When establishing 1800 connectivity with a plurality of security-relevant subsystems (e.g., security-relevant subsystems 226), threat mitigation process 10 may utilize at least one application program interface (e.g., API Gateway 224) to access at least one of the plurality of security-relevant subsystems. For example, a 1st API gateway may be utilized to access CDN (i.e., Content Delivery Network) system; a 2nd API gateway may be utilized to access DAM (i.e., Database Activity Monitoring) system; a 3rd API gateway may be utilized to access UBA (i.e., User Behavior Analytics) system; a 4th API gateway may be utilized to access MDM (i.e., Mobile Device Management) system; a 5th API gateway may be utilized to access IAM (i.e., Identity and Access Management) system; and a 6th API gateway may be utilized to access DNS (i.e., Domain Name Server) system.

As discussed above, threat mitigation process 10 may allow a third-party (e.g., the user/owner/operator of computing platform 60) to define 1802 a unified query (e.g., query 1694) on a unified platform (e.g., unified platform 290) concerning security-relevant subsystems 226 (e.g., security-relevant subsystem 1650, security-relevant subsystem 1652 and security-relevant subsystem 1654). In order to enable the querying of these separate and discrete subsystems (e.g., security-relevant subsystem 1650, security-relevant subsystem 1652 and security-relevant subsystem 1654 within security-relevant subsystems 226) using a single query operation, threat mitigation process 10 may map (in the manner discussed above) one or more data fields of unified platform 290 (e.g., a platform effectuated by threat mitigation process 10) to one or more data fields of each of the plurality of security-relevant subsystems (e.g., e.g., security-relevant subsystem 1650, security-relevant subsystem 1652 and security-relevant subsystem 1654 within security-relevant subsystems 226).

Threat mitigation process 10 may denormalize 1804 the unified query (e.g., query 1694) to define a subsystem-specific query for each of the plurality of security-relevant subsystems (e.g., security-relevant subsystem 1650, security-relevant subsystem 1652 and security-relevant subsystem 1654), thus defining a plurality of subsystem-specific queries (e.g., subsystem-specific queries 1702, 1704, 1706).

One or more of the plurality of subsystem-specific queries (e.g., subsystem-specific queries 1702, 1704, 1706) may have a defined execution schedule (e.g., defined execution schedule 1702S for subsystem-specific query 1702, defined execution schedule 1704S for subsystem-specific query 1704, and defined execution schedule 1706S for subsystem-specific query 1706). The defined execution schedule (e.g., defined execution schedule 1702S. 1704S, 1706S) may include one or more of: a defined execution time; a defined execution date; a defined execution frequency; and a defined execution scope.

- Defined Execution Time: The defined execution schedule (e.g., defined execution schedule 1702S. 1704S, 1706S) may define a particular time that a task is performed. For example, the defined execution schedule (e.g., defined execution schedule 1702S. 1704S, 1706S) may define that an MDM (i.e., Mobile Device Management) system provide a device access report at midnight (local time) every day.
- Defined Execution Date: The defined execution schedule (e.g., defined execution schedule 1702S. 1704S, 1706S) may define a particular date that a task is performed. For example, the defined execution schedule (e.g., defined execution schedule 1702S. 1704S, 1706S) may define that a router provide a port opening report at COB every Friday (local time).
- Defined Execution Frequency: The defined execution schedule (e.g., defined execution schedule 1702S. 1704S, 1706S) may define a particular frequency that a task is performed. For example, the defined execution schedule (e.g., defined execution schedule 1702S. 1704S, 1706S) may define that a CDN (i.e., Content Delivery Network) system provide a quantity delivered report every hour.
- Defined Execution Scope: The defined execution schedule (e.g., defined execution schedule 1702S. 1704S, 1706S) may define a particular scope for a task being performed. For example, the defined execution schedule (e.g., defined execution schedule 1702S. 1704S, 1706S) may define that a switch provide an activity report for a specific port within the switch.

These defined execution schedules (e.g., defined execution schedule 1702S. 1704S, 1706S) may be a default execution schedule that is configured to be revisable by a third-party (e.g., the user/owner/operator of computing platform 60). For example and with respect to these defined execution schedules (e.g., defined execution schedule 1702S, 1704S, 1706S):

- the default time may be midnight, which may be revisable by the third-party (e.g., the user/owner/operator of computing platform 60);
- the default date may be the 1st of the month, which may be revisable by the third-party (e.g., the user/owner/operator of computing platform 60);
- the default frequency may be once, which may be revisable by the third-party (e.g., the user/owner/operator of computing platform 60); and the default scope may be a narrower scope, which may be revisable by the third-party (e.g., the user/owner/operator of computing platform 60).

As discussed above, unified platform 290 (e.g., a platform effectuated by threat mitigation process 10) is shown to include four data fields (e.g., data fields 1686, 1688, 1690, 1692), wherein a third-party (e.g., the user/owner/operator of computing platform 60) may utilize these data fields to define the unified query (e.g., query 1694). As this unified query (e.g., query 1694) may be used as the basis to search for pertinent information on (in this example) three entirely separate and discrete subsystems (e.g., security-relevant subsystem 1650, security-relevant subsystem 1652 and security-relevant subsystem 1654), it is foreseeable that these subsystems (e.g., security-relevant subsystem 1650, security-relevant subsystem 1652 and security-relevant subsystem 1654) may require queries to be structured differently.

Accordingly and when denormalizing 1804 the unified query (e.g., query 1694) to define a subsystem-specific query for each of the plurality of security-relevant subsystems (e.g., security-relevant subsystem 1650, security-relevant subsystem 1652 and security-relevant subsystem 1654), thus defining a plurality of subsystem-specific queries (e.g., subsystem-specific queries 1702, 1704, 1706), threat mitigation process 10 may translate 1806 a syntax of the unified query (e.g., query 1694) to a syntax of each of the plurality of subsystem-specific queries (e.g., subsystem-specific queries 1702, 1704, 1706). For example:

- security-relevant subsystem 1650 may only be capable of processing queries having a first structure and/or utilizing a first nomenclature;
- security-relevant subsystem 1652 may only be capable of processing queries having a second structure and/or utilizing a second nomenclature; and
- security-relevant subsystem 1654 may only be capable of processing queries having a third structure and/or utilizing a third nomenclature.

Accordingly and when denormalizing 1804 the unified query (e.g., query 1694) to define a plurality of subsystem-specific queries (e.g., subsystem-specific queries 1702, 1704, 1706), threat mitigation process 10 may translate 1806 the syntax of the unified query (e.g., query 1694) so that:

- subsystem-specific query 1702 has a first structure and/or utilizes a first nomenclature;
- subsystem-specific query 1704 has a second structure and/or utilizes a second nomenclature;
- subsystem-specific query 1706 has a third structure and/or utilizes a third nomenclature.

Threat mitigation process 10 may provide 1808 the plurality of subsystem-specific queries (e.g., subsystem-specific queries 1702, 1704, 1706) to the plurality of security-relevant subsystems (e.g., security-relevant subsystem 1650, security-relevant subsystem 1652 and security-relevant subsystem 1654).

The plurality of subsystem-specific queries (e.g., subsystem-specific queries 1702, 1704, 1706) may be effectuated on the appropriate security-relevant subsystem. For example, subsystem-specific query 1702 may be effectuated on security-relevant subsystem 1650, subsystem-specific query 1704 may be effectuated on security-relevant subsystem 1652, and subsystem-specific query 1706 may be effectuated on security-relevant subsystem 1654; resulting in the generation of subsystem-specific result sets. For example, security-relevant subsystem 1650 may generate subsystem-specific result set 1696, security-relevant subsystem 1652 may generate subsystem-specific result set 1698, and security-relevant subsystem 1654 may generate subsystem-specific result set 1700.

Threat mitigation process 10 may receive 1810 a plurality of subsystem-specific results sets (e.g., subsystem-specific result sets 1696, 1698, 1700) from the plurality of security-relevant subsystems (e.g., security-relevant subsystem 1650, security-relevant subsystem 1652 and security-relevant subsystem 1654, respectively) that were generated in response to the plurality of subsystem-specific queries (e.g., subsystem-specific queries 1702, 1704, 1706).

And by mapping (in the manner discussed above) one or more data fields within a result set structure of each of the plurality of security-relevant subsystems (e.g., security-relevant subsystem 1650, security-relevant subsystem 1652 and security-relevant subsystem 1654) to one or more data fields within a result set structure of the unified platform (e.g., unified platform 290), these subsystem-specific result sets (e.g., subsystem-specific result sets 1696, 1698, 1700) may be provided to the unified platform (e.g., unified platform 290) in a fashion that enables the unified platform (e.g., unified platform 290) to properly process these subsystem-specific result sets (e.g., subsystem-specific result sets 1696, 1698, 1700).

Threat mitigation process 10 may normalize 1812 the plurality of subsystem-specific results sets (e.g., subsystem-specific result sets 1696, 1698, 1700) received from the plurality of security-relevant subsystems (e.g., security-relevant subsystem 1650, security-relevant subsystem 1652 and security-relevant subsystem 1654, respectively) to define a unified result set (e.g., unified result set 1708). For example, threat mitigation process 10 may process the plurality of subsystem-specific results sets (e.g., subsystem-specific result sets 1696, 1698, 1700) so that the subsystem-specific results sets all have a common format, a common nomenclature, and/or a common structure.

Accordingly and when normalizing 1812 the plurality of subsystem-specific results sets (e.g., subsystem-specific result sets 1696, 1698, 1700) received from the plurality of security-relevant subsystems (e.g., security-relevant subsystem 1650, security-relevant subsystem 1652 and security-relevant subsystem 1654, respectively) to define a unified result set (e.g., unified result set 1708), threat mitigation process 10 may translate 1814 a syntax of each of the plurality of subsystem-specific results sets (e.g., subsystem-specific result sets 1696, 1698, 1700) to a syntax of the unified result set (e.g., unified result set 1708).

As discussed above:

- security-relevant subsystem 1650 may only be capable of processing queries having a first structure and/or utilizing a first nomenclature;
- security-relevant subsystem 1652 may only be capable of processing queries having a second structure and/or utilizing a second nomenclature; and
- security-relevant subsystem 1654 may only be capable of processing queries having a third structure and/or utilizing a third nomenclature.

Accordingly and when producing a result set:

- security-relevant subsystem 1650 may only be capable producing a result set (e.g., subsystem-specific result set 1696) having a first structure and/or utilizing a first nomenclature;
- security-relevant subsystem 1652 may only be capable producing a result set (e.g., subsystem-specific result set 1698) having a second structure and/or utilizing a second nomenclature; and security-relevant subsystem 1654 may only be capable producing a result set (e.g., subsystem-specific result set 1700) having a third structure and/or utilizing a third nomenclature.

Accordingly and when normalizing 1812 the plurality of subsystem-specific results sets (e.g., subsystem-specific result sets 1696, 1698, 1700) received from the plurality of security-relevant subsystems (e.g., security-relevant subsystem 1650, security-relevant subsystem 1652 and security-relevant subsystem 1654, respectively) to define a unified result set (e.g., unified result set 1708), threat mitigation process 10 may translate 1814 the syntax of:

- subsystem-specific result set 1696 from a first structure/first nomenclature to a unified syntax of the unified result set (e.g., unified result set 1708);
- subsystem-specific result set 1698 from a second structure/second nomenclature to the unified syntax of the unified result set (e.g., unified result set 1708);
- subsystem-specific result set 1700 from a third structure/third nomenclature to a unified syntax of the unified result set (e.g., unified result set 1708).

As could be imagined, it is foreseeable that e.g., one or more of security-relevant subsystems 226 may be offline when asked to perform a task (or go offline while performing a task). Therefore, one or more of subsystem-specific result sets 1696, 1698, 1700 may be missing/incomplete/defective. Accordingly, threat mitigation process 10 may be configured to determine 1816 whether one or more of the plurality of subsystem-specific queries (e.g., subsystem-specific queries 1702, 1704, 1706) failed to execute properly, thus defining one or more failed subsystem-specific queries. And if one or more of the plurality of subsystem-specific queries (e.g., subsystem-specific queries 1702, 1704, 1706) failed to execute properly, threat mitigation process 10 may reexecute 1818 the one or more failed subsystem-specific queries.

As discussed above and in this example, threat mitigation process 10 provides 1808 subsystem-specific query 1702 to security-relevant subsystem 1650; subsystem-specific query 1704 to security-relevant subsystem 1652; and subsystem-specific query 1706 to security-relevant subsystem 1654.

Assume for this example that security-relevant subsystem 1650 went offline while executing subsystem-specific query 1702 and has since come back online. However, upon threat mitigation process 10 examining subsystem-specific result set 1696, it is determined that subsystem-specific result set 1696 only contains 53,246 pieces of data (but is supposed to contain 100,000 pieces of data). Accordingly, threat mitigation process 10 may determine 1816 that subsystem-specific query 1702 failed to execute properly, thus defining subsystem-specific query 1702 as a failed subsystem-specific query. Accordingly, threat mitigation process 10 may reexecute 1818 the failed subsystem-specific query (e.g., subsystem-specific query 1702) so the requested 100,000 pieces of data may be obtained from security-relevant subsystem 1650 (and the previously-obtained 53,246 pieces of data may be deleted).

Once the plurality of subsystem-specific results sets (e.g., subsystem-specific result sets 1696, 1698, 1700) are normalized 1812, threat mitigation process 10 may combine the subsystem-specific results sets (e.g., subsystem-specific result sets 1696, 1698, 1700) to form the unified result set (e.g., unified result set 1708), wherein threat mitigation process 10 may then provide 1820 the unified result set (e.g., unified result set 1708) to a third-party (e.g., the user/owner/operator of computing platform 60).

Generative AI/Large Language Model Utilization

Threat mitigation process 10 may be configured to harness the power of Generative AI and Large Language Models (LLM). Generative AI models (e.g., AI/ML process 56), as part of the broader artificial intelligence and machine learning landscape, are beginning to play a crucial role in enhancing network threat detection systems. Unlike traditional, discriminative models that classify input data into predefined categories (e.g., malicious or benign), generative models can learn to generate new data samples that are similar to the training data.

Here's how these capabilities are being harnessed for network threat detection:

- Anomaly Detection: Generative models, such as Generative Adversarial Networks (GANs), can be trained on normal network traffic data to understand what typical network behavior looks like. Once trained, these models can generate new network traffic data that is expected to be similar to the "normal" traffic. By comparing real network traffic to these generated patterns, anomalies that could indicate potential threats, such as DDOS attacks or unauthorized access, can be detected more efficiently. Anomalies stand out because they deviate significantly from the generated "normal" patterns.
- Synthetic Data Generation: One of the challenges in training effective network threat detection systems is the scarcity of labeled data, especially for new and emerging threats. Generative AI models can help by creating large volumes of synthetic network traffic data, including both normal operations and various types of attack scenarios. This synthetic data can help in training more robust discriminative models (such as deep learning-based classifiers) by providing a richer, more varied dataset that covers a wider range of possible threats.
- Improving Data Privacy: In some contexts, using real network traffic data to train threat detection models can raise privacy concerns, especially if the data contains sensitive information. Generative models can be used to create synthetic data that mimics real network traffic without containing any actual user or proprietary information. This approach allows for the development and testing of threat detection systems in a manner that is respectful of privacy concerns.
- Evolving Threat Simulation: Cyber threats are constantly evolving, and keeping threat detection systems up to date can be challenging. Generative models can be used to simulate how threats might evolve over time, generating new, unseen threat patterns for testing the resilience of network systems. This proactive approach helps in identifying potential vulnerabilities before they are exploited in the wild.
- Training and Testing Environments: Generative models can create realistic network environments for training cybersecurity professionals. By simulating various attack scenarios, these models provide a dynamic and challenging environment for cybersecurity training, allowing professionals to experience and respond to a range of threats in a controlled, risk-free setting.
- Limitations and Challenges: While generative AI models offer promising capabilities for network threat detection, there are also limitations and challenges. These include the complexity of training these models, the risk of generating misleading data, and the computational resources required. Additionally, as attackers also leverage AI, there's a continuous arms race between threat actors and defenders.

Generally speaking, generative AI models are increasingly being explored for their potential to revolutionize network threat detection systems. By enhancing anomaly detection, enabling the generation of synthetic data, and simulating evolving threats, these models can significantly improve the ability of organizations to detect and respond to cyber threats more effectively and efficiently.

As is known in the art, a large language model is an artificial intelligence system that is trained on massive amounts of text data to generate human-like responses to natural language inputs. These models use complex algorithms and neural networks to learn patterns and relationships in language data, enabling them to understand and generate responses to human language.

The primary use of large language models is to improve natural language processing in a wide range of applications (e.g., virtual assistants, chatbots, search engines, and language translation tools). These models have made significant advances in recent years, and are now able to generate highly convincing and accurate responses to complex human language inputs.

Large language models can be used to generate text in a variety of formats, including spoken language, written language, and code. They can also be used to summarize text, generate creative writing, and even create music or art. As the technology continues to improve, large language models are expected to play an increasingly important role in a wide range of industries, including healthcare, finance, and entertainment.

Automated Generation of a Human-Readable Report

Figure 34:
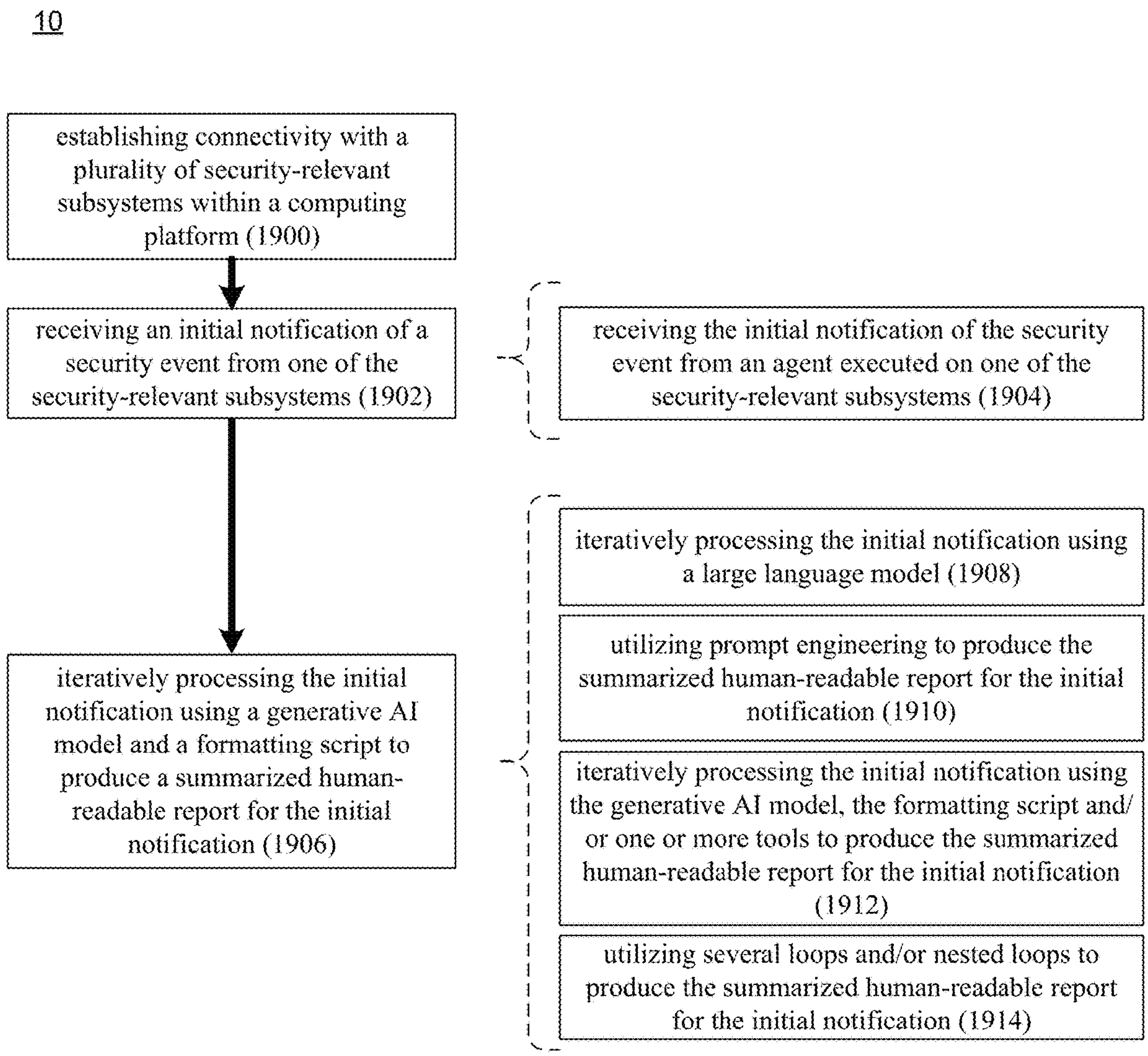
FIG. 34 is a flowchart of another implementation of the threat mitigation process of FIG. 1 according to an embodiment of the present disclosure.

Referring also to FIG. 34, threat mitigation process 10 may establish 1900 connectivity with a plurality of security-relevant subsystems (e.g., security-relevant subsystems 226) within a computing platform (e.g., computing platform 60).

As discussed above, examples of security-relevant subsystems 226 may include but are not limited to: CDN (i.e., Content Delivery Network) systems; DAM (i.e., Database Activity Monitoring) systems; UBA (i.e., User Behavior Analytics) systems; MDM (i.e., Mobile Device Management) systems; IAM (i.e., Identity and Access Management) systems; DNS (i.e., Domain Name Server) systems, antivirus systems, operating systems, data lakes; data logs; security-relevant software applications; security-relevant hardware systems; and resources external to the computing platform.

In a computing platform (e.g., computing platform 60), establishing connectivity between security-relevant subsystems (e.g., security-relevant subsystems 226)—such as firewalls, intrusion detection systems, intrusion prevention systems, and security information and event management systems—may require a multifaceted approach that encompasses network configuration, secure communication protocols, authentication, authorization mechanisms, and centralized management. Initially, each subsystem may be assigned a unique IP address, either statically or via DHCP, for identification and is often segmented into subnets to enhance both performance and security, with dedicated security subnets for these critical components.

Secure communication among these subsystems may be paramount, utilizing protocols such as TLS/SSL for encryption, VPNs for creating secure connections over potentially insecure networks, and SSH for secure administrative actions and file transfers. The integrity and confidentiality of communications may be further ensured through the use of digital certificates within a Public Key Infrastructure, Access Control Lists, and Role-Based Access Control, which collectively authenticate devices and authorize only permitted interactions.

The backbone of inter-subsystem connectivity may lie in network protocols like IPSec for securing IP communications and SNMPv3 for secure network management. These subsystems are typically managed through centralized consoles, allowing for uniform policy distribution and configuration across the network. Monitoring and logging may play crucial roles, with tools like Syslog and SIEM systems aggregating and analyzing log data for real-time security alerting.

Moreover, network segmentation and the implementation of demilitarized zones (DMZs) may be strategies employed to further delineate and secure the network infrastructure. Firewalls may be meticulously configured to control traffic between these segments, enforcing security policies that dictate allowed and blocked communications based on established rules.

Through this comprehensive approach-integrating secure communication channels, robust authentication and authorization, and vigilant monitoring-security-relevant subsystems within a computer network can establish secure and efficient connectivity. This interconnectedness may be vital for the detection, prevention, and response to security threats, ensuring the overarching protection of information systems and data within an organization.

Threat mitigation process 10 may receive 1902 an initial notification (e.g., initial notification 298) of a security event from one of the security-relevant subsystems (e.g., security-relevant subsystems 226). As discussed above, examples of such security events may include but are not limited to access auditing; anomalies; authentication; denial of services; exploitation; malware; phishing; spamming; reconnaissance; and/or web attack within a monitored computing platform (e.g., computing platform 60).

The initial notification (e.g., initial notification 298) may include a computer-readable language portion that defines one or more specifics of the security event. An example of the computer-readable language portion (e.g., within initial notification 298 of the security event) may include but is not limited to a JSON portion.

When receiving 1902 an initial notification (e.g., initial notification 298) of a security event from one of the security-relevant subsystems (e.g., security-relevant subsystems 226), threat mitigation process 10 may receive 1904 the initial notification (e.g., initial notification 298) of the security event from an agent (e.g., agent 300) executed on one of the security-relevant subsystems (e.g., security-relevant subsystems 226).

In the context of a threat mitigation process 10, an agent (e.g., agent 300) may refer to a software component that plays a crucial role in monitoring, detecting, and reporting potential security threats or malicious activities within a computing platform (e.g., computing platform 60). These agents (e.g., agent 300) may be deployed across various parts of a computing platform (e.g., computing platform 60) to ensure comprehensive surveillance and protection.

Functions of Agents (e.g., agent 300):

Monitoring Network Traffic: Agents may continuously monitor network traffic for signs of unusual or suspicious behavior. This includes analyzing packets, inspecting protocols, and scrutinizing port activity, among other things.

Detection of Anomalies: Agents may use predefined rules or sophisticated algorithms (including machine learning models) to identify deviations from normal network behavior, which could indicate an intrusion or an attempt at one.

Log Activity: Agents may log network activity, providing a detailed record of traffic patterns, access attempts, and potentially malicious activities. This information is crucial for forensic analysis and understanding the nature of any attack.

Alert Generation: Upon detecting suspicious activities, agents may generate alerts. These alerts can be configured according to severity levels and are sent to administrators or a central monitoring system for further action.

Types of Agents (e.g., agent 300):

Passive Agents: These agents monitor and analyze network traffic in real-time without interfering with the network's operation. They passively watch for signs of intrusion and report findings to a central system or administrator.

Active Agents: In addition to monitoring, active agents can take predefined actions when a threat is detected, such as blocking traffic, isolating affected network segments, or directly interacting with the threat to mitigate its impact.

Deployment Strategies for Agent (e.g., agent 300):

Host-based Agents: These are installed on individual hosts or devices within the network. They monitor incoming and outgoing traffic from the device, along with system logs and operations, to detect potential intrusions.

Network-based Agents: Deployed at strategic points within the network, such as at gateways or along backbone connections, these agents may monitor the flow of data across the network to identify suspicious patterns or anomalies.

Significance of Agents (e.g., agent 300):

Scalability: Agents may allow a NIDS to scale effectively. By distributing the monitoring load across multiple points in the network, the system can handle large volumes of traffic without significant bottlenecks.

Real-time Detection: The real-time monitoring capability of agents enables immediate detection of potential threats, allowing for quicker responses to mitigate damage.

Comprehensive Coverage: Deploying agents across different parts of a network ensures that both internal and external traffic is monitored, providing a more comprehensive defense mechanism against intrusions.

Flexibility: Agents may be tailored to specific network environments and requirements. This includes customizing the detection algorithms, adjusting sensitivity levels, and defining appropriate responses to detected threats.

Generally speaking, agents (e.g., agent 300) may function as the eyes and ears of threat mitigation process 10, providing the essential capabilities needed for the early detection of and response to cybersecurity threats. Their deployment and management may help maintain the integrity and security of networked systems.

Threat mitigation process 10 may iteratively process 1906 the initial notification (e.g., initial notification 298) using a generative AI model (e.g., generative AI model 302) and a formatting script (e.g., formatting script 304) to produce a summarized human-readable report (e.g., summarized human-readable report 306) for the initial notification (e.g., initial notification 298).

The summarized human-readable report (e.g., summarized human-readable report 306) may define recommended next steps, recommended actions and/or disclaimers. For example and in response to a security event that is based upon suspicious activity occurring on computing platform 60:

Recommended Next Steps may provide examples of additional investigations that may be implemented (e.g., port analysis/domain owner identification/perpetrator analysis) to further analyze the security event to gauge the risk/severity of the same.

Recommended Actions may provide examples of responsive actions that may be implemented (e.g., port blocking/stream shutdown/perpetrator account disablement) to mitigate the negative impact of the security event.

Disclaimers may provide explanations for why the suspicious activity of the security event may be benign and occurring for a legitimate (i.e., non-threatening) reason (e.g., such port traffic may occur during weekly backups, the person performing this operation is the president.

As discussed above, a generative AI model (e.g., generative AI model 302) is a type of artificial intelligence system designed to generate new, synthetic data that resembles its training data. It learns the patterns, features, and distributions of the input data and can produce novel outputs, such as images, text, or sound, that mimic the original dataset. These models are widely used for applications including content creation, data augmentation, and simulation. Examples include Generative Adversarial Networks (GANs) and Variational Autoencoders (VAEs), which have become foundational in fields requiring realistic and diverse data generation.

A formatting script (e.g., formatting script 304) may include a set of instructions or codes configured to structure, preprocess, or format data (input or output) in a way that's optimal for interaction with or processing by a large language model. This can include tasks like cleaning data, structuring prompts, or formatting the model's outputs for specific applications. The exact nature of formatting script 304 can vary widely depending on the requirements of the task at hand and the specifics of the model's interface.

For example, in a web application that uses a large language model to generate content based on user inputs, a formatting script might:

Preprocess User Inputs: Clean and structure user queries into a format that the model can more effectively understand and process. This could involve correcting typos, removing unnecessary punctuation, or structuring the input into a more coherent prompt.

Format Model Prompts: Tailor prompts to fit specific use cases or to elicit more accurate responses from the model. This might include adding specific instructions or context to the prompt that guides the model in generating the desired output.

Post-Process Model Outputs: Clean or format the text generated by the model to meet user expectations or application requirements. This could involve correcting grammar, structuring the output into a specific format (e.g., HTML, JSON), or truncating responses to fit length constraints.

Handle Special Formatting: For certain applications, such as code generation or creating structured data from unstructured text, the script might include rules or templates to format the output in a specific syntax or schema.

These formatting scripts (e.g., formatting script 304) may help integrate large language models into broader applications or workflows, ensuring that the interaction between human users and the AI is as seamless and effective as possible. Formatting scripts (e.g., formatting script 304) may be implemented in various programming languages, depending on the environment in which the large language model is being deployed (e.g., Python scripts for a server-side application or JavaScript for client-side processing in a web application).

Accordingly and when iteratively processing 1906 the initial notification (e.g., initial notification 298) using a generative AI model (e.g., generative AI model 302) and a formatting script (e.g., formatting script 304) to produce a summarized human-readable report (e.g., summarized human-readable report 306) for the initial notification (e.g., initial notification 298), threat mitigation process 10 may iteratively process 1908 the initial notification (e.g., initial notification 298) using a large language model (e.g., large language model 308).

As discussed above, a large language model (e.g., large language model 308) is an advanced artificial intelligence system designed to understand and generate human-like text, which is trained on vast amounts of text data, learning patterns and structures of language. These LLMs can perform various natural language processing tasks, such as answering questions, generating text, translating languages, and more. LLMs work by processing input text, analyzing it, and generating appropriate responses based on learned patterns and context.

Large language model (e.g., large language model 308) are a specific subset of generative AI models that focus on understanding, generating, and manipulating natural language text. The relationship between large language models (e.g., large language model 308) and generative AI models (e.g., generative AI model 302) can be seen in terms of their foundational technologies, objectives, and the principles they employ to generate new data.

Large language models (e.g., large language model 308) relate to the broader category of generative AI models (e.g., generative AI model 302) as follows:

Shared Foundation in Generative Techniques

Generative Principle: At their core, both LLMs and generative AI models are designed to generate new data samples that mimic the distribution of their training data. For generative AI models, this might mean creating new images, music, or text that resemble the original dataset. LLMs specifically focus on generating text that is coherent, contextually relevant, and stylistically similar to the text they were trained on.

Modeling Data Distributions: Both LLMs and other generative AI models aim to model the underlying probability distribution of their training data. For LLMs, this involves predicting the likelihood of a sequence of words or tokens based on the vast corpus of text they were trained on. Other generative models, like Generative Adversarial Networks (GANs) or Variational Autoencoders (VAEs), learn to generate data in their respective domains (e.g., images) by modeling the distribution of the training data in those domains.

Use of Deep Learning Architectures

Neural Network Architectures: Both LLMs and generative AI models leverage advanced neural network architectures to learn from their training data. Transformers, a type of neural network architecture, have proven particularly effective for LLMs due to their ability to handle long-range dependencies in text. Similarly, GANs utilize a duo of neural networks (generator and discriminator) to generate new data, while VAEs use encoder-decoder architectures for generating data.

Advancements in AI: The development and refinement of these neural network architectures have propelled advancements in both fields. Innovations in training techniques, model architecture, and computational efficiency benefit both LLMs and generative AI models across different domains.

Specificity vs. Generality

Domain-Specific vs. Domain-Generality: LLMs are domain-specific in that they are tailored for natural language processing tasks. In contrast, the term "generative AI models" encompasses a broader range of models designed for various types of data, including but not limited to text. This generality vs. specificity distinction highlights how LLMs fit within the larger ecosystem of generative AI by applying its principles to the specific domain of language.

Application and Impact

Versatile Applications: Both LLMs and generative AI models have wide-ranging applications across industries. LLMs are particularly influential in areas requiring natural language understanding and generation, such as chatbots, content creation, and automated customer service. Other generative AI models find their applications in creating synthetic datasets, enhancing creative design processes, and even drug discovery.

Enhancing Human Creativity and Efficiency: Both sets of technologies augment human capabilities by automating creative processes, generating new content, and providing tools for decision-making and analysis.

In conclusion, LLMs are a specialized form of generative AI models with a focus on natural language. They share the foundational approach of learning to generate new data that resembles their training input but apply these principles specifically to the domain of text. This relationship underscores the versatility and breadth of generative AI technologies and their profound impact on both specific industries and broader societal contexts.

Accordingly and when iteratively processing 1906 the initial notification (e.g., initial notification 298) using a generative AI model (e.g., generative AI model 302) and a formatting script (e.g., formatting script 304) to produce a summarized human-readable report (e.g., summarized human-readable report 306) for the initial notification (e.g., initial notification 298), threat mitigation process 10 may utilize 1910 prompt engineering to produce the summarized human-readable report (e.g., summarized human-readable report 306) for the initial notification (e.g., initial notification 298).

As is also known in the art, prompt engineering is an essential aspect of working with large language models (e.g., large language model 308), as it provides a way to guide the AI model's responses and ensure that they are accurate, relevant, and appropriate for the intended application.

In general, prompt engineering involves designing and fine-tuning prompts (e.g., formatting script 304) that may be used to train or fine-tune a large language model, such as OpenAI's GPT-3. The prompts (e.g., formatting script 304) can take a variety of forms, including natural language queries, prompts with specific keywords or phrases, or a combination of both.

The goal of prompt engineering is to create a set of prompts (e.g., formatting script 304) that are tailored to the specific use case or application, such as generating conversational responses, answering specific questions, or generating creative writing. By designing prompts (e.g., formatting script 304) that are closely aligned with the intended use case, developers can improve the accuracy and relevance of the model's responses, resulting in more effective and engaging interactions.

Once the prompts (e.g., formatting script 304) have been designed and fine-tuned, they are used to train or fine-tune the large language model. During the training process, the model is exposed to the prompts (e.g., formatting script 304) and learns to generate responses that are consistent with the patterns and relationships in the training data. As the model is fine-tuned with additional prompts, its performance improves, allowing it to generate more natural and effective responses over time.

Overall, prompt engineering is an essential aspect of working with large language models (e.g., large language model 308), as it enables developers to create more accurate and effective natural language processing applications.

When iteratively processing 1906 the initial notification (e.g., initial notification 298) using a generative AI model (e.g., generative AI model 302) and a formatting script (e.g., formatting script 304) to produce a summarized human-readable report (e.g., summarized human-readable report 306) for the initial notification (e.g., initial notification 298), threat mitigation process 10 may iteratively process 1912 the initial notification (e.g., initial notification 298) using the generative AI model (e.g., generative AI model 302), the formatting script (e.g., formatting script 304) and/or one or more tools (e.g., tools 310) to produce the summarized human-readable report (e.g., summarized human-readable report 306) for the initial notification (e.g., initial notification 298).

The one or more tools (e.g., tools 310) may include one or more of: a decoding tool to decode an encoded initial notification (e.g., initial notification 298); a decompression tool to decompress a compressed initial notification (e.g., initial notification 298); and an identification tool to identify an owner of a domain associated with the initial notification (e.g., initial notification 298).

In the context of managing and responding to security events within a computing platform (e.g., computing platform 60), decoding tools, decompression tools, and identification tools serve distinct yet complementary purposes. These tools are part of the arsenal used by cybersecurity professionals to analyze, understand, and mitigate security incidents.

Below is an explanation of each tool's purpose:

- Decoding Tool: Decoding tools are designed to convert data from a coded form into its original form. In the context of a security event, initial notification (e.g., initial notification 298) may be encoded in a format (e.g., Base64) that is unreadable by threat mitigation process 10 in its native form. Accordingly, threat mitigation process 10 may utilize such a decoding tool to decode such an encoded initial notification.
- Decompression Tool: Decompression tools are used to expand compressed files back into their original form. In the context of a security event, initial notification (e.g., initial notification 298) may be compressed in a format (e.g., ZIP, RAR, or custom compression algorithms) that is unreadable by threat mitigation process 10 in its native form. Accordingly, threat mitigation process 10 may utilize such a decompression tool to decompress such an encoded initial notification.
- Identification Tool: Identification tools concerning domain ownership are utilized to determine the registrants or owners of domains involved in a security event. This can include tools like WHOIS lookups, DNS query tools, or specialized software designed to trace domain affiliations and histories. When a security event involves network communication with suspicious or malicious domains (e.g., for data exfiltration, C2 communication, or phishing), understanding who owns these domains can provide crucial clues about the attackers. This information can help in assessing the credibility and intent behind the domains, tracking the source of the attack, and potentially identifying the attackers or their affiliations. Moreover, it aids in blacklisting domains, strengthening domain reputation checks, and enhancing overall network security posture.

In summary, decoding and decompression tools help cybersecurity teams understand and analyze the content and nature of the threat by revealing the true form of data and files involved in a security event. Identification tools concerning domain ownership extend this analysis by providing insights into the actors behind the threats, enabling more targeted and effective responses. Together, these tools are essential for diagnosing, understanding, and mitigating security incidents in a computer platform (e.g., computing platform 60).

When iteratively processing 1906 the initial notification (e.g., initial notification 298) using a generative AI model (e.g., generative AI model 302) and a formatting script (e.g., formatting script 304) to produce a summarized human-readable report (e.g., summarized human-readable report 306) for the initial notification (e.g., initial notification 298), threat mitigation process 10 may utilize 1914 several loops (not shown) and/or nested loops (not shown) to produce the summarized human-readable report (e.g., summarized human-readable report 306) for the initial notification (e.g., initial notification 298).

In the intricate process of investigating security events on a computing platform (e.g., computing platform 60), the strategic application of loops and nested loops within an iterative AI process (e.g., generative AI model 302) proves to be immensely beneficial. These programming constructs allow for the automation of repetitive tasks, crucial in the analysis of vast volumes of network traffic data for potential security threats. A loop facilitates the sequential examination of collected data, enabling the AI system to methodically identify unusual patterns or signatures indicative of malicious activities. The complexity of network security investigations is further addressed through the implementation of nested loops, where a loop is embedded within another, thereby allowing for multi-layered analysis.

For instance, in the detection of security incidents such as distributed denial-of-service (DDOS) attacks, an outer loop could iterate over specific time intervals, scrutinizing traffic data to spot abnormalities in volume that unfold over time. Within each identified time frame, an inner loop could delve deeper, examining individual data packets or sessions for more direct signs of compromise, such as suspicious request frequencies or known malware signatures. This dual-level approach, with an outer loop assessing broader temporal patterns and an inner loop focusing on granular data points, exemplifies the nuanced analysis possible with nested loops.

Such a methodology not only enhances the thoroughness of the security assessment but also significantly accelerates the detection process. By automating the scrutiny of terabytes of network data, AI systems equipped with loop-based algorithms can identify threats with a precision and speed unattainable through manual analysis. The adaptability of loops and nested loops to various levels of data granularity ensures that complex, layered security events are effectively uncovered and addressed. Consequently, the use of iterative loops in AI-driven security event investigation stands as a cornerstone technique in bolstering the defense mechanisms of computer networks against an ever-evolving landscape of cyber threats.

Intelligent Agent

Figure 35:
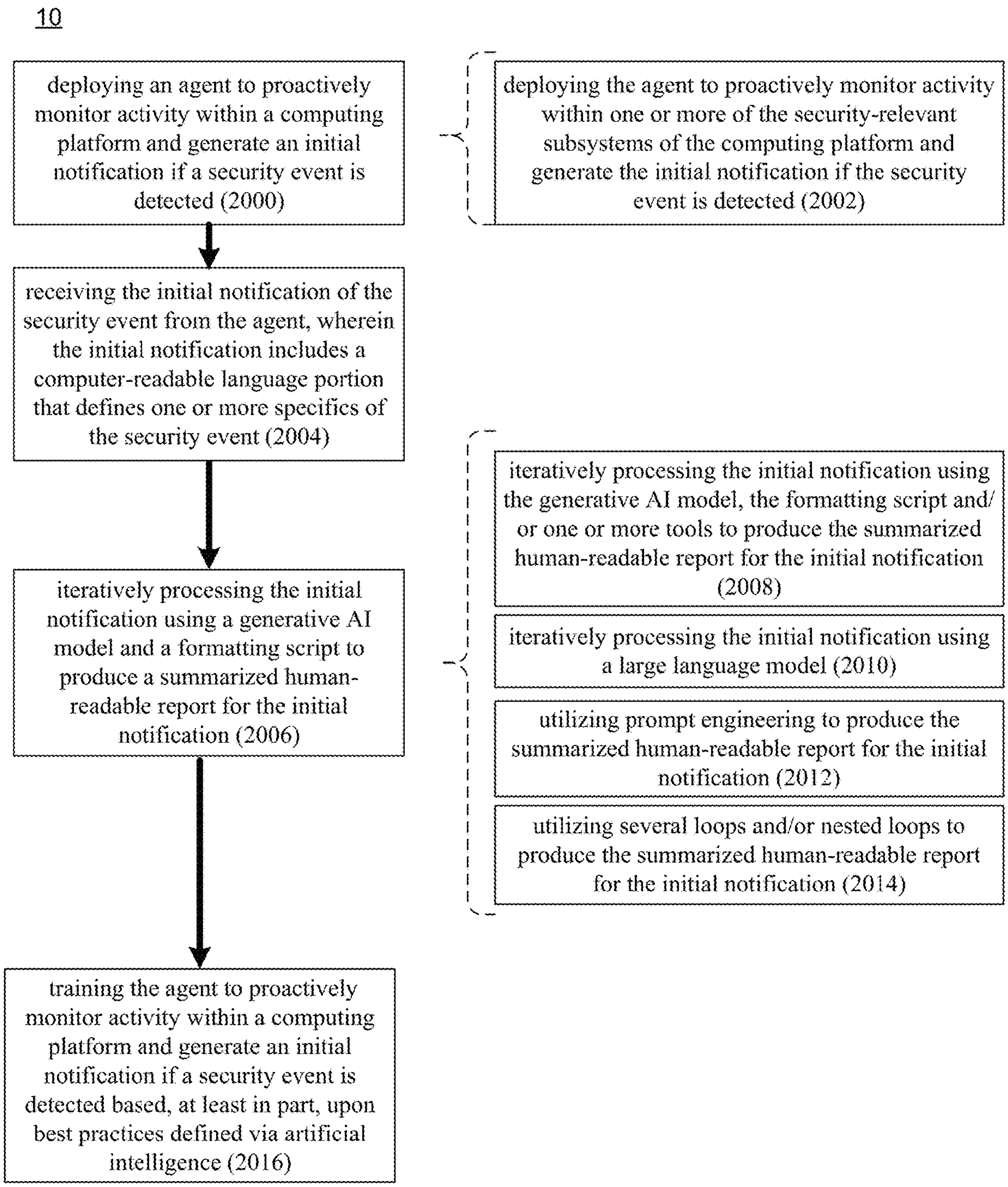
FIG. 35 is a flowchart of another implementation of the threat mitigation process of FIG. 1 according to an embodiment of the present disclosure.

Referring also to FIG. 35, threat mitigation process 10 may deploy 2000 an agent (e.g., agent 300) to proactively monitor activity within a computing platform (e.g., computing platform 60) and generate an initial notification (e.g., initial notification 298) if a security event is detected.

As discussed above, an agent (e.g., agent 300) may refer to a software component that plays a crucial role in monitoring, detecting, and reporting potential security threats or malicious activities within a computing platform (e.g., computing platform 60). These agents (e.g., agent 300) may be deployed across various parts of a computing platform (e.g., computing platform 60) to ensure comprehensive surveillance and protection.

As discussed above, examples of such security events may include but are not limited to access auditing; anomalies; authentication; denial of services; exploitation; malware; phishing; spamming; reconnaissance; and/or web attack within a monitored computing platform (e.g., computing platform 60). An example of the computer-readable language portion (e.g., within the notification of the security event) may include but is not limited to a JSON portion.

As discussed above, the computing platform (e.g., computing platform 60) may include a plurality of security-relevant subsystems (e.g., security-relevant subsystems 226). Accordingly and when deploying 2000 an agent (e.g., agent 300) to proactively monitor activity within a computing platform (e.g., computing platform 60) and generate an initial notification (e.g., initial notification 298) if a security event is detected, threat mitigation process 10 may deploy 2002 the agent (e.g., agent 300) to proactively monitor activity within one or more of the security-relevant subsystems (e.g., security-relevant subsystems 226) of the computing platform (e.g., computing platform 60) and generate the initial notification (e.g., initial notification 298) if the security event is detected.

As discussed above, examples of security-relevant subsystems 226 may include but are not limited to: CDN (i.e., Content Delivery Network) systems; DAM (i.e., Database Activity Monitoring) systems; UBA (i.e., User Behavior Analytics) systems; MDM (i.e., Mobile Device Management) systems; IAM (i.e., Identity and Access Management) systems; DNS (i.e., Domain Name Server) systems, antivirus systems, operating systems, data lakes; data logs; security-relevant software applications; security-relevant hardware systems; and resources external to the computing platform.

Threat mitigation process 10 may receive 2004 the initial notification (e.g., initial notification 298) of the security event from the agent (e.g., agent 300), wherein the initial notification (e.g., initial notification 298) includes a computer-readable language portion that defines one or more specifics of the security event, As discussed above, examples of such security events may include but are not limited to access auditing; anomalies; authentication; denial of services; exploitation; malware; phishing; spamming; reconnaissance; and/or web attack within a monitored computing platform (e.g., computing platform 60). An example of the computer-readable language portion (e.g., within the notification of the security event) may include but is not limited to a JSON portion.

In the manner discussed above, threat mitigation process 10 may iteratively process 2006 the initial notification (e.g., initial notification 298) using a generative AI model (e.g., generative AI model 302) and a formatting script (e.g., formatting script 304) to produce a summarized human-readable report (e.g., summarized human-readable report 306) for the initial notification (e.g., initial notification 298).

As discussed above, the summarized human-readable report (e.g., summarized human-readable report 306) may define recommended next steps, recommended actions and/or disclaimers. For example and in response to a security event that is based upon suspicious activity occurring on computing platform 60:

- Recommended Next Steps may provide examples of additional investigations that may be implemented (e.g., port analysis/domain owner identification/perpetrator analysis) to further analyze the security event to gauge the risk/severity of the same.
- Recommended Actions may provide examples of responsive actions that may be implemented (e.g., port blocking/stream shutdown/perpetrator account disablement) to mitigate the negative impact of the security event.
- Disclaimers may provide explanations for why the suspicious activity of the security event may be benign and occurring for a legitimate (i.e., non-threatening) reason (e.g., such port traffic may occur during weekly backups, the person performing this operation is the president.

When iteratively processing 2006 the initial notification (e.g., initial notification 298) using a generative AI model (e.g., generative AI model 302) and a formatting script (e.g., formatting script 304) to produce a summarized human-readable report (e.g., summarized human-readable report 306) for the initial notification (e.g., initial notification 298), threat mitigation process 10 may iteratively process 2008 the initial notification (e.g., initial notification 298) using the generative AI model (e.g., generative AI model 302), the formatting script (e.g., formatting script 304) and/or one or more tools (e.g., tools 310) to produce the summarized human-readable report (e.g., summarized human-readable report 306) for the initial notification (e.g., initial notification 298).

As discussed above, the one or more tools (e.g., tools 310) may include one or more of: a decoding tool to decode an encoded initial notification (e.g., initial notification 298); a decompression tool to decompress a compressed initial notification (e.g., initial notification 298); and an identification tool to identify an owner of a domain associated with the initial notification (e.g., initial notification 298).

When iteratively processing 2006 the initial notification (e.g., initial notification 298) using a generative AI model (e.g., generative AI model 302) and a formatting script (e.g., formatting script 304) to produce a summarized human-readable report (e.g., summarized human-readable report 306) for the initial notification (e.g., initial notification 298), threat mitigation process 10 may iteratively process 2010 the initial notification (e.g., initial notification 298) using a large language model (e.g., large language model 308).

As discussed above, a large language model (e.g., large language model 308) is an advanced artificial intelligence system designed to understand and generate human-like text, which is trained on vast amounts of text data, learning patterns and structures of language. These LLMs can perform various natural language processing tasks, such as answering questions, generating text, translating languages, and more. LLMs work by processing input text, analyzing it, and generating appropriate responses based on learned patterns and context.

When iteratively processing 2006 the initial notification (e.g., initial notification 298) using a generative AI model (e.g., generative AI model 302) and a formatting script (e.g., formatting script 304) to produce a summarized human-readable report (e.g., summarized human-readable report 306) for the initial notification (e.g., initial notification 298), threat mitigation process 10 may utilize 2012 prompt engineering to produce the summarized human-readable report (e.g., summarized human-readable report 306) for the initial notification (e.g., initial notification 298).

As discussed above, prompt engineering is an essential aspect of working with large language models (e.g., large language model 308), as it provides a way to guide the AI model's responses and ensure that they are accurate, relevant, and appropriate for the intended application.

As discussed above and when iteratively processing 2006 the initial notification (e.g., initial notification 298) using a generative AI model (e.g., generative AI model 302) and a formatting script (e.g., formatting script 304) to produce a summarized human-readable report (e.g., summarized human-readable report 306) for the initial notification (e.g., initial notification 298), threat mitigation process 10 may utilize 2014 several loops and/or nested loops to produce the summarized human-readable report (e.g., summarized human-readable report 306) for the initial notification (e.g., initial notification 298).

As discussed above, in the intricate process of investigating security events on a computing platform (e.g., computing platform 60), the strategic application of loops and nested loops within an iterative AI process (e.g., generative AI model 302) proves to be immensely beneficial. These programming constructs allow for the automation of repetitive tasks, crucial in the analysis of vast volumes of network traffic data for potential security threats. A loop facilitates the sequential examination of collected data, enabling the AI system to methodically identify unusual patterns or signatures indicative of malicious activities. The complexity of network security investigations is further addressed through the implementation of nested loops, where a loop is embedded within another, thereby allowing for multi-layered analysis.

Threat mitigation process 10 may train 2016 the agent (e.g., agent 300) to proactively monitor activity within a computing platform (e.g., computing platform 60) and generate an initial notification (e.g., initial notification 298) if a security event is detected based, at least in part, upon best practices defined via artificial intelligence (e.g., AI/ML process 56). For example and during the operation of threat mitigation process 10, data may be archived concerning activities that occurred within the computing platform (e.g., computing platform 60). So over time, threat mitigation process 10 may build a data repository (e.g., data repository 312) that identifies various examples of "concerning" activities within the computing platform (e.g., computing platform 60) and whether those activities resulted in an actual security event or were simply false alarms. Accordingly, threat mitigation process 10 may train 2016 the agent (e.g., agent 300) to proactively monitor activity within a computing platform (e.g., computing platform 60) and generate an initial notification (e.g., initial notification 298) if a security event is detected based, at least in part, upon the information contained within the data repository (e.g., data repository 312). Additionally/alternatively, threat mitigation process 10 may train 2016 the agent (e.g., agent 300) to proactively monitor activity within a computing platform (e.g., computing platform 60) and generate an initial notification (e.g., initial notification 298) if a security event is detected based, at least in part, upon supplemental information (e.g., supplemental information 314) obtained from e.g., technical bulletins released by software houses, antivirus providers, hardware manufactures, etc.).

Prompt Engineering

Figure 36:
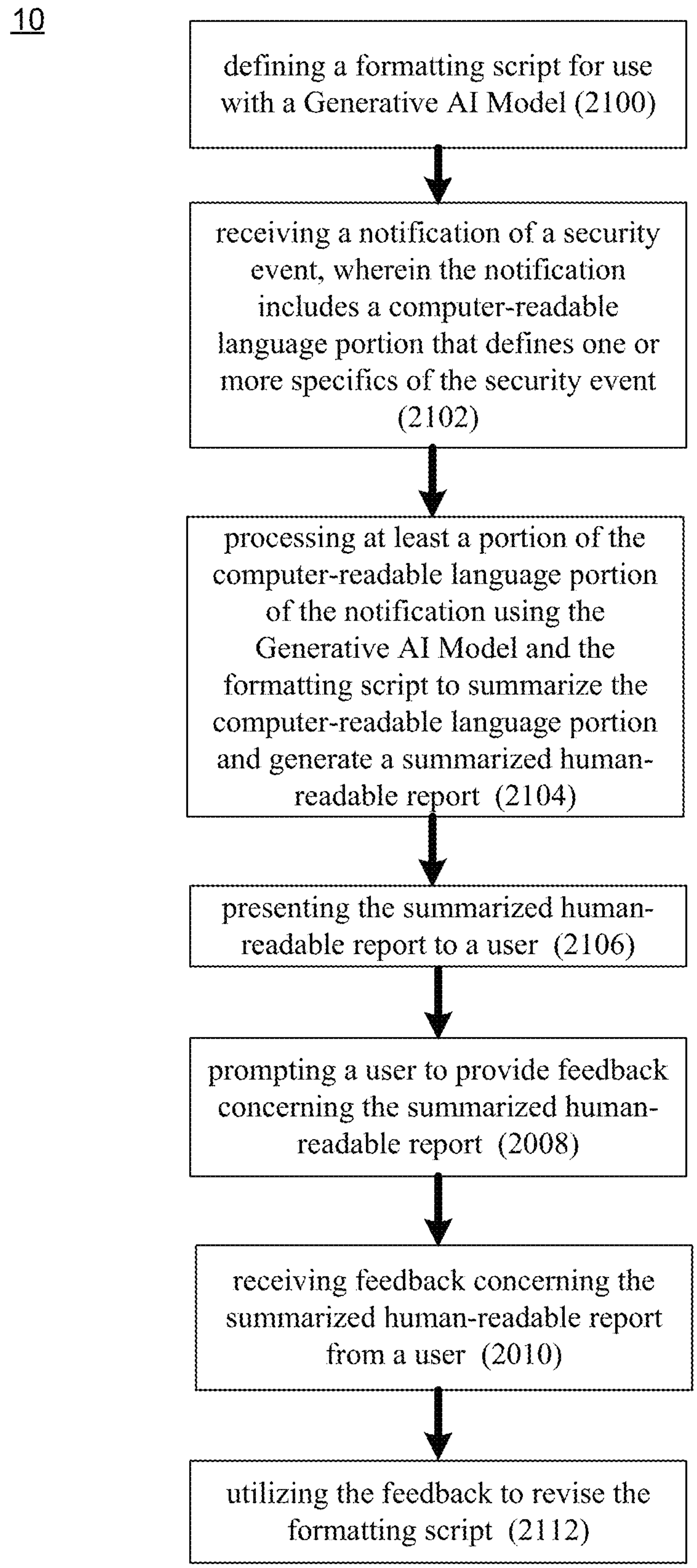
FIG. 36 is a flowchart of another implementation of the threat mitigation process of FIG. 1 according to an embodiment of the present disclosure.

Referring also to FIG. 36, threat mitigation process 10 may define 2100 a formatting script (e.g., formatting script 304) for use with a Generative AI model (e.g., generative AI model 302). An example of such a formatting script (e.g., formatting script 304) may include but is not limited to a group of one or more prompts that are tailored to the specific use case or application for which the Generative AI model (e.g., generative AI model 302) is deployed. Specifically, the formatting script (e.g., formatting script 304) may include one or more discrete instructions for the Generative AI model (e.g., generative AI model 302) and/or the large language model (e.g., large language model 308). Such instructions for the Generative AI model (e.g., generative AI model 302) and/or the large language model (e.g., large language model 308) may include: formatting instructions and/or content instructions.

As discussed above, these formatting scripts (e.g., formatting script 304) may help integrate large language models into broader applications or workflows, ensuring that the interaction between human users and the AI is as seamless and effective as possible. Formatting scripts (e.g., formatting script 304) may be implemented in various programming languages, depending on the environment in which the large language model is being deployed (e.g., Python scripts for a server-side application or JavaScript for client-side processing in a web application).

Threat mitigation process 10 may receive 2102 a notification of a security event, wherein the notification includes a computer-readable language portion that defines one or more specifics of the security event. As discussed above, examples of such security events may include but are not limited to access auditing; anomalies; authentication; denial of services; exploitation; malware; phishing; spamming; reconnaissance; and/or web attack within a monitored computing platform (e.g., computing platform 60). An example of the computer-readable language portion (e.g., within the notification of the security event) may include but is not limited to a JSON portion.

Below is an example of such a JSON portion:

```
{
  "timestamp": 1676573073400,
  "formatVersion": 1,
  "webaclId": "arn:aws:wafv2::051480436342:icnifuhtyzwa-SharedServices-Policy1606244930846/5a071c76-4c57-4971-9326-5c0c8a649b1c",
  "terminatingRuleId": "IP-Whitelist-606244930846",
  "terminatingRuleType": "GROUP",
  "action": "ALLOW",
  "terminatingRuleMatchDetails": [ ],
```

-continued

```
  "httpSourceName": "ALB",
  "httpSourceId": "223275863938-app/k8s-toolskon-f53b6065de/888885884d9c7626",
  "ruleGroupList": [
    {
        "ruleGroupId": "arn:aws:wafv2::132154534106:nywk0s0jgn37-IP-Whitelist/6f83906e-e4c9-4b9e-b4ce-
a83633520409",
      "terminatingRule": {
        "ruleId": "Public-IP-Whitelist",
        "action": "ALLOW",
        "ruleMatchDetails": null
      },
      "nonTerminatingMatchingRules": [ ],
      "excludedRules": null,
      "customerConfig": null
    }
  ],
  "rateBasedRuleList": [ ],
  "nonTerminatingMatchingRules": [ ],
  "requestHeadersInserted": null,
  "responseCodeSent": null,
  "httpRequest": {
    "clientIp": "10.142.82.58",
    "country": "US",
    "headers": [
      {
        "name": "host",
        "value": "site.example.com"
      },
      {
        "name": "content-encoding",
        "value": "snappy"
      },
      {
        "name": "content-type",
        "value": "application/x-protobuf"
      },
      {
        "name": "user-agent",
        "value": "GrafanaAgent/v0.26.1"
      },
      {
        "name": "x-scope-orgid",
        "value": "prod"
      },
      {
        "name": "content-length",
        "value": "40792"
      }
    ],
    "uri": "/api/v1/push",
    "args": "",
    "httpVersion": "HTTP/2.0",
    "httpMethod": "POST",
    "requestId": "1-63ee7991-4fb3b76547a55ccd5badf00d"
  },
  "oversizeFields": [
    "REQUEST_BODY"
  ]
}
```

Threat mitigation process 10 may process 2104 at least a portion of the computer-readable language portion of the notification using the large language model (e.g., large language model 308) and the formatting script (e.g., formatting script 304) to summarize the computer-readable language portion and generate a summarized human-readable report (e.g., summarized human-readable report 306).

Below is an example of such a summarized human-readable report (e.g., summarized human-readable report 306):

Summary & Analysis: At timestamp 1676573073400, the web ACL (arn:aws:wafv2::051480436342:icni-fuhtyzwa-SharedServices-Policyl606244930846/5a071c76-4c57-4971-9326-5c0c8a649b1c) allowed an HTTP POST request from external IP 10.142.82.58 (hostname site.example.com, US) to URI '/api/v1/push'. This event could indicate malicious activity as the request includes an API key and the request body is over the size limit.

Suggested Legitimate Activity:

Multiple requests sent in a burst

Sending information that is larger than average

Use of an API key

Next Steps:

Analyze the source IP address using public resources to identify the owner and location.

Analyze the request body to identify any suspicious or malicious activity, such as attempts to gain access to sensitive information.

Check the headers to verify that the user-agent is legitimate and that the content-type is appropriate for the request.

Threat mitigation process 10 may present 2106 the (above-illustrated) summarized human-readable report (e.g., summarized human-readable report 306) to a user (e.g., analyst 256).

Through the use of the above-described formatting script (e.g., formatting script 304), the above-illustrated summarized human-readable report (e.g., summarized human-readable report 306) may be concise and easily digestible by the user (e.g., analyst 256). For example and if the above-illustrated JSON portion was provided to the above-described Generative AI model (e.g., generative AI model 302) without the above-described formatting script (e.g., formatting script 304), the result produced would be much less concise and generally less readable.

Below is an example of such a less-concise & less-readable summarized human-readable report (e.g., summarized human-readable report 306):

```
#### Human Readable Output
### WebACL
| timestamp | webaclId | terminatingRuleId | terminatingRuleType | action | httpSourceName | httpSourceId | | ---
| --- | --- | --- | --- | --- | --- | | 1676573073400 | arn:aws:wafv2::051480436342:icnifuhtyzwa-SharedServices-
Policy1606244930846/5a071c76-4c57-4971-9326-5c0c8a649b1c |
arn:aws:wafv2::132154534106:nywk0s0jgn37-IP-Whitelist/6f83906e-e4c9-4b9e-b4ce-a83633520409 |
GROUP | ALLOW | ALB | 223275863938-app/k8s-kong-toolskon-f53b6065de/888885884d9c7626 |
### Rule Group
| ruleGroupId |
| --- |
| arn:aws:wafv2::132154534106:nywk0s0jgn37-IP-Whitelist/6f83906e-e4c9-4b9e-b4ce-a83633520409 |
### Terminating Rule
| ruleId | action |
| --- | --- |
| SNOW-Public-IP-Whitelist | ALLOW |
### HTTP Request | clientIp | country | uri | args | httpVersion | httpMethod | requestId |
| --- | --- | --- | --- | --- | --- | --- |
| 10.142.82.58 | US | /api/v1/push |
| HTTP/2.0 | POST | 1-63ee7991-4fb3b76547a55ccd5badf00d |
### Headers
| name | value |
| --- | --- |
| host | site.example.com |
| content-encoding | snappy |
| content-type | application/x-protobuf |
| user-agent | GrafanaAgent/v0.26.1 |
| x-prometheus-remote-write-version | 0.1.0 |
| x-scope-orgid | prod |
| content-length | 40792 |
```

Threat mitigation process 10 may prompt 2108 a user (e.g., analyst 256) to provide feedback concerning the (above-illustrated) summarized human-readable report (e.g., summarized human-readable report 306). And (if provided), threat mitigation process 10 may receive 2110 feedback concerning the summarized human-readable report (e.g., summarized human-readable report 306) from a user (e.g., analyst 256). For example, the user (e.g., analyst 256) may be asked to give "thumbs-up/thumbs-down" feedback concerning the quality of the (above-illustrated) summarized human-readable report (e.g., summarized human-readable report 306). In the event that the feedback provided is e.g., marginal or poor, threat mitigation process 10 may ask the user (e.g., analyst 256) to provide additional commentary, examples of which may include but are not limited to: "the summary is too long", "the summary is too short", "I would appreciate a more detailed roadmap for remediation", "more concise language would be helpful", etc. And (if feedback is provided), threat mitigation process 10 may utilize 2112 the feedback to revise the above-described formatting script (e.g., formatting script 304) so that the (above-illustrated) summarized human-readable report (e.g., summarized human-readable report 306) may be tailored based upon such feedback.

Chunking and Recombining to Overcome Token Limits

Figure 37:
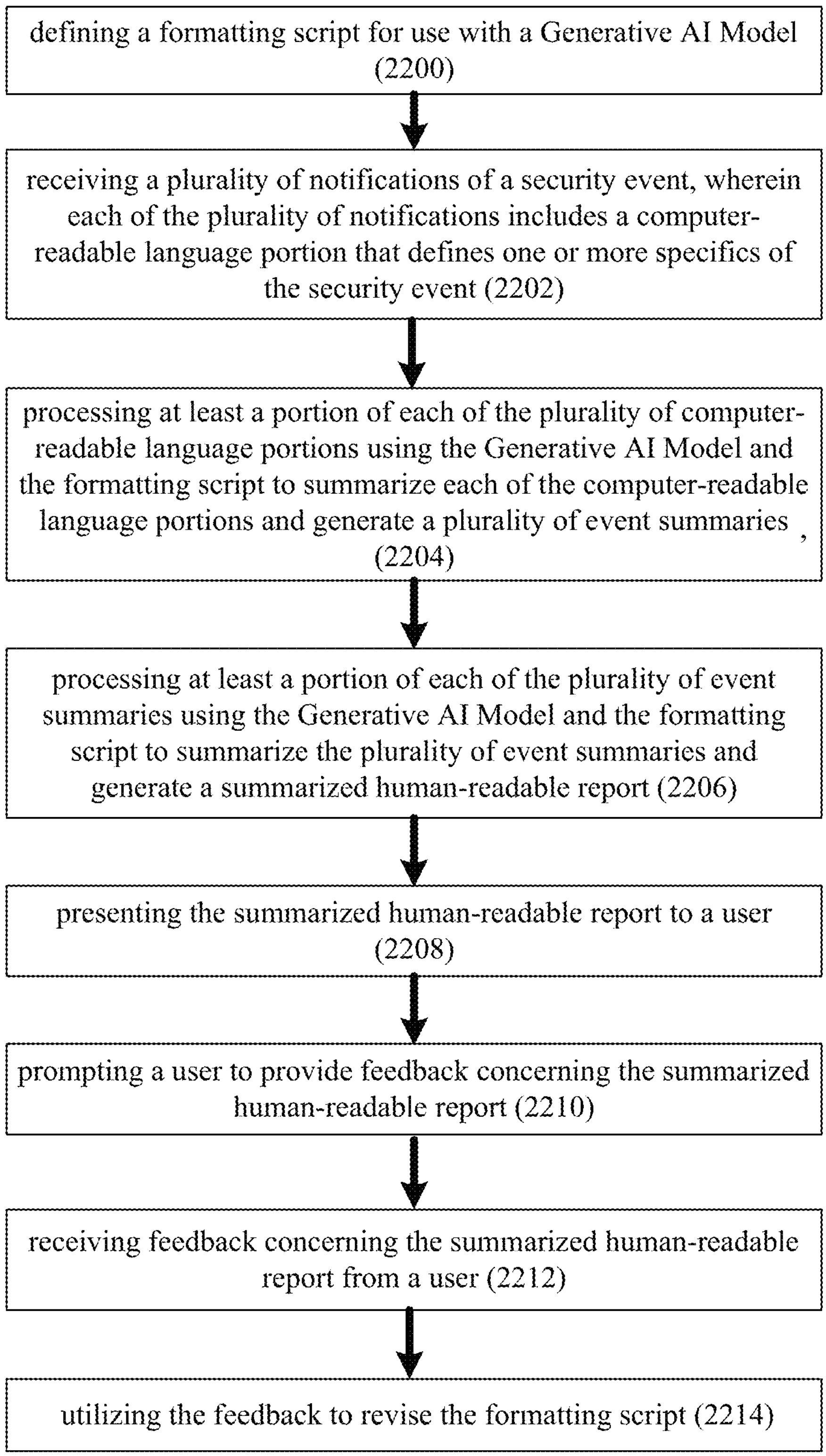
FIG. 37 is a flowchart of another implementation of the threat mitigation process of FIG. 1 according to an embodiment of the present disclosure.

Referring also to FIG. 37 and as is known in the art, the inputs to (and outputs from) a Generative AI model (e.g., generative AI model 302) may be limited in scope. Accordingly and if multiple notifications (concerning security events) are received, it is often not practical to have those events simultaneously summarized by such a Generative AI model (e.g., generative AI model 302). Specifically, large language models (e.g., large language model 308) often specify such limits based upon a maximum number of tokens.

As is known in the art, the token limits of a large language model (e.g., large language model 308) refer to the maximum number of words or tokens that the model can process in a single input sequence. The specific token limit of a large language model depends on the architecture and specifications of the model. Depending on the model used, requests can use up to 4097 tokens shared between prompt and completion. If your prompt is 4000 tokens, your completion can be 97 tokens at most. The limit is currently a technical limitation, but there are often creative ways to solve problems within the limit, e.g., condensing your prompt, breaking the text into smaller pieces, etc.

When an input sequence exceeds the token limit of a language model, it needs to be broken up into smaller segments or "chunks" that can be processed separately. This process is known as "chunking" or "windowing". The chunks are then fed into the model sequentially, and the output from each chunk is combined to produce the final result. Chunking can introduce some challenges, as it requires careful management of the context and flow of the input sequence. In some cases, the output of a previous chunk may need to be taken into account when processing the next chunk, in order to maintain continuity and coherence.

Overall, the token limits of large language models (e.g., large language model 308) are an important consideration for developers and researchers working with natural language processing applications. By carefully managing the input sequence and chunking appropriately, it is possible to create highly effective and accurate language models that can process very large amounts of text data.

As discussed above, threat mitigation process 10 may define 2200 a formatting script (e.g., formatting script 304) for use with a Generative AI model (e.g., generative AI model 302).

As discussed above, these formatting scripts (e.g., formatting script 304) may help integrate large language models into broader applications or workflows, ensuring that the interaction between human users and the AI is as seamless and effective as possible. Formatting scripts (e.g., formatting script 304) may be implemented in various programming languages, depending on the environment in which the large language model is being deployed (e.g., Python scripts for a server-side application or JavaScript for client-side processing in a web application).

Threat mitigation process 10 may receive 2202 a plurality of notifications (e.g., initial notification 298 and additional notification 316) of a security event, wherein each of the plurality of notifications (e.g., initial notification 298 and additional notification 316) includes a computer-readable language portion that defines one or more specifics of the security event, thus defining a plurality of computer-readable language portions.

As discussed above, examples of such the security events may include but are not limited to access auditing; anomalies; authentication; denial of services; exploitation; malware; phishing; spamming; reconnaissance; and/or web attack within a monitored computing platform (e.g., computing platform 60). As further discussed above, an example of the computer-readable language portions (e.g., within the notification of the security event) may include but is not limited to a JSON portion.

Assume for the following example that threat mitigation process 10 receives two notifications of a security event.

Below is an example of such a JSON portion for EVENT #1:

```
{
  “eventVersion”: “1.08”,
  “userIdentity”: {
    “type”: “AssumedRole”,
    “principalId”: “AYEDVBV3CPSALNLBYZTE6:q5btsdo6lhqv@uyf0bn1fk303.com”,
    “arn”: “arn:aws:sts::996966753428:assumed-role/DevOps/q5btsdo6lhqv@uyf0bn1fk303.com”,
    “accountId”: “896966753408”,
    “accessKeyId”: “ASIA5B4444444FTJIUG”,
    “sessionContext”: {
      “sessionIssuer”: {
        “type”: “Role”,
        “principalId”: “AROA5BV3CPAAAAABYZTE6”,
        “arn”: “arn:aws:iam::896966753408:role/DevOps”,
        “accountId”: “123966753123”,
        “userName”: “DevOps”
      },
      “webIdFederationData”: { },
      “attributes”: {
        “creationDate”: “2023-01-24T15:47:29Z”,
        “mfaAuthenticated”: “false”
      }
    },
    “invokedBy”: “amplifybackend.amazonaws.com”
  },
  “eventTime”: “2023-01-24T16:53:14Z”,
  “eventSource”: “iam.amazonaws.com”,
  “eventName”: “CreateRole”,
  “awsRegion”: “us-east-1”,
  “sourceIPAddress”: “amplifybackend.amazonaws.com”,
  “userAgent”: “amplifybackend.amazonaws.com”,
  “requestParameters”: {
    “roleName”: “us-east-1_F4tKzs0rI”,
              “assumeRolePolicyDocument”: “{\“Version\”:\“2012-10-
17\”,\“Statement\”:[{\“Sid\”:\“CognitoAssumeRolePolicy\”,\“Effect\”:\“Allow\”,\“Principal\”:{\“Federated\”:
\“cognito-
identity.amazonaws.com\”},\“Action\”:\“sts:AssumeRoleWithWebIdentity\”,\“Condition\”:{\“StringEquals\”:
{\“cognito-identity.amazonaws.com:aud\”:\“us-east-1:62444912-9f39-4eca-f00d-
5ab4de99b55b\”},\“ForAnyValue:StringLike\”:{\“cognito-
identity.amazonaws.com:amr\”:\“authenticated\”}}}]}”
  },
  “responseElements”: {
    “role”: {
      “path”: “/”,
      “roleName”: “us-east-1_G8tKzs0rI_Manage-only”,
      “roleId”: “AROA5BV3CPSAMOFIYG2AT”,
      “arn”: “arn:aws:iam::896966753408:role/us-east-1_G8tKzs0rI_Manage-only”,
      “createDate”: “Jan 24, 2023 4:53:14 PM”,
          “assumeRolePolicyDocument”: “%7B%22Version%22%3A%222012-10-
17%22%2C%22Statement%22%3A%5B%7B%22Sid%22%3A%22CognitoAssumeRolePolicy%22%2C%22Effect
%22%3A%22Allow%22%2C%22Principal%22%3A%7B%22Federated%22%3A%22cognito-
identity.amazonaws.com%22%7D%2C%22Action%22%3A%22sts%3AAssumeRoleWithWebIdentity%22%2C
%22Condition%22%3A%7B%22StringEquals%22%3A%7B%22cognito-
identity.amazonaws.com%3Aaud%22%3A%22us-east-1%3A62444912-9f39-4eca-f00d-
5ab4de99b55b%22%7D%2C%22ForAnyValue%3AStringLike%22%3A%7B%22cognito-
```

-continued identity.amazonaws.com%3Aamr%22%3A%22authenticated%22%7D%7D%7D%5D%7D"
      }
   },
   "requestID": "01dce44c-e2cb-447f-b4df-00d4a3547842",
   "eventID": "aaafe757-bb5e-45cf-9f1c-6a64f4ee35d2",
   "readOnly": "false",
   "eventType": "AwsApiCall",
   "managementEvent": "true",
   "recipientAccountId": "896966755608",
   "eventCategory": "Management",
   "sessionCredentialFromConsole": "true"
}

Below is an example of such a JSON portion for EVENT #2:

{
   "eventVersion": "1.08",
   "userIdentity": {
      "type": "AssumedRole",
      "principalId": "AYEDVBV3CPSALNLBYZTE6:q5btsdo6lhqv@uyf0bn1fk303.com",
      "arn": "arn:aws:sts::996966753428:assumed-role/DevOps/q5btsdo6lhqv@uyf0bn1fk303.com",
      "accountId": "896966753408",
      "accessKeyId": "ASIA5B4444444FTJIUG",
      "sessionContext": {
         "sessionIssuer": {
            "type": "Role",
            "principalId": "AROA5BV3CPAAAAABYZTE6",
            "arn": "arn:aws:iam::896966753408:role/DevOps",
            "accountId": "123966753123",
            "userName": "DevOps"
         },
         "webIdFederationData": { },
         "attributes": {
            "creationDate": "2023-01-24T15:47:29Z",
            "mfaAuthenticated": "false"
         }
      },
      "invokedBy": "amplifybackend.amazonaws.com"
   },
   "eventTime": "2023-01-24T16:53:14Z",
   "eventSource": "iam.amazonaws.com",
   "eventName": "CreateRole",
   "awsRegion": "us-east-1",
   "sourceIPAddress": "amplifybackend.amazonaws.com",
   "userAgent": "amplifybackend.amazonaws.com",
   "requestParameters": {
      "roleName": "us-east-1_F4tKzs0rI",
                  "assumeRolePolicyDocument": "{\"Version\":\"2012-10-
17\",\"Statement\":[{\"Sid\":\"CognitoAssumeRolePolicy\",\"Effect\":\"Allow\",\"Principal\":{\"Federated\":
\"cognito-
identity.amazonaws.com\"},\"Action\":\"sts:AssumeRoleWithWebIdentity\",\"Condition\":{\"StringEquals\":
{\"cognito-identity.amazonaws.com:aud\":\"us-east-1:62444912-9f39-4eca-f00d-
5ab4de99b55b\"},\"ForAnyValue:StringLike\":{\"cognito-
identity.amazonaws.com:amr\":\"authenticated\"}}}]}"
   },
   "responseElements": {
      "role": {
         "path": "/",
         "roleName": "us-east-1_G8tKzs0rI_Manage-only",
         "roleId": "AROA5BV3CPSAMOFIYG2AT",
         "arn": "arn:aws:iam::896966753408:role/us-east-1_G8tKzs0rI_Manage-only",
         "createDate": "Jan 24, 2023 4:53:14 PM",
               "assumeRolePolicyDocument": "%7B%22Version%22%3A%222012-10-
17%22%2C%22Statement%22%3A%5B%7B%22Sid%22%3A%22CognitoAssumeRolePolicy%22%2C%22Effect
%22%3A%22Allow%22%2C%22Principal%22%3A%7B%22Federated%22%3A%22cognito-
identity.amazonaws.com%22%7D%2C%22Action%22%3A%22sts%3AAssumeRoleWithWebIdentity%22%2C
%22Condition%22%3A%7B%22StringEquals%22%3A%7B%22cognito-
identity.amazonaws.com%3Aaud%22%3A%22us-east-1%3A62444912-9f39-4eca-f00d-
5ab4de99b55b%22%7D%2C%22ForAnyValue%3AStringLike%22%3A%7B%22cognito-
identity.amazonaws.com%3Aamr%22%3A%22authenticated%22%7D%7D%7D%5D%7D"
      }
   },
   "requestID": "01dce44c-e2cb-447f-b4df-00d4a3547842",
   "eventID": "aaafe757-bb5e-45cf-9f1c-6a64f4ee35d2",
   "readOnly": "false", -continued "eventType": "AwsApiCall",
"managementEvent": "true",
"recipientAccountId": "896966755608",
"eventCategory": "Management",
"sessionCredentialFromConsole": "true"
}

Threat mitigation process 10 may process 2204 at least a portion of each of the plurality of computer-readable language portions (as illustrated above) using the Generative AI model (e.g., generative AI model 302) and the (above-described) formatting script (e.g., formatting script 304) to summarize each of the (two in this example) computer-readable language portions and generate a plurality of event summaries.

Below is an example of such an event summary for EVENT #1:

At 16:53:14 on Jan. 24, 2023, user q5btsdo6lhqv@uyf0bn1fk303.com, authenticated through the ARN arn:aws:sts::996966753428:assumed-role/DevOps/q5btsdo6lhqv@uyf0bn1fk303.com and the IP address amplifybackend.amazonaws.com, created a role called "us-east-1_F4tKzs0rl" in the US East region. This event indicates the creation of a role in AWS by an authenticated user, which could potentially be misused.

Suggested Legitimate Activity:
- Provisioning a role for an application
- Creating a role for a specific user Next Steps:
- Review the account history for the user who created the role to determine if this is normal behavior.
- Check whether the role was created with a policy or inline policies that allow excessive permissions.
- Identify any external IP addresses associated with the user activity to determine the geographical location of the activity and the potential owner of the IP address.
- Review the environment for any suspicious activity by leveraging tools such as IDS/IPS and Security Information and Event Management (SIEM) to identify any malicious network traffic.

Below is an example of such an event summary for EVENT #2:

Summary & Analysis: At 16:52:58 on Jan. 24, 2023, an assumed role AYEDVBV3CPSALNLBYZTE6:q5btsdo6lhqv@uyf0bn1fk303.com "was used to create a role with the name" us-east-1_F4tKzs0rl" using the IP address "amplifybackend.amazonaws.com" and the user agent "amplifybackend.amazonaws.com". This could indicate the creation of a malicious role to gain unauthorized access to resources, or a legitimate role created for a new user or application.

Suggested Legitimate Activity:
- Creating a role for a new user or application
- Creating a role for access to a 3rd party service
- Adding a role to an existing user or application Next Steps:
- Check the user and IP address to verify the user and origin of the request
- Verify the user identity type and origin by checking the 'userIdentity.type' and 'userIdentity.invokedBy' fields.
- Check the IP address and user agent in the 'sourceIPAddress' and 'userAgent' fields to verify whether the request originated from a trusted source.
- Check the role name and policy document in the 'requestParameters' section to verify what permission was granted:
  - Check the 'roleName' field to verify the name of the role that was created.
- Check the 'assumeRolePolicyDocument' field to review the permissions that were granted to the role.
- Check for suspicious activity and malicious behavior:
  - Look for any suspicious activity from the user or IP address that could indicate malicious intent, such as creating multiple roles with similar names or granting permissions beyond what is necessary.
- Check for any malicious behavior from the user or IP address, such as granting excessive permissions to a role or creating multiple roles with suspicious names.

Once the plurality of notifications (e.g., initial notification 298 and additional notification 316) of a security event are summarized (as shown above), threat mitigation process 10 may process 2206 at least a portion of each of the plurality of event summaries (illustrated above) using the Generative AI model (e.g., generative AI model 302) and the above-described formatting script (e.g., formatting script 304) to summarize the plurality of event summaries and generate a summarized human-readable report (e.g., summarized human-readable report 306).

Below is an example of such a summarized human-readable report (e.g., summarized human-readable report 306) for EVENTS 1-2:

Summary

1. On Jan. 24, 2023 at 16:52:58Z, a role was created with the name us-east-1_F4tKzs0rl by user gibtsdofthov@uvfobn1fk303.com with the IP address amplifybackend.amazonaws.com.
2. At 16:53:14 on 2023-01-24, the user with accessKeyld 'ASIA5BV3CPSAPAFTJIUG' and assumed role AROA5BV3CPSALNLBYZTE6 attempted to PutRolePolicy for a role called 'us-east-1_G8tKzs0rl_Manage-only' from the source IP Address 'amplifybackend.amazonaws.com'.

Impact on the Organization:
- The events indicate that a user is attempting to modify a role in the AWS IAM service, which could potentially grant additional privileges to the user and associated IP address. This could lead to unauthorized access to sensitive resources or data, or privilege escalation, resulting in financial loss or other damage to the organization.

Relevant Artifacts:
- User: gbtsdo6thqv@uvf0bn1fk303.com
- Access Key ID: ASIA5B4444444FTJIUG
- Assumed Role: AYEDVBV3CPSALNLBYZTE6
- IP Address: amplifybackend.amazonaws.com
- Role Name: us-east-1_G8tKzs0rl-authRole and us-east-1_G8tKzs0rl-only
- Account ID: 896966753408
- Location of External IP: Unknown Potential Security Threats Indicated by Events:
- The events indicate that a user is attempting to modify a role in the AWS IAM service, which could potentially grant additional privileges to the user and associated IP address. This could lead to unauthorized access to sensitive resources or data, or privilege escalation, resulting in financial loss or other damage to the organization.

Indicators of Compromise (IOCs):
- User identity associated with accessKeyId 'ASIA5B4444444FTJIUG'
- Policy document attempted to be applied to role
- IP address amplifybackend.amazonaws.com
- Unusually high API usage or unsuccessful authentication attempts from user or IP address
- Attempts to access sensitive data or modifications to existing policies from user or IP address Legitimate Activity Contributing to False Positives:
- Creation of a new role for a legitimate user
- Creation of a new role for an application
- Creation of a new role for an automated process
- Updating the policy on an existing role to allow access to certain resources
- Modifying an existing user's permissions
- Creating new users or groups
- Modifying existing groups or users Next Steps for Further Investigation:
- Review the user identity associated with the event and look for suspicious activity that may be associated with the user.
- Check for any changes in the IAM role that was created to ensure that it does not provide more access than intended.
- Verify that the IP address associated with the event is a trusted source and that no suspicious activity has been observed from that IP in the past.
- Look for any other events associated with the user or IP address that may indicate malicious or suspicious activity.
- Confirm the identity of the user associated with the accessKeyId 'ASIA5B4444444FTJIUG' by checking the IAM user records.
- Analyze the policy document to ensure that the new policy does not grant more access than is necessary for the role.
- Investigate any suspicious activity that could be associated with the user, such as unusually high API usage or unsuccessful authentication attempts.
- Investigate any malicious activity that could be associated with the user, such as attempts to access sensitive data or modifications to existing policies.

Recommend Actions:
- Selective shutdown/suspension of user account(s).
- Selective shutdown of impacted ports.
- Selective shutdown of suspicious streams.
- Quarantining of inbound file(s).

As discussed above, threat mitigation process 10 may present 2208 the (above-illustrated) summarized human-readable report (e.g., summarized human-readable report 306) to a user (e.g., analyst 256) and may prompt 2210 the user (e.g., analyst 256) to provide feedback concerning the (above-illustrated) summarized human-readable report (e.g., summarized human-readable report 306).

Threat mitigation process 10 may receive 2212 feedback concerning the (above-illustrated) summarized human-readable report (e.g., summarized human-readable report 306) from a user (e.g., analyst 256) and may utilize 2214 the feedback to revise the above-described formatting script (e.g., formatting script 304) so that the (above-illustrated) summarized human-readable report (e.g., summarized human-readable report 306) may be tailored based upon such feedback.

Auto-Execution of Recommended Next Steps

Figure 38:
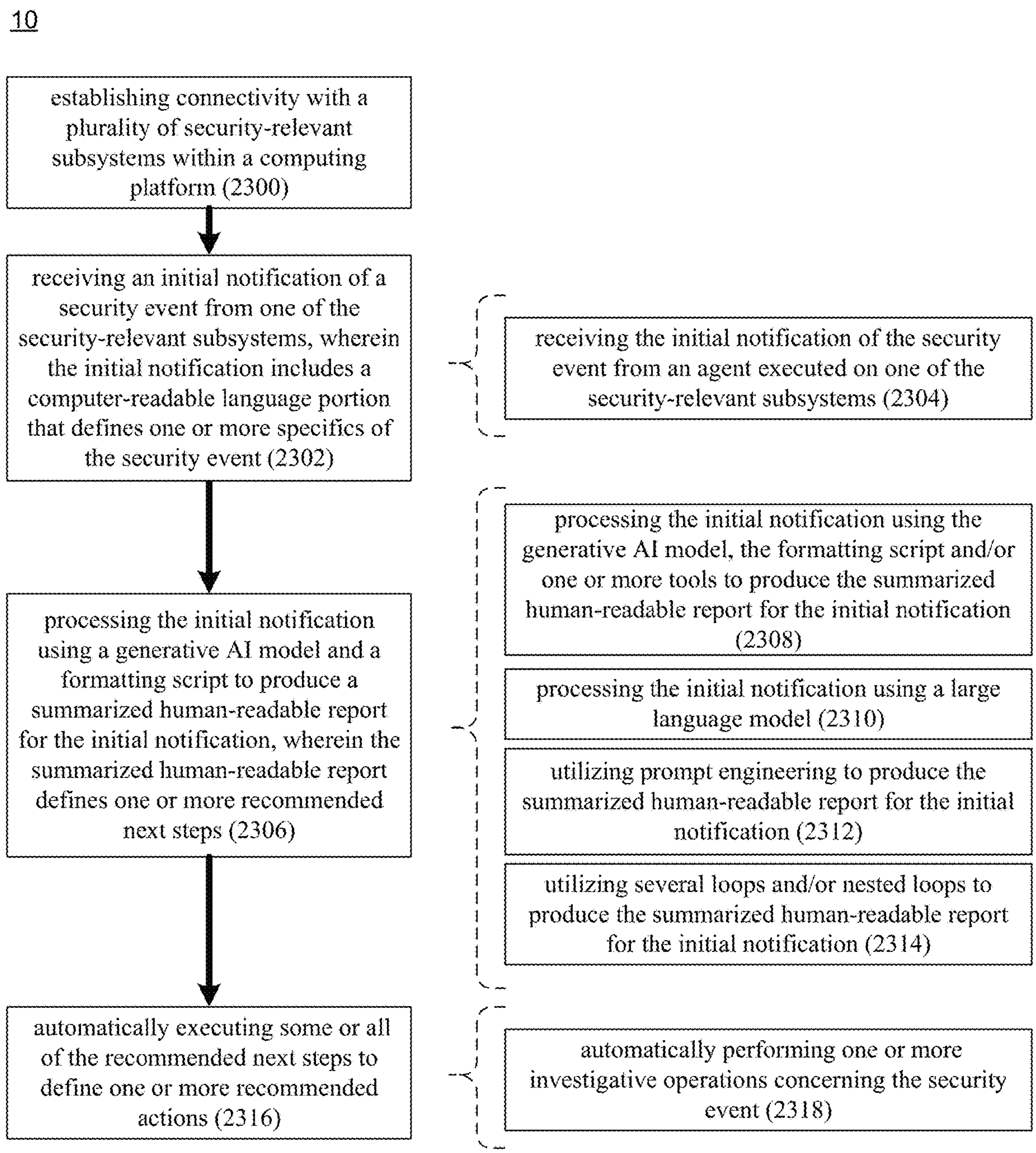
FIG. 38 is a flowchart of another implementation of the threat mitigation process of FIG. 1 according to an embodiment of the present disclosure.

Referring also to FIG. 38 and as discussed above, threat mitigation process 10 may establish 2300 connectivity with a plurality of security-relevant subsystems (e.g., security-relevant subsystems 226) within a computing platform (e.g., computing platform 60).

As discussed above, establishing connectivity between security-relevant subsystems (e.g., security-relevant subsystems 226) may require a multifaceted approach that encompasses network configuration, secure communication protocols, authentication, authorization mechanisms, and centralized management.

As discussed above, examples of security-relevant subsystems 226 may include but are not limited to: CDN (i.e., Content Delivery Network) systems; DAM (i.e., Database Activity Monitoring) systems; UBA (i.e., User Behavior Analytics) systems; MDM (i.e., Mobile Device Management) systems; IAM (i.e., Identity and Access Management) systems; DNS (i.e., Domain Name Server) systems, antivirus systems, operating systems, data lakes; data logs; security-relevant software applications; security-relevant hardware systems; and resources external to the computing platform.

Threat mitigation process 10 may receive 2302 an initial notification (e.g., initial notification 298) of a security event from one of the security-relevant subsystems (e.g., security-relevant subsystems 226), wherein the initial notification (e.g., initial notification 298) includes a computer-readable language portion that defines one or more specifics of the security event. As discussed above, examples of such security events may include but are not limited to access auditing; anomalies; authentication; denial of services; exploitation; malware; phishing; spamming; reconnaissance; and/or web attack within a monitored computing platform (e.g., computing platform 60). An example of the computer-readable language portion (e.g., within the notification of the security event) may include but is not limited to a JSON portion.

When receiving 2302 an initial notification (e.g., initial notification 298) of a security event from one of the security-relevant subsystems (e.g., security-relevant subsystems 226), threat mitigation process 10 may receive 2304 the initial notification (e.g., initial notification 298) of the security event from an agent (e.g., agent 300) executed on one of the security-relevant subsystems (e.g., security-relevant subsystems 226).

As discussed above, an agent (e.g., agent 300) may refer to a software component that plays a crucial role in monitoring, detecting, and reporting potential security threats or malicious activities within a computing platform (e.g., computing platform 60). These agents (e.g., agent 300) may be deployed across various parts of a computing platform (e.g., computing platform 60) to ensure comprehensive surveillance and protection.

Threat mitigation process 10 may process 2306 the initial notification (e.g., initial notification 298) using a generative AI model (e.g., generative AI model 302) and a formatting script (e.g., formatting script 304) to produce a summarized human-readable report (e.g., summarized human-readable report 306) for the initial notification (e.g., initial notification 298), wherein the summarized human-readable report (e.g., summarized human-readable report 306) defines one or more recommended next steps.

With respect to the (above-illustrated) summarized human-readable report (e.g., summarized human-readable report 306), examples of one or more recommended next steps defined therein are as follows:

Next Steps for Further Investigation:

- Review the user identity associated with the event and look for suspicious activity that may be associated with the user.
- Check for any changes in the IAM role that was created to ensure that it does not provide more access than intended.
- Verify that the IP address associated with the event is a trusted source and that no suspicious activity has been observed from that IP in the past.
- Look for any other events associated with the user or IP address that may indicate malicious or suspicious activity.
- Confirm the identity of the user associated with the accessKeyId 'ASIA5B4444444FTJIUG' by checking the IAM user records.
- Analyze the policy document to ensure that the new policy does not grant more access than is necessary for the role.
- Investigate any suspicious activity that could be associated with the user, such as unusually high API usage or unsuccessful authentication attempts.
- Investigate any malicious activity that could be associated with the user, such as attempts to access sensitive data or modifications to existing policies.

When processing 2306 the initial notification (e.g., initial notification 298) using a generative AI model (e.g., generative AI model 302) and a formatting script (e.g., formatting script 304) to produce a summarized human-readable report (e.g., summarized human-readable report 306) for the initial notification (e.g., initial notification 298), threat mitigation process 10 may process 2308 the initial notification (e.g., initial notification 298) using the generative AI model (e.g., generative AI model 302), the formatting script (e.g., formatting script 304) and/or one or more tools (e.g., tools 310) to produce the summarized human-readable report (e.g., summarized human-readable report 306) for the initial notification (e.g., initial notification 298).

As discussed above, the one or more tools (e.g., tools 310) includes one or more of: a decoding tool to decode an encoded initial notification (e.g., initial notification 298); a decompression tool to decompress a compressed initial notification (e.g., initial notification 298); and an identification tool to identify an owner of a domain associated with the initial notification (e.g., initial notification 298).

When processing 2306 the initial notification (e.g., initial notification 298) using a generative AI model (e.g., generative AI model 302) and a formatting script (e.g., formatting script 304) to produce a summarized human-readable report (e.g., summarized human-readable report 306) for the initial notification (e.g., initial notification 298), threat mitigation process 10 may process 2310 the initial notification (e.g., initial notification 298) using a large language model (e.g., large language model 308).

As discussed above, a large language model (e.g., large language model 308) is an advanced artificial intelligence system designed to understand and generate human-like text, which is trained on vast amounts of text data, learning patterns and structures of language. These LLMs can perform various natural language processing tasks, such as answering questions, generating text, translating languages, and more. LLMs work by processing input text, analyzing it, and generating appropriate responses based on learned patterns and context.

When processing 2306 the initial notification (e.g., initial notification 298) using a generative AI model (e.g., generative AI model 302) and a formatting script (e.g., formatting script 304) to produce a summarized human-readable report (e.g., summarized human-readable report 306) for the initial notification (e.g., initial notification 298), threat mitigation process 10 may utilize 2312 prompt engineering to produce the summarized human-readable report (e.g., summarized human-readable report 306) for the initial notification (e.g., initial notification 298).

As discussed above, prompt engineering is an essential aspect of working with large language models (e.g., large language model 308), as it provides a way to guide the AI model's responses and ensure that they are accurate, relevant, and appropriate for the intended application.

When processing 2306 the initial notification (e.g., initial notification 298) using a generative AI model (e.g., generative AI model 302) and a formatting script (e.g., formatting script 304) to produce a summarized human-readable report (e.g., summarized human-readable report 306) for the initial notification (e.g., initial notification 298), threat mitigation process 10 may utilize 2314 several loops and/or nested loops to produce the summarized human-readable report (e.g., summarized human-readable report 306) for the initial notification (e.g., initial notification 298).

As discussed above, in the intricate process of investigating security events on a computing platform (e.g., computing platform 60), the strategic application of loops and nested loops within an iterative AI process (e.g., generative AI model 302) proves to be immensely beneficial. These programming constructs allow for the automation of repetitive tasks, crucial in the analysis of vast volumes of network traffic data for potential security threats. A loop facilitates the sequential examination of collected data, enabling the AI system to methodically identify unusual patterns or signatures indicative of malicious activities. The complexity of network security investigations is further addressed through the implementation of nested loops, where a loop is embedded within another, thereby allowing for multi-layered analysis.

Threat mitigation process 10 may automatically execute 2316 some or all of the recommended next steps to define one or more recommended actions. Further and when automatically executing 2316 some or all of the recommended next steps to define one or more recommended actions, threat mitigation process 10 may automatically perform 2318 one or more investigative operations concerning the security event.

As discussed above and with respect to the (above-illustrated) summarized human-readable report (e.g., summarized human-readable report 306), examples of one or more recommended next steps defined therein are as follows:

Next Steps for Further Investigation:

- Review the user identity associated with the event and look for suspicious activity that may be associated with the user.
- Check for any changes in the IAM role that was created to ensure that it does not provide more access than intended.
- Verify that the IP address associated with the event is a trusted source and that no suspicious activity has been observed from that IP in the past.

Look for any other events associated with the user or IP address that may indicate malicious or suspicious activity.

Confirm the identity of the user associated with the accessKeyId 'ASIA5B4444444FTJIUG' by checking the IAM user records.

Analyze the policy document to ensure that the new policy does not grant more access than is necessary for the role.

Investigate any suspicious activity that could be associated with the user, such as unusually high API usage or unsuccessful authentication attempts.

Investigate any malicious activity that could be associated with the user, such as attempts to access sensitive data or modifications to existing policies.

Accordingly, threat mitigation process 10 may automatically execute 2316 some or all of these recommended next steps to define one or more recommended actions. For example, threat mitigation process 10 may automatically execute 2316 this recommended next step:

Review the user identity associated with the event and look for suspicious activity that may be associated with the user Upon executing 2316 this recommended next step, threat mitigation process 10 may determine that User X is acting in a very suspicious manner. Accordingly, threat mitigation process 10 may automatically perform 2318 one or more investigative operations concerning User X with respect to the security event. For example, threat mitigation process 10 may automatically perform 2318 one or more investigative operations concerning the network usage of User X, the background of User X, the web browsing history of User X, etc. All of this research and investigation may result in threat mitigation process 10 defining the recommended action of disabling all accounts of User X.

Auto-Execution of Recommended Actions

Figure 39:
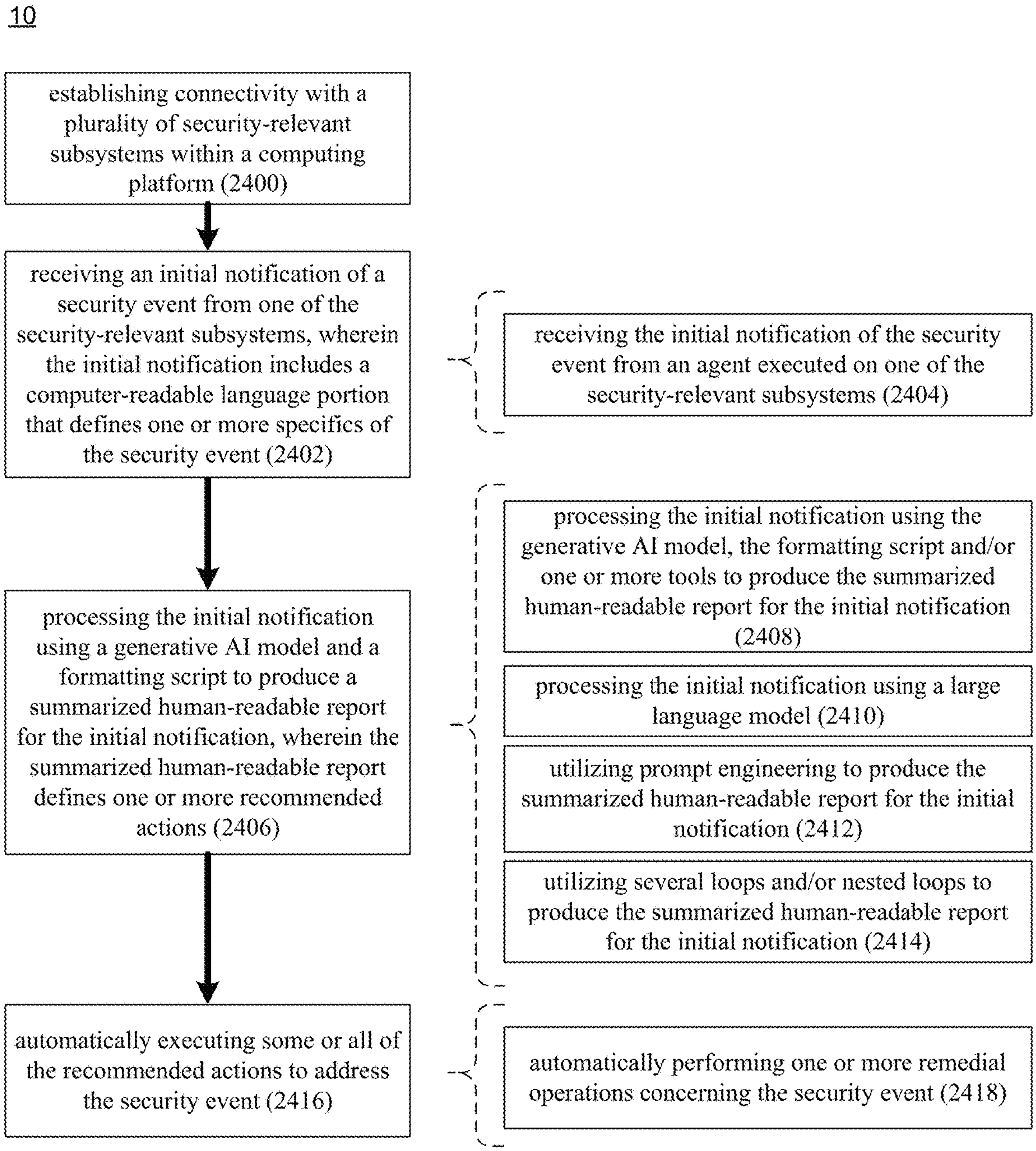
FIG. 39 is a flowchart of another implementation of the threat mitigation process of FIG. 1 according to an embodiment of the present disclosure.

Referring also to FIG. 39, threat mitigation process 10 may establish 2400 connectivity with a plurality of security-relevant subsystems (e.g., security-relevant subsystems 226) within a computing platform (e.g., computing platform 60).

As discussed above, establishing connectivity between security-relevant subsystems (e.g., security-relevant subsystems 226) may require a multifaceted approach that encompasses network configuration, secure communication protocols, authentication, authorization mechanisms, and centralized management.

As discussed above, examples of security-relevant subsystems 226 may include but are not limited to: CDN (i.e., Content Delivery Network) systems; DAM (i.e., Database Activity Monitoring) systems; UBA (i.e., User Behavior Analytics) systems; MDM (i.e., Mobile Device Management) systems; IAM (i.e., Identity and Access Management) systems; DNS (i.e., Domain Name Server) systems, antivirus systems, operating systems, data lakes; data logs; security-relevant software applications; security-relevant hardware systems; and resources external to the computing platform.

Threat mitigation process 10 may receive 2402 an initial notification (e.g., initial notification 298) of a security event from one of the security-relevant subsystems (e.g., security-relevant subsystems 226), wherein the initial notification (e.g., initial notification 298) includes a computer-readable language portion that defines one or more specifics of the security event. As discussed above, examples of such security events may include but are not limited to access auditing; anomalies; authentication; denial of services; exploitation; malware; phishing; spamming; reconnaissance; and/or web attack within a monitored computing platform (e.g., computing platform 60). An example of the computer-readable language portion (e.g., within the notification of the security event) may include but is not limited to a JSON portion.

When receiving 2402 an initial notification (e.g., initial notification 298) of a security event from one of the security-relevant subsystems (e.g., security-relevant subsystems 226), threat mitigation process 10 may receive 2404 the initial notification (e.g., initial notification 298) of the security event from an agent (e.g., agent 300) executed on one of the security-relevant subsystems (e.g., security-relevant subsystems 226).

As discussed above, an agent (e.g., agent 300) may refer to a software component that plays a crucial role in monitoring, detecting, and reporting potential security threats or malicious activities within a computing platform (e.g., computing platform 60). These agents (e.g., agent 300) may be deployed across various parts of a computing platform (e.g., computing platform 60) to ensure comprehensive surveillance and protection.

Threat mitigation process 10 may process 2406 the initial notification (e.g., initial notification 298) using a generative AI model (e.g., generative AI model 302) and a formatting script (e.g., formatting script 304) to produce a summarized human-readable report (e.g., summarized human-readable report 306) for the initial notification (e.g., initial notification 298), wherein the summarized human-readable report (e.g., summarized human-readable report 306) defines one or more recommended actions.

With respect to the (above-illustrated) summarized human-readable report (e.g., summarized human-readable report 306), examples of one or more recommended actions defined therein are as follows:

Recommend Actions:

- Selective shutdown/suspension of user account(s).
- Selective shutdown of impacted port(s).
- Selective shutdown of suspicious stream(s).
- Quarantining of inbound file(s).

When processing 2406 the initial notification (e.g., initial notification 298) using a generative AI model (e.g., generative AI model 302) and a formatting script (e.g., formatting script 304) to produce a summarized human-readable report (e.g., summarized human-readable report 306) for the initial notification (e.g., initial notification 298), threat mitigation process 10 may process 2408 the initial notification (e.g., initial notification 298) using the generative AI model (e.g., generative AI model 302), the formatting script (e.g., formatting script 304) and/or one or more tools (e.g., tools 310) to produce the summarized human-readable report (e.g., summarized human-readable report 306) for the initial notification (e.g., initial notification 298).

As discussed above, the one or more tools (e.g., tools 310) includes one or more of: a decoding tool to decode an encoded initial notification (e.g., initial notification 298); a decompression tool to decompress a compressed initial notification (e.g., initial notification 298); and an identification tool to identify an owner of a domain associated with the initial notification (e.g., initial notification 298).

When processing 2406 the initial notification (e.g., initial notification 298) using a generative AI model (e.g., generative AI model 302) and a formatting script (e.g., formatting script 304) to produce a summarized human-readable report (e.g., summarized human-readable report 306) for the initial notification (e.g., initial notification 298), threat mitigation process 10 may process 2410 the initial notification (e.g., initial notification 298) using a large language model (e.g., large language model 308).

As discussed above, a large language model (e.g., large language model 308) is an advanced artificial intelligence system designed to understand and generate human-like text, which is trained on vast amounts of text data, learning patterns and structures of language. These LLMs can perform various natural language processing tasks, such as answering questions, generating text, translating languages, and more. LLMs work by processing input text, analyzing it, and generating appropriate responses based on learned patterns and context.

When processing 2406 the initial notification (e.g., initial notification 298) using a generative AI model (e.g., generative AI model 302) and a formatting script (e.g., formatting script 304) to produce a summarized human-readable report (e.g., summarized human-readable report 306) for the initial notification (e.g., initial notification 298), threat mitigation process 10 may utilize 2412 prompt engineering to produce the summarized human-readable report (e.g., summarized human-readable report 306) for the initial notification (e.g., initial notification 298).

As discussed above, prompt engineering is an essential aspect of working with large language models (e.g., large language model 308), as it provides a way to guide the AI model's responses and ensure that they are accurate, relevant, and appropriate for the intended application.

When processing 2406 the initial notification (e.g., initial notification 298) using a generative AI model (e.g., generative AI model 302) and a formatting script (e.g., formatting script 304) to produce a summarized human-readable report (e.g., summarized human-readable report 306) for the initial notification (e.g., initial notification 298), threat mitigation process 10 may utilize 2414 several loops and/or nested loops to produce the summarized human-readable report (e.g., summarized human-readable report 306) for the initial notification (e.g., initial notification 298).

As discussed above, in the intricate process of investigating security events on a computing platform (e.g., computing platform 60), the strategic application of loops and nested loops within an iterative AI process (e.g., generative AI model 302) proves to be immensely beneficial. These programming constructs allow for the automation of repetitive tasks, crucial in the analysis of vast volumes of network traffic data for potential security threats. A loop facilitates the sequential examination of collected data, enabling the AI system to methodically identify unusual patterns or signatures indicative of malicious activities. The complexity of network security investigations is further addressed through the implementation of nested loops, where a loop is embedded within another, thereby allowing for multi-layered analysis.

Threat mitigation process 10 may automatically execute 2416 some or all of the recommended actions to address the security event. Further and when automatically executing 2416 some or all of the recommended actions, threat mitigation process 10 may automatically perform 2418 one or more remedial operations concerning the security event.

As discussed above and with respect to the (above-illustrated) summarized human-readable report (e.g., summarized human-readable report 306), examples of one or more recommended actions defined therein are as follows:

Recommend Actions:

- Selective shutdown/suspension of user account(s).
- Selective shutdown of impacted port(s).
- Selective shutdown of suspicious stream(s).
- Quarantining of inbound file(s).

Accordingly, threat mitigation process 10 may automatically execute 2416 some or all of these recommended actions to address the security event. For example, threat mitigation process 10 may automatically execute 2416 this recommended action:

Selective shutdown of impacted port

Upon executing 2416 this recommended action, threat mitigation process 10 may shut down Port A which is receiving data from BlackHat.RU and may shut down Port B which is providing data to BadActor.RU. Further, threat mitigation process 10 may automatically perform 2418 one or more remedial operations concerning the security event. For example, threat mitigation process 10 may automatically delete/quarantine any data that was received on Port A from BlackHat.RU.

Model Registry

Figure 40:
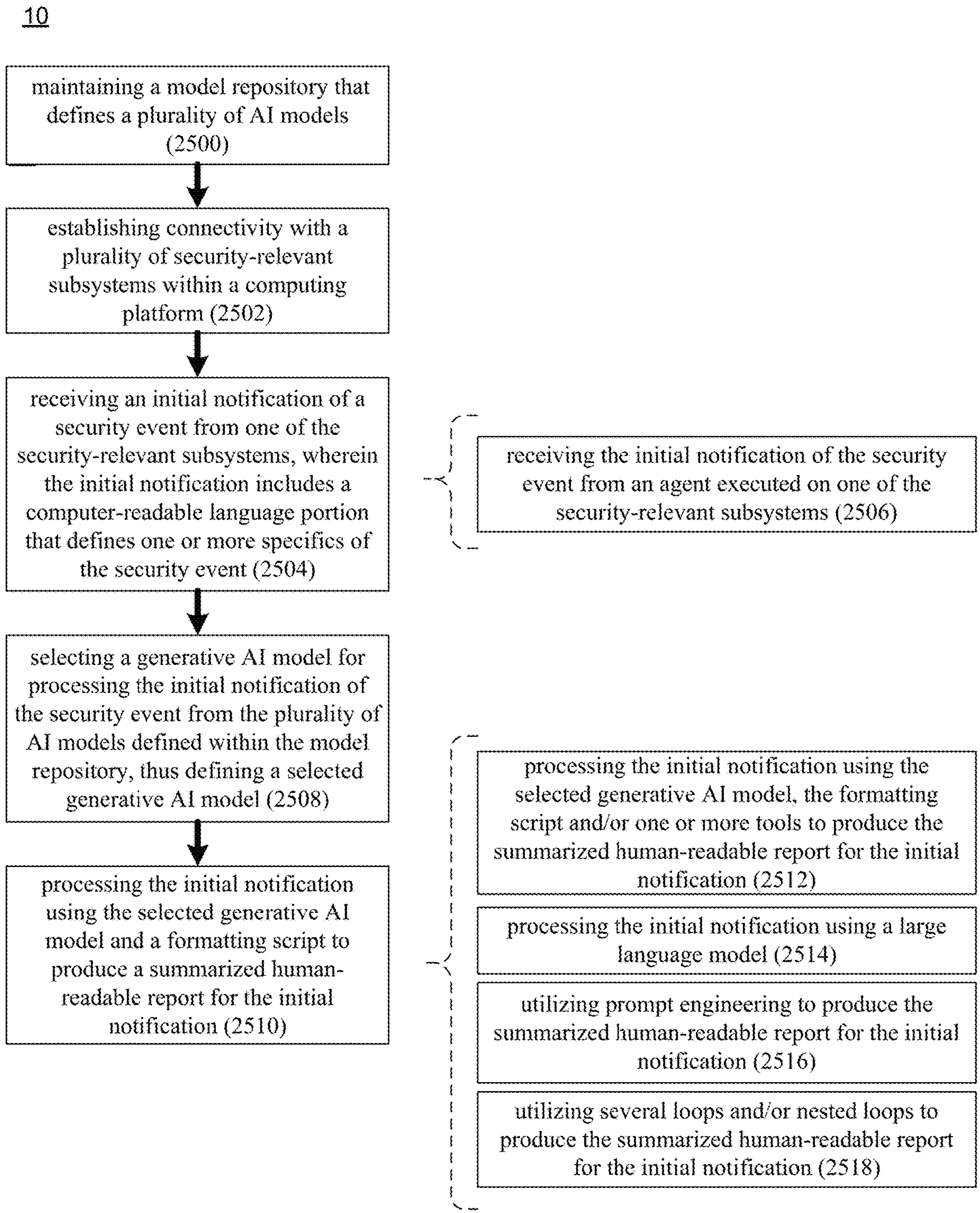
FIG. 40 is a flowchart of another implementation of the threat mitigation process of FIG. 1 according to an embodiment of the present disclosure.

Referring also to FIG. 40, threat mitigation process 10 may maintain 2500 a model repository (e.g., model repository 318) that defines a plurality of AI models (e.g., plurality of AI models 320).

Maintaining 2500 a model repository (e.g., model repository 318) for use by threat mitigation process 10 may involve several activities centered around the creation, storage, management, and updating of AI models that are designed to identify and respond to suspicious or malicious activities within a computing platform (e.g., computing platform 60). Generally speaking, Network Intrusion Detection Systems equipped with AI capabilities can significantly improve the detection of complex and evolving cyber threats. Here's what maintaining such a repository generally entails:

Maintaining 2500 such a model repository (e.g., model repository 318) may include various different functionalities, examples of which may include but are not limited to:

- Model Development and Training: Initially, AI models are developed and trained using historical data, which includes both normal network behavior and various types of intrusions or attacks. This phase involves feature selection, choosing appropriate machine learning algorithms, and training models to recognize patterns indicative of potential security breaches.
- Model Validation and Testing: Before deployment, models are validated and tested to ensure they accurately detect intrusions while minimizing false positives and false negatives. This step might involve using separate datasets not seen by the model during the training phase to evaluate performance.
- Repository Storage: The repository (e.g., model repository 318) acts as a centralized library where these AI models are stored. It includes not only the models themselves but also metadata about the models, such as their type (e.g., decision trees, neural networks), performance metrics, intended use cases (e.g., detecting DDOS attacks, malware), and information on training datasets.
- Version Control: Similar to software development practices, maintaining a version control system for the AI models is crucial. This ensures that updates, improvements, and changes to the models are systematically managed, allowing for the rollback to previous versions if needed.
- Model Deployment: Models may be deployed into the operational environment of the NIDS so they can start analyzing network traffic and identifying potential threats. This might involve integrating models into existing NIDS frameworks or updating NIDS components to accommodate new AI capabilities.

- Monitoring and Updating: Cyber threats are constantly evolving; therefore, AI models require continuous monitoring and retraining to stay effective. This includes updating models with new data reflecting the latest threat patterns and re-deploying them. The repository (e.g., model repository 318) must support these iterative cycles of retraining and updating.
- Access Control and Security: Given the sensitivity of the models and the data they process, maintaining proper access control and security measures for the repository (e.g., model repository 318) is paramount. This ensures that only authorized personnel can access, modify, or deploy models.
- Compliance and Documentation: Ensuring that the repository (e.g., model repository 318) and its models comply with relevant regulations and standards, and maintaining thorough documentation for each model may be of paramount importance. This documentation should cover the model's purpose, performance characteristics, training data sources, and any limitations or biases.

By maintaining 2500 an AI model repository (e.g., model repository 318) for a Network Intrusion Detection System, organizations can systematically manage the lifecycle of AI models (e.g., plurality of AI models 320), from development to deployment, ensuring that their NIDS remains effective against the continuously changing landscape of network threats.

Threat mitigation process 10 may establish 2502 connectivity with a plurality of security-relevant subsystems (e.g., security-relevant subsystems 226) within a computing platform (e.g., computing platform 60).

As discussed above, establishing connectivity between security-relevant subsystems (e.g., security-relevant subsystems 226) may require a multifaceted approach that encompasses network configuration, secure communication protocols, authentication, authorization mechanisms, and centralized management.

Threat mitigation process 10 may receive 2504 an initial notification (e.g., initial notification 298) of a security event from one of the security-relevant subsystems (e.g., security-relevant subsystems 226), wherein the initial notification (e.g., initial notification 298) includes a computer-readable language portion that defines one or more specifics of the security event. As discussed above, examples of such security events may include but are not limited to access auditing; anomalies; authentication; denial of services; exploitation; malware; phishing; spamming; reconnaissance; and/or web attack within a monitored computing platform (e.g., computing platform 60). An example of the computer-readable language portion (e.g., within the notification of the security event) may include but is not limited to a JSON portion.

When receiving 2504 an initial notification (e.g., initial notification 298) of a security event from one of the security-relevant subsystems (e.g., security-relevant subsystems 226), threat mitigation process 10 may receive 2506 the initial notification (e.g., initial notification 298) of the security event from an agent (e.g., agent 300) executed on one of the security-relevant subsystems (e.g., security-relevant subsystems 226).

As discussed above, an agent (e.g., agent 300) may refer to a software component that plays a crucial role in monitoring, detecting, and reporting potential security threats or malicious activities within a computing platform (e.g., computing platform 60). These agents (e.g., agent 300) may be deployed across various parts of a computing platform (e.g., computing platform 60) to ensure comprehensive surveillance and protection.

Threat mitigation process 10 may select 2508 a generative AI model (e.g., generative AI model 302) for processing the initial notification (e.g., initial notification 298) of the security event from the plurality of AI models (e.g., plurality of AI models 320) defined within the model repository (e.g., model repository 318), thus defining a selected generative AI model (e.g., generative AI model 302).

Examples of the plurality of AI models (e.g., plurality of AI models 320) defined within the model repository (e.g., model repository 318) may include but are not limited to:

- BERT (Bidirectional Encoder Representations from Transformers): Developed by Google, BERT is a powerful natural language processing model that has been influential in various NLP tasks, including question answering and sentiment analysis.
- OpenAI's GPT (Generative Pre-trained Transformer) Series: This includes GPT-2, GPT-3, GPT-4 and potentially future iterations. These models are developed by OpenAI and are known for their ability to generate human-like text across a wide range of topics.
- XLNet: Developed by Google, XLNet is a generalized autoregressive pretraining method that outperforms BERT on several NLP benchmarks.
- T5 (Text-to-Text Transfer Transformer): Also developed by Google, T5 is a versatile model capable of performing various NLP tasks by converting all tasks into a text-to-text format.
- BERT-based models from Hugging Face: Hugging Face provides pre-trained BERT-based models like ROBERTa, DistilBERT, and BERTweet, which are widely used in the NLP community.
- Microsoft's Turing Natural Language Generation (T-NLG): T-NLG is a large-scale AI language model developed by Microsoft Research, which competes in the domain of natural language generation and understanding.
- Facebook's ROBERTa (Robustly optimized BERT approach): ROBERTa is an optimized BERT model developed by Facebook AI Research, which achieves better performance on various NLP benchmarks.
- Tencent's ERNIE (Enhanced Representation through kNowledge Integration): ERNIE is a knowledge-enhanced language representation model developed by Tencent AI Lab, which integrates external knowledge for better understanding.
- Fast.ai's ULMFIT (Universal Language Model Fine-Tuning): ULMFIT is a transfer learning method developed by Fast.ai, which enables easy fine-tuning of pre-trained language models for specific tasks with limited data.
- Salesforce's CTRL (Conditional Transformer Language Model): CTRL is a large-scale autoregressive language model developed by Salesforce Research, which allows users to control the topic of the generated text.

The plurality of AI models (e.g., plurality of AI models 320) defined within the model repository (e.g., model repository 318) may include multiple versions of the same model (e.g., ChatGPT 3.0 versus ChatGPT 3.5 versus ChatGPT 4.0) . . . wherein such different versions provide different levels of performance/operating cost.

Accordingly, the plurality of AI models (e.g., plurality of AI models 320) defined within the model repository (e.g., model repository 318) may offer e.g., different features, operate on different cost structures or perform certain operations more efficiently. Therefore, threat mitigation process 10 may select 2508 a generative AI model (e.g., generative AI model 302) from the plurality of AI models (e.g., plurality of AI models 320) defined within the model repository (e.g., model repository 318) based upon operation requirements. For example, Model A may be very fast and quite expensive to operate. However, it may be very skilled at generating synthetic speech. Accordingly, threat mitigation process 10 may select 2508 Model A when realistic synthetic speech is needed. Conversely, Model B may be slower and less expensive to operate. But it may be really good at translating text between languages. Accordingly, threat mitigation process 10 may select 2508 Model B when translations are needed at a more leisurely pace.

Threat mitigation process 10 may process 2510 the initial notification (e.g., initial notification 298) using the selected generative AI model (e.g., generative AI model 302) and a formatting script (e.g., formatting script 304) to produce a summarized human-readable report (e.g., summarized human-readable report 306) for the initial notification (e.g., initial notification 298).

When processing 2510 the initial notification (e.g., initial notification 298) using the selected generative AI model (e.g., generative AI model 302) and a formatting script (e.g., formatting script 304) to produce a summarized human-readable report (e.g., summarized human-readable report 306) for the initial notification (e.g., initial notification 298), threat mitigation process 10 may process 2512 the initial notification (e.g., initial notification 298) using the selected generative AI model (e.g., generative AI model 302), the formatting script (e.g., formatting script 304) and/or one or more tools (e.g., tools 310) to produce the summarized human-readable report (e.g., summarized human-readable report 306) for the initial notification (e.g., initial notification 298).

As discussed above, the one or more tools (e.g., tools 310) includes one or more of: a decoding tool to decode an encoded initial notification (e.g., initial notification 298); a decompression tool to decompress a compressed initial notification (e.g., initial notification 298); and an identification tool to identify an owner of a domain associated with the initial notification (e.g., initial notification 298).

When processing 2510 the initial notification (e.g., initial notification 298) using the selected generative AI model (e.g., generative AI model 302) and a formatting script (e.g., formatting script 304) to produce a summarized human-readable report (e.g., summarized human-readable report 306) for the initial notification (e.g., initial notification 298), threat mitigation process 10 may process 2514 the initial notification (e.g., initial notification 298) using a large language model (e.g., large language model 308).

As discussed above, a large language model (e.g., large language model 308) is an advanced artificial intelligence system designed to understand and generate human-like text, which is trained on vast amounts of text data, learning patterns and structures of language. These LLMs can perform various natural language processing tasks, such as answering questions, generating text, translating languages, and more. LLMs work by processing input text, analyzing it, and generating appropriate responses based on learned patterns and context.

When processing 2510 the initial notification (e.g., initial notification 298) using the selected generative AI model (e.g., generative AI model 302) and a formatting script (e.g., formatting script 304) to produce a summarized human-readable report (e.g., summarized human-readable report 306) for the initial notification (e.g., initial notification 298), threat mitigation process 10 may utilize 2516 prompt engineering to produce the summarized human-readable report (e.g., summarized human-readable report 306) for the initial notification (e.g., initial notification 298).

As discussed above, prompt engineering is an essential aspect of working with large language models (e.g., large language model 308), as it provides a way to guide the AI model's responses and ensure that they are accurate, relevant, and appropriate for the intended application.

When processing 2510 the initial notification (e.g., initial notification 298) using the selected generative AI model (e.g., generative AI model 302) and a formatting script (e.g., formatting script 304) to produce a summarized human-readable report (e.g., summarized human-readable report 306) for the initial notification (e.g., initial notification 298), threat mitigation process 10 may utilize 2518 several loops and/or nested loops to produce the summarized human-readable report (e.g., summarized human-readable report 306) for the initial notification (e.g., initial notification 298).

As discussed above, in the intricate process of investigating security events on a computing platform (e.g., computing platform 60), the strategic application of loops and nested loops within an iterative AI process (e.g., generative AI model 302) proves to be immensely beneficial. These programming constructs allow for the automation of repetitive tasks, crucial in the analysis of vast volumes of network traffic data for potential security threats. A loop facilitates the sequential examination of collected data, enabling the AI system to methodically identify unusual patterns or signatures indicative of malicious activities. The complexity of network security investigations is further addressed through the implementation of nested loops, where a loop is embedded within another, thereby allowing for multi-layered analysis.

Dynamic Decision Making

Figure 41:
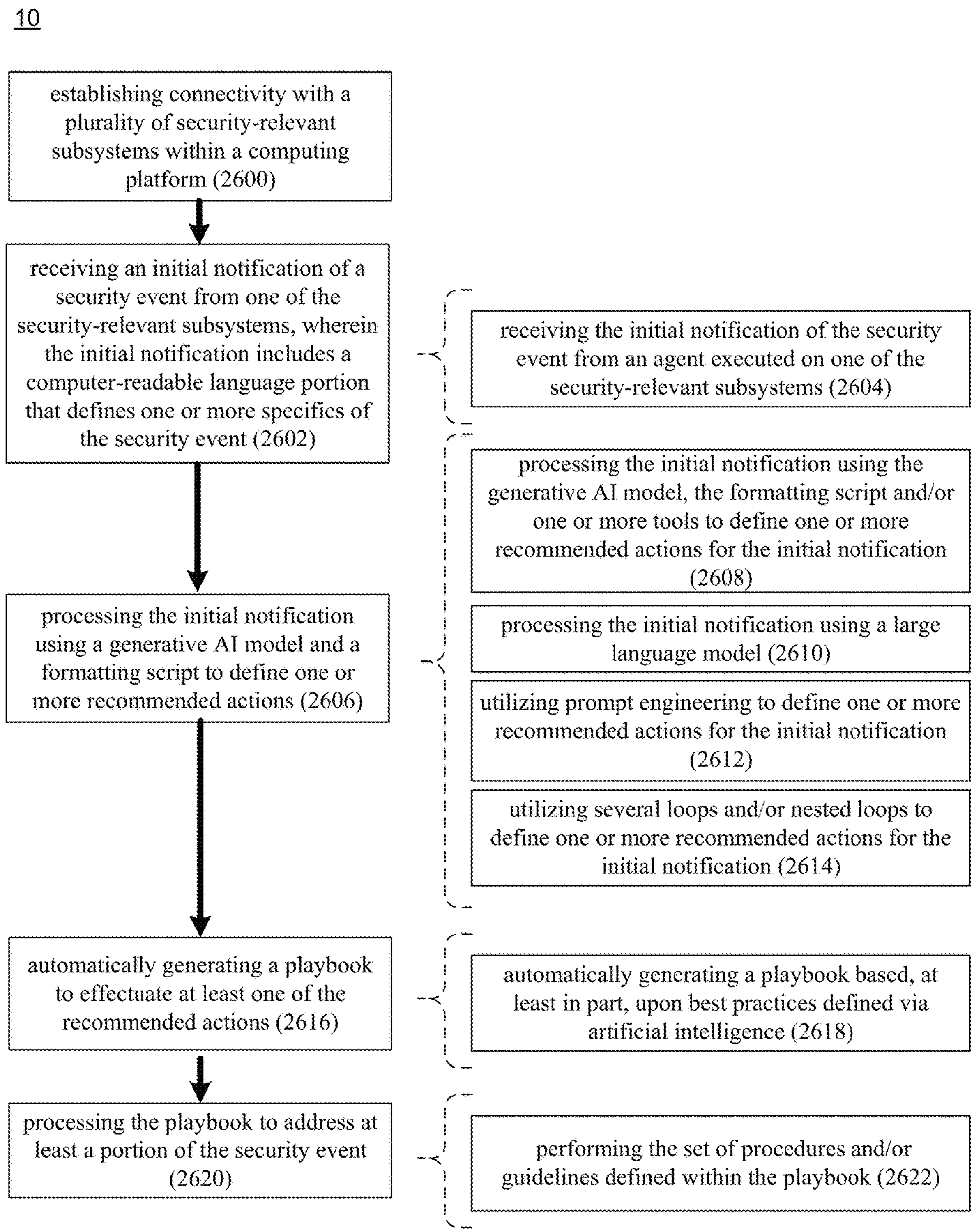
FIG. 41 is a flowchart of another implementation of the threat mitigation process of FIG. 1 according to an embodiment of the present disclosure.

Referring also to FIG. 41, threat mitigation process 10 may establish 2600 connectivity with a plurality of security-relevant subsystems (e.g., security-relevant subsystems 226) within a computing platform (e.g., computing platform 60).

As discussed above, establishing connectivity between security-relevant subsystems (e.g., security-relevant subsystems 226) may require a multifaceted approach that encompasses network configuration, secure communication protocols, authentication, authorization mechanisms, and centralized management.

As discussed above, examples of security-relevant subsystems 226 may include but are not limited to: CDN (i.e., Content Delivery Network) systems; DAM (i.e., Database Activity Monitoring) systems; UBA (i.e., User Behavior Analytics) systems; MDM (i.e., Mobile Device Management) systems; IAM (i.e., Identity and Access Management) systems; DNS (i.e., Domain Name Server) systems, antivirus systems, operating systems, data lakes; data logs; security-relevant software applications; security-relevant hardware systems; and resources external to the computing platform.

Threat mitigation process 10 may receive 2602 an initial notification (e.g., initial notification 298) of a security event from one of the security-relevant subsystems (e.g., security-relevant subsystems 226), wherein the initial notification (e.g., initial notification 298) includes a computer-readable language portion that defines one or more specifics of the security event. As discussed above, examples of such security events may include but are not limited to access auditing; anomalies; authentication; denial of services; exploitation; malware; phishing; spamming; reconnaissance; and/or web attack within a monitored computing platform (e.g., computing platform 60). An example of the computer-readable language portion (e.g., within the notification of the security event) may include but is not limited to a JSON portion.

When receiving 2602 an initial notification (e.g., initial notification 298) of a security event from one of the security-relevant subsystems (e.g., security-relevant subsystems 226), threat mitigation process 10 may receive 2604 the initial notification (e.g., initial notification 298) of the security event from an agent (e.g., agent 300) executed on one of the security-relevant subsystems (e.g., security-relevant subsystems 226).

As discussed above, an agent (e.g., agent 300) may refer to a software component that plays a crucial role in monitoring, detecting, and reporting potential security threats or malicious activities within a computing platform (e.g., computing platform 60). These agents (e.g., agent 300) may be deployed across various parts of a computing platform (e.g., computing platform 60) to ensure comprehensive surveillance and protection.

Threat mitigation process 10 may process 2606 the initial notification (e.g., initial notification 298) using a generative AI model (e.g., generative AI model 302) and a formatting script (e.g., formatting script 304) to define one or more recommended actions.

As discussed above and with respect to the (above-illustrated) summarized human-readable report (e.g., summarized human-readable report 306), examples of one or more recommended actions defined therein are as follows:

Recommend Actions:

- Selective shutdown/suspension of user account(s).
- Selective shutdown of impacted port(s).
- Selective shutdown of suspicious stream(s).
- Quarantining of inbound file(s).

When processing 2606 the initial notification (e.g., initial notification 298) using a generative AI model (e.g., generative AI model 302) and a formatting script (e.g., formatting script 304) to define one or more recommended actions, threat mitigation process 10 may process 2608 the initial notification (e.g., initial notification 298) using the generative AI model (e.g., generative AI model 302), the formatting script (e.g., formatting script 304) and/or one or more tools (e.g., tools 310) to define one or more recommended actions for the initial notification (e.g., initial notification 298).

As discussed above, the one or more tools (e.g., tools 310) includes one or more of: a decoding tool to decode an encoded initial notification (e.g., initial notification 298); a decompression tool to decompress a compressed initial notification (e.g., initial notification 298); and an identification tool to identify an owner of a domain associated with the initial notification (e.g., initial notification 298).

When processing 2606 the initial notification (e.g., initial notification 298) using a generative AI model (e.g., generative AI model 302) and a formatting script (e.g., formatting script 304) to define one or more recommended actions, threat mitigation process 10 may process 2610 the initial notification (e.g., initial notification 298) using a large language model (e.g., large language model 308).

As discussed above, a large language model (e.g., large language model 308) is an advanced artificial intelligence system designed to understand and generate human-like text, which is trained on vast amounts of text data, learning patterns and structures of language. These LLMs can perform various natural language processing tasks, such as answering questions, generating text, translating languages, and more. LLMs work by processing input text, analyzing it, and generating appropriate responses based on learned patterns and context.

When processing 2606 the initial notification (e.g., initial notification 298) using a generative AI model (e.g., generative AI model 302) and a formatting script (e.g., formatting script 304) to define one or more recommended actions, threat mitigation process 10 may utilize 2612 prompt engineering to define one or more recommended actions for the initial notification (e.g., initial notification 298).

As discussed above, prompt engineering is an essential aspect of working with large language models (e.g., large language model 308), as it provides a way to guide the AI model's responses and ensure that they are accurate, relevant, and appropriate for the intended application.

When processing 2606 the initial notification (e.g., initial notification 298) using a generative AI model (e.g., generative AI model 302) and a formatting script (e.g., formatting script 304) to define one or more recommended actions, threat mitigation process 10 may utilize 2614 several loops and/or nested loops to define one or more recommended actions for the initial notification (e.g., initial notification 298).

As discussed above, in the intricate process of investigating security events on a computing platform (e.g., computing platform 60), the strategic application of loops and nested loops within an iterative AI process (e.g., generative AI model 302) proves to be immensely beneficial. These programming constructs allow for the automation of repetitive tasks, crucial in the analysis of vast volumes of network traffic data for potential security threats. A loop facilitates the sequential examination of collected data, enabling the AI system to methodically identify unusual patterns or signatures indicative of malicious activities. The complexity of network security investigations is further addressed through the implementation of nested loops, where a loop is embedded within another, thereby allowing for multi-layered analysis.

Threat mitigation process 10 may automatically generate 2616 a playbook (e.g., playbook 322) to effectuate at least one of the above-discussed recommended actions. The playbook (e.g., playbook 322) may define a set of procedures and/or guidelines configured to at least partially address the security event.

In the context of a Network Intrusion Detection System (NIDS) and broader cybersecurity operations, a playbook (e.g., playbook 322) refers to a predefined set of procedures or steps that are to be followed in response to specific types of alerts or indicators of compromise. These playbooks (e.g., playbook 322) may be essential for ensuring that an organization's response to potential threats is swift, effective, and consistent.

Examples of the roles and benefits of playbooks (e.g., playbook 322) in a NIDS context are as follows:

- Standardizing Response Procedures: Playbooks provide a standardized method for responding to different types of security incidents. This standardization helps in minimizing errors and ensures that all necessary steps are taken to mitigate and analyze the threat.
- Automating Response Actions: Many modern NIDS and Security Orchestration, Automation, and Response (SOAR) platforms allow for the automation of certain playbook actions. For example, a playbook might automatically isolate a compromised system from the network, update firewall rules to block malicious traffic, or gather additional context about an alert without human intervention.

- Facilitating Quick Decision-Making: By having a set of predetermined actions, playbooks enable security analysts to make quick decisions in response to detected threats. This is crucial in minimizing the time an attacker has inside the network and reducing the potential damage they can cause.
- Enhancing Incident Management: Playbooks help in organizing the workflow of incident response, from initial detection to post-incident analysis. This includes specifying roles and responsibilities, documenting actions taken, and ensuring compliance with regulatory requirements.
- Improving Training and Readiness: Playbooks are also valuable training tools for security teams. They help in familiarizing new analysts with the typical response processes and can be used in tabletop exercises to simulate responses to hypothetical security incidents.
- Evolving with Threat Landscape: As new types of attacks emerge and organizations' network environments change, playbooks must be regularly updated. This ensures that the response strategies remain effective against the latest threats and are aligned with the current network architecture and business processes.

In summary, playbooks (e.g., playbook 322) in a Network Intrusion Detection System context may be critical for managing and responding to security incidents efficiently. They help in minimizing the impact of attacks, ensuring compliance with regulatory standards, and maintaining the overall security posture of an organization.

When automatically generating 2616 a playbook (e.g., playbook 322) to effectuate at least one of the recommended actions, threat mitigation process 10 may automatically generate 2618 a playbook (e.g., playbook 322) based, at least in part, upon best practices defined via artificial intelligence (e.g., AI/ML process 56).

For example and during the operation of threat mitigation process 10, data may be archived concerning activities that occurred within the computing platform (e.g., computing platform 60). So over time, threat mitigation process 10 may build a data repository (e.g., data repository 312) that identifies various examples of "concerning" activities within the computing platform (e.g., computing platform 60), the procedures employed to address these "concerning" activities, and whether such procedures were successful. Accordingly, threat mitigation process 10 may automatically generate 2618 a playbook (e.g., playbook 322) based, at least in part, upon best practices extracted from data repository 312 via artificial intelligence (e.g., AI/ML process 56). Accordingly and through the use of threat mitigation process 10, playbooks need not be static and may be dynamic . . . wherein threat mitigation process 10 may automatically generate 2618 playbook 322 based, at least in part, upon best practices defined via artificial intelligence (e.g., AI/ML process 56).

Threat mitigation process 10 may process 2620 the playbook (e.g., playbook 322) to address at least a portion of the security event, wherein processing 2620 the playbook (e.g., playbook 322) to address at least a portion of the security event may include performing 2622 the set of procedures and/or guidelines defined within the playbook (e.g., playbook 322). Examples of such procedures and/or guidelines defined within the playbook (e.g., playbook 322) may include but are not limited to:

- Selective shutdown/suspension of user account(s).
- Selective shutdown of impacted port(s).
- Selective shutdown of suspicious stream(s).
- Quarantining of inbound file(s).

Adaptive Defense

Figure 42:
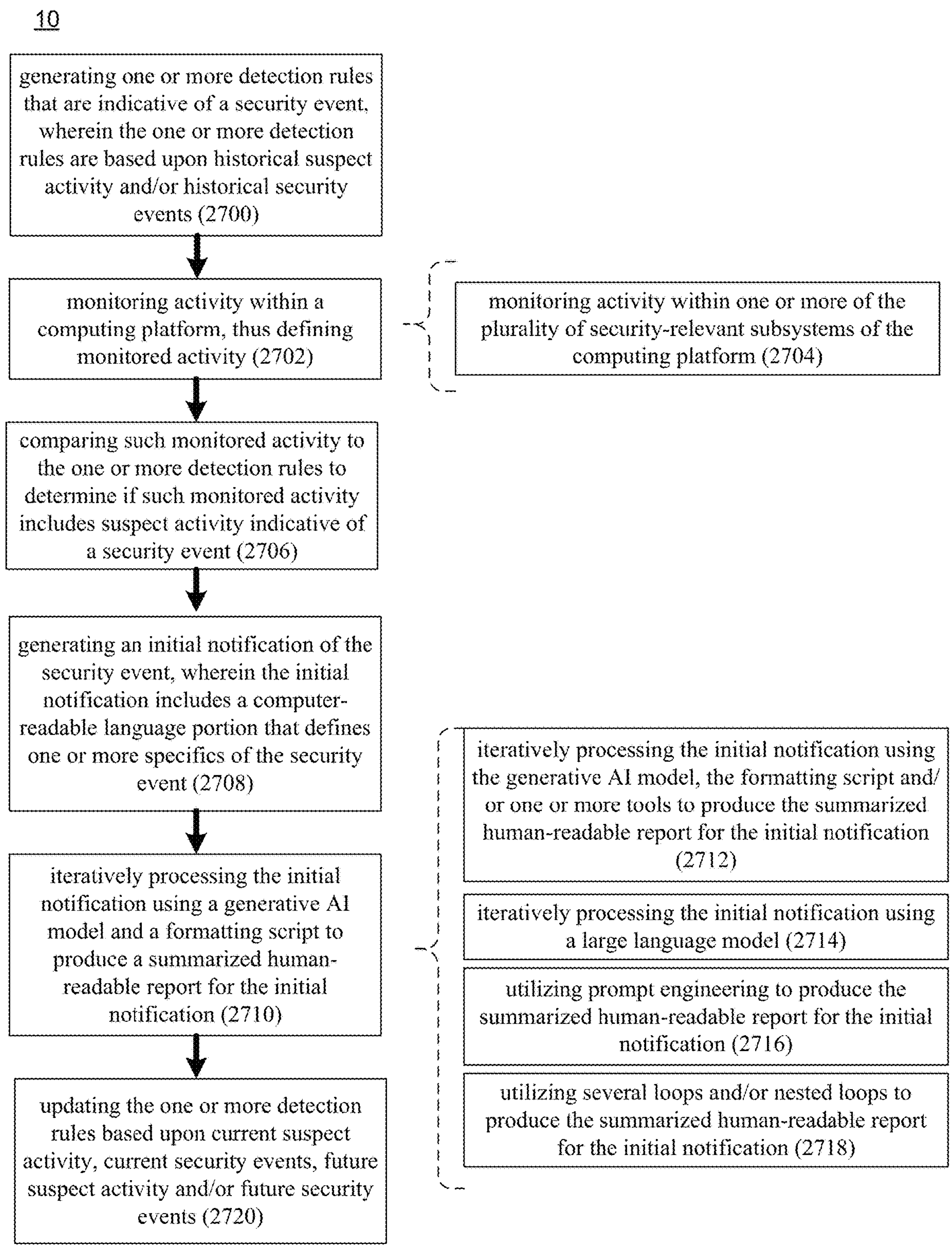
FIG. 42 is a flowchart of another implementation of the threat mitigation process of FIG. 1 according to an embodiment of the present disclosure.

Referring also to FIG. 42, threat mitigation process 10 may generate 2700 one or more detection rules (e.g., detection rules 324) that are indicative of a security event, wherein the one or more detection rules are based upon historical suspect activity and/or historical security events. As discussed above, examples of such security events may include but are not limited to access auditing; anomalies; authentication; denial of services; exploitation; malware; phishing; spamming; reconnaissance; and/or web attack within a monitored computing platform (e.g., computing platform 60).

As discussed above and during the operation of threat mitigation process 10, data may be archived concerning activities that occurred within the computing platform (e.g., computing platform 60). So over time, threat mitigation process 10 may build a data repository (e.g., data repository 312) that identifies various examples of "concerning" activities within the computing platform (e.g., computing platform 60), the procedures employed to address these "concerning" activities, and whether such procedures were successful. Accordingly, threat mitigation process 10 may generate 2700 such detection rules (e.g., detection rules 324) that are indicative of a security event based upon historical suspect activity and/or historical security events defined within data repository 312.

Threat mitigation process 10 may monitor 2702 activity within a computing platform (e.g., computing platform 60), thus defining monitored activity (e.g., monitored activity 326).

The computing platform (e.g., computing platform 60) may include a plurality of security-relevant subsystems (e.g., security-relevant subsystems 226).

As discussed above, examples of security-relevant subsystems 226 may include but are not limited to: CDN (i.e., Content Delivery Network) systems; DAM (i.e., Database Activity Monitoring) systems; UBA (i.e., User Behavior Analytics) systems; MDM (i.e., Mobile Device Management) systems; IAM (i.e., Identity and Access Management) systems; DNS (i.e., Domain Name Server) systems, antivirus systems, operating systems, data lakes; data logs; security-relevant software applications; security-relevant hardware systems; and resources external to the computing platform.

Accordingly and when monitoring 2702 activity within a computing platform (e.g., computing platform 60), threat mitigation process 10 may monitor 2704 activity within one or more of the plurality of security-relevant subsystems (e.g., security-relevant subsystems 226) of the computing platform (e.g., computing platform 60).

Threat mitigation process 10 may compare 2706 such monitored activity (e.g., monitored activity 326) to the one or more detection rules (e.g., detection rules 324) to determine if such monitored activity (e.g., monitored activity 326) includes suspect activity indicative of a security event.

As discussed above, examples of such security events may include but are not limited to access auditing; anomalies; authentication; denial of services; exploitation; malware; phishing; spamming; reconnaissance; and/or web attack within a monitored computing platform (e.g., computing platform 60).

Threat mitigation process 10 may generate 2708 an initial notification (e.g., initial notification 298) of the security event, wherein the initial notification (e.g., initial notification 298) includes a computer-readable language portion that defines one or more specifics of the security event. An example of the computer-readable language portion (e.g., within the notification of the security event) may include but is not limited to a JSON portion.

Threat mitigation process 10 may iteratively process 2710 the initial notification (e.g., initial notification 298) using a generative AI model (e.g., generative AI model 302) and a formatting script (e.g., formatting script 304) to produce a summarized human-readable report (e.g., summarized human-readable report 306) for the initial notification (e.g., initial notification 298).

As discussed above, the summarized human-readable report (e.g., summarized human-readable report 306) may define recommended next steps, recommended actions and/or disclaimers. For example and in response to a security event that is based upon suspicious activity occurring on computing platform 60:

- Recommended Next Steps may provide examples of additional investigations that may be implemented (e.g., port analysis/domain owner identification/perpetrator analysis) to further analyze the security event to gauge the risk/severity of the same.
- Recommended Actions may provide examples of responsive actions that may be implemented (e.g., port blocking/stream shutdown/perpetrator account disablement) to mitigate the negative impact of the security event.
- Disclaimers may provide explanations for why the suspicious activity of the security event may be benign and occurring for a legitimate (i.e., non-threatening) reason (e.g., such port traffic may occur during weekly backups, the person performing this operation is the president.

When iteratively processing 2710 the initial notification (e.g., initial notification 298) using a generative AI model (e.g., generative AI model 302) and a formatting script (e.g., formatting script 304) to produce a summarized human-readable report (e.g., summarized human-readable report 306) for the initial notification (e.g., initial notification 298), threat mitigation process 10 may iteratively process 2712 the initial notification (e.g., initial notification 298) using the generative AI model (e.g., generative AI model 302), the formatting script (e.g., formatting script 304) and/or one or more tools (e.g., tools 310) to produce the summarized human-readable report (e.g., summarized human-readable report 306) for the initial notification (e.g., initial notification 298).

As discussed above, the one or more tools (e.g., tools 310) includes one or more of: a decoding tool to decode an encoded initial notification (e.g., initial notification 298); a decompression tool to decompress a compressed initial notification (e.g., initial notification 298); and an identification tool to identify an owner of a domain associated with the initial notification (e.g., initial notification 298).

When iteratively processing 2710 the initial notification (e.g., initial notification 298) using a generative AI model (e.g., generative AI model 302) and a formatting script (e.g., formatting script 304) to produce a summarized human-readable report (e.g., summarized human-readable report 306) for the initial notification (e.g., initial notification 298), threat mitigation process 10 may iteratively process 2714 the initial notification (e.g., initial notification 298) using a large language model (e.g., large language model 308).

As discussed above, a large language model (e.g., large language model 308) is an advanced artificial intelligence system designed to understand and generate human-like text, which is trained on vast amounts of text data, learning patterns and structures of language. These LLMs can perform various natural language processing tasks, such as answering questions, generating text, translating languages, and more. LLMs work by processing input text, analyzing it, and generating appropriate responses based on learned patterns and context.

When iteratively processing 2710 the initial notification (e.g., initial notification 298) using a generative AI model (e.g., generative AI model 302) and a formatting script (e.g., formatting script 304) to produce a summarized human-readable report (e.g., summarized human-readable report 306) for the initial notification (e.g., initial notification 298), threat mitigation process 10 may utilize 2716 prompt engineering to produce the summarized human-readable report (e.g., summarized human-readable report 306) for the initial notification (e.g., initial notification 298).

As discussed above, prompt engineering is an essential aspect of working with large language models (e.g., large language model 308), as it provides a way to guide the AI model's responses and ensure that they are accurate, relevant, and appropriate for the intended application.

When iteratively processing 2710 the initial notification (e.g., initial notification 298) using a generative AI model (e.g., generative AI model 302) and a formatting script (e.g., formatting script 304) to produce a summarized human-readable report (e.g., summarized human-readable report 306) for the initial notification (e.g., initial notification 298), threat mitigation process 10 may utilize 2718 several loops and/or nested loops to produce the summarized human-readable report (e.g., summarized human-readable report 306) for the initial notification (e.g., initial notification 298).

As discussed above, in the intricate process of investigating security events on a computing platform (e.g., computing platform 60), the strategic application of loops and nested loops within an iterative AI process (e.g., generative AI model 302) proves to be immensely beneficial. These programming constructs allow for the automation of repetitive tasks, crucial in the analysis of vast volumes of network traffic data for potential security threats. A loop facilitates the sequential examination of collected data, enabling the AI system to methodically identify unusual patterns or signatures indicative of malicious activities. The complexity of network security investigations is further addressed through the implementation of nested loops, where a loop is embedded within another, thereby allowing for multi-layered analysis.

Threat mitigation process 10 may update 2720 the one or more detection rules (e.g., detection rules 324) based upon current suspect activity, current security events, future suspect activity and/or future security events.

As discussed above and as threat mitigation process 10 continues to operate, data may continue to be archived concerning activities that occurred within the computing platform (e.g., computing platform 60). And as time continues to pass, threat mitigation process 10 may continue to build a data repository (e.g., data repository 312) that identifies various examples of "concerning" activities within the computing platform (e.g., computing platform 60), the procedures employed to address these "concerning" activities, and whether such procedures were successful. Accordingly, threat mitigation process 10 may update 2720 the one or more detection rules (e.g., detection rules 324) based upon current suspect activity, current security events, future suspect activity and/or future security events.

Next Generation Risk Modeling

Figure 43:
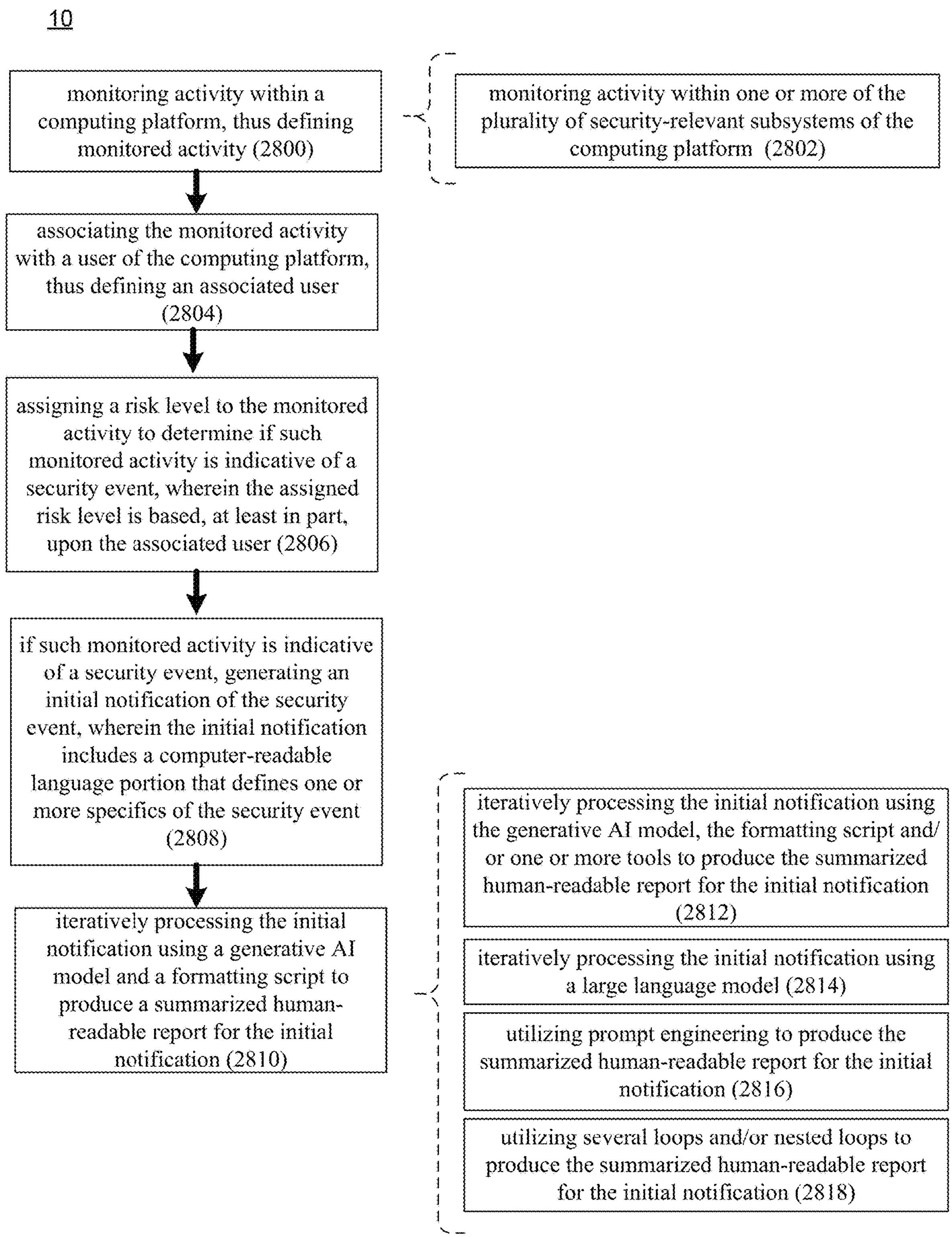
FIG. 43 is a flowchart of another implementation of the threat mitigation process of FIG. 1 according to an embodiment of the present disclosure.

Referring also to FIG. 43, threat mitigation process 10 may monitor 2800 activity within a computing platform (e.g., computing platform 60), thus defining monitored activity (e.g., monitored activity 326).

As discussed above, examples of security-relevant subsystems 226 may include but are not limited to: CDN (i.e., Content Delivery Network) systems; DAM (i.e., Database Activity Monitoring) systems; UBA (i.e., User Behavior Analytics) systems; MDM (i.e., Mobile Device Management) systems; IAM (i.e., Identity and Access Management) systems; DNS (i.e., Domain Name Server) systems, antivirus systems, operating systems, data lakes; data logs; security-relevant software applications; security-relevant hardware systems; and resources external to the computing platform.

The computing platform (e.g., computing platform 60) may include a plurality of security-relevant subsystems (e.g., security-relevant subsystems 226).

As discussed above, examples of security-relevant subsystems 226 may include but are not limited to: CDN (i.e., Content Delivery Network) systems; DAM (i.e., Database Activity Monitoring) systems; UBA (i.e., User Behavior Analytics) systems; MDM (i.e., Mobile Device Management) systems; IAM (i.e., Identity and Access Management) systems; DNS (i.e., Domain Name Server) systems, antivirus systems, operating systems, data lakes; data logs; security-relevant software applications; security-relevant hardware systems; and resources external to the computing platform.

Accordingly and when monitoring 2800 activity within a computing platform (e.g., computing platform 60), threat mitigation process 10 may monitor 2802 activity within one or more of the plurality of security-relevant subsystems (e.g., security-relevant subsystems 226) of the computing platform (e.g., computing platform 60).

Threat mitigation process 10 may associate 2804 the monitored activity (e.g., monitored activity 326) with a user of the computing platform (e.g., computing platform 60), thus defining an associated user (e.g., associated user 328).

Threat mitigation process 10 may assign 2806 a risk level to the monitored activity (e.g., monitored activity 326) to determine if such monitored activity (e.g., monitored activity 326) is indicative of a security event, wherein the assigned risk level is based, at least in part, upon the associated user (e.g., associated user 328). Accordingly, if the associated user (e.g., associated user 328) is the owner of the company, the assigned risk level may be reduced due to the position of associated user 328. Conversely, if the associated user (e.g., associated user 328) is a new hire of the company (or someone who has shown questionable judgement in the past), the assigned risk level may be increased.

As discussed above, examples of such security events may include but are not limited to access auditing; anomalies; authentication; denial of services; exploitation; malware; phishing; spamming; reconnaissance; and/or web attack within a monitored computing platform (e.g., computing platform 60).

If such monitored activity (e.g., monitored activity 326) is indicative of a security event, threat mitigation process 10 may generate 2808 an initial notification (e.g., initial notification 298) of the security event, wherein the initial notification (e.g., initial notification 298) includes a computer-readable language portion that defines one or more specifics of the security event. An example of the computer-readable language portion (e.g., within the notification of the security event) may include but is not limited to a JSON portion.

Threat mitigation process 10 may iteratively process 2810 the initial notification (e.g., initial notification 298) using a generative AI model (e.g., generative AI model 302) and a formatting script (e.g., formatting script 304) to produce a summarized human-readable report (e.g., summarized human-readable report 306) for the initial notification (e.g., initial notification 298).

When iteratively processing 2810 the initial notification (e.g., initial notification 298) using a generative AI model (e.g., generative AI model 302) and a formatting script (e.g., formatting script 304) to produce a summarized human-readable report (e.g., summarized human-readable report 306) for the initial notification (e.g., initial notification 298), threat mitigation process 10 may iteratively process 2812 the initial notification (e.g., initial notification 298) using the generative AI model (e.g., generative AI model 302), the formatting script (e.g., formatting script 304) and/or one or more tools (e.g., tools 310) to produce the summarized human-readable report (e.g., summarized human-readable report 306) for the initial notification (e.g., initial notification 298).

As discussed above, the one or more tools (e.g., tools 310) includes one or more of: a decoding tool to decode an encoded initial notification (e.g., initial notification 298); a decompression tool to decompress a compressed initial notification (e.g., initial notification 298); and an identification tool to identify an owner of a domain associated with the initial notification (e.g., initial notification 298).

When iteratively processing 2810 the initial notification (e.g., initial notification 298) using a generative AI model (e.g., generative AI model 302) and a formatting script (e.g., formatting script 304) to produce a summarized human-readable report (e.g., summarized human-readable report 306) for the initial notification (e.g., initial notification 298), threat mitigation process 10 may iteratively process 2814 the initial notification (e.g., initial notification 298) using a large language model (e.g., large language model 308).

As discussed above, a large language model (e.g., large language model 308) is an advanced artificial intelligence system designed to understand and generate human-like text, which is trained on vast amounts of text data, learning patterns and structures of language. These LLMs can perform various natural language processing tasks, such as answering questions, generating text, translating languages, and more. LLMs work by processing input text, analyzing it, and generating appropriate responses based on learned patterns and context.

When iteratively processing 2810 the initial notification (e.g., initial notification 298) using a generative AI model (e.g., generative AI model 302) and a formatting script (e.g., formatting script 304) to produce a summarized human-readable report (e.g., summarized human-readable report 306) for the initial notification (e.g., initial notification 298), threat mitigation process 10 may utilize 2816 prompt engineering to produce the summarized human-readable report (e.g., summarized human-readable report 306) for the initial notification (e.g., initial notification 298).

As discussed above, prompt engineering is an essential aspect of working with large language models (e.g., large language model 308), as it provides a way to guide the AI model's responses and ensure that they are accurate, relevant, and appropriate for the intended application.

When iteratively processing 2810 the initial notification (e.g., initial notification 298) using a generative AI model (e.g., generative AI model 302) and a formatting script (e.g., formatting script 304) to produce a summarized human-readable report (e.g., summarized human-readable report 306) for the initial notification (e.g., initial notification 298), threat mitigation process 10 may utilize 2818 several loops and/or nested loops to produce the summarized human-readable report (e.g., summarized human-readable report 306) for the initial notification (e.g., initial notification 298).

As discussed above, in the intricate process of investigating security events on a computing platform (e.g., computing platform 60), the strategic application of loops and nested loops within an iterative AI process (e.g., generative AI model 302) proves to be immensely beneficial. These programming constructs allow for the automation of repetitive tasks, crucial in the analysis of vast volumes of network traffic data for potential security threats. A loop facilitates the sequential examination of collected data, enabling the AI system to methodically identify unusual patterns or signatures indicative of malicious activities. The complexity of network security investigations is further addressed through the implementation of nested loops, where a loop is embedded within another, thereby allowing for multi-layered analysis.

AI-Based Threat Mitigation Platform

Figure 44:
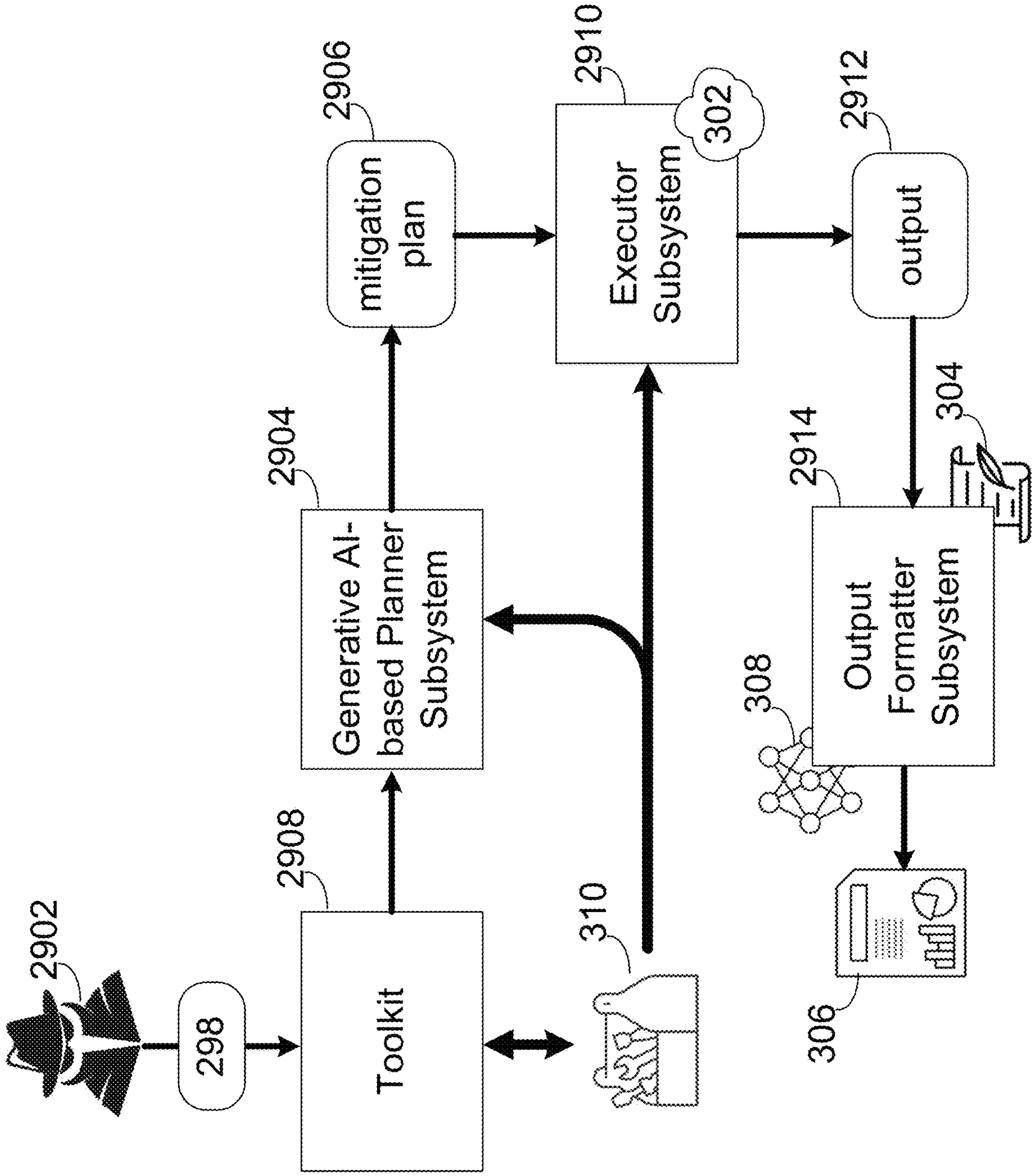
FIG. 44 is a diagrammatic view of a threat mitigation platform for effectuating the threat mitigation process of FIG. 1 according to an embodiment of the present disclosure.

Referring also to FIG. 44, there is shown threat mitigation platform 2900. Threat mitigation platform 2900 may include an agent subsystem (e.g., an agent subsystem 2902) configured to generate an initial notification (e.g., initial notification 298) concerning a security event within a computing platform (e.g., computing platform 60).

As discussed above, examples of such security events may include but are not limited to access auditing; anomalies; authentication; denial of services; exploitation; malware; phishing; spamming; reconnaissance; and/or web attack within a monitored computing platform (e.g., computing platform 60).

The threat mitigation platform (e.g., threat mitigation platform 2900) may include a generative AI-based planner subsystem (e.g., generative AI-based planner subsystem 2904) configured to receive the initial notification (e.g., initial notification 298) and generate a mitigation plan (e.g., mitigation plan 2906) to address, in whole or in part, the security event within the computing platform (e.g., computing platform 60).

The generative AI-based planner subsystem (e.g., generative AI-based planner subsystem 2904) may be configured to utilize one or more tools (e.g., tools 310) available via tool kit 2908 to process the initial notification (e.g., initial notification 298).

As discussed above, the one or more tools (e.g., tools 310) utilized by generative AI-based planner subsystem 2904 includes one or more of: a decoding tool to decode an encoded initial notification (e.g., initial notification 298); a decompression tool to decompress a compressed initial notification (e.g., initial notification 298); and an identification tool to identify an owner of a domain associated with the initial notification (e.g., initial notification 298).

The threat mitigation platform (e.g., threat mitigation platform 2900) may include an executor subsystem (e.g., executor subsystem 2910) configured to iteratively process the mitigation plan (e.g., mitigation plan 2906) using a generative AI model (e.g., generative AI model 302) to generate an output (e.g., output 2912).

The executor subsystem (e.g., executor subsystem 2910) may be configured to utilize one or more tools (e.g., tools 310) available via tool kit 2908 to process the mitigation plan (e.g., mitigation plan 2906).

As discussed above, the one or more tools (e.g., tools 310) utilized by the executor subsystem 2908 includes one or more of: a decoding tool to decode an encoded initial notification (e.g., initial notification 298); a decompression tool to decompress a compressed initial notification (e.g., initial notification 298); and an identification tool to identify an owner of a domain associated with the initial notification (e.g., initial notification 298).

The executor subsystem (e.g., executor subsystem 2910) may be configured to utilize several loops and/or nested loops to generate the output (e.g., output 2912).

As discussed above, in the intricate process of investigating security events on a computing platform (e.g., computing platform 60), the strategic application of loops and nested loops within an iterative AI process (e.g., generative AI model 302) proves to be immensely beneficial. These programming constructs allow for the automation of repetitive tasks, crucial in the analysis of vast volumes of network traffic data for potential security threats. A loop facilitates the sequential examination of collected data, enabling the AI system to methodically identify unusual patterns or signatures indicative of malicious activities. The complexity of network security investigations is further addressed through the implementation of nested loops, where a loop is embedded within another, thereby allowing for multi-layered analysis.

The threat mitigation platform (e.g., threat mitigation platform 2900) may include an output formatter subsystem (e.g., output formatter subsystem 2914) configured to format the output (e.g., output 2912) and generate a summarized human-readable report (e.g., summarized human-readable report 306) for the initial notification (e.g., initial notification 298).

The output formatter subsystem (e.g., output formatter subsystem 2914) may be configured to utilize a large language model (e.g., large language model 308) to generate the summarized human-readable report (e.g., summarized human-readable report 306) for the initial notification (e.g., initial notification 298).

As discussed above, a large language model (e.g., large language model 308) is an advanced artificial intelligence system designed to understand and generate human-like text, which is trained on vast amounts of text data, learning patterns and structures of language. These LLMs can perform various natural language processing tasks, such as answering questions, generating text, translating languages, and more. LLMs work by processing input text, analyzing it, and generating appropriate responses based on learned patterns and context.

The output formatter subsystem (e.g., output formatter subsystem 2914) may be configured to utilize a formatting script (e.g., formatting script 304) to generate the summarized human-readable report (e.g., summarized human-readable report 306) for the initial notification (e.g., initial notification 298).

As discussed above, the summarized human-readable report (e.g., summarized human-readable report 306) may define recommended next steps, recommended actions and/or disclaimers. For example and in response to a security event that is based upon suspicious activity occurring on computing platform 60:

- Recommended Next Steps may provide examples of additional investigations that may be implemented (e.g., port analysis/domain owner identification/perpetrator analysis) to further analyze the security event to gauge the risk/severity of the same.
- Recommended Actions may provide examples of responsive actions that may be implemented (e.g., port blocking/stream shutdown/perpetrator account disablement) to mitigate the negative impact of the security event.
- Disclaimers may provide explanations for why the suspicious activity of the security event may be benign and occurring for a legitimate (i.e., non-threatening) reason (e.g., such port traffic may occur during weekly backups, the person performing this operation is the president.

General

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object-oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general-purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method executed on a computing device comprising:
   - establishing connectivity with a plurality of security-relevant subsystems within a computing platform;
   - receiving an initial notification of a security event from one of the security-relevant subsystems, wherein the initial notification includes a computer-readable language portion that defines one or more specifics of the security event;
   - processing the initial notification using a generative AI model and a formatting script to produce a summarized human-readable report for the initial notification, wherein the summarized human-readable report defines one or more recommended actions, and wherein the formatting script
     - tailors prompts to one or more of fit specific use cases and elicit more accurate response from the generative AI model; and
   - automatically executing some or all of the recommended actions to address the security event.

2. The computer-implemented method of claim 1 wherein receiving an initial notification of a security event from one of the security-relevant subsystems includes:
   - receiving the initial notification of the security event from an agent executed on one of the security-relevant subsystems.

3. The computer-implemented method of claim 1 wherein processing the initial notification using a generative AI model and a formatting script to produce a summarized human-readable report for the initial notification includes:
   - processing the initial notification using the generative AI model, the formatting script and one or more tools to produce the summarized human-readable report for the initial notification.

4. The computer-implemented method of claim 3 wherein the one or more tools includes one or more of:
   - a decoding tool to decode an encoded initial notification;
   - a decompression tool to decompress a compressed initial notification; and
   - an identification tool to identify an owner of a domain associated with the initial notification.

5. The computer-implemented method of claim 1 wherein processing the initial notification using a generative AI model and a formatting script to produce a summarized human-readable report for the initial notification includes:
   - processing the initial notification using a large language model.

6. The computer-implemented method of claim 1 wherein processing the initial notification using a generative AI model and a formatting script to produce a summarized human-readable report for the initial notification includes:
   - utilizing prompt engineering to produce the summarized human-readable report for the initial notification.

7. The computer-implemented method of claim 1 wherein processing the initial notification using a generative AI model and a formatting script to produce a summarized human-readable report for the initial notification includes:
   - utilizing several loops and/or nested loops to produce the summarized human-readable report for the initial notification.

8. The computer-implemented method of claim 1 wherein automatically executing some or all of the recommended actions includes:
   - automatically performing one or more remedial operations concerning the security event.

9. A computer program product residing on a non-transitory computer readable medium having a plurality of instructions stored thereon which, when executed by a processor, cause the processor to perform operations comprising:
   - establishing connectivity with a plurality of security-relevant subsystems within a computing platform;
   - receiving an initial notification of a security event from one of the security-relevant subsystems, wherein the initial notification includes a computer-readable language portion that defines one or more specifics of the security event;
   - processing the initial notification using a generative AI model and a formatting script to produce a summarized human-readable report for the initial notification, wherein the summarized human-readable report defines one or more recommended actions, and wherein the formatting script
     - tailors prompts to one or more of fit specific use cases and elicit more accurate response from the generative AI model; and
   - automatically executing some or all of the recommended actions to address the security event.

10. The computer program product of claim 9 wherein receiving an initial notification of a security event from one of the security-relevant subsystems includes:
   - receiving the initial notification of the security event from an agent executed on one of the security-relevant subsystems.

11. The computer program product of claim 9 wherein processing the initial notification using a generative AI model and a formatting script to produce a summarized human-readable report for the initial notification includes:
   - processing the initial notification using the generative AI model, the formatting script and one or more tools to produce the summarized human-readable report for the initial notification.

12. The computer program product of claim 11 wherein the one or more tools includes one or more of:
   - a decoding tool to decode an encoded initial notification;
   - a decompression tool to decompress a compressed initial notification; and
   - an identification tool to identify an owner of a domain associated with the initial notification.

13. The computer program product of claim 9 wherein processing the initial notification using a generative AI model and a formatting script to produce a summarized human-readable report for the initial notification includes:
   - processing the initial notification using a large language model.

14. The computer program product of claim 9 wherein processing the initial notification using a generative AI model and a formatting script to produce a summarized human-readable report for the initial notification includes:

utilizing prompt engineering to produce the summarized human-readable report for the initial notification.

15. The computer program product of claim 9 wherein processing the initial notification using a generative AI model and a formatting script to produce a summarized human-readable report for the initial notification includes:

utilizing several loops and/or nested loops to produce the summarized human-readable report for the initial notification.

16. The computer program product of claim 9 wherein automatically executing some or all of the recommended actions includes:

automatically performing one or more remedial operations concerning the security event.

17. A computing system including a processor and memory configured to perform operations comprising:

establishing connectivity with a plurality of security-relevant subsystems within a computing platform;

receiving an initial notification of a security event from one of the security-relevant subsystems, wherein the initial notification includes a computer-readable language portion that defines one or more specifics of the security event;

processing the initial notification using a generative AI model and a formatting script to produce a summarized human-readable report for the initial notification, wherein the summarized human-readable report defines one or more recommended actions, and wherein the formatting script tailors prompts to one or more of fit specific use cases and elicit more accurate response from the generative AI model; and automatically executing some or all of the recommended actions to address the security event.

18. The computing system of claim 17 wherein receiving an initial notification of a security event from one of the security-relevant subsystems includes:

receiving the initial notification of the security event from an agent executed on one of the security-relevant subsystems.

19. The computing system of claim 17 wherein processing the initial notification using a generative AI model and a formatting script to produce a summarized human-readable report for the initial notification includes:

processing the initial notification using the generative AI model, the formatting script and one or more tools to produce the summarized human-readable report for the initial notification.

20. The computing system of claim 19 wherein the one or more tools includes one or more of:

a decoding tool to decode an encoded initial notification;

a decompression tool to decompress a compressed initial notification; and an identification tool to identify an owner of a domain associated with the initial notification.

21. The computing system of claim 17 wherein processing the initial notification using a generative AI model and a formatting script to produce a summarized human-readable report for the initial notification includes:

processing the initial notification using a large language model.

22. The computing system of claim 17 wherein processing the initial notification using a generative AI model and a formatting script to produce a summarized human-readable report for the initial notification includes:

utilizing prompt engineering to produce the summarized human-readable report for the initial notification.

23. The computing system of claim 17 wherein processing the initial notification using a generative AI model and a formatting script to produce a summarized human-readable report for the initial notification includes:

utilizing several loops and/or nested loops to produce the summarized human-readable report for the initial notification.

24. The computing system of claim 17 wherein automatically executing some or all of the recommended actions includes:

automatically performing one or more remedial operations concerning the security event.

* * * * *